United States Patent
Tanaka

(10) Patent No.: US 7,877,473 B2
(45) Date of Patent: Jan. 25, 2011

(54) MODE DETECTION OF DATA TRANSFER BETWEEN A SOURCE DEVICE AND A CONNECTED PORTABLE DEVICE

(75) Inventor: Koujirou Tanaka, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/570,616

(22) PCT Filed: Jul. 21, 2005

(86) PCT No.: PCT/JP2005/013399
§ 371 (c)(1),
(2), (4) Date: Sep. 5, 2008

(87) PCT Pub. No.: WO2006/009210
PCT Pub. Date: Jan. 26, 2006

(65) Prior Publication Data
US 2009/0013027 A1   Jan. 8, 2009

(30) Foreign Application Priority Data
Jul. 21, 2004   (JP) ............................. 2004-213672

(51) Int. Cl.
  *G06F 13/00* (2006.01)
(52) U.S. Cl. .................................... 709/224
(58) Field of Classification Search ................ 703/203
  See application file for complete search history.

(56) References Cited

U.S. PATENT DOCUMENTS

| | | | |
|---|---|---|---|
| 6,489,980 B1 * | 12/2002 | Scott et al. ................... | 715/854 |
| 7,155,535 B2 * | 12/2006 | Agarwal et al. ............. | 709/238 |
| 2003/0028395 A1 * | 2/2003 | Rodgers et al. ................ | 705/1 |
| 2003/0217171 A1 * | 11/2003 | Von Stuermer et al. ..... | 709/231 |
| 2005/0004976 A1 * | 1/2005 | Mavrogeanes et al. ...... | 709/203 |
| 2005/0203991 A1 * | 9/2005 | Kawamura et al. .......... | 709/203 |

FOREIGN PATENT DOCUMENTS

| JP | 2001-78154 | 3/2001 |
|---|---|---|
| JP | 2002-514326 | 5/2002 |
| JP | 2003-317376 | 11/2003 |
| JP | 2005-141635 | 6/2005 |

OTHER PUBLICATIONS

U.S. Appl. No. 10/567,642, filed Feb. 9, 2006, Kawakami.
U.S. Appl. No. 10/569,984, filed Feb. 28, 2006, Tanaka.
U.S. Appl. No. 10/572,035, filed Mar. 15, 2006, Tanaka.
U.S. Appl. No. 10/572,580, filed Mar. 20, 2006, Tanaka.
U.S. Appl. No. 10/572,589, filed Mar. 20, 2006, Yamauchi et al.

* cited by examiner

*Primary Examiner*—Robert B Harrell
(74) *Attorney, Agent, or Firm*—Oblon, Spivak, McClelland, Maier & Neustadt, L.L.P.

(57) ABSTRACT

A method of exchanging content between a source device and a connected device based on a detected transfer mode. In a first mode, the source device retrieves data from a connected device and revokes the access right information corresponding to the content at the connected device. In a second mode, which is based on the detection of a group identification scheme included in the content, the content may be copied back and forth between the source device and the connected device without any revocation of access rights.

6 Claims, 52 Drawing Sheets

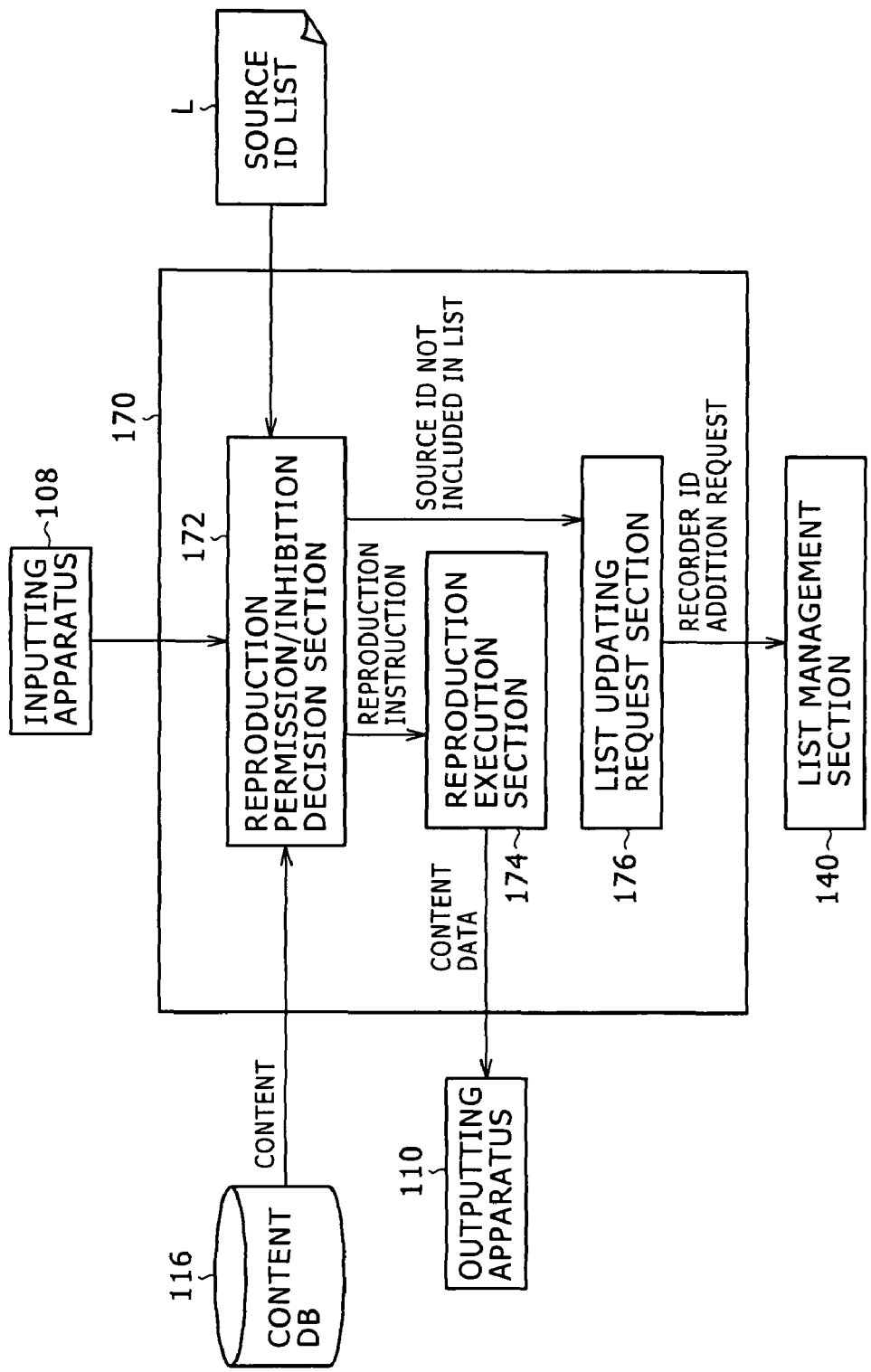

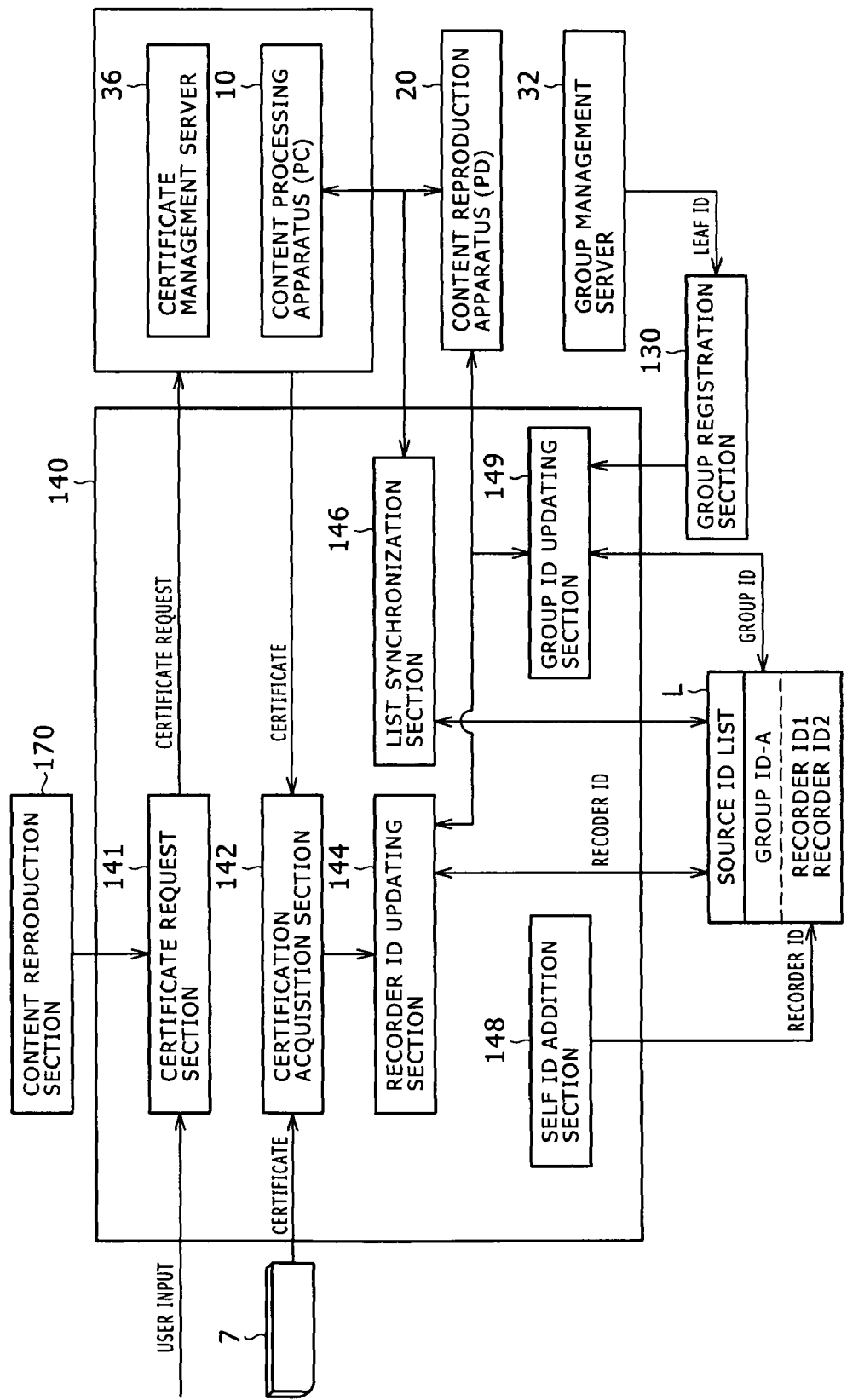

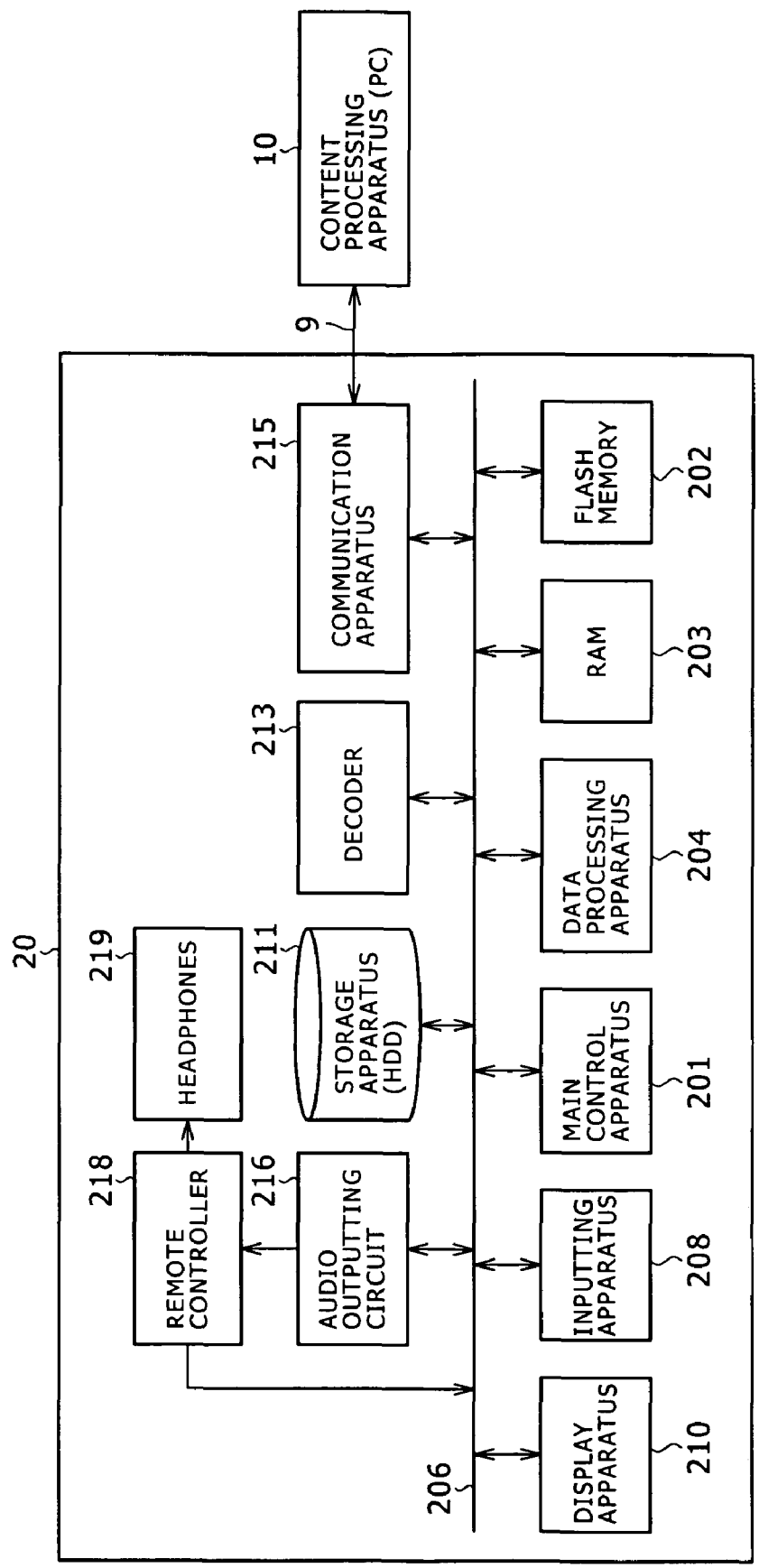

FIG.12

| 3241 | 3242 | 3243 | 3244 | 3245 |
|---|---|---|---|---|
| USER ID | CREDIT CARD NUMBER | LEAF ID | APPARATUS ID | RECORDER ID |
| Yamada Taro | XXX-XXXX | LEAF ID-A | TERMINAL ID1 | RECORDER ID1 |
|  |  |  | TERMINAL ID2 | RECORDER ID2 |
|  |  |  | DEVICE ID1 | — |
|  |  |  | DEVICE ID2 | — |
| Suzuki Jiro | YYY-YYYY | LEAF ID-B | TERMINAL ID10 | RECORDER ID10 |
|  |  |  | DEVICE ID12 | — |
|  |  |  | DEVICE ID13 | — |
| ... | ... | ... | ... | ... |

US 7,877,473 B2

MODE DETECTION OF DATA TRANSFER BETWEEN A SOURCE DEVICE AND A CONNECTED PORTABLE DEVICE

TECHNICAL FIELD

This invention relates to a content processing apparatus, a content processing method and a computer program.

BACKGROUND ART

Conventionally, a content providing service is carried out wherein digital contents such as music contents or image contents are loaded from a server in which the contents are stored into an information terminal such as a PC (Personal Computer) or a PDA (Personal Digital Assistant) owned by a user so that the contents are utilized on the information terminal. Further, the user can rip contents recorded on a recording medium such as a CD (Compact Disk) to copy the contents on a hard disk or the like of the PC and utilize the contents on the PC. Furthermore, also it is possible for the user to transfer the contents acquired by downloading, ripping or the like to a PD (Portable Device) owned by the user so that the contents are utilized on the PD.

If it is assumed that the user can freely utilize a content downloaded or ripped in such a manner as described above, then this is sometimes undesirable from the point of view of copyright protection. Therefore, copyright management is conventionally performed by providing a license corresponding to a content and setting right information of a reproduction-permission time number or a copying-permission time number of a content to the license such that reproduction control or transfer control of the content is performed based on the right information set to the license (for example, refer to Japanese Patent Laid-Open No. 2002-312211 and Japanese Patent Laid-Open No. 2003-296486)

However, where a PC or a PD which is a transfer destination of the content performs copyright management using a method different from that described above, a PC or the like of a transfer source must transfer the content with a format ready for the copyright management method so that reproduction control of the content can be performed by the transfer destination.

Therefore, the present invention has been made in view of such a problem as described above, and it is an object of the present invention to provide a content processing apparatus, a content processing method and a computer program wherein a content can be transferred using a method corresponding to that according to a copyright management method in an information processing apparatus of a transfer destination.

DISCLOSURE OF THE INVENTION

In order to solve the subject described above, according to an aspect of the present invention, there is provided a content processing apparatus configured so as to be capable of connecting for communication at least to a content reproduction apparatus which reproduces contents and capable of connecting for communication to a management server which manages the content processing apparatus for recording and/or reproducing contents and the content reproduction apparatus, including a reproduction control section for controlling reproduction of a content, which is distributed with a source ID applied thereto, based on a first source ID list which is retained by the content processing apparatus itself and indicates providing sources of contents whose reproduction is to be permitted and to which a group ID produced in a unit of a user is added when the content processing apparatus is registered in a unit of a user into the management server, a first display section for displaying title information of contents stored in the connected content reproduction apparatus, a selection section for selecting the title information of the contents displayed on the first display section, a requesting section for requesting transfer of a content corresponding to the title information selected by the selection section to the content processing apparatus, a transfer mode detection section for detecting a transfer mode of the connected content reproduction apparatus, a first transfer processing section for detecting, where the transfer mode detected by the transfer mode detection section is a first mode, whether the content corresponding to the title information selected by the selection section is a content transferred from the content processing apparatus to the content reproduction apparatus and for updating, where the content is a content transferred from the content processing apparatus, right information corresponding to the content stored in the content processing apparatus and deleting right information corresponding to the content stored in the content reproduction apparatus, and a second transfer processing section for detecting, where the transfer mode detected by the transfer mode detection section is a second mode, whether or not the group ID applied to the content processing apparatus is included in a second source ID list stored in the content reproduction apparatus, detecting, where the group ID is included in the second source ID list, whether the content corresponding to the title information selected by the selection section is stored in the content processing apparatus and transferring, where the content is not stored in the content processing apparatus, the content corresponding to the title information selected by the selection section from the content reproduction apparatus to the content processing apparatus.

As described above, according to the present invention, a content processing apparatus, a content processing method and a computer program wherein a content can be transferred using a method corresponding to that according to a copyright management method in an information processing apparatus of a transfer destination.

BRIEF DESCRIPTION OF THE DRAWINGS

FIG. 7 is a block diagram schematically showing functions of a content reproduction section according to the embodiment.

FIG. 8 is a block diagram schematically showing a configuration of a list management section according to the embodiment.

FIG. 9 is a block diagram schematically showing an example of a hardware configuration of a content reproduction apparatus according to the embodiment.

FIG. 12 is an explanatory view illustrating a data structure of a group registration database according to the embodiment.

BEST MODE FOR CARRYING OUT THE INVENTION

Figure 1:
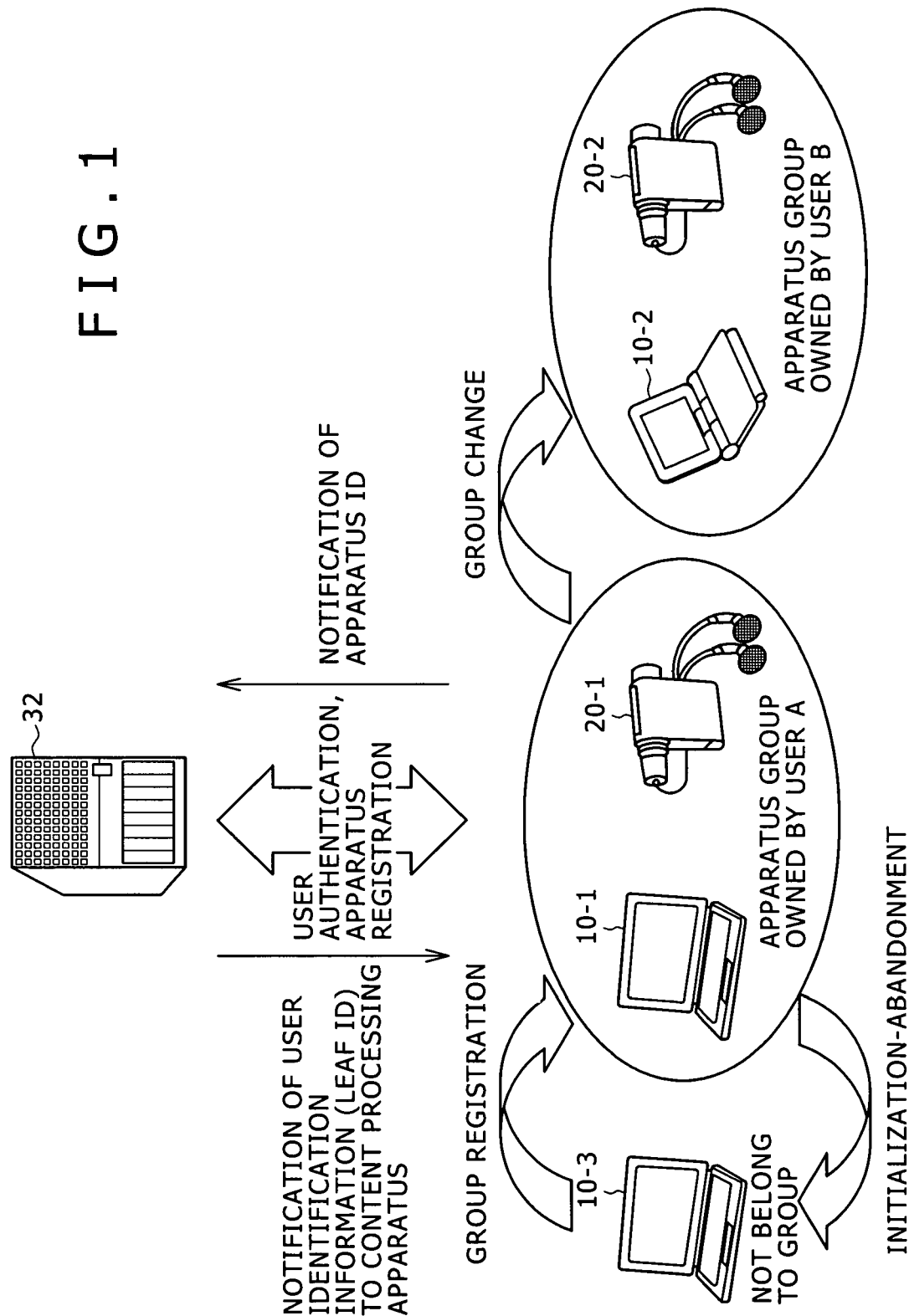
FIG. 1 is an explanatory view illustrating an outline of group registration of a content sharing system according to a first embodiment of the present invention.

In the following, preferred embodiments of the present invention are described in detail with reference to the accompanying drawings. It is to be noted that those components which have substantially same functional configurations are denoted by like reference characters and overlapping description of them is omitted herein.

First Embodiment

In the following, a content sharing system according to a first embodiment of the present invention and components of the content sharing system are described.

<1. Outline of Copyright Management of the Group Management Type>

First, an outline of a content sharing system ready for copyright management of the group management type according to the present invention is described.

The content sharing system according to the present embodiment is configured as a copyright management system for managing contents between a plurality of apparatus (content processing apparatus, content reproduction apparatus and so forth) to protect the copyright of the contents. In particular, the content sharing system restricts sharing of contents between apparatus owned by different users in order to prevent such illegal utilization of the contents as an act of mass distribution and so forth of contents through the Internet or the like.

On the other hand, the content sharing system is configured also as a system which implements a content sharing service by which contents can be shared freely to some degree between a plurality of apparatus owned by a same user (including not only a sole user but also a user group within a limited range such as members of a family, friends, colleagues and so forth: this similarly applies to the following expression).

In this manner, the content sharing system according to the present embodiment adopts a copyright management method (a copyright management scheme of "Group Management Type" hereinafter described) wherein, while copyright management is performed, sharing of contents is acknowledged within a range of private utilization such that the convenience and the degree of freedom in content sharing between a plurality of apparatus owned by a same user can be enhanced.

As described hereinabove, in the conventional copyright management system ready only for the "check-in check-out method" complying with the SDMI, illegal utilization of contents is restricted by restricting the copy number (number of times of check-in and check-out) of a content in a "unit of a content" based on a license which is right information which prescribes utilization authority of the content. In such a system as just described, since a copyright management process must be performed every time a content is copied (check-in check-out) between a plurality of content processing apparatus, the content sharing system has a drawback in that the system configuration is complicated and the processing speed is low and besides the degree of freedom in content utilization within a range of private utilization is low, resulting in lack of the convenience. Further, in such a conventional copyright management system of the check-in check-out type as described above, the user must always be conscious of the copy source or the number of times of copying of a content when it utilizes the system. Further, "prevention of copying of a content to an apparatus owned by another person" which is the original object of the copyright management system is not implemented.

In contrast, the content sharing system according to the present embodiment is characterized in that it can execute copyright management not only of the conventional check-in check-out type but also of the group management type. In the copyright management system of the group management type, such copyright management that the management unit in content utilization is a "content providing source (source)" unit (particularly, a "unit of a user by whom a content is owned first" or a "unit of an apparatus by which a content is produced") and reproduction of a content by each apparatus is permitted/inhibited in response to a providing source of the content.

More particularly, in the copyright management system of the group management type, a plurality of apparatus owned by each user are group-registered in a unit of a user into a group management server, and each of the apparatus registered as a group controls reproduction of a content based on a source ID representative of a providing source of the content and a source ID list. By the control, a content of the same providing source can be copied and reproduced between and by the apparatus registered in the apparatus group of the same user.

It is to be noted that the content may be an arbitrary content such as a sound (Audio) content of music, a lecture, or a radio program, an image (Video) content formed from a still picture or pictures or moving pictures which form a movie, a television program, a video program, a photograph, a painting, a chart or the like, an electronic book (E-book), a game or software. In the following description, a music content, particularly a music content distributed from a distribution server or ripped from a music CD, is described as an example of a content. However, the present invention is not limited to such an example as just mentioned.

Now, an outline of group registration into the content sharing system 100 according to the present embodiment for performing such copyright management of the group management type as described above is described with reference to FIG. 1. It is to be noted that FIG. 1 is an explanatory view showing an outline of group registration of the content sharing system 100 according to the present embodiment.

As shown in FIG. 1, content processing apparatus (PC) 10-1 and 10-2 and content reproduction apparatus (PD) 20-1 and 20-2 are grouped, for example, into an apparatus group (content processing apparatus 10-1 and content reproduction apparatus 20-1) owned by a user A and another apparatus group (content processing apparatus 10-2 and content reproduction apparatus 20-2) owned by another user B. Such grouping of the apparatus is performed by registering the content processing apparatus 10 and the content reproduction apparatus 20 in a unit of a user as a group into a group management server 32.

The group registration is described particularly taking the content processing apparatus 10-1 owned by the user A as an example. First, the user A would use the content processing apparatus 10-1 owned by the user A itself to access the group management server 32 to perform a user authentication process and transmit an apparatus ID (for example, a terminal ID) of the content processing apparatus 10-1 to the group management server 32. Then, the group management server 32 stores the apparatus ID of the content processing apparatus 10-1 in a coordinated relationship with the user A and group-registers the apparatus ID of the content processing apparatus 10-1. Further, the group management server 32 transmits user identification information (for example, a leaf ID hereinafter described) representative of the user A to the content processing apparatus 10-1, and the content processing apparatus 10-1 stores the received user identification into a storage section of the content processing apparatus 10-1 itself. Similarly, also the other content processing apparatus 10 is group-registered. Although the group registration of each of the content reproduction apparatus (PD) 20 is performed through a content processing apparatus (PC) 10, details are hereinafter described.

In such group registration, one apparatus (content processing apparatus 10 and content reproduction apparatus 20) can be registered only into an apparatus group of a single user but cannot be registered into apparatus groups of different users at a time. Accordingly, if the owner of the content processing apparatus 10-2 is changed from the user A to the user B, it is necessary to change the group registration of the content processing apparatus 10-2, that is, to perform registration cancellation from the apparatus group of the user A and re-registration into the apparatus group of the user B.

Further, for example, if the user A newly purchases a content processing apparatus 10-3, since the content processing apparatus 10-3 is in a state wherein it does not belong to any group, the content processing apparatus 10-3 can be group-registered into the apparatus group of the user A. On the other hand, also it is possible to cancel the group registration of the content processing apparatus 10-1 registered already in the apparatus group of the user A so that it does not belong to any group.

In this manner, in the content sharing system 100, individual apparatus are group-registered in a unit of a user who owns the apparatus into the group management server 32. As a result, between apparatus registered in an apparatus group of the same user, a content can be shared freely. On the other hand, a content cannot be shared between apparatus which are registered in apparatus groups of different users.

Here, an outline of a management technique of such content sharing as described above is described with reference to FIG. 2. It is to be noted that FIG. 2 is a block diagram showing principal components of the content sharing system 100 according to the present embodiment.

Figure 2:
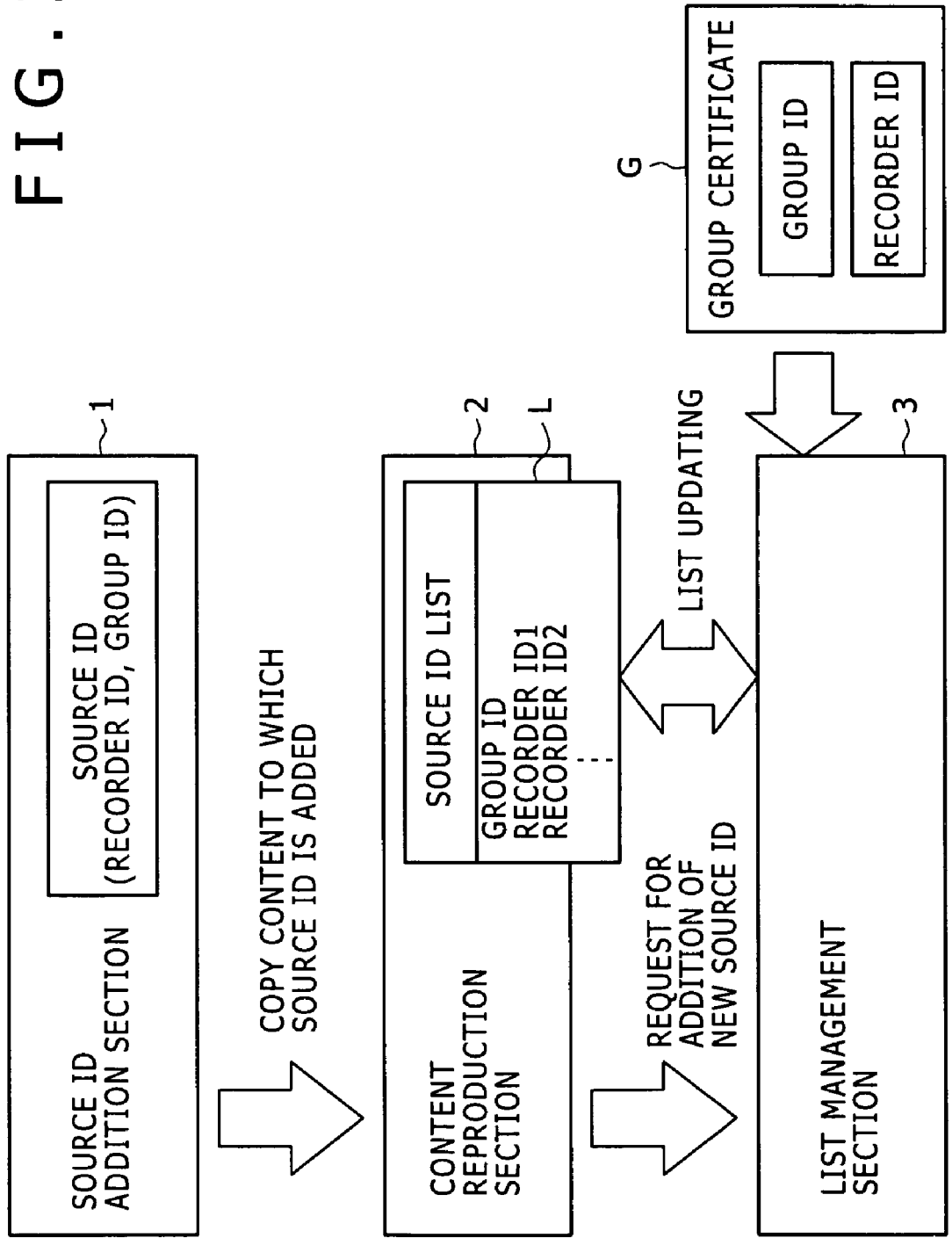
FIG. 2 is a block diagram showing principal components of the content sharing system of the embodiment.

As shown in FIG. 2, the content sharing system 100 according to the present embodiment includes a source ID addition section 1, a content reproduction section 2 and a list management section 3 as principal components thereof.

The source ID addition section 1 is provided, for example, in a content processing apparatus 10 or the like and has a function of applying, to a content, a source ID representative of a providing source of the content. It is to be noted that "to apply a source ID to a content" signifies to coordinate a source ID with a content, and this includes, for example, a process of adding data of a source ID into a file (content file) which includes content data, another process of coordinating the content file and a file including the data of the source ID with each other, and so forth.

Further, the "providing source of a content" signifies the source on the personal user level of a content shared in the content sharing system 100. In particular, the providing source of a content is, for example, (1) a user who utilizes a content distribution service to acquire (purchase or the like) the content, (2) a content processing apparatus 10 which produces the content by ripping, self recording or the like. The source ID mentioned hereinabove is an identifier applied uniquely to each of such content providing sources. A providing source of a content which is distributed in the system can be specified by applying the source ID to the content.

In the present embodiment, for example, a recorder ID and a group ID are used each as a source ID. The recorder ID is a source ID used where a content processing apparatus 10 is a providing source of a content, and the group ID is a source ID used where a user is a providing source of a content.

The recorder ID is an identifier applied uniquely in a unit of a content processing apparatus 10 (PC or the like) which has a content ripping function. The recorder ID is produced by a content processing apparatus 10 having a ripping function mentioned hereinabove based on an apparatus ID or the like of the content processing apparatus 10 and is retained safely in the content processing apparatus 10. When a content is ripped from a removable recording medium such as a music CD, the content processing apparatus 10 applies the recorder ID of the content processing apparatus 10 itself to the ripped content (hereinafter referred to as "ripped content"). Accordingly, a content processing apparatus 10 of a producing source of a ripped content (accordingly, a providing source of the content) can be specified from such a recorder ID as just described.

Meanwhile, the group ID is an identifier applied uniquely in a unit of a user who owns a content processing apparatus 10 and/or a content reproduction apparatus 20. In particular, the group ID is applied in a unit of a user account of a content sharing service provided by the content sharing system 100 according to the present embodiment. An apparatus group to which a content processing apparatus 10 or a content reproduction apparatus 20 and an owner of the apparatus belong can be identified from such a group ID as just described.

In the present embodiment, the group ID is produced based on a leaf ID, for example, upon group registration of a content processing apparatus 10 or upon reception of a distribution content by the content processing apparatus 10. The leaf ID is an identifier applied in a unit of a user and is produced, for example, upon user registration into the group management server 32 by the group management server 32. Such a leaf ID as just described is formed as an example of user identification information and is conveyed from the group management server 32 to the content processing apparatus 10 upon group registration of or upon content distribution to each apparatus.

The content processing apparatus 10 produces a group ID based on a leaf ID and a service ID received from the group management server 32. The service ID is an ID unique in a unit of a content distribution service or a ripping content sharing service implemented by the content sharing system 100. Here, the content distribution service is a service of distributing a content from the content distribution server to a content processing apparatus 10. Meanwhile, the ripping content sharing service is a service of performing the group registration described hereinabove to make it possible to share a ripped content between a plurality of content processing apparatus 10 and content reproduction apparatus 20 owned by the same user.

For example, where the content distribution service and the ripped content sharing service are not managed separately from each other but a common service ID is used for both services, the service ID and the leaf ID are joined together in the following manner to produce one group ID.

"Group ID"="service ID"+"leaf ID"

On the other hand, where the content distribution service and the ripped content sharing service are managed separately from each other, a content distribution service ID unique in a unit of a ripped content sharing service and a ripped content sharing service ID unique in a unit of a ripped content sharing service are produced. Therefore, the service ID and the leaf ID of the services are joined together in the following manner to produce two group IDs corresponding to the two services.

"First group ID"="content distribution service ID"+ "leaf ID"

"Second group ID"="ripped content sharing service ID"+"leaf ID"

The first group ID of the two IDs is applied to a distribution content, which is distributed from the content distribution server, in order to identify a user who purchases the distribution content. Meanwhile, the second group ID is used as a reference with which, when a recorder ID is to be added to a source ID list hereinafter described in order for a content processing apparatus 10 and a content reproduction apparatus 20 to share a ripped content therebetween, it is decided whether or not such addition should be permitted.

In the present embodiment, for example, the latter technique wherein a first group ID and a second group ID are produced is adopted. However, in the following description, the first group ID and the second group ID are not distinguished from each other but are both represented as group ID for the convenience of description.

Such a group ID as just mentioned is applied to a distribution content distributed from the content distribution server, for example, by the content processing apparatus 10. By applying a group ID to a distribution content in this manner, a user of a purchasing source of the distribution content (that is, a providing source of the content) can be identified.

As described above, a content to which a source ID (recorder ID, group ID) is applied by the source ID addition section 1 of the content processing apparatus 10 can be copied freely between the content processing apparatus 10 and the content reproduction apparatus 20. In other words, in the copyright management system of the group management type, upon copying of a content to which a source ID is applied (that is, a content of an object of copyright management), such a restriction process for the number of times of copying as is performed in the conventional copyright management system of the check-in check-out type is not performed at all.

The content reproduction section 2 is formed from a reproduction machine or reproduction software for a content or the like and provided in a content processing apparatus 10 or a content reproduction apparatus 20. The content reproduction section 2 has a source ID list L to which a source ID with regard to which reproduction is permitted by the content reproduction section is added. The source ID list L is provided for each content reproduction section 2, and in different content reproduction sections 2, the source IDs included in the source ID lists L of the content reproduction sections 2 are different from each other.

When a content to which the source ID described above is applied is to be reproduced, the content reproduction section 2 checks the source ID list L to enable/disable reproduction of the content. In particular, if the source ID applied to the content is included in the source ID list L, then the content can be reproduced, but if the source ID applied to the content is not included in the source ID list L, then the content cannot be reproduced. In this manner, the content reproduction section 2 controls reproduction of a content in a unit of a source ID, that is, in a unit of a content providing source.

Further, the content reproduction section 2 can issue a request for addition of a new source ID to the source ID list L included in the content reproduction section 2 thereof, for example, to the list management section 3. In particular, in order to reproduce a content to which a new source ID which is not included in the source ID list L held by the content reproduction section 2 itself is added, it is necessary for the content reproduction section 2 to add the new source ID to the source ID list L. The content reproduction section 2 issues a request for permission of addition of a new source ID to the list management section 3 which permits updating of the source ID list L.

The list management section 3 is provided, for example, in each content processing apparatus 10 and updates the source ID list L held in the content reproduction section 2. Here, the updating of the source ID list L is addition or deletion of a source ID to or from the source ID list L. The list management section 3 can add/delete a source ID to/from the source ID list L to enable/disable reproduction of a content to which the source ID is applied by the content reproduction section 2.

Such a list management section 3 as described above acquires a group certificate G which is sharing information by which a group ID and a recorder ID are coordinated with each other and updates the source ID list L based on such a group certificate G as just described. More particularly, where a group ID included in the group certificate G is same as a group ID included in the source ID list L, the list management section 3 adds a recorder ID included in the group certificate G to the source ID list L. Consequently, a recorder ID of a content processing apparatus 10 registered in an apparatus group of the same user can be added to the source ID list L to make it possible to reproduce a ripped content ripped by such a content processing apparatus 10 as just described.

As described above, in the content sharing system 100 according to the present embodiment, reproduction of a content by each of the content processing apparatus 10 and the content reproduction apparatus 20 is controlled by the source ID addition section 1, content reproduction section 2 and list management section 3 to manage the copyright of a content copied between the content processing apparatus 10. It is to be noted that, although the content sharing system 100 is configured such that it can execute not only copyright management of such a group management type as described above but also copyright management of the conventional check-in check-out type, details are hereinafter described.

<2. System Configuration>

Now, a general configuration of the content sharing system 100 according to the present embodiment is described with reference to FIG. 3. It is to be noted that FIG. 3 is a block diagram schematically showing a general configuration of the content sharing system 100 according to the present embodiment.

Figure 3:
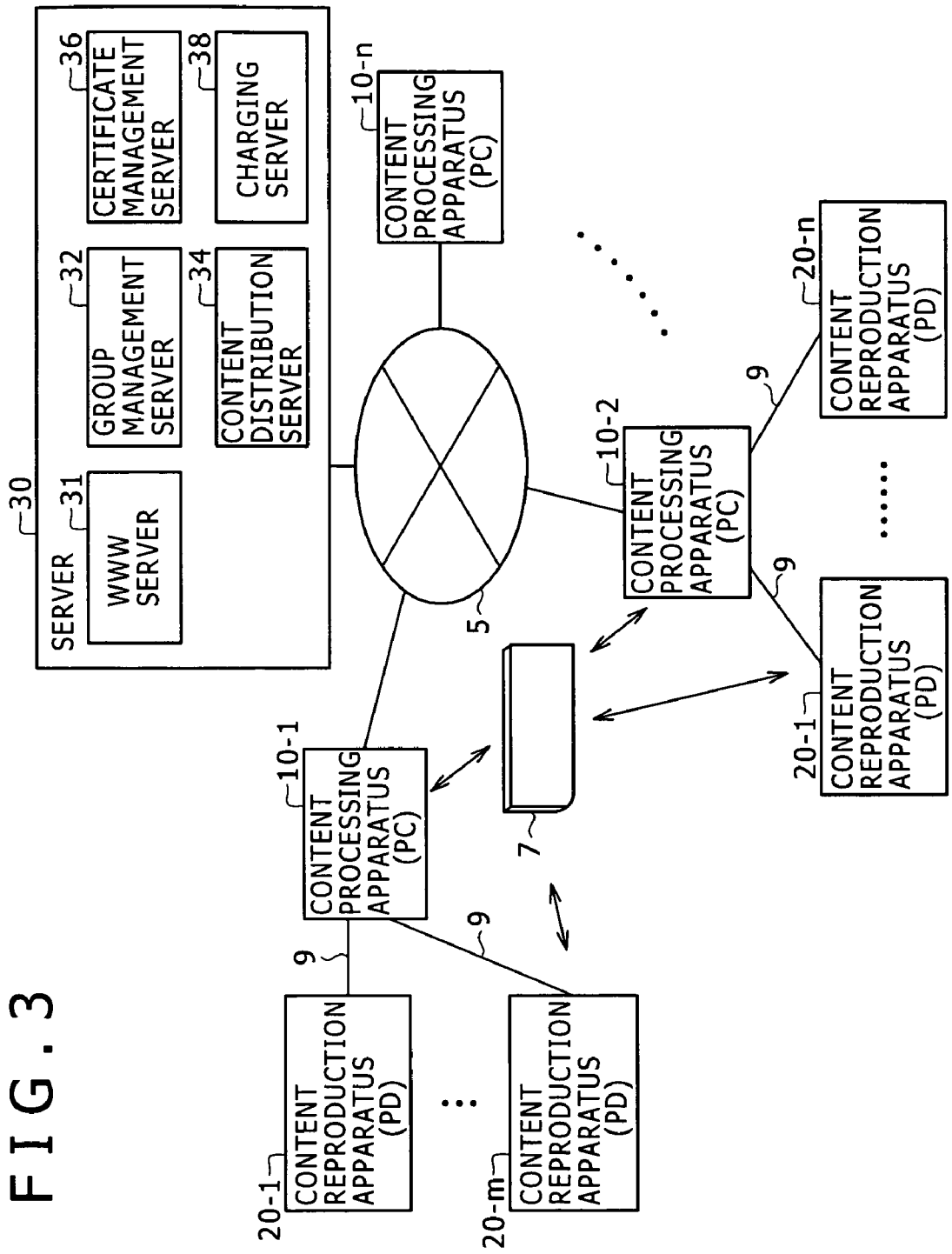
FIG. 3 is a block diagram schematically showing a general configuration of the content sharing system according to the embodiment.

As shown in FIG. 3, the content sharing system 100 according to the present embodiment includes a plurality of content processing apparatus 10-1, 10-2, . . . , 10-n (in the following description, any of them may be generally referred to as "content processing apparatus 10"), a plurality of content reproduction apparatus 20-1, 20-2, . . . , 20-m, 20-n (in the following description, any of them may be generally referred to as "content reproduction apparatus 20"), a server 30, a network 5 and a local line 9 which interconnect the apparatus mentioned, and a storage medium 7. The server 30 includes, for example, a WWW (World Wide Web) server 31, a group management server 32, a content distribution server 34, a certificate management server 36, a charging server 38 and so forth.

Each content processing apparatus 10 is an apparatus which can record and reproduce a content. More particularly, the content processing apparatus 10 is formed from a computer apparatus (which may be of the notebook type or of the desk top type) such as a personal computer (PC). However, the content processing apparatus 10 is not limited to any of such examples as just mentioned but may be any apparatus such as a PDA (Personal Digital Assistant), a game machine for home use, or an information appliance only if the apparatus has a communication function through the network 5.

The content processing apparatus 10 can connect for communication to the server 30, for example, through the network 5. The content processing apparatus 10 can install, for example, software for a content distribution service and software for a ripped content sharing service. Consequently, the content processing apparatus 10 can receive a content distributed from the content distribution server 34 and record the distribution content on a recording medium such as a storage apparatus or a storage medium 7.

Further, the content processing apparatus 10 can produce a content newly, for example, by self recording (self sound recording, image recording or the like), or ripping and record the content on the storage apparatus or the storage medium 7. It is to be noted that the self recording signifies to record images/sound and so forth picked up/collected by an image pickup apparatus/sound collection apparatus provided in the content processing apparatus 10 itself as video/audio digital data. Meanwhile, the ripping signifies to extract content data (sound data, image data or the like) of the digital type recorded on a recording medium such as a music CD, a video DVD, and a software CD-ROM, convert the content data into data of a file format which can be processed by a computer and record the data on the storage apparatus or the storage medium 7.

Each content processing apparatus 10 can compression-code the distribution content and the ripped content described above in accordance with a predetermined compression coding method such as the ATRAC3 (registered trademark of Sony Corporation) (Advanced Transform Acoustic Coding 3) method or the MP3 (MPEG Audio Layer-3) method, encrypt the content using an encryption method such as the DES (Data Encryption Standard) and record the encrypted content.

Further, the content processing apparatus 10 transmits and receives the distribution content or the ripped content to and from another content processing apparatus 10 or a content reproduction apparatus 20 through the network 5 or the local line 9 or can transfer the distribution content or ripped content through the storage medium 7. Consequently, a content can be shared between a plurality of content processing apparatus 10 and a plurality of content reproduction apparatus 20 through provision/acquisition of the content.

Further, the content processing apparatus 10 is group-registered into the group management server 32 connected thereto through the network 5. Further, the content processing apparatus 10 includes components which correspond, for example, to such source ID addition section 1, content reproduction section 2 and list management section 3 as described hereinabove. In this manner, the content processing apparatus 10 is configured so as to be ready for a copyright management system of the group management type described hereinabove. Furthermore, while the content processing apparatus 10 is configured so as to be ready, for example, also for a copyright management system of the conventional check-in check-out type, details are hereinafter described.

Each of the content reproduction apparatus 20 is a portable device (PD) which is a portable content reproduction apparatus. More particularly, the content reproduction apparatus 20 is formed, for example, from a portable audio player which includes a hard disk drive (HDD) having a storage capacity of several tens GB or the like. However, the content reproduction apparatus 20 is not limited to such an example as just described but may be any of various portable apparatus such as a portable video/audio player, a PDA, a portable telephone set and a PHS. Further, a storage medium in the content reproduction apparatus 20 or the storage medium 7 which can be loaded into the content reproduction apparatus 20 is not limited to a HDD but may be any recording medium which can be accessed at random such as an optical disk, a magneto-optical disk, a flash memory, a FeRAM or a magnetic memory. It is to be noted that the content reproduction apparatus 20 may be a machine only for reproduction of a content.

The content reproduction apparatus 20 can be locally connected to the content processing apparatus 10, for example, through the local line 9 and can communicate various kinds of data with the content processing apparatus 10. The local line 9 is formed from a wire cable such as a USB (Universal Serial Bus) cable or a SCSI (Small Computer System Interface) cable. It is to be noted that the content processing apparatus 10 and the content reproduction apparatus 20 may be configured for data communication with each other by ratio communication.

Any of such content reproduction apparatus 20 as described above can reproduce a content transferred from a content processing apparatus 10 through the local line 9 or a content provided by the storage medium 7.

Further, the content reproduction apparatus 20 is group-registered into the group management server 32 through the content processing apparatus 10. Further, the content reproduction apparatus 20 includes a configuration corresponding, for example, to the content reproduction section 2 described hereinabove. In this manner, the content reproduction apparatus 20 is configured so as to be ready for the copyright management method of the group management type described hereinabove. Further, the content reproduction apparatus 20 is ready also for the copyright management method of the check-in check-out type, and the group management type and the check-in check-out type can be changed over therebetween in response to setting by the content reproduction apparatus 20. However, details are hereinafter described.

The server 30 is formed from a computer apparatus which includes a server function or the like. The server 30 includes, for example, a WWW server 31, a group management server 32, a content distribution server 34, a certificate management server 36 and a charging server 38.

The WWW server 31 establishes communication with a content processing apparatus 10 which has connected thereto through a network to perform a user registration process, a user authentication process and so forth. When user authentication is completed, the WWW server 31 causes the content processing apparatus 10 to connect to the group management server 32 or the content distribution server 34.

The group management server 32 group-registers the content processing apparatus 10 and the content reproduction apparatus 20 in a unit of a user in response to a registration request from a content processing apparatus 10 owned by a user-registered user described hereinabove.

The content distribution server 34 is a server which provides a content distribution service and distributes, in response to a distribution request from a content processing apparatus 10 owned by the user, a content to the content processing apparatus 10 through the network 5. The content distribution server 34 is, for example, an EMD server which provides an electronic music distribution (EMD) service or the like. The content distribution server 34 compression-codes a music content of an object of distribution in accordance with a compression coding method such as the ATRAC3 method or the MP3 method, encrypts the coded music content in accordance with an encryption method such as the DES and distributes the encrypted music content to the content processing apparatus 10. Further, the content distribution server 34 encrypts a content key for decrypting the distribution content to the content processing apparatus 10 together with the encrypted distribution content.

The certificate management server 36 acquires and manages a group certificate G issued by each content processing apparatus 10 and distributes the group certificate G to the content processing apparatus 10 which belong to the same apparatus group. Consequently, the content processing apparatus 10 can add a recorder ID of any other content processing apparatus 10 belonging to the same apparatus group and share the ripped content.

The charging server 38 performs a charging process for a user who purchases a content in response to distribution of the content by the content distribution server 34 described hereinabove.

The WWW server 31, group management server 32, content distribution server 34, certificate management server 36 and charging server 38 may entirely or partly be formed integrally as hardware or may be formed from individually different server apparatus.

The network 5 is a communication line network which interconnects the content processing apparatus 10 and the server 30 for bidirectional communication. The network 5 is formed from a public network such as the Internet, a telephone network or a satellite communication network or a dedicated network such as a WAN, a LAN or an IP-VPN and may be any of a wire network and a radio network.

Further, such a network 5 as described above includes a private network. The private network is a network which interconnects a plurality of content processing apparatus 10 among which a content is shared within a private use as viewed from a point of view of copyright management. A particular example of such a private network as just mentioned may be, for example, a network which interconnects a plurality of content processing apparatus 10 used by the same user, a home network used in the same home, a LAN which interconnects a plurality of content processing apparatus 10 used within a limited group (company, friends or the like) of a small scale, or the like.

The storage medium 7 is a removable medium which can store various kinds of data such as contents, group certificates G and programs and may be any of various optical disks such as a DVD-R, a DVD-WR, DVD-RAM, a CD-R, a CD-RW, and a magneto-optical disk, magnetic disks such as a flexible disk and a hard disk, and various semiconductor memories. It is to be noted that the storage medium 7 may be a recording medium with a copyright management function which, for example, uses a cryptographic key or the like to limit copying, reproduction and so forth of a content.

The storage medium 7 functions as a content providing/acquiring medium between the content processing apparatus 10. For example, if the storage medium 7 in which a content is written by the content processing apparatus 10-1 is loaded into the content processing apparatus 10-2 so that the content may be read out, then the content can be provided from the content processing apparatus 10-1 to the content processing apparatus 10-2. Further, the content processing apparatus 10-1 can provide/acquire a content to and from a content reproduction apparatus 20, which cannot be connected to the network 5, through the storage medium 7. Further, the storage medium 7 functions also as a providing/acquiring medium of a group certificate G between the content processing apparatus 10. Furthermore, the storage medium 7 can be inserted into a content selling terminal (not shown) provided at a sales situation or the like and store and provide a content purchased in response to a user operation to a content processing apparatus 10.

<3. Content Providing Apparatus (PC)>

Now, a configuration of a content processing apparatus (PC) 10 according to the present embodiment is described in detail.

First, a hardware configuration of a content processing apparatus 10 according to the present embodiment is described with reference to FIG. 4. It is to be noted that FIG. 4 is a block diagram schematically showing an example of a hardware configuration of the content processing apparatus 10 according to the present embodiment.

Figure 4:
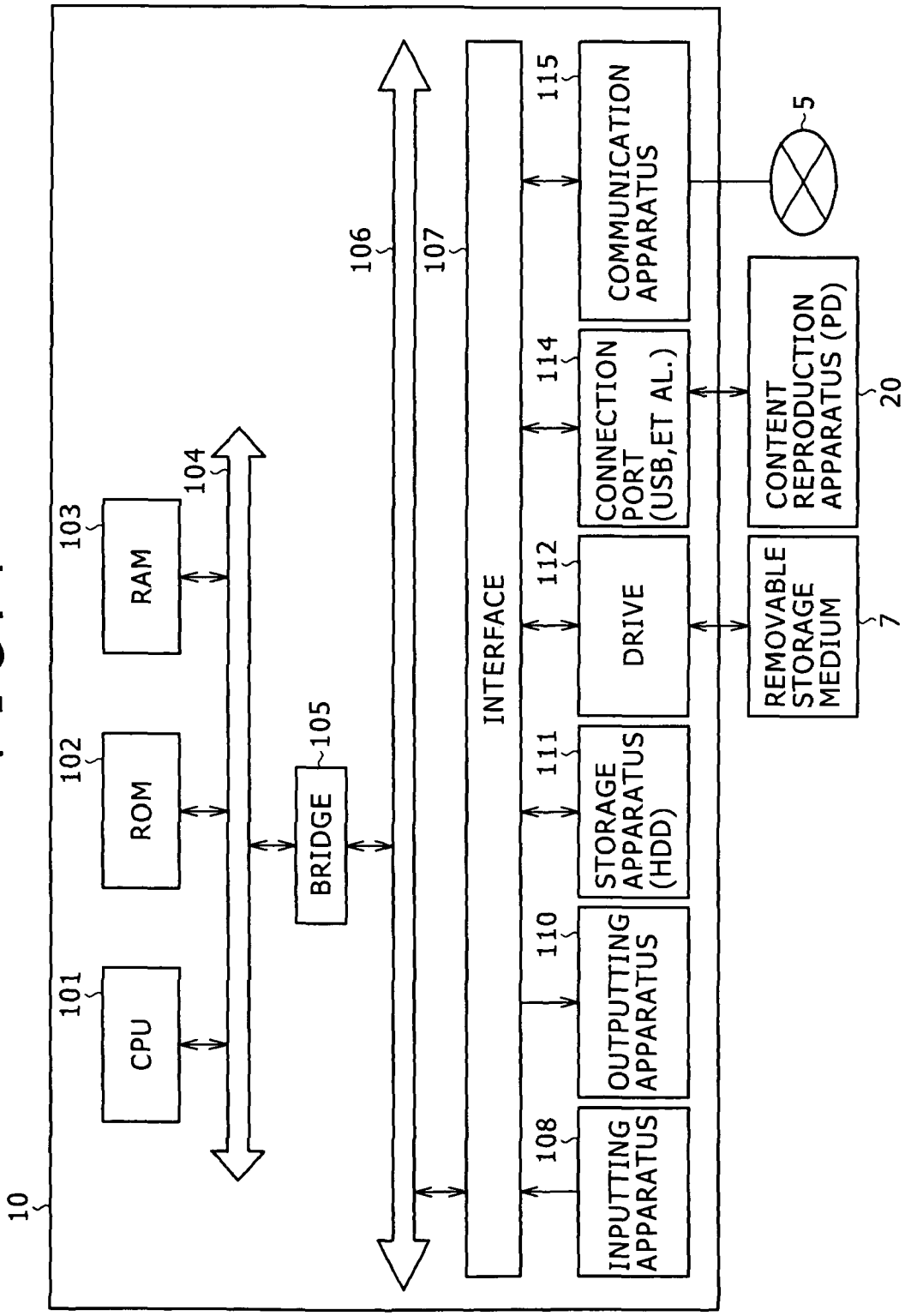
FIG. 4 is a block diagram schematically showing an example of a hardware configuration of a content processing apparatus according to the embodiment.

As shown in FIG. 4, the content processing apparatus 10 includes a CPU (Central Processing Unit) 101, a ROM (Read Only Memory) 102, a RAM (Random Access Memory) 103, a host bus 104, a bridge 105, an external bus 106, an interface 107, an inputting apparatus 108, an outputting apparatus 110, a storage apparatus (HDD) 111, a drive 112, a connection port 114, and a communication apparatus 115.

The CPU 101 functions as an arithmetic operation processing apparatus and a control apparatus and operates in accordance with the programs to control the components in the content processing apparatus 10. The ROM 102 stores programs, arithmetic operation parameters and so forth to be used by the CPU 101. The RAM 103 temporarily stores a program to be used for execution by the CPU 101, parameters which vary suitably during the execution and so forth. The CPU 101, ROM 102 and RAM 103 are connected to each other by the host bus 104 formed from a CPU bus or the like.

The host bus 104 is connected to the external bus 106 such as a PCI (Peripheral Component Interconnect/Interface) bus or the like through the bridge 105.

The inputting apparatus 108 is formed from inputting elements such as a mouse, a keyboard, a touch panel, buttons, switches and levers, an input control circuit for producing and outputting an input signal to the CPU 101, and so forth. The user of the content processing apparatus 10 can operate the inputting apparatus 108 to input various data to the content processing apparatus 10 and issue an instruction of a processing operation to the content processing apparatus 10.

The outputting apparatus 110 is formed from a display apparatus such as a CRT (Cathode Ray Tube) display apparatus, a liquid crystal display (LCD) apparatus, lamps or the like and a sound outputting apparatus such as a speaker. The outputting apparatus 110 outputs, for example, a reproduced content. In particular, the display apparatus displays various kinds of information such as produced video data in the form of a text or an image. Meanwhile, the sound outputting apparatus emits sound of reproduced sound data or the like.

Figure 5:
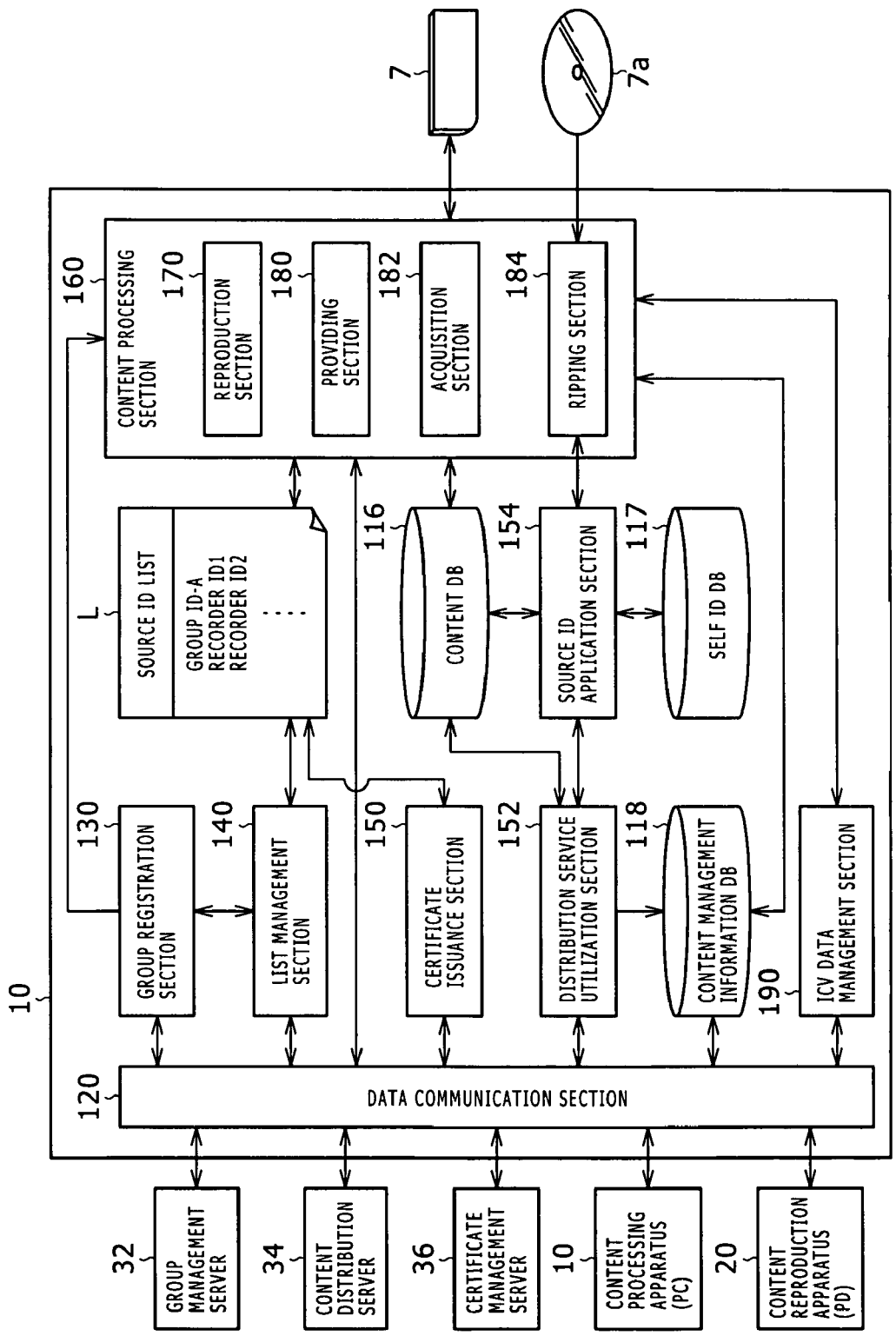
FIG. 5 is a block diagram schematically showing functions of the content processing apparatus according to the embodiment.

The storage apparatus 111 is an apparatus for data storage formed as an example of a storage section of the content processing apparatus 10 according to the present embodiment and is formed from, for example, a HDD (Hard Disk Drive) or the like. The storage apparatus 111 drives the hard disk to store programs to be executed by the CPU 101 and various data. Further, a source ID list L, a content database 116, a self ID database 117, a content management information database 118 and so forth hereinafter described with reference to FIG. 5 are stored in the storage apparatus 111.

The drive 112 is a reader/writer for a storage medium and is built in or externally provided for the content processing apparatus 10. The drive 112 records/reproduces various data of contents, group certificates G and programs on/from the storage medium 7 such as a magnetic disk, an optical disk, a magneto-optical disk or a semiconductor memory loaded in the content processing apparatus 10.

In particular, the drive 112 reads out data recorded on the removable storage medium 7 and supplies the data to the RAM 103 through the interface 107, external bus 106, bridge 105 and host bus 104. The CPU 101 stores the data into the ROM 102, the storage apparatus 111 or the like as occasion demands. Meanwhile, the drive 112 receives data stored in the ROM 102, the storage apparatus 111 or the like, data newly produced or data acquired from an external apparatus from the CPU 101 and writes the data on the removable storage medium 7.

The connection port 114 is a port for connecting an external peripheral apparatus such as a content reproduction apparatus 20 and has connection terminals such as USB terminals and IEEE1394 terminals. The connection port 114 is connected to the CPU 101 and so forth through the interface 107, external bus 106, bridge 105, host bus 104 and so forth. By such a connection port 114 as just described, the content processing apparatus 10 can communicate various data through the content reproduction apparatus 20 and the local line 9.

The communication apparatus 115 is a communication interface formed from a communication device or the like for connecting, for example, to the network 5. The communication apparatus 115 transmits and receives various data of a content, a source ID list L, a group certificate G, a control signal and so forth to and from an external apparatus such as another content processing apparatus 10 or the server 30 through the network 5.

Now, principal functions of the content processing apparatus 10 according to the present embodiment are described with reference to FIG. 5. It is to be noted that FIG. 5 is a block diagram schematically showing functions of the content processing apparatus 10 according to the present embodiment.

As shown in FIG. 5, each content processing apparatus 10 includes, for example, a data communication section 120, a group registration section 130, a list management section 140, a certificate issuance section 150, a distribution service utilization section 152, a source ID application section 154, a content processing section 160, an ICV data management section 190, a content database 116, a self ID database 117 and a content management information database 118.

The data communication section 120 transmits and receives various data between the content processing apparatus 10 and an external apparatus. For example, the data communication section 120 utilizes the communication apparatus 115 to transmit and receive data between the content processing apparatus 10 and another content processing apparatus 10 or the server 30 through the network 5. Further, the data communication section 120 utilizes the connection port 114 to transmit and receive data between the content processing apparatus 10 and a content reproduction apparatus 20 through the local line 9.

The group registration section 130 performs a user registration process and a group registration process (apparatus registration process) of the content processing apparatus 10 into the group management server 32. In the group registration process, the group registration section 130 transmits group registration request information (for example, a group registration request notification, the user ID, the password, the terminal ID, the recorder ID and so forth) to the group management server 32. Here, the terminal ID is an ID for uniquely identifying the content processing apparatus 10 formed from a PC or the like. The terminal ID and the recorder ID are produced uniquely, for example, based on a random number generated originally, a device ID of each content processing apparatus 10 or the like by each content processing apparatus 10.

Further, the group registration section 130 receives service data (a leaf ID, a service common key and so forth) issued from the group management server 32 in response to group registration of the content processing apparatus 10. The group registration section 130 outputs, for example, the received leaf ID to the list management section 140 and outputs the received service common key to the content processing section 160. The service common key (secret key) is a key necessary to decrypt encrypted content data and stored safely so that it may not be falsified.

Further, the group registration section 130 performs a group registration cancellation request process of the content processing apparatus 10 to the group management server 32. Also in this instance, the group registration section 130 transmits group registration cancellation request information (for example, a group registration cancellation request notification, the user ID, the password, the terminal ID and so forth) to the group management server 32 similarly as upon registration. If registration cancellation is performed, then the group registration section 130 notifies the list management section 140 of this.

Furthermore, the group registration section 130 can group-register a content reproduction apparatus 20 connected to the content processing apparatus 10 into the group management server 32. Details of such a group registration process and a registration cancellation process of the content processing apparatus 10 and the content reproduction apparatus 20 by the group registration section 130 as described above are hereinafter described.

The list management section 140 is a component corresponding to the list management section 3 shown in FIG. 2. The list management section 140 has, for example, a function of updating the source ID list L held by the content processing apparatus 10.

For example, upon group registration described hereinabove, the list management section 140 adds the service ID to the leaf ID received from the group registration section 130, converts the leaf ID having the service ID added thereto into a group ID and adds the group ID to the source ID list L. Further, when the list management section 140 acquires a group certificate G distributed from the group management server 32 or another content processing apparatus 10, if the group ID included in the group certificate G and the group ID included in the source ID list L coincide with each other, then the list management section 140 adds the recorder ID included in the group certificate G to the source ID list L. It is to be noted that, where validity term information is set to the source ID such as the group ID or the recorder ID, the list management section 140 describes also the validity term information of the source ID in the source ID list L upon addition of the source ID to the source ID list L.

Further, the list management section 140 deletes, upon group registration cancellation, all source IDs in the source ID list L. Furthermore, also it is possible for the list management section 140 to update the source ID list L of a content processing apparatus 10 connected to the content processing apparatus 10. It is to be noted that details of such a list updating process by the list management section 140 as just mentioned are hereinafter described.

It is to be noted that the source ID list L is stored safely in the storage apparatus 111, the ROM 102 or the like of the content processing apparatus 10. The source ID list L is stored in a state wherein, for example, it is encrypted and has a digital signature applied thereto in order to prevent illegal falsification thereof by a user.

In the present embodiment, a group ID produced based on a leaf ID upon group registration is stored in the content processing apparatus 10 in such a manner that it is included in the source ID list L as described above. This is because the group ID is utilized as a source ID for making it possible to reproduce a distribution contents to which the group ID is applied to perform reproduction control of the distribution content based on the group ID. It is to be noted that, for example, where a group ID is utilized not as a source ID but only as a source ID (second group ID described hereinabove) for reference to addition of a recorder ID to the source ID list L in a ripped content sharing service, the group ID need not necessarily be stored in the source ID list L. In this instance, the group ID may be stored, for example, in another storage region of the storage apparatus 111, for example, in the self ID database 117 or may be stored in some other portion such as the ROM 102.

The certificate issuance section 150 has, for example, a function of issuing a group certificate G for certifying an apparatus group to which the content processing apparatus 10 itself belongs. More particularly, the certificate issuance section 150 issues a group certificate G which coordinates, for example, in a state wherein the content processing apparatus 10 is group-registered and has a group IDA as described above, a recorder ID 1 corresponding to the content processing apparatus 10 and the group IDA with each other. It can be certified by the group certificate G that the content processing apparatus 10 corresponding to the recorder ID 1 belongs to an apparatus group which is owned by the user and specified by the group IDA. Further, a digital signature for detection of falsification, for example, a MAC (Message Authentication Code), is applied to the group certificate G. Falsification of the group certificate G can be prevented by this.

When such a group certificate G as described above is to be issued, the certificate issuance section 150 reads out the recorder ID and the group ID corresponding to the content processing apparatus 10 itself from the storage apparatus 111 and encrypts the read out recorder ID and group ID with the digital signature applied thereto to produce and issue a group certificate G.

The certificate issuance section 150 can issue a group ID, for example, at an arbitrary timing after group registration of the content processing apparatus 10. For example, the certificate issuance section 150 may issue a group certificate G corresponding to the content processing apparatus 10 itself in response to an input by the user through the content processing apparatus 10 or a certification request from another content processing apparatus 10. Further, the certificate issuance section 150 may issue and transmit a group certificate G to the certificate management server 36 after group registration of the content processing apparatus 10.

Further, the certificate issuance section 150 may apply validity term information to the group certificate G to be issued. By this, any content processing apparatus 10 which acquires the group certificate G can add the recorder ID included in the group certificate G to the source ID list L only within the term of validity represented by validity term information included in the group certificate G.

Further, while the certificate issuance section 150 can arbitrarily set a route to be used when a group certificate G issued in such a manner as described above is to be distributed to another content processing apparatus 10, the group certificate G may be distributed to another content processing apparatus 10, for example, through the certificate management server 36. By this, the certificate management server 36 can manage group certificates G of the content processing apparatus 10 in a centralized manner and distribute any group certificate G to another content processing apparatus 10 which belongs to the same apparatus group.

Also the distribution method of the group certificate G can be set arbitrarily. For example, the group certificate G may be transmitted directly through the network 5 or the local line 9 or may be attached to and transmitted together with an electronic mail or otherwise may be adhered to a homepage. Or else, the group certificate G may be provided to the content processing apparatus 10 through the storage medium 7 on which the group certificate G is recorded. Furthermore, the group certificate G may be distributed through the storage medium 7 on which the group certificate G is recorded together with the content. By this, for example, together with a ripped content, a recorder ID applied to the ripped content and a group ID of a content processing apparatus 10 by which the ripped content is ripped can be distributed at a time. Therefore, any content processing apparatus 10 can immediately reproduce the ripped content if the content processing apparatus 10 belongs to the same apparatus group.

The group certificate G distributed in this manner is utilized for sharing registration, that is, for addition of a recorder ID to the source ID list L by the other content processing apparatus 10. Consequently, the other content processing apparatus 10 which receives the distribution of the group certificate G from the content processing apparatus 10 which belongs to the same apparatus group can acquire the recorder ID of the apparatus which owns the same group ID and add the recorder ID to the source ID list L.

By issuing and distributing a group certificate G in which a group ID and a recorder ID are coordinated with each other in this manner, those content processing apparatus 10 which belong to the same apparatus group can share the recorder IDs of each other even if they are not connected directly to each other.

It is to be noted that a certificate management section (not shown) wherein a group certificate G issued by the certificate issuance section 150 or a group certificate G acquired from another content processing apparatus 10 or the certificate management server 36 is stored and managed may be provided. By this, the certificate management section can read out the group certificates G acquired in the past from such a certificate database as just mentioned and distribute the group certificates G to another content processing apparatus 10 and so forth.

The distribution service utilization section 152 performs a process relating to a content distribution service to or from the content distribution server 34.

In particular, the distribution service utilization section 152 transmits and receives various kinds of information such as user authentication information (a user ID, a password and so forth) necessary to utilize the content distribution service described hereinabove, charging information and content distribution request information to and from the content distribution server 34 or supports inputting/outputting of such information.

Further, the distribution service utilization section 152 receives a distribution content and a license of the distribution content transmitted from the content distribution server 34 through the network 5 and the communication apparatus 115. In particular, if the user of the content processing apparatus 10 utilizes the content distribution service to acquire a content, then the distribution service utilization section 152 downloads a file of the distribution content and another file of the license which prescribes utilization conditions of the distribution content, for example, as different files from each other from the content distribution server 34. In the case of a content for which copyright management of the group management type is performed, a leaf ID allocated to the user by the group registration described above is described in the license of the distribution content. On the other hand, in the case of another content for which copyright management of the check-in check-out type is performed, information of check-in check-out time number restriction, reproduction time number restriction, reproduction term and so forth which are utilization condition information (Usage Rule) of the content is described in the license.

The distribution service utilization section 152 works data of the distribution content and data of the license received in this manner to produce, for example, a content file which includes the content and the license as a same file.

At this time, as regards a distribution content of the group management type, a group ID is applied to the content data of the distribution content by the source ID application section 154. The source ID application section 154 is a component which corresponds to the source ID addition section 1 described hereinabove. The source ID application section 154 applies a group ID to the distribution content. Particularly, the source ID application section 154 executes a process of converting the leaf ID described in the license corresponding to the distribution content into a group ID. The conversion process of a leaf ID into a group ID is performed by adding, for example, a service ID of the content distribution service to the leaf ID similarly as described hereinabove. By this, a group ID representative of the user and the service by and through which the distribution content is purchased is coordinated with the distribution content.

In this manner, the distribution service utilization section 152 and the source ID application section 154 produce a content file in which a file of a distributed content and a file of a license are joined together.

Figure 6A:
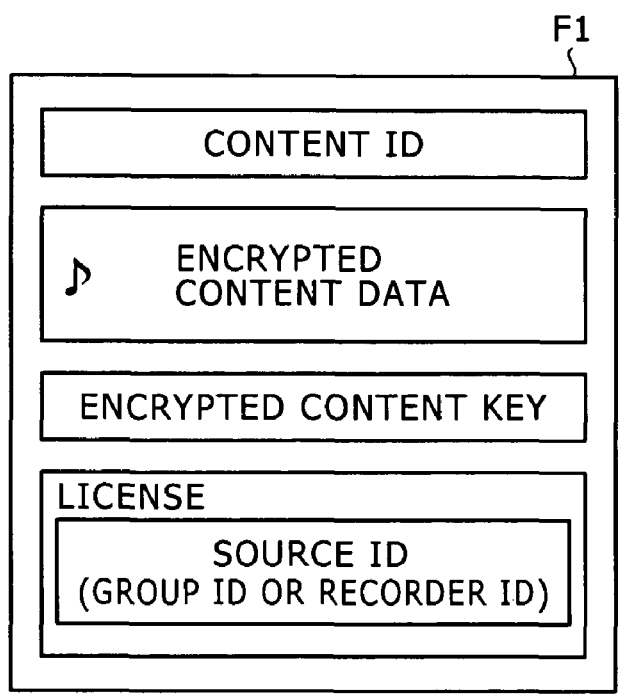
FIG. 6A is an explanatory view schematically showing a configuration of a content of a group management type and a content of a check-in check-out type according to the embodiment.

In particular, as shown in FIG. 6A, a content file F1 of the group management type includes, for example, a content ID, content data encrypted with a content key, a content key encrypted with a system common key which can be handled only by the content sharing system 100 and a license in which a source ID such as a group ID is described.

Figure 6B:
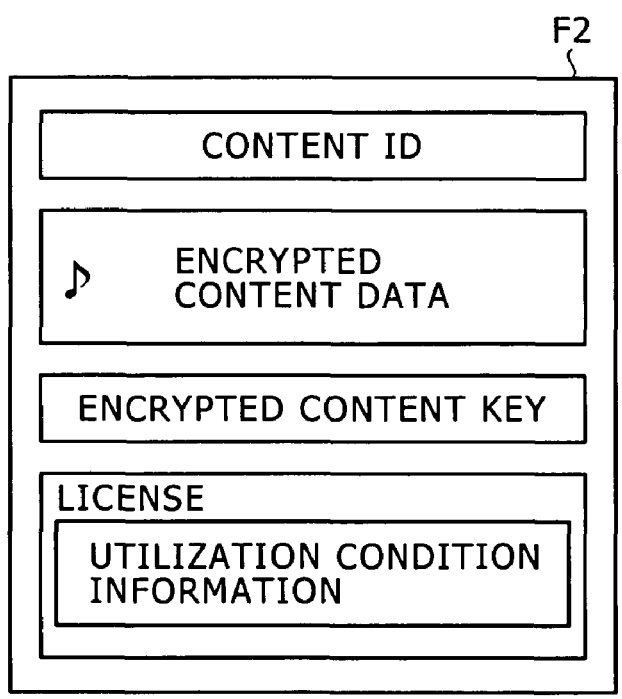
FIG. 6B is an explanatory view schematically showing a configuration of a content of the group management type and a content of the check-in check-out type according to the embodiment.

Meanwhile, as shown in FIG. 6B, a content file F2 of the check-in check-out type includes, for example, a content ID, content data encrypted with a content key, a content key encrypted with the system common key and a license in which utilization condition information is described.

A license in such content files F1 and F2 as described above is in an encrypted form so that falsification thereof can be detected. Consequently, a source ID or a utilization condition can be coordinated safely with a content. Further, the content processing apparatus 10 holds common secret information so that it can perform, for example, decoding of an encrypted content key or falsification checking of a license. Therefore, even if a content is shared in the content sharing system 100, falsification of the source ID or the utilization condition applied to the content can be prevented suitably from being falsified.

The distribution service utilization section 152 records a content file produced in such a manner as described above, for example, into the content database 116 in the storage apparatus 111. It is to be noted that, while, in the present embodiment, a content and a license which correspond to each other are managed in the same file and stored in the content database 116 as described hereinabove, the manner of management is not limited to this example. For example, a content and a file are managed in separate files. In this instance, the file of the content may be stored in the content database 116 while the file of the license is stored in the license database such that the content and the license are coordinated with each other by content IDs or the like included in the two files.

Further, the distribution service utilization section 152 receives, upon distribution of a content, attribute information of the distribution content from the content distribution server 34. The attribute information of the distribution content includes, for example, title information (for example, a tune name, an artist (singer) name, an album name, a genre, reproduction time and so forth), the content ID of the distribution content, the distribution date and hour, the data size, a data format, and the type of the copyright management method. The distribution service utilization section 152 records such attribute information of a distribution content, a recording place (for example, an address in the content DB 116) of the distribution content and so forth as content management information into the content management information database 118.

Such a distribution service utilization section 152 as described above is configured, for example, by installing software for the content distribution service corresponding to a content distribution service to be utilized into the content processing apparatus 10. It is to be noted that a plurality of such distribution service utilization sections 152 may be provided each for one of a plurality of content distribution services to be utilized by the user.

Further, the source ID application section 154 applies the group ID of the content processing apparatus 10 itself to a content (ripped content) ripped from the recording medium 7a or the like by a ripping section 184 hereinafter described. More particularly, the source ID application section 154 reads out a recorder ID of the content processing apparatus 10 stored in the self ID database 117, produces a license which includes the recorder ID, and coordinates such a license as just described with content data of the ripped content. In particular, the source ID application section 154 produces such a content file F1 which includes a content ID, encrypted content data of a ripped content, an encrypted content key and a license in which a recorder ID is described as shown in FIG.

6A. The source ID application section 154 records the ripped content to which the recorder ID is applied in this manner into the content database 116.

It is to be noted that the timing of the application of a recorder ID preferably is a point of time at which, for example, ripping of the content is completed. By applying the recorder ID to the ripped content immediately in this manner, the recorder ID can be applied with certainty before the ripped content which requires copyright management thereof is distributed in the system 100. It is to be noted that the timing of application of a recorder ID is not limited to such an example as described above, but may be, for example, a point of time at which the ripped content is reproduced for the first time, another point of time at which the ripped content is copied into another content processing apparatus 10, or the like.

In the self ID database 117, IDs corresponding to the content processing apparatus 10 itself, such as a device ID, a recorder ID, and a terminal ID, are stored.

The device ID is an identifier which is applied uniquely to various kinds of apparatus (content processing apparatus 10, content reproduction apparatus 20 and so forth) in a unit of an apparatus. The device ID is applied, for example, upon shipment of the content processing apparatus 10 from a factory and is stored safely in the self ID database 117.

Meanwhile, the terminal ID is an ID applied uniquely in a unit of a content processing apparatus 10 such as a PC. Further, the recorder ID is an identifier applied uniquely in a unit of a content processing apparatus 10 having a ripping function as described above. Such terminal ID and recorder ID are produced so as to be unique to each content processing apparatus 10 based on a device ID or a random number by the content processing apparatus 10. The IDs are encrypted in order to prevent illegal falsification and stored safely in the self ID database 117.

The content processing section 160 performs various processes for a content. The content processing section 160 is formed by installing, for example, an application program which utilizes (for example, reproduces, transfers or the like) a content, a DRM module for managing the copyright for such utilization and so forth into the content processing apparatus 10. The content processing section 160 includes, for example, a content reproduction section 170, a content providing section 180, a content acquisition section 182 and a ripping section 184.

The content reproduction section 170 is a component corresponding to the content reproduction section 2 shown in FIG. 2. The content reproduction section 170 is formed from, for example, a reproduction apparatus having a content reproduction function or software for content utilization installed in the content processing apparatus 10, and can reproduce various kinds of contents. Content data reproduced by the content reproduction section 170 are outputted from the outputting apparatus 110.

The content reproduction section 170 is ready, for example, for both of a content of the group management type and another content of the check-in check-out type and can execute reproduction control of the group management type and reproduction control of the check-in check-out type. In particular, where the group management type is used for reproduction control, the content reproduction section 170 controls reproduction of a content of an object of reproduction based on whether or not the source ID applied to the content of the reproduction object is included in the source ID list L. Meanwhile, where the check-in check-out type is used for reproduction control, the content reproduction section 170 controls reproduction of a content of a reproduction object based on whether or not utilization condition information of a license corresponding to the content of the reproduction object is satisfied. Details of such a content reproduction section 170 as just described are hereinafter described.

It is to be noted that two or more content reproduction sections 170 may be provided in one content processing apparatus 10. For example, by installing two or more kinds of software for content reproduction into one content processing apparatus 10, by providing two or more reproduction apparatus, or by using software for content reproduction and reproduction apparatus, two or more content reproduction sections 170 ready for different content distribution services or different copyright management methods may be configured in one content processing apparatus 10.

The content providing section 180 provides a content to another content processing apparatus 10 or a content reproduction apparatus 20. Further, the content acquisition section 182 acquires a content from another content processing apparatus 10 or a content reproduction apparatus 20. The content providing section 180 and the content acquisition section 182 may execute a content providing/acquisition process, for example, by a transmission/reception process through the network 5 or the local line 9 or through the storage medium 7.

It is to be noted that, upon such reproduction, provision or acquisition of a content as described above, the content processing section 160 may control the process described above based on the content management information in the content management information database 118 and the content management information may be displayed on the outputting apparatus 110.

The ripping section 184 rips a content recorded on a recording medium 7a such as a CD or a DVD on which music contents and/or video contents are recoded. More particularly, the ripping section 184 controls the drive 112, for example, in response to a user input to extract music/video data or the like from the recording medium 7a and produce a content in which such music/video data are converted in data of a format (for example, the ATRAC3 format or the like) which can be processed by the content processing apparatus 10. To the content ripped in this manner, the recorder ID of the content processing apparatus 10 is applied by the source ID application section 154.

It is to be noted that a self recording section (not shown) for producing a content newly by self audio and/or video recording in addition to the ripping section 184. The self recording section may collect sound and/or pick up an image around the content processing apparatus 10 to produce audio data and/or video data and perform a predetermined data process for such data to produce a content newly. Alternatively, the self recording section may convert video/audio data of a television program, a radio program or the like received through the communication apparatus 115 or the like into data of a recordable format to produce a new content. Also to a content produced by the self recording section, a recorder ID can be applied to manage the copyright of the content in accordance with the group management type.

The ICV data management section 190 manages ICV (Integrity Check Value) data of the content processing apparatus 10 and ICV data of a content reproduction apparatus 20 connected to the content processing apparatus 10. The ICV data are data for checking, when a process is performed for a content, the validity of the process.

In the copyright management process of the group management type, the ICV data include a MAC value (hash value with a key) of the source ID list L. Therefore, the ICV data management section 190 detects based on such ICV data whether or not the source ID list L is legal, that is, whether or not the source ID list L is falsified illegally. On the other hand, in the copyright management process of the check-in checkout type, the ICV data include a MAC value (hash value with a key) of a license of a content. Therefore, the ICV data management section 190 detects based on such ICV data whether or not the license is legal, that is, whether or not the license is falsified illegally.

As a result, if it is decided that the source ID list L or the license is legal, then the ICV data management section 190 permits the process of the content processing section 160, but if it is decided that the source ID list L or the license is not illegal, then the ICV data management section 190 does not permit the process of the content processing section 160.

Further, the ICV data include a flag which is an example of method identification information of whether the copyright management method is of the group management type or of the check-in check-out type. For example, if the flag is "0", then the copyright management method is of the group management type, but if the flat is "1", then the copyright management method is of the check-in check-out type. Therefore, the content processing section 160 can decide based on the flag in accordance with which one of the copyright management methods the content should be processed.

Further, the ICV data management section 190 can manage not only ICV data relating to the content processing apparatus 10 but also ICV data of any content reproduction apparatus 20 connected to the content processing apparatus 10 similarly. Consequently, by setting the value of the flag (method identification information) in the ICV data of any of the content reproduction apparatus 20 connected to the content processing apparatus 10 using the content processing apparatus 10, the copyright management method for the content reproduction apparatus 20 can be set. At this time, the setting of the copyright management method of the content reproduction apparatus 20 may be executed based on region information representative of a region in which the system 100 is used. For example, if the content reproduction apparatus 20 is used in the United States, then the copyright management method may be set to the group management type, but if the content reproduction apparatus 20 is used in Japan, then the copyright management method may be set to the check-in check-out type.

Further, though not shown in FIG. 5, the content processing apparatus 10 may include a transfer control section for controlling transfer of a content between the content processing apparatus (PC) 10 and any content reproduction apparatus (PD) 20. The transfer control section controls transfer of a content stored in the content processing apparatus 10 to a content reproduction apparatus 20 or transfer of a content stored in a content reproduction apparatus 20 to the content processing apparatus 10 in accordance with a transfer request, for example, based on a user input.

Further, the transfer control section can perform not only transfer control of a content of an object of copyright management (content to which a source ID is applied) but also transfer control of a content which is not under copyright management (for example, a raw content to which no source ID is applied). For example, if a transfer request from the content processing apparatus 10 to a content reproduction apparatus 20 or a transfer request from a content reproduction apparatus 20 to the content processing apparatus 10 is inputted with regard to a content which is not under copyright control, then the transfer control section compares the group ID in the source ID list of the content processing apparatus 10 and the group ID in the source ID list of the content reproduction apparatus 20 with each other. If the result of the comparison indicates coincidence of the two group IDs, then the transfer control section permits the transfer, but if the group IDs do not coincide with each other, then the transfer control section does not permit the transfer. Consequently, utilization not only of a content whose copyright is managed by the group management system but also a content which is not under copyright protection (unrestricted copying between apparatus) can be limited.

In the foregoing, the components of the content processing apparatus 10 are described. The data communication section 120, group registration section 130, list management section 140, certificate issuance section 150, distribution service utilization section 152, source ID application section 154, content processing section 160, ICV data management section 190, transfer control section and so forth described hereinabove may be formed, for example, as hardware having the functions described hereinabove, or may alternatively be formed by installing a program for implementing the functions described above into the content processing apparatus 10.

Now, the content reproduction section 170 according to the present embodiment is described in detail with reference to FIG. 7. It is to be noted that FIG. 7 is a block diagram schematically showing functions of the content reproduction section 170 according to the present embodiment.

As shown in FIG. 7, the content reproduction section 170 includes, for example, a reproduction permission/inhibition decision section 172, a reproduction execution section 174 and a list updating request section 176.

The reproduction permission/inhibition decision section 172 controls reproduction of a content for which a request for reproduction is issued. The reproduction permission/inhibition decision section 172 can execute both of reproduction control of the group management type and reproduction control of the check-in check-out type.

When the reproduction control of the group management type is to be performed, the reproduction permission/inhibition decision section 172 decides based on a source ID (recorder ID or group ID) applied to a content for which a reproduction request is issued and the source ID list L whether or not reproduction of the content may be permitted.

In particular, if a request for reproduction of a content designated by a user is accepted, for example, from the inputting apparatus 108, then the reproduction permission/inhibition decision section 172 reads out the content whose reproduction request is accepted from the content database 116 and decides whether or not a source ID is applied to the content, that is, whether or not a source ID is described in the license in the content file. If no source ID is applied to the content, then the reproduction permission/inhibition decision section 172 decides that the content requires no copyright management and permits reproduction of the content, and outputs a reproduction instruction signal of the content to the reproduction execution section 174. On the other hand, if a source ID (recorder ID or group ID) is applied to the content, then the reproduction permission/inhibition decision section 172 decides that the content requires copyright management and performs the following processes.

First, the reproduction permission/inhibition decision section 172 reads out (extracts) a source ID from the license in the content file and reads out and interprets the source ID list L. Then, the reproduction permission/inhibition decision section 172 compares the source ID read out from the content and the source IDs included in the source ID list L with each other to decide whether or not the source ID read out from the content is included in the source ID list L. If, as a result of the comparison, the source ID read out from the content is included in the source ID list L, then the reproduction permission/inhibition decision section 172 checks the term of validity of the source ID. If the source ID is within the term of validity, then the reproduction permission/inhibition decision section 172 permits reproduction of the content and outputs a reproduction instruction signal of the content to the reproduction execution section 174. On the other hand, if the source ID read out from the content is not included in the source ID list L or the source ID is not within the term or validity, then the reproduction permission/inhibition decision section 172 inhibits reproduction of the content and does not output a reproduction instruction signal. Therefore, the reproduction execution section 174 cannot reproduce the content. It is to be noted that, in this instance, an error notification representing that the reproduction conditions are not satisfied may be displayed.

In this manner, the reproduction permission/inhibition decision section 172 according to the present embodiment performs such reproduction restriction as to completely inhibit reproduction of a content to which a source ID which is not included in the source ID list L is applied. However, the reproduction restriction of a content is not limited to the example just described, but the reproduction permission/inhibition decision section 172 may perform such reproduction control as, for example, to permit reproduction while restricting the reproduction of the content only to part of the content in time or in contents, to permit reproduction while the picture quality, sound quality or the like is deteriorated or to permit reproduction only by a predetermined number of times (for example, only once) at first but inhibit later reproduction.

Further, for example, where the source ID applied to the content is not included in the source ID list L as described hereinabove, the reproduction permission/inhibition decision section 172 outputs such a source ID as just described to the list updating request section 176.

On the other hand, when reproduction control of the check-in check-out type is to be performed, the reproduction permission/inhibition decision section 172 decides based on utilization condition information (reproduction time number restriction, reproduction validity term) in the license corresponding to the content of the object of the reproduction request whether or not reproduction of the content should be permitted. If it is decided as a result of the decision that the utilization condition of the license is satisfied, then the reproduction permission/inhibition decision section 172 permits the reproduction of the content and outputs a reproduction instruction signal of the content to the reproduction execution section 174. On the other hand, if it is decided that the utilization condition of the license is satisfied, then the reproduction permission/inhibition decision section 172 inhibits reproduction of the content and does not output a reproduction instruction signal.

The reproduction execution section 174 reproduces the designated content in response to the reproduction instruction signal of the reproduction permission/inhibition decision section 172. In particular, the reproduction execution section 174 uses a service common key to decrypt the encoded content key and then uses the decrypted content key to decrypt the encoded content, whereafter the reproduction execution section 174 decodes and reproduces the decrypted content and outputs the reproduced content from the outputting apparatus 110.

The list updating request section 176 issues a request for addition of the recorder ID to the source ID list L to the list management section 140. The addition requesting process in this instance is performed, for example, by outputting an ID addition requesting signal representing a recorder ID of the object of addition to the list management section 140.

In particular, for example, if a source ID which is not included in the source ID list L is inputted from the reproduction permission/inhibition decision section 172, then the list updating request section 176 decides whether the source ID is a recorder ID or a group ID. If, as a result of the decision, the source ID is a recorder ID, then the list updating request section 176 requests the list management section 140 to add the recorder ID to the source ID list L. The list updating request section 176 may perform the addition requesting process automatically or may perform the addition request process after it confirms whether or not the user wants addition of the recorder ID. On the other hand, if the result of the decision indicates that the source ID is a group ID, then the list updating request section 176 does not perform the addition requesting process. This is because the content processing apparatus 10 can be registered into an apparatus group of only one user.

Now, the list management section 140 according to the present embodiment is described in detail with reference to FIG. 8. It is to be noted that FIG. 8 is a block diagram schematically showing a configuration of the list management section 140 according to the present embodiment.

As shown in FIG. 8, the list management section 140 includes, for example, a certificate request section 141, a certification acquisition section 142, a recorder ID updating section 144, a list synchronization section 146, a self ID addition section 148 and a group ID updating section 149.

The certificate request section 141 transmits a certificate requesting signal to a different content processing apparatus 10 or the certificate management server 36 in response to a user input or automatically to request for a group certificate G issued by the different content processing apparatus 10 which belongs to the same apparatus group. For example, the certificate request section 141 may issue a notification of a recorder ID relating to the request for addition from the content reproduction section 170 to a particular content processing apparatus 10 or the certificate management server 36 to request for a group certificate G which includes the recorder ID. Alternatively, the certificate request section 141 may transmit the group ID owned by the content processing apparatus 10 itself to a different content processing apparatus 10 or the certificate management server 36 at an arbitrary timing to request for one, two or more group certificates G which each includes a recorder ID relating to the recorder ID (that is, the recorder ID of the different content processing apparatus 10 which belongs to the same apparatus group).

The certification acquisition section 142 acquires a group certificate G from a different content processing apparatus 10 or the certificate management server 36. In particular, the certification acquisition section 142 can receive and acquire a group certificate G from an external content processing apparatus 10 or the certificate management server 36 through the network 5 and the communication apparatus 115. Further, the certification acquisition section 142 can use the drive 112 to read out and acquire a group certificate G recorded on the storage medium 7 provided from a different content processing apparatus 10. The certification acquisition section 142 outputs the group certificate G acquired in this manner to the recorder ID updating section 144.

The recorder ID updating section 144 adds the recorder ID to the source ID list L based on the group certificate G inputted from the certification acquisition section 142. In particular, the recorder ID updating section 144 first reads out the group ID included in the group certificate G and reads out the group ID in the source ID list L. Then, the recorder ID updating section 144 decides whether or not the two group IDs coincide with each other. If a result of the decision indicates that the two group IDs coincide with each other, then the recorder ID updating section 144 reads out the recorder ID corresponding to the different content processing apparatus 10 included in the group certificate G and adds the recorder ID to the source ID list L. On the other hand, if the two group IDs do not coincide with each other, then the recorder ID included in the group certificate G is not added to the source ID list L.

Consequently, only a recorder ID corresponding to each content processing apparatus 10 recorded in the same apparatus group can be added to the source ID list L. It is to be noted that the recorder ID updating section 144 may restrict addition of recorder IDs by providing an upper limit to the number of recorder IDs which can be added to the source ID list L.

The list synchronization section 146 has a function of synchronizing a plurality of source ID lists L with each other. The synchronization of source ID lists L here signifies merging of a plurality of source ID lists L which are different from each other, and the source ID list L after the synchronization includes all of those recorder IDs which have been included in the plural original source ID lists L without any overlap.

The synchronization process of source ID lists L can be executed only between those content processing apparatus 10 which have the same group ID. In particular, the list synchronization section 146 acquires the source ID lists L possessed by another content processing apparatus 10 or content reproduction apparatus 20 and, only when the group ID included in the source ID list L and the group ID included in the source ID list L of the self content processing apparatus 10 coincide with each other, the list synchronization section 146 can synchronize the two source ID lists L.

By such a synchronization process as described above, the recorder IDs included in the source ID lists L possessed by a plurality of apparatus registered in the same apparatus group can be made same as each other. Therefore, a ripped content can be shared between and reproduced by the content processing apparatus 10.

It is to be noted that the synchronization process may be performed periodically or automatically at an arbitrary timing between the content processing apparatus 10, for example, in a private network by the list synchronization section 146 or may be performed between designated particular content processing apparatus 10 in response to an instruction of the user. Further, such a synchronization process as described above can be executed not only between the content processing apparatus 10 connected to each other by a private network or between the content processing apparatus 10 connected to each other by the local line 9 but also between the content processing apparatus 10 connected remotely to each other through the network 5.

The self ID addition section 148 adds the recorder ID corresponding to the content processing apparatus 10 itself, for example, unconditionally to the source ID list L. In particular, the self ID addition section 148 reads out the recorder ID corresponding to the content processing apparatus 10 itself, for example, from the self ID database 117 and writes the recorder ID into the source ID list L. Consequently, the content processing apparatus 10 can reproduce a ripped content ripped by the content processing apparatus 10 itself irrespective of whether or not there exists a group registration. It is to be noted that the group ID may be produced based on a random number or the like by the self ID addition section and recorded into the self ID database 117.

The group ID updating section 149 adds, for example, when a group ID is inputted from the group registration section 130 upon group registration of the content processing apparatus 10, such a group ID as just mentioned into the source ID list L. Consequently, the content processing apparatus 10 is enabled to reproduce a distribution content having the group ID applied thereto.

Further, if a group registration cancellation notification is inputted from the group registration section 130, then the group ID updating section 149 deletes all source IDs (recorder IDs, group IDs) included in the source ID list L. However, only the recorder ID corresponding to the content processing apparatus 10 itself is not deleted from the source ID list L. Consequently, the content processing apparatus 10 is permitted to reproduce only a ripped content produced by the content processing apparatus 10 itself and those contents which are not under copyright management.

It is to be noted that the recorder ID updating section 144 and the group ID updating section 149 can update and return the source ID list L received from the content reproduction apparatus 20.

The list management section 140 according to the present embodiment is described above. In this manner, the list management section 140 adds a group ID obtained by group registration to the source ID list L and adds the recorder ID of any content processing apparatus 10 which belongs to the same apparatus group based on whether or not the group ID is same to the source ID list L. Consequently, those content processing apparatus 10 which are registered in the same apparatus group can freely reproduce a copied distribution content and a ripped content. On the other hand, reproduction of a copied content can be restricted and illegal utilization of a content can be prevented between those content processing apparatus 10 which are registered in different apparatus groups or are not registered as yet.

It is to be noted that only one representative list management section 140 may be provided in a certain content processing apparatus 10 from among a plurality of content processing apparatus 10 and content reproduction apparatus 20 in a private network such that such a list management section 140 as just mentioned collectively updates the source ID lists L of the content processing apparatus 10 and the content reproduction apparatus 20. In this instance, the representative list management section 140 is preferably provided, for example, in a connection server apparatus in a private network.

<4. Content Processing Apparatus (PD)>

Now, a configuration of the content reproduction apparatus (PD) 20 according to the present embodiment is described in detail.

First, a hardware configuration of the content reproduction apparatus 20 according to the present embodiment is described with reference to FIG. 9. It is to be noted that FIG. 9 is a block diagram schematically showing an example of a hardware configuration of the content reproduction apparatus 20 according to the present embodiment.

As shown in FIG. 9, the content reproduction apparatus 20 includes, for example, a main control apparatus 201, a flash memory 202, a RAM 203, a data processing apparatus 204, a bus 206, an inputting apparatus 208, a display apparatus 210, a storage apparatus (HDD) 211, a decoder 213, a communication apparatus 215, an audio outputting circuit 216, a remote controller 218, and headphones 219.

The main control apparatus 201 functions as a control apparatus and controls the components of the content reproduction apparatus 20. The flash memory 202 stores, for example, a program which defines action of the main control apparatus 201 and various data. Meanwhile, the RAM 203 is formed from, for example, an SDRAM (Synchronous DRAM) and temporarily stores various data relating to processes of the main control apparatus 201.

The data processing apparatus 204 is formed from a system LSI or the like and processes data to be transferred in the content reproduction apparatus 20. The bus 206 is a data line which interconnects the main control apparatus 201, flash memory 202, RAM 203, data processing apparatus 204, inputting apparatus 208, display apparatus 210, storage apparatus (HDD) 211, decoder 213, communication apparatus 215, audio outputting circuit 216 and so forth.

The inputting apparatus 208 and the remote controller 218 are formed from operation elements such as a touch panel, button keys, levers, and dials, and an input control circuit which produces an input signal in response to an operation of any of the operation elements by the user and outputs the input signal to the main control apparatus 201. The user of the content reproduction apparatus 20 can input various data or input a processing action instruction to the content reproduction apparatus 20 by operating the inputting apparatus 208 or the remote controller 218 which is hereinafter described.

The display apparatus 210 is formed from, for example, an LCD panel, and an LCD control circuit. The display apparatus 210 displays various kinds of information in the form of a text or an image under the control of the main control apparatus 201. For example, the display apparatus 210 can display title information of contents held in the content reproduction apparatus 20 such that it can be decided whether or not reproduction is permitted as hereinafter described.

The storage apparatus 211 is an apparatus for data storage formed as an example of a storage section of the content reproduction apparatus 20 according to the present embodiment. The storage apparatus 211 is formed from, for example, a hard disk drive (HDD) having a storage capacity of several tens GB and stores compressed contents, programs of the main control apparatus 201 and various data such as processing data.

The decoder 213 performs a decryption process, a decoding process, a surround process, a conversion process into PCM data and so forth of encrypted contents data.

The communication apparatus 215 is formed from a USB controller, a USB terminal and so forth and transmits and receives various data such as contents, a source ID list L, ICV data, content management information and control signals to and from a content processing apparatus 10 connected through the local line 9 such as a USB cable.

The audio outputting circuit 216 amplifies analog audio data decoded by the decoder 213 and DA converted by the CPU and outputs the amplified analog audio data to the remote controller 218. The analog audio data are outputted from the remote controller 218 to the headphones 219 and outputted from a speaker built in the headphones 219.

Here, principal data flows in the content reproduction apparatus 20 having such a hardware configuration as described above are described.

First, a data flow when the content reproduction apparatus (PD) 20 receives a content from a content processing apparatus (PC) 10 is described. When the content reproduction apparatus 20 and the content processing apparatus 10 are connected to each other by the local line 9 such as a USB cable, the content processing apparatus 10 recognizes the content reproduction apparatus 20 as a removable HDD. If, in this state, the content processing apparatus 10 transmits content data and control information such as ICV data to the content reproduction apparatus 20, then the communication apparatus 215 receive the data. Then, the received content data are stored directly into the storage apparatus 211 by the communication apparatus 215. Meanwhile, the control information received by the communication apparatus 215 is inputted to the main control apparatus 201 via the data processing apparatus 204 and stored into a predetermined storage region.

Now, a data flow when the content reproduction apparatus (PD) 20 reproduces a content is described. First, a reproduction request of a content is inputted to the main control apparatus 201, and if reproduction of the content is permitted by the main control apparatus 201, then the data processing apparatus 204 reads out content data of an object of reproduction from the storage apparatus 211 and transfers the content data to the RAM 203 and simultaneously and parallelly transfers the content data transferred to the RAM 203 to the decoder 213. Then, the decoder 213 performs a decryption process, a decoding process, a surround process, a conversion process into PCM data and so forth of the content data in an encrypted form and transfers resulting data to the main control apparatus 201. Further, the display apparatus 210 performs volume adjustment of the PCM data inputted thereto by means of a DA converter (not shown) and converts resulting data into analog audio data, and transfers the analog audio data to an amplifier of the audio outputting circuit 216. The audio outputting circuit 216 outputs the analog audio data from the headphones 219 through the remote controller 218.

Now, principal functions of the content reproduction apparatus 20 according to the present embodiment are described with reference to FIG. 10. It is to be noted that FIG. 10 is a block diagram schematically showing functions of the content reproduction apparatus 20 according to the present embodiment.

Figure 10:
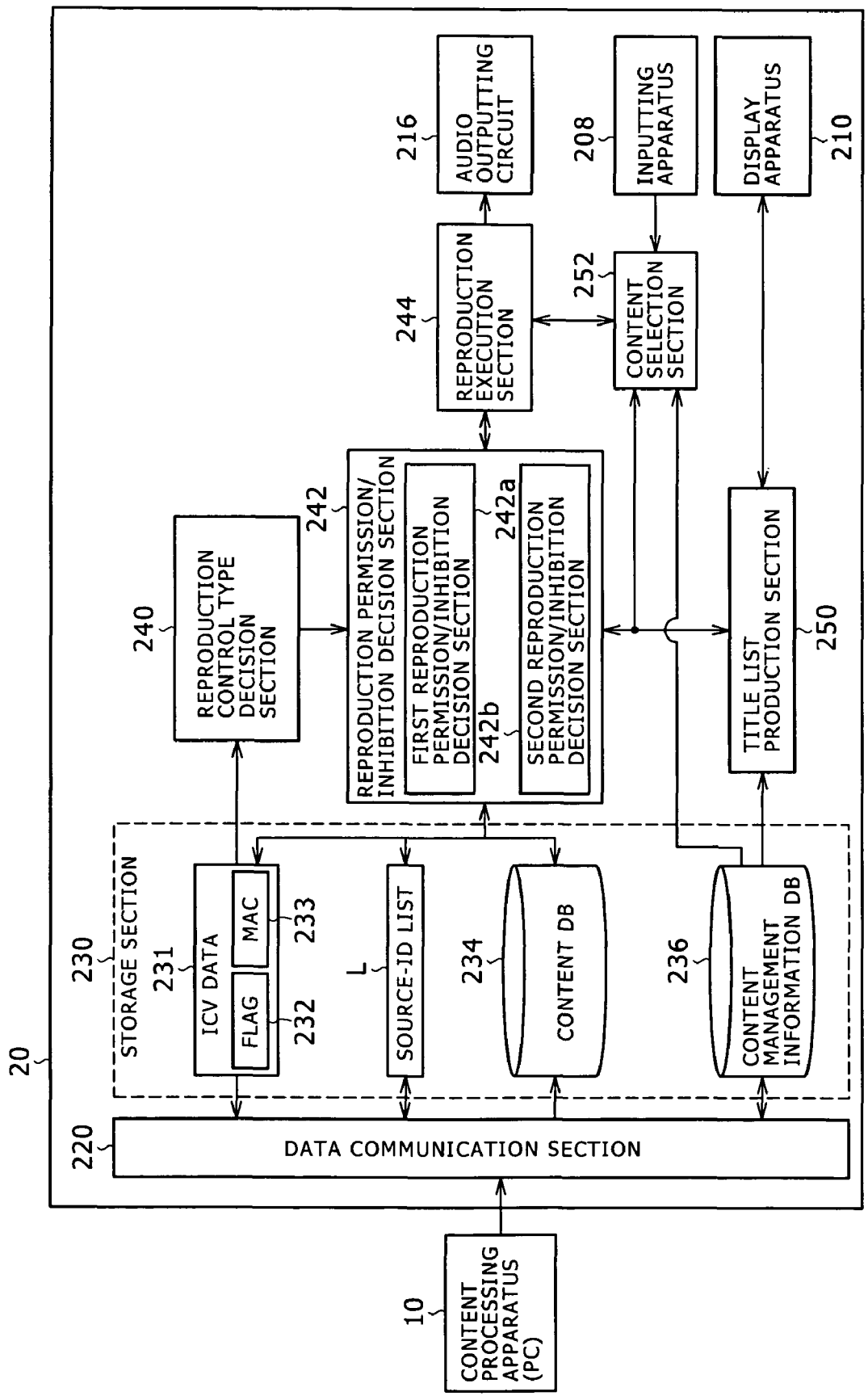
FIG. 10 is a block diagram schematically showing functions of the content reproduction apparatus according to the embodiment.

As shown in FIG. 10, each content reproduction apparatus 20 includes, for example, a data communication section 220, a storage section 230, a reproduction control type decision section 240, a reproduction permission/inhibition decision section 242, a reproduction execution section 244, a title list production section 250 and a content selection section 252.

The data communication section 220 utilizes the communication apparatus 215 to transmit and receive data to and from a content processing apparatus 10 through the local line 9.

The storage section 230 is formed from, for example, the storage apparatus 211, flash memory 202 and so forth described hereinabove and stores various data in the content reproduction apparatus 20. The storage section 230 has, for example, ICV data 231, a source ID list L, a content database 234 and a content management information database 236 stored therein.

The ICV data 231 are produced by the ICV data management section 190 of a content processing apparatus 10 and transferred to the content reproduction apparatus 20, and are used to check the validity of a content reproduction process in the content reproduction apparatus 20. The ICV data 231 include, for example, a 1-bit flag 232 applied to a header part, and a MAC value 233.

The flag 232 is an example of method identification information representative of a reproduction control method (copyright management method) of the content reproduction apparatus 20. For example, where the reproduction control method of the content reproduction apparatus 20 is set to the group management type, the flag 232 is "0", but where the reproduction control method is set to the check-in check-out type, then the flag 232 is "1".

Further, where the reproduction control method of the content reproduction apparatus 20 is set to the group management type by the content processing apparatus 10, the MAC value 233 is a MAC value of the source ID list L. On the other hand, where the reproduction control method is set to the check-in check-out type, the MAC value 233 is a MAC value produced based on a license including utilization condition information of each content.

Further, the source ID list L in the storage section 230 is substantially same as the source ID list L of a content processing apparatus 10 described hereinabove. As the content reproduction apparatus 20 is group-registered, the group ID is added, and also the recorder ID of each of the content processing apparatus 10 which belong to the same apparatus group is added. In the present embodiment, the source ID list L is updated by the list management section 140 of the content processing apparatus 10. However, a list management section may be provided in the content reproduction apparatus 20 such that the content reproduction apparatus 20 itself updates the source ID list L.

Further, the content database 234 stores a content transferred from a content processing apparatus 10. Where the reproduction control method of the content reproduction apparatus 20 is set to the group management type, the content to which such a license including a source ID as shown in FIG. 6A is applied is stored in the content database 234. However, where the reproduction control method is set to the check-in check-out type, the content to which such a license including utilization condition information as illustrated in FIG. 6B is applied is stored in the content database 234.

In the content management information database 236, attribute information of each content stored in the content database 234 such as a content ID and title information (tune name, artist name, album name and so forth) of the title, recording place information (for example, an address in the content database 234) and so forth are recorded similarly as in the content management information database 118 of the content processing apparatus 10 described hereinabove.

Further, for example, the device ID of the content reproduction apparatus 20 is stored safely in a self ID database not shown in the storage section 230. The device ID is an ID applied uniquely in a unit of a content reproduction apparatus 20 upon shipment from a factory, and is used upon group registration of the content reproduction apparatus 20.

The reproduction control type decision section 240 reads out, for example, upon reproduction of a content or the like, the flag 232 of the ICV data 231 described hereinabove and decides a reproduction control method of the content reproduction apparatus 20 set by the content processing apparatus 10 based on the flag 232. In particular, for example, where the flag 232 is "0", the reproduction control type decision section 240 decides that the reproduction control method is of the group management type (first reproduction control method), but where the flag 232 is "1", the reproduction control type decision section 240 decides that the reproduction control method is of the check-in check-out type (second reproduction control method). The reproduction control type decision section 240 outputs a result of the decision to the reproduction permission/inhibition decision section 242.

The reproduction permission/inhibition decision section 242 decides based on the reproduction control method decided by the reproduction control type decision section 240 whether or not reproduction of the content whose request for reproduction is received should be permitted. The reproduction permission/inhibition decision section 242 includes a first reproduction permission/inhibition decision section 242a which performs reproduction control in accordance with a copyright management scheme of the group management type and a second reproduction permission/inhibition decision section 242b which performs reproduction control in accordance with a copyright management scheme of the check-in check-out type.

If it is decided by the reproduction control type decision section 240 that the reproduction control method of the content reproduction apparatus 20 is of the group management type (first reproduction control method), then the reproduction permission/inhibition decision section 242 renders the first reproduction permission/inhibition decision section 242a operative to decide whether or not reproduction of the content should be performed based on the source ID applied to the content of the object of reproduction and the source ID list L. It is to be noted that, if a term of validity is set to the source ID in the source ID list L, then reproduction of the content is permitted when the source ID is within the term of validity.

On the other hand, if it is decided that the reproduction control method of the content reproduction apparatus 20 is of the check-in check-out type (first reproduction control method), then the reproduction permission/inhibition decision section 242 renders the second reproduction permission/inhibition decision section 242b operative to decide whether or not reproduction of the content should be permitted based on utilization condition information (reproduction time number restriction, term of validity for reproduction and so forth) of the license applied to the content of the object of reproduction. It is to be noted that the reproduction permission/inhibition decision section 242 has substantially same functions as those of the reproduction permission/inhibition decision section 172 of the content processing apparatus 10 described hereinabove, and therefore, detailed description of the same is omitted.

The reproduction execution section 244 reproduces a content, which is decided to be permitted to be reproduced by the reproduction permission/inhibition decision section 242 and outputs the content to the audio output circuit. It is to be noted that the reproduction execution section 244 has substantially same functions as those of the reproduction execution section 174 of the content processing apparatus 10 described hereinabove, and therefore, detailed description of the same is omitted.

The title list production section 250 reads out title information of all or some of contents stored in the content database 234 from the content management information database 236 and produces a list (hereinafter referred to as "title list") of the contents. The title list is a table of tune names of music contents and includes, as incidental information, an artist name or an album name, reproduction time and so forth of each music content. Further, the title list production section 250 causes the produced title list to be displayed on the display apparatus 210. Consequently, the user can read the title list to select a content whose reproduction is desired and operate the inputting apparatus 208 to designate the title information of the content and issue a reproduction request. In this manner, the title list production section 250 and the display section 210 in the present embodiment are configured as an example of a display section which displays title information of one, two or more contents held by the content reproduction apparatus 20.

The content selection section 252 selects a content of an object of reproduction based on a user input to the inputting apparatus 208 and outputs a result of the selection to the reproduction permission/inhibition decision section 242. In particular, the content selection section 252 reads out a content ID and a storage place of a content, whose reproduction is requested by the user, corresponding to text information of the content from the content management information database 236 and outputs such information to the reproduction permission/inhibition decision section 242. As a result, the reproduction permission/inhibition decision section 242 performs reproduction permission/inhibition decision regarding the selected content of the object of reproduction, and only those contents which can be reproduced are reproduced by the reproduction execution section 244.

Further, the title list production section 250 may produce a title list such that title information of those contents which can be reproduced and title information of those contents which cannot be reproduced can be decided and cause the title list to be displayed. In this instance, the title list production section 250 first requests the reproduction permission/inhibition decision section 242 described above to decide whether or not each content of an object of display can be reproduced, and produces, based on a result of the decision, a title list in which those contents which can be reproduced and those contents which cannot be reproduced can be identified from each other. Consequently, the user can selectively designate a content whose reproduction is desired from among those contents which can be reproduced. In this manner, where title information of a content desired by the user is selected from among those contents which are displayed on the display apparatus 210 and can be reproduced, the content selection section 252 outputs a content ID and a storage place of a content corresponding to the selected title information to the reproduction permission/inhibition decision section 242 so that the reproduction permission/inhibition decision section 242 reproduces the content without performing a decision with regard to whether or not reproduction is permitted.

The functional configuration of the content reproduction apparatus 20 according to the present embodiment is described above. The content reproduction apparatus 20 can selectively execute reproduction control of the group management type and reproduction control of the check-in check-out type in accordance with setting by the content processing apparatus 10. Therefore, not only the convenience of the content reproduction apparatus 20 to the user is enhanced, but also enhancement of the efficiency in development work and reduction of the cost can be anticipated because there is no necessity to design and develop content reproduction apparatus 20 of different models which are ready for the individual reproduction control methods.

Further, each content reproduction apparatus 20 is ready for such copyright management of the group management type that reproduction of a content is controlled based on the source ID applied to the content and the source ID list L. Therefore, since the user can freely download and reproduce a content from a content processing apparatus 10 owned by the user itself to the content reproduction apparatus 20, the content utilization by the user is higher in the degree of freedom and is more user-friendly than that of the conventional check-in check-out type.

It is to be noted that the data communication section 220, reproduction control type decision section 240, reproduction permission/inhibition decision section 242, reproduction execution section 244, title list production section 250, content selection section 252 and so forth described hereinabove may be configured, for example, as hardware having the functions described hereinabove or may be configured by installing a program, which causes a computer to implement the functions described hereinabove, into the content reproduction apparatus 20.

Further, in the embodiment described above, where a source ID is not applied to a content, the reproduction permission/inhibition decision section 242 of any content reproduction apparatus 20 decides that the content does not require copyright management and permits reproduction of the content. Then, the reproduction permission/inhibition decision section 242 outputs a reproduction instruction signal of the content to the reproduction execution section 244. In particular, the content reproduction apparatus 20 is configured such that it can freely reproduce any content which is not under copyright protection such as a content to which no source ID is applied or the like. Utilization restriction of such contents which are not under copyright projection as described above can be implemented by the group management type described hereinabove. A technique therefor is described below.

First, if the transfer control section (not shown) of the content processing apparatus 10 described hereinabove accepts a request to transfer a content, which is stored in the content database 116 and is under copyright projection, to the content reproduction apparatus 20, then it acquires the source ID list L in the content reproduction apparatus 20 connected by the local line 9 (step 1).

Then, the transfer control section compares the group ID in the acquired source ID list L of the content reproduction apparatus 20 and the group ID in the source ID list L possessed by the transfer control section itself (step 2).

If the two group IDs described above coincide with each other as a result of the comparison, then the transfer control section permits the content, whose request for transfer has been received and which is not under copyright protection, to be transferred from the content processing apparatus 10 to the content reproduction apparatus 20. However, if the two group IDs do not coincide with each other, then the transfer control section inhibits the transfer (step 3).

On the other hand, although transfer of a content, which is not under copyright protection, from a content reproduction apparatus 20 to a content processing section 10 is basically inhibited, also it is possible to configure the system such that partial transfer is permitted in accordance with a group management method described hereinabove. A technique therefor is described below.

First, if the transfer control section of a content processing section 10 accepts a request from a content reproduction apparatus 20 connected thereto by the local line 9 to transfer a content which is stored in the content reproduction apparatus 20 but is not under copyright protection to the content processing section 10, then the transfer control section of the content processing section 10 acquires the source ID list L in the content reproduction apparatus 20 (step 1).

Then, the transfer control section compares the group ID in the acquired source ID list L of the content reproduction apparatus 20 and the group ID in the source ID list L possessed by the transfer control section itself (step 2).

If the two group IDs described above coincide with each other as a result of the comparison, then the transfer control section permits the content, whose request for transfer has been received and which is not under copyright protection, to be transferred from the content reproduction apparatus 20 to the content processing apparatus 10. However, if the two group IDs do not coincide with each other, then the transfer control section inhibits the transfer (step 3).

In this manner, in such a copyright management method of the group management type according to the present embodiment as described above, by controlling the transfer between the content processing apparatus 10 and the content reproduction apparatus 20, copying transfer can be restricted to achieve utilization restriction also with regard to a content which is not under copyright management.

<5. Server>

Now, a configuration of the server 30 according to the present embodiment is described in detail with reference to FIG. 11. It is to be noted that FIG. 11 is a block diagram schematically showing functions of the server 30 according to the present embodiment.

Figure 11:
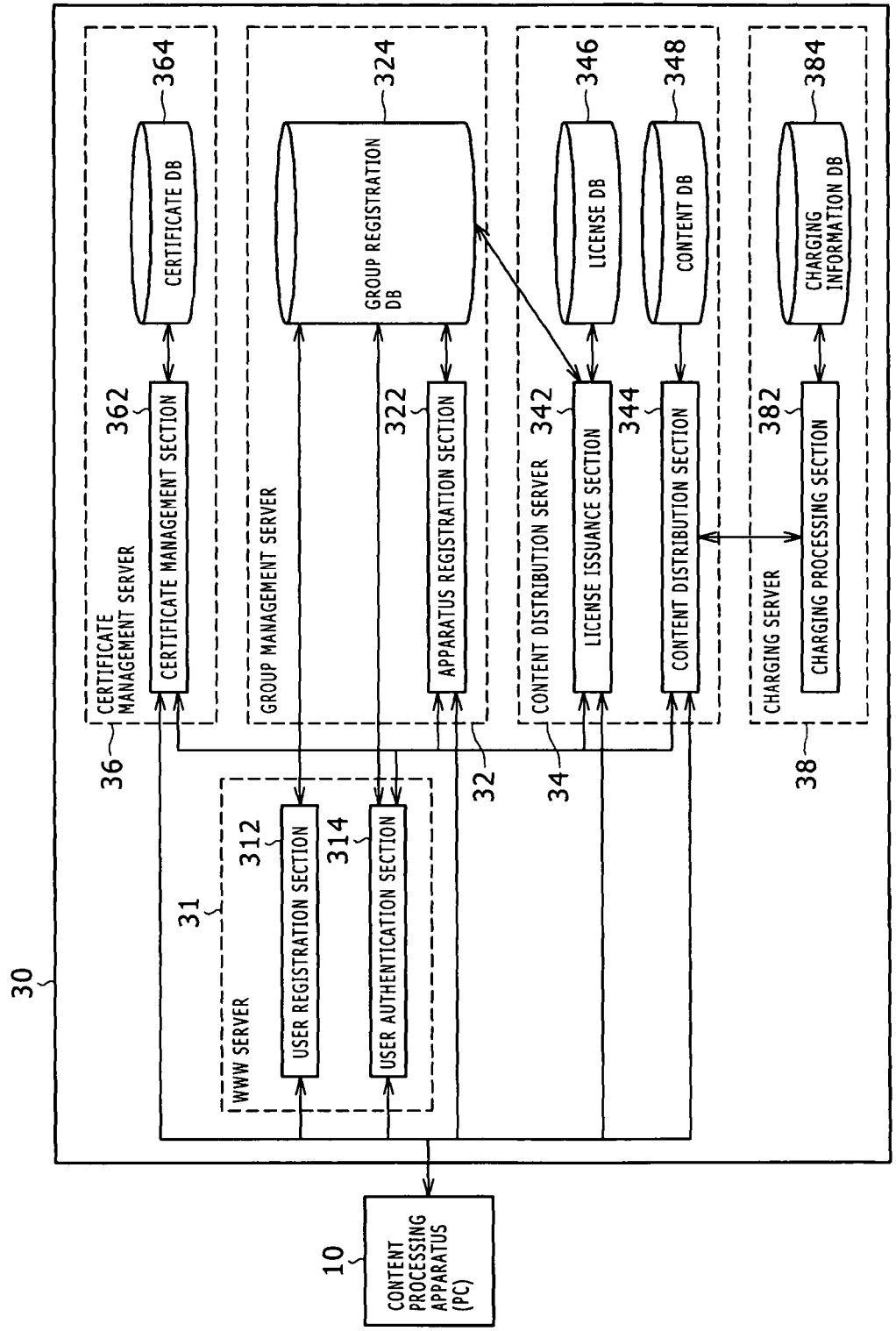
FIG. 11 is a block diagram schematically showing functions of a server according to the embodiment.

As shown in FIG. 11, the server 30 includes a WWW server 31, a group management server 32, a content distribution server 34, a certificate management server 36 and a charging server 38.

Of the components mentioned, the WWW server 31, group management server 32 and certificate management server 36 form a content sharing service execution section and execute a content sharing service of group-registering a plurality of content processing apparatus 10 and content reproduction apparatus 20 and sharing a content among the group-registered apparatus. Further, the WWW server 31, content distribution server 34 and charging server 38 form a distribution service execution section and perform a content distribution service of distributing a content to the user of the content processing apparatus 10, for example, for pay.

In the following, functional configurations of the servers 31, 32, 34, 36 and 38 according to the present embodiment are described individually. It is to be noted that the hardware configuration of the servers 31, 32, 34, 36 and 38 according to the present embodiment is similar to the hardware configuration of the content processing apparatus (PC) 10 described hereinabove with reference to FIG. 4, and therefore, description of the same is omitted.

First, the WWW server 31 is described. The WWW server 31 accepts a request from a content processing apparatus 10 accessing thereto through the network 5 and controls communication between the content processing apparatus 10 and the server 30. The WWW server 31 includes a user registration section 312 and a user authentication section 314.

The user registration section 312 performs a registration process of a new user who desires utilization of the content sharing service and/or content distribution service, a registration changing process, a registration cancellation process, management of user account information (such as user ID, credit number, and password), and so forth. To a service-registered user, a unique leaf ID is applied in a unit of a user. Various user account information and leaf IDs determined by such a registration process by the user registration section 312 as described above are stored into a group registration database 324. However, the management is not limited to such an example as just described, but a user registration database may be provided in the WWW server 31 such that the user account information and leaf IDs are managed in the user registration database.

The user authentication section 314 performs a user authentication process of authenticating, for example, in response to a connection request (registration request, registration cancellation request, content distribution request, certificate request, user account information changing request or the like) from a content processing apparatus 10 owned by the user registered in the content sharing service and/or the content distribution service in such a manner as described above, the user who owns the content processing apparatus 10 of the source of the request. The user authentication is performed, for example, based on user account information and so forth inputted by the user and the user account information of the group registration database 324. The authenticated user is, for example, permitted to log in the group management server 32, content distribution server 34, certificate management server 36 or the like.

Now, the group management server 32 is described. The group management server 32 group-registers a plurality of content processing apparatus 10 and content reproduction apparatus 20 owned by the same user. The group management server 32 includes an apparatus registration section 322 and a group registration database 324.

The group registration database 324 is stored in a storage apparatus (not shown) such as an HDD provided in the group management server 32. As seen in FIG. 12, in the group registration database 324, for example, user account information (user ID 3241, credit card number 3242) of a user who enjoys provision of the content sharing service and the content distribution service, a leaf ID 3243 corresponding to the user, an apparatus ID 3244 of a group-registered content processing apparatus 10 or content reproduction apparatus 20, and a recorder ID 3245 of an apparatus having a ripping function from among the group-registered content processing apparatus 10 are stored in an associated relationship with each other.

To one user ID (user account) 3241, for example, one leaf ID 3243 is allocated. Further, with the leaf ID 3243 of each user, apparatus IDs (terminal IDs or device IDs) 3244 of one, two or more content processing apparatus 10 and content reproduction apparatus 20 registered in an apparatus group of the user represented by the leaf ID are associated. Here, the terminal ID described above is registered as the apparatus ID 3244 of the content processing apparatus (PC) 10, and the device ID described above is registered as the apparatus ID 3244 of the content reproduction apparatus (PD) 20. Furthermore, with the terminal ID, the recorder ID of the content processing apparatus 10 having a ripping function is associated.

The apparatus registration section 322 group-registers a content processing apparatus 10 or a content reproduction apparatus 20 of a registration requesting source into an apparatus group owned by a user authenticated by the user authentication section 314 described hereinabove. The group registration process is performed, for example, when group registration request information (for example, a registration requesting notification, a terminal ID or a device ID, a recorder ID or the like) is received from the group registration section 130 of the content processing apparatus 10 after the user authentication process is performed. When an apparatus is to be group-registered, an apparatus ID (terminal ID or device ID, a recorder ID and so forth) of the content processing apparatus 10 or the content reproduction apparatus 20 of the registration requesting source is written into a location of the column of the apparatus ID 3244 of the group registration database 324 described hereinabove which corresponds to the authenticated user described above. By this, the apparatus ID of the group-registered apparatus and the leaf ID (apparatus group) applied to the authenticated user described hereinabove are associated with each other.

Further, the apparatus registration section 322 inhibits the same content processing apparatus 10 from being registered into different apparatus groups. To this end, the apparatus registration section 322 searches the group registration database 324 and, if the apparatus ID of the content processing apparatus 10 of the registration requesting source is stored already, the apparatus registration section 322 rejects registration of the content processing apparatus 10 or the content reproduction apparatus 20 so that the apparatus ID may not be written newly into the group registration database 324. Consequently, it is possible to cause one content processing apparatus 10 or one content reproduction apparatus 20 to belong to only one apparatus group.

Further, it is also possible for the apparatus registration section 322 to set an upper limit to the number of content processing apparatus 10 or content reproduction apparatus 20 which can be registered into the same apparatus group, particularly an upper limit of the number of content processing apparatus 10 which can be associated with a leaf ID of the same user. For example, the apparatus registration section 322 may set the upper limit number to the number of content processing apparatus (PC) 10 which can be registered in the same apparatus group, for example, to a predetermined number (for example, three) such that only a number of terminal IDs up to the predetermined upper limit number (for example, to three) are associated with a certain leaf ID. In this instance, if a number of registration requests exceeding such an upper limit number as described above are received from content processing apparatus (PC) 10 each having a terminal ID as an apparatus ID, then the apparatus registration section 322 rejects the registration of the registration requests. By this, the number of content processing apparatus (PC) 10 which can be registered in the same apparatus group can be restricted, for example, to three or less, and consequently, the number of content processing apparatus 10 which can receive a distribution content in the same apparatus group can be restricted.

Further, as another example of the number described above, for example, the apparatus registration section 322 may set an upper limit number (for example, 10) to recorder IDs which can be associated with the same group ID. In this instance, if a number of registration requests exceeding such an upper limit number as described above are received from content processing apparatus (PC) 10 each having a recorder ID, then the apparatus registration section 322 rejects the registration. Consequently, since the number of content processing apparatus 10 having a ripping function which can be registered in the same apparatus group can be restricted, the number of content processing apparatus 10 which can serve as a providing source of a ripped content which can be shared in the same apparatus group can be restricted.

Further, when a content processing apparatus 10 is registered into a predetermined apparatus group, the apparatus registration section 322 notifies the group-registered content processing apparatus 10 of service data. The service data include, for example, a leaf ID corresponding to the authenticated user (registered apparatus group) described above, and a service common key for utilizing a content. Consequently, the group-registered content processing apparatus 10 can receive a leaf ID, convert the leaf ID into a group ID and adds the group ID to the source ID list L of the content processing apparatus 10 itself.

It is to be noted that a leaf ID may not be conveyed from the 322 of the group management server 32 to the content processing apparatus 10 in this manner, but the apparatus registration section 322 may produce a group ID based on the leaf ID and so forth and notify the content processing apparatus 10 of the produced group ID. In this instance, the content processing apparatus 10 by itself may not produce a group ID but can add the group ID received from the group management server 32 as it is to the source ID list L.

Further, the apparatus registration section 322 cancels a registration of a content processing apparatus 10 of a registration cancellation requesting source from an apparatus group owned by an authenticated user. This group registration cancellation process is performed when group registration cancellation request information (for example, a group registration cancellation requesting notification, a terminal ID or a device ID, a recorder ID or the like) is received from the group registration section 130 of the content processing apparatus 10 after the user authentication process is performed. When a group registration of an apparatus is to be cancelled, an apparatus ID (terminal ID, device ID) of a content processing apparatus 10 or a content reproduction apparatus 20 which is the registration cancellation requesting source described hereinabove is deleted from the column of the apparatus ID 3244 of the group registration database 324 described hereinabove. However, a recorder ID is not deleted even if a registration of a corresponding content processing apparatus (PC) 10 is canceled. Consequently, if a number of content processing apparatus 10, which have a ripping function, equal to the predetermined upper limit number described hereinabove (for example, 10) are group-registered once, then even if the registration of one of the content processing apparatus 10 is canceled later, a new content processing apparatus 10 cannot be registered additionally. Accordingly, the registration number of content processing apparatus 10 which can produce a ripped content which can be shared can be suppressed to make copyright management of ripped contents severe.

Now, the certificate management server 36 is described. The certificate management server 36 collects and manages group certificates G issued by the content processing apparatus 10 and distributes a group certificate G to any other content processing apparatus 10 which belongs to an apparatus group of the same user. The certificate management server 36 includes a certificate management section 362 and a certificate database 364.

The certificate database 364 is stored in a storage apparatus (not shown) such as an HDD provided in the certificate management server 36. The certificate database 364 stores the group certificates G issued by the content processing apparatus 10 in an associated relationship with the users (leaf IDs) of the content processing apparatus 10.

The certificate management section 362 acquires the group certificates G issued by the content processing apparatus 10 through the network 5 and stores the acquired group certificates G in an associated relationship with the users into the certificate database 364. Further, the certificate management section 362 reads the group certificates G of one, two or more content processing apparatus 10 which belong to an apparatus group of a certain user from such a certificate database 364 as described above and distributes the group certificates G to the other content processing apparatus 10 and so forth which belong to the same apparatus group.

For example, when a content processing apparatus 10 is group-registered by the group management server 32, the certificate management section 362 acquires a group certificate G in which the recorder ID of the content processing apparatus 10 and the group ID are associated with each other from the registered content processing apparatus 10 and stores the group certificate G into the certificate database 364. Further, when another content processing apparatus 10 is registered newly into the same apparatus group, the certificate management section 362 distributes the group certificates G of the content processing apparatus 10 registered already in the same apparatus group to the newly registered content processing apparatus 10. Consequently, the newly registered content processing apparatus 10 can share a ripped content by acquiring the recorder IDs of the registered content processing apparatus 10 and adding the acquired recorder IDs to the source ID list L.

Further, when a certificate distribution request is received from a content processing apparatus 10 registered already, when the content processing apparatus 10 accesses the server 30 or in a like case, the certificate management section 362 may distribute, to the content processing apparatus 10, the group certificates G of the other content processing apparatus 10 which belong to the same apparatus group.

Further, if a registration of a content processing apparatus 10 is canceled, then the certificate management section 362 deletes the group certificate G of the content processing apparatus 10 whose registration is canceled from the certificate database 364.

In this manner, the certificate management section 362 of the certificate management server 36 manages the group certificates G issued by the content processing apparatus 10 in a centralized fashion and distributes the group certificates G to the other content processing apparatus 10 which belong to the same apparatus group. Consequently, any content processing apparatus 10 can acquire the group certificates G of the other content processing apparatus 10 without directly connecting the content processing apparatus 10 to each other. Furthermore, since the certificate management server 36 performs centralized management of the group certificates G, any content processing apparatus 10 can always acquire the latest group certificates G. For example, any content processing apparatus 10 can acquire the group certificates G of all of the content processing apparatus 10 which belong to an apparatus group of the same user and add the recorder IDs of the content processing apparatus 10 to the source ID list L.

Now, the content distribution server 34 is described. The content distribution server 34 distributes a content, for example, for pay to a content processing apparatus 10 of a user who has a user registration for the content distribution service. The content distribution server 34 is configured so as to be capable of distributing both of contents which are ready for the copyright management scheme of the group management type described hereinabove and contents which are ready for the copyright management scheme of the check-in check-out type described hereinabove.

The content distribution server 34 includes, for example, a license issuance section 342, a content distribution section 344, a license database 346 and a content database 348.

The license database 346 and the content database 348 are stored in a storage apparatus (not shown) such as a HDD provided in the content distribution server 34. The license database 346 is a database for storing a license issued upon distribution of a content. The content database 348 is a database for a plurality of contents which are an object of distribution of the content distribution service.

The content distribution section 344 allows, for example, a user who has been authenticated successfully to read a list of distributable contents and select that one of the distribution contents which the user wants to be distributed. Further, the content distribution section 344 distributes a selected distribution content to a content processing apparatus 10 utilized by the user through the network 5. It is to be noted that the distribution process requires, for example, such a charging process as hereinafter described as a requirement.

Further, the content distribution section 344 transmits also information (content ID, title information (tune name, artist name, album name, reproduction time and so forth)) relating to a distribution content stored, for example, in the content database 348 or the like in an associated relationship with the distribution content.

The license issuance section 342 issues a license (right information; Usage Right) of a content distributed by the content distribution section 344 described hereinabove. The license issuance section 342 can issue a license of a different type depending upon the type of the copyright management method.

For example, where copyright management of the group management type is to be performed, the license issuance section 342 issues a license including a leaf ID corresponding to the user who purchases a distribution content in an associated relationship with the distribution content. Thereupon, the license issuance section 342 may acquire the leaf ID corresponding to the user from the group registration database 324 described hereinabove or may be acquired from the user authentication section 314.

After the license issuance section 342 issues a license in this manner, the content distribution server 34 transmits a file of the distribution content and a file of the license including the leaf ID corresponding to the user who purchases the distribution contents in an associated relationship with each other to the content processing apparatus 10. As a result, the content processing apparatus 10 receiving such a distribution content and a license as described above converts the leaf ID into a group ID and applies the group ID to the distribution content such that the group ID functions as a source ID for the distribution content to execute copyright management of the group management type described hereinabove.

On the other hand, where copyright management of the check-in check-out type is to be performed, the license issuance section 342 issues a license, in which utilization condition information (Usage rule) such as check-in/out time number restriction, reproduction time number restriction, reproduction validity term and so forth is described, in an associated relationship with the distribution content. Thereupon, the license issuance section 342 may produce a license of a utilization condition type desired by the user based on license model information of the license database 346.

After the license issuance section 342 issues a license in this manner, the content distribution server 34 transmits a file of the distribution content and a file of the license including the utilization condition information in an associated relationship with each other to the content processing apparatus 10. As a result, the content processing apparatus 10 receiving such a distribution content and a license including the utilization condition information as described above executes copyright management of the check-in check-out type based on the license.

The license issuance section 342 stores and manages the issued license into and in the license database 346.

As described above, upon distribution of a content to a content processing apparatus 10, the content distribution server 34 transmits the distribution content and the license thereof in a set. Thereupon, when a content of the group management type is to be distributed, the content distribution server 34 places the leaf ID into the license, but when a content of the check-in check-out type is to be distributed, the content distribution server 34 places the utilization condition information into the license.

It is to be noted that, while, in the foregoing description, the content distribution server 34 transmits a distribution content and a license in separate files, the content distribution server 34 may otherwise transmit them in the same file. Further, while, in the foregoing description, the content distribution server 34 notifies, upon distribution of a content of the group management type, a content processing apparatus 10 of a leaf ID and the content processing apparatus 10 produces a group ID based on the received leaf ID, the production of a group ID is not limited to the example described above. For example, the content distribution server 34 may produce a group ID based on a leaf ID in advance and notify the content processing apparatus 10 of the produced group ID.

Now, the charging server is described. The charging server 38 performs a charging process in response to distribution of a content by the content distribution server 34 described hereinabove. The charging server 38 includes, for example, a charging processing section 382 and a charging information database 384.

The charging information database 384 is a database including charging information for each user and stored in a storage apparatus (not shown) such as a HDD provided in the charging server 38.

The charging processing section 382 performs a charging process of requesting, for example, a user who receives distribution of a content to pay an amount of money according to the content to be distributed. Accounting information such as an amount of money claimed, a settling method and a settling date generated by the charging process is stored, for example, into the charging information database 384.

<6. Content Sharing Method>

Figure 13:
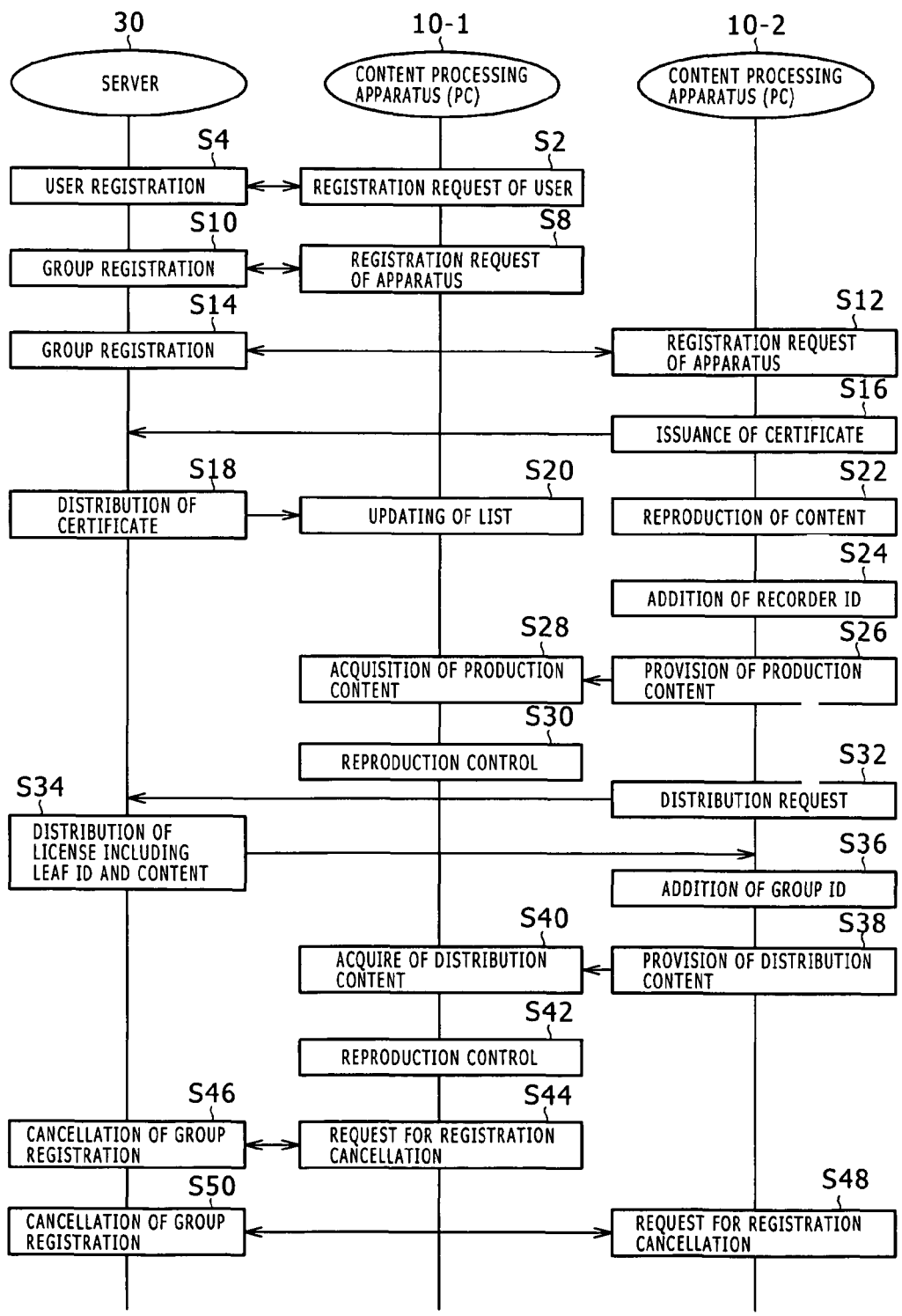
FIG. 13 is a timing chart illustrating a basic flow of a content sharing method according to the embodiment.

Now, a basic flow of a content sharing method which makes use of such a content sharing system 100 as described above is described with reference to FIG. 13. FIG. 13 is a timing chart illustrating a basic flow of the content sharing method according to the present embodiment.

As shown in FIG. 13, a new user would first use the content processing apparatus (PC) 10-1 owned by the user itself to issue a user registration request for the content sharing service utilizing a copyright management scheme of the group management type described hereinabove to the WWW server 31 of the server 30 (S2). Consequently, the WWW server 31 performs a user authentication process of the user to apply a new leaf ID to the user and register the user (S4). It is to be noted that the user registration of the content sharing service may serve also as user registration of the content distribution service. Further, the user registration process described above may be performed by the group management server 32 in place of the WWW server 31.

Then, the user would use the content processing apparatus (PC) 10-1 and 10-2 owned by the user itself to issue a registration request of the two individual apparatus to the server 30 (S8, S12). Consequently, the group management server 32 group-registers the content processing apparatus 10-1 and 10-2 into an apparatus group of the user in accordance with such a registration request of the apparatus as just mentioned and notifies the content processing apparatus 10-1 and 10-2 of a leaf ID corresponding to the user (S10, S14). The content processing apparatus 10-1 and 10-2 convert the received leaf ID into a group ID and add the group ID into the source ID lists L of the content processing apparatus 10-1 and 10-2 themselves. It is to be noted that such apparatus group registration of the content processing apparatus 10 as described above need not be performed at the same time but may be performed at arbitrary timings different from each other.

Then, the content processing apparatus 10-2 issues a group certificate G which associates the group ID corresponding to the content processing apparatus 10-2 itself and a recorder ID with each other and transmits the group certificate G to the certificate management server 36 of the server 30 (S16). Then, the certificate management server 36 distributes the group certificate G of the content processing apparatus 10-2 to the content processing apparatus 10-1 (S18). It is to be noted that such distribution of the group certificate G as just described may be performed from the content processing apparatus 10-2 directly to the content processing apparatus 10-1 without the intervention of the certificate management server 36. Further, the group certificate G of the content processing apparatus 10-1 may be distributed to the content processing apparatus 10-2 similarly.

After the content processing apparatus 10-1 acquires the group certificate G distributed in such a manner as described above, it performs an updating process of the source ID list L owned by the content processing apparatus 10-1 itself (S20). In this list updating process, where the content processing apparatus 10-1 and 10-2 are registered in the same apparatus group upon the group registration described hereinabove, since both apparatus have the same group ID, the content processing apparatus 10-1 can add the recorder ID of the content processing apparatus 10-2 included in the group certificate G to the source ID list L of the content processing apparatus 10-1 itself. On the other hand, where the content processing apparatus 10-1 and 10-2 are registered in different apparatus groups, since the two apparatus have different group IDs from each other, the content processing apparatus 10-1 cannot add the recorder ID included in the group certificate G to the source ID list L of the content processing apparatus 10-1 itself.

In the following, a case is described wherein a content provided from the content processing apparatus 10-2 in such a situation as described above is acquired and shared by the content processing apparatus 10-1.

First, a case wherein a production content such as a ripped content is shared is described. The content processing apparatus 10-2 produces a content by ripping, self recording or the like (S22) and applies a recorder ID corresponding to the content processing apparatus 10-2 to the production content (S24). Then, the content processing apparatus 10-2 provides the production content to which the recorder ID is applied to the content processing apparatus 10-1 through the network 5, local line 9, storage medium 7 or the like (S26).

Then, the content processing apparatus 10-1 acquires the production content (S28) and executes a reproduction control process of the production content, for example, in response to a reproduction request of the user (S30). In this instance, if the recorder ID applied to the production content is included in the source ID list L of the content processing apparatus 10-1, then the content processing apparatus 10-1 can reproduce the production content, but if the recorder ID is not included in the source ID list L, then the content processing apparatus 10-1 cannot reproduce the content.

Now, another case wherein distribution content data are shared is described. First, the content processing apparatus 10-2 issues a distribution request of a content to the group management server 32 (S32). Consequently, the group management server 32 distributes the content whose distribution is requested and a license including the leaf ID corresponding to the content processing apparatus 10-2 to the content processing apparatus 10-2 (S34). Then, the content processing apparatus 10-2 converts the leaf ID in the received license into a group ID and applies the group ID to the distribution content (S36). Then, the content processing apparatus 10-2 provides the distribution content having the group ID applied thereto to the content processing apparatus 10-1 in a similar manner as described above (S38), and the content processing apparatus 10-1 acquires the distribution content (S40). Then, the content processing apparatus 10-1 executes a reproduction control process of the distribution content, for example, in response to a reproduction request of the user (S42). In this instance, if the group ID applied to the distribution content is included in the source ID list L of the content processing apparatus 10-1, then the content processing apparatus 10-1 can reproduce the distribution content, but if the group ID is not included in the source ID list L, the content processing apparatus 10-1 cannot reproduce the distribution content.

Further, if the content processing apparatus 10-1 and 10-2 individually issue a registration cancellation request (S44, S48), then the group management server 32 cancels the group registrations of the content processing apparatus 10-1 and 10-2 in response to the registration cancellation requests (S46, S50).

In such a content sharing method in which the content sharing system 100 is used as described above, if a plurality of content processing apparatus 10 owned by the same user are registered into the same apparatus group, then a production content and a distribution content can be shared comparatively freely between the content processing apparatus 10.

<7. Group Registration-Cancellation Process>

Now, processes of group-registering/registration-canceling a content processing apparatus (PC) 10 or a content reproduction apparatus (PD) 20 into and in the group management server 32 are described in detail. It is to be noted that the following processing flow is started in a state wherein user registration of the content sharing service into the group management server 32 is completed already and a leaf ID is not applied to a user who owns a content processing apparatus 10.

Figure 14:
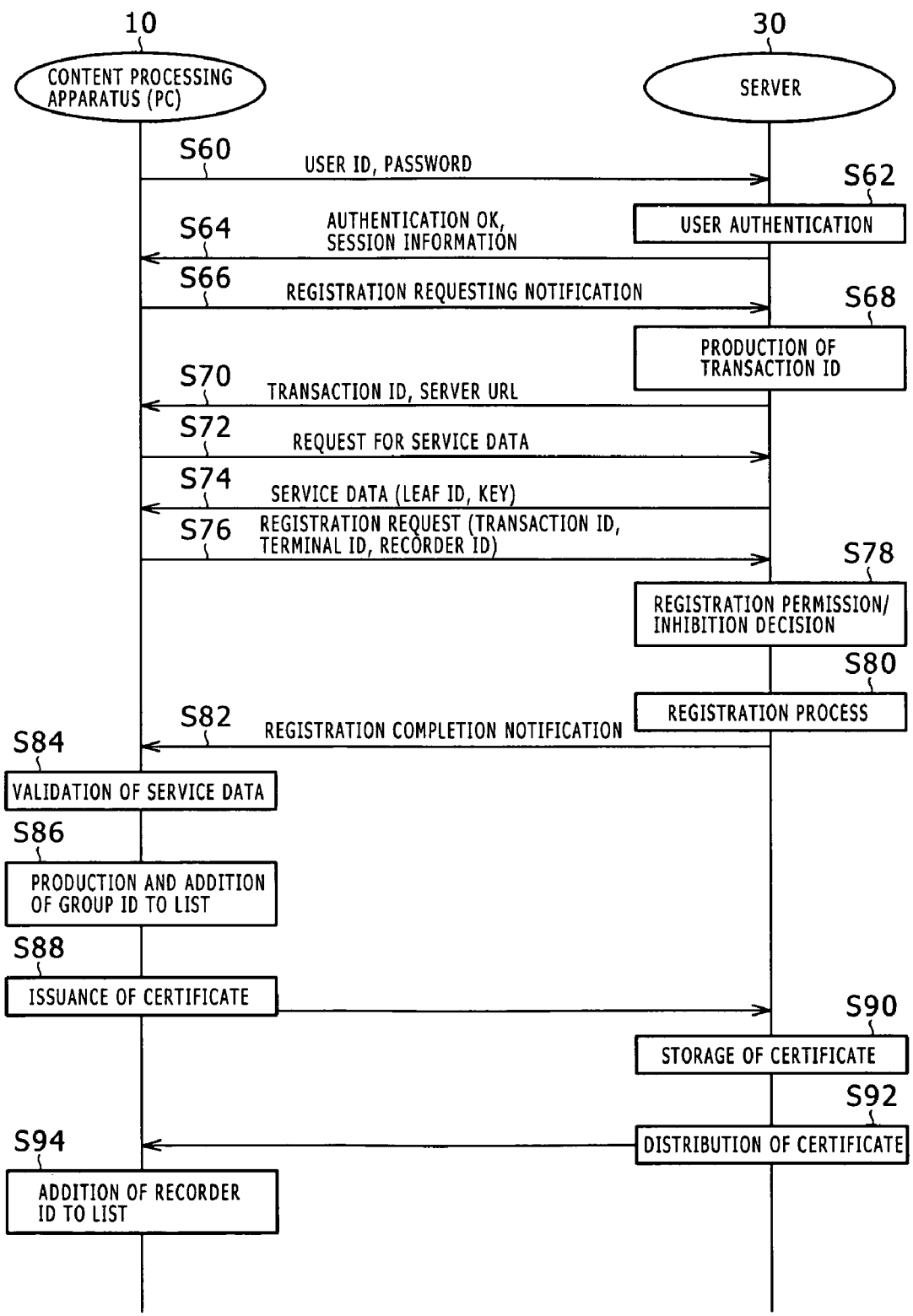
FIG. 14 is a timing chart illustrating a group registration process of a content processing apparatus (PC) according to the embodiment.

First, a process (group registration process) of apparatus-registering a content processing apparatus (PC) 10 into the group management server 32 according to the present embodiment is described. FIG. 14 is a timing chart illustrating a group registration process of the content processing apparatus (PC) 10 according to the present embodiment.

As shown in FIG. 14, first at steps S60 to S70, a communication connection is established safely between the content processing apparatus 10 of a registration requesting source and the server 30 through the network 5 and user authentication is performed. The processes at steps S60 to S70 are performed between a browser of the content processing apparatus 10 and the WWW server 31 of the server 30.

In particular, the content processing apparatus 10 of the registration requesting source first transmits a user ID and a password to the WWW server 31 in response to a user input (S60). Consequently, the WWW server 31 collates the received user ID and password with a user ID and a password registered in the group registration database 324 to perform a user authentication process (S62). If a result of this indicates that the user authentication results in failure, then the WWW server 31 does not permit the log-in and ends the registration process. On the other hand, if the user authentication results in success, then the WWW server 31 permits the log-in and transmits a notification that the user authentication results in success and session information for performing safe communication to the content processing apparatus 10 (S64). Then, the content processing apparatus 10 transmits a registration request notification to the WWW server 31 (S66). The WWW server 31 recognizes that the content processing apparatus 10 accesses the WWW server 31 for registration request based on the registration request notification. Then, the WWW server 31 produces a transaction ID (S68) and transmits the produced transaction ID and a URL (Uniform Resource Locator) which is an example of address information of the group management server 32 to the content processing apparatus 10 (S70). Consequently, the content processing apparatus 10 can thereafter access the group management server 32 referring to the received URL.

At next steps S72 to S86, processes for actually registering the content processing apparatus 10 into the group management server 32 are performed. The processes at steps S72 to S86 are performed between the copyright management section of the content processing apparatus 10 and the group management server 32 of the server 30.

In particular, the content processing apparatus 10 first issues a request for service data to the group management server 32 (S72). Consequently, the group management server 32 transmits service data to the content processing apparatus 10 (S74). The service data include a leaf ID corresponding to the authenticated user and a service common key described hereinabove. Then, the content processing apparatus 10 transmits the transaction ID received at step S70 described hereinabove and the terminal ID and the recorder ID corresponding to the content processing apparatus 10 itself to the group management server 32 to perform a registration request to the group management server 32 (S76). The terminal ID and the recorder ID are produced by the content processing apparatus 10. It is to be noted that the information transferred at steps S74 and S76 can be transmitted and received safely because falsification thereof from the outside is prevented by the session information described hereinabove.

Then, the group management server 32 decides whether or not registration of the content processing apparatus 10 should be permitted (S78). This registration permission/inhibition decision is performed, for example, based on an upper limit number of those content processing apparatus 10 which can be registered in the same apparatus group (for example, an upper limit number of terminal IDs (for example, three terminal IDs), an upper limit number of recorder IDs (for example, 10 recorder IDs)). More particularly, if, for example, three content processing apparatus 10 having different terminal IDs from each other are registered already in the apparatus group of the authenticated user, the group management server 32 inhibits registration of a new content processing apparatus 10. Further, if, for example, 10 content processing apparatus 10 having different recorder IDs from each other have been registered in the apparatus group of the user (irrespective of whether or not 10 content processing apparatus 10 remain registered), then the group management server 32 inhibits registration of a new content processing apparatus 10.

If such a result of the registration permission/inhibition decision at step S78 as described above indicates that the registration should not be permitted, then the group management server 32 transmits an error notification that the content processing apparatus 10 cannot be registered. On the other hand, if the result of the registration permission/inhibition decision indicates permission of the registration, then the group management server 32 performs a registration process of the content processing apparatus 10 of the registration requesting source described hereinabove (S80). In particular, the group management server 32 writes the terminal ID and the recorder ID received from the content processing apparatus 10 of the registration requesting source described above into a record of the authenticated user of the group registration database 324 to register the content processing apparatus 10. Further, the group management server 32 transmits a registration completion notification to the registered content processing apparatus 10 (S82).

Then, when the content processing apparatus 10 receives such a registration completion notification as described above, it validates the service data received at step S74 described hereinabove (S84). Further, the content processing apparatus 10 produces a group ID (both of a first group ID and a second group ID) based on the leaf ID in the validated service data and adds and stores the group ID to and into the source ID list L (S86). Consequently, the content processing apparatus 10 is enabled to reproduce a distribution content to which the group ID is applied and add a recorder ID of a group certificate G which includes the group ID into the source ID list L of the content processing apparatus 10 itself.

After such a registration process of the content processing apparatus 10 as described above, such a certificate issuance and distribution process as described below may be performed. In particular, the content processing apparatus 10 first issues a group certificate G including the group ID and the recorder ID corresponding to the content processing apparatus 10 itself and transmits the group certificate G to the certificate management server 36 (S88). Consequently, the certificate management server 36 stores the received group certificate G into the certificate database 364 (S90). Consequently, when a different content processing apparatus 10 is registered into the same apparatus group, the group certificate G can be distributed to share the recorder ID.

Furthermore, if one, two or more other content processing apparatus 10 are registered already in the same apparatus group, then the certificate management server 36 distributes the group certificates G of the other registered content processing apparatus 10 to the registered content processing apparatus 10 (S92). Consequently, the registered content processing apparatus 10 reads out the recorder IDs in the received group certificates G and adds the recorder IDs to the source ID list L of the content processing apparatus 10 itself (S94). Consequently, the content processing apparatus 10 can thereafter reproduce a ripped content ripped by any other content processing apparatus 10 which belongs to the same apparatus group.

Figure 15:
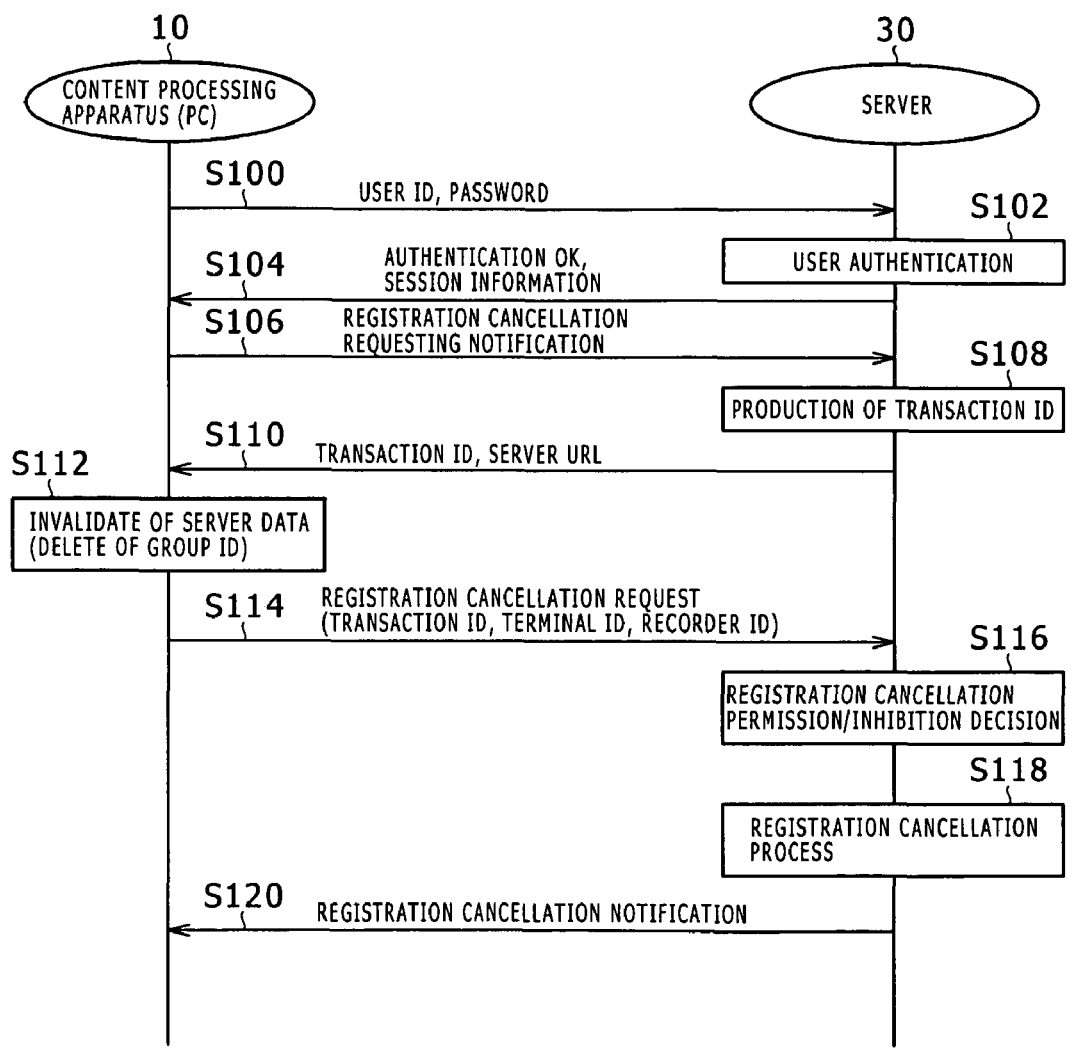
FIG. 15 is a timing chart illustrating a group registration cancellation process of the content processing apparatus (PC) according to the embodiment.

Now, a process (group registration cancellation process) of canceling the registration of a content processing apparatus (PC) 10 according to the present embodiment from an apparatus group registered already is described with reference to FIG. 15. FIG. 15 is a timing chart illustrating a group registration cancellation process of a content processing apparatus (PC) 10 according to the present embodiment.

As shown in FIG. 15, first at steps S100 to S110, a communication connection is established safely between the content processing apparatus 10 of a registration cancellation requesting source and the server 30 through the network 5 and user authentication is performed. The processes at steps S100 to S110 are performed between the browser of the content processing apparatus 10 and the WWW server 31 of the server 30. It is to be noted that, since the processes at such steps S100 to S110 mentioned above are substantially same as those at steps S60 to S70 of the group registration process of the content processing apparatus 10 described hereinabove with reference to FIG. 14 except that a registration cancellation requesting notification is issued from the content processing apparatus 10 to the WWW server 31 at step S106, detailed description of them is omitted.

At next steps S112 to S120, processes for actually canceling the registration of the content processing apparatus 10 are performed. The processes at steps S112 to S120 are performed between the copyright management section of the content processing apparatus 10 and the group management server 32 of the server 30.

In particular, the content processing apparatus 10 invalidates service data acquired from the group management server 32 upon the group registration described hereinabove and held in the content processing apparatus 10 (S112). More particularly, the content processing apparatus 10 deletes the group ID and the recorder ID included in the source ID list L of the content processing apparatus 10 itself. Consequently, the content processing apparatus 10 is disabled to reproduce a content to which any of the source IDs is applied.

Then, the content processing apparatus 10 transmits the transaction ID received at step S110 described hereinabove and the terminal ID and the recorder ID corresponding to the content processing apparatus 10 itself to the group management server 32 to issue a registration cancellation request to the group management server 32 (S114). It is to be noted that the information transmitted at step S114 can be transmitted safely because falsification thereof from the outside is prevented with the session information described hereinabove.

Then, when the registration cancellation request is received, the group management server 32 decides whether or not the registration of the content processing apparatus 10 can be canceled (S116). For example, in a case wherein the content processing apparatus 10 of the registration cancellation requesting source is not registered as yet or the registration cancellation request is illegal or in a like case, the group management server 32 does not permit the registration cancellation.

If the registration cancellation is not permitted as a result of such a registration permission/inhibition decision at step S116 as described above, then the group management server 32 transmits an error notification that the registration cancellation in the content processing apparatus 10 is not permitted.

On the other hand, if the registration cancellation is permitted as a result of the registration permission/inhibition decision at step S116, then the group management server 32 performs a registration cancellation process of the content processing apparatus 10 of the registration cancellation requesting source (S118). In particular, the group management server 32 deletes the terminal ID of the content processing apparatus 10 of the registration cancellation source from the record of the authenticated user of the group registration database 324. Thereupon, the record ID of the content processing apparatus 10 of the registration requesting source is left without being deleted from the group registration database 324. Consequently, when the ripped content sharing service is provided, a disadvantage that an excessively great number of content processing apparatus 10 having a ripping function are registered and a ripped content becomes shared by the large number of content processing apparatus 10 can be prevented.

Then, the group management server 32 transmits a registration cancellation completion notification to the content processing apparatus 10 whose registration has been canceled (S120).

As described above, in the registration cancellation process of the content processing apparatus 10, after service data are invalidated first on the group management server 32 side (S112), the registration cancellation process is performed on the group management server 32 side (S118). Consequently, as regards the content processing apparatus 10 whose registration is cancelled by the group management server 32 side, service data held by the content processing apparatus 10 can be invalidated with certainty to delete the group ID and so forth from the source ID list L. Therefore, such a situation that, although the registration of a content processing apparatus 10 is cancelled on the group management server 32, service data of the content processing apparatus 10 are not actually invalidated can be prevented.

The group registration process and the registration cancellation process of the content processing apparatus (PC) 10 are described above. It is to be noted that, in order to register a content processing apparatus 10 registered already once again, the registration of the content processing apparatus 10 must be cancelled once.

Figure 16:
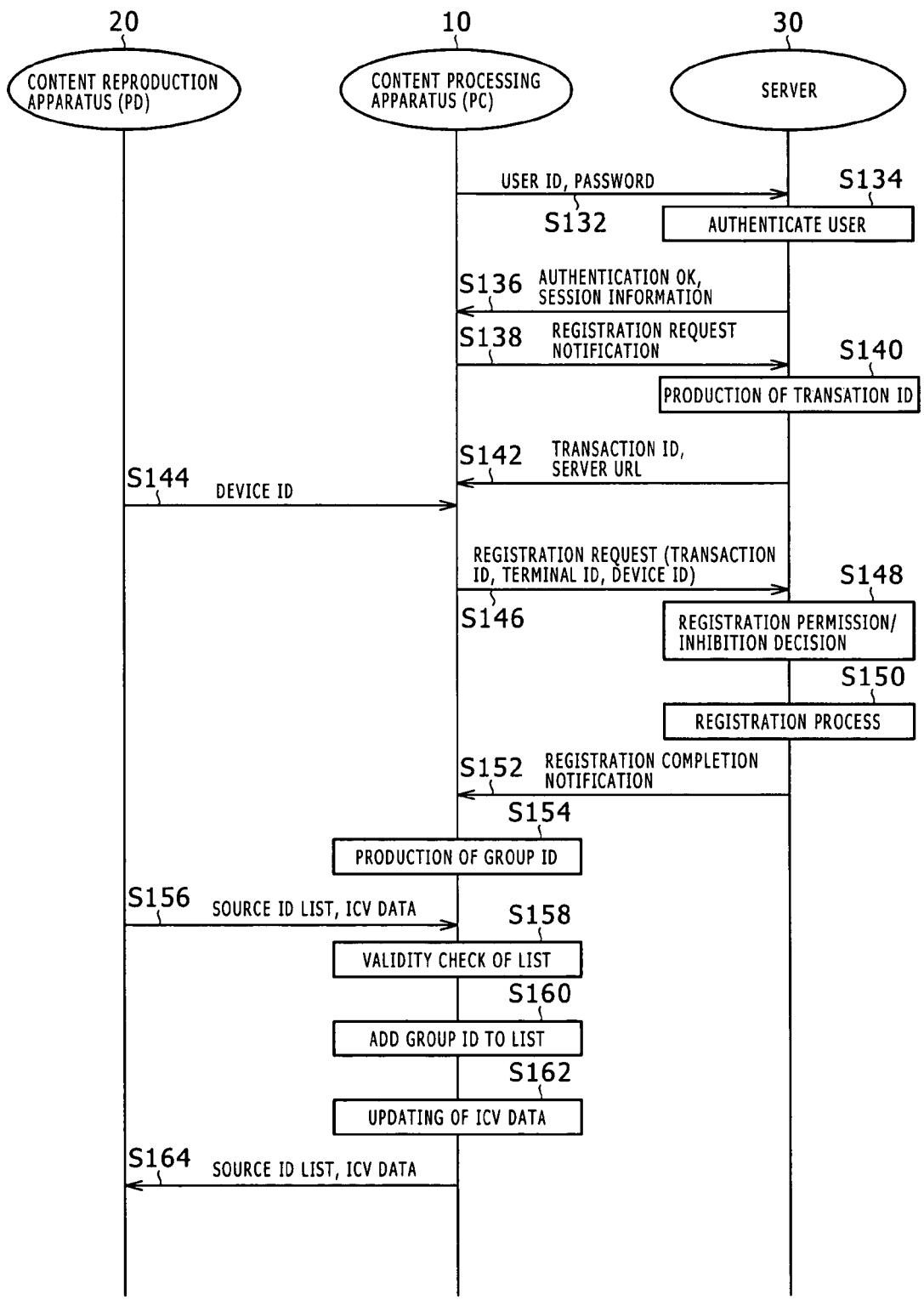
FIG. 16 is a timing chart illustrating a group registration process of a content reproduction apparatus (PD) according to the embodiment.

Now, a process (group registration process) of apparatus-registering a content reproduction apparatus (PD) 20 into the group management server 32 is described with reference to FIG. 16. FIG. 16 is a timing chart illustrating a group registration process of the content reproduction apparatus (PD) 20 according to the present invention.

In order to group-register a content reproduction apparatus (PD) 20, the content reproduction apparatus (PD) 20 of the object of registration is connected to a content processing apparatus (PC) 10, which is group-registered already, through the local line 9, and this content processing apparatus (PC) 10 is used to group-register the content reproduction apparatus (PD) 20 into the group management server 32.

As shown in FIG. 16, first at steps S132 to S142, a communication connection is established safely between the content processing apparatus 10 of the registration requesting source connected to the content reproduction apparatus 20 of the registration object and the server 30 to perform user authentication. The processes at steps S132 to S142 are performed between the browser of the content processing apparatus 10 and the WWW server 31 of the server 30. It is to be noted that, since the processes at such steps S132 to S142 mentioned above are substantially same as those at steps S60 to S70 of the group registration process of the content processing apparatus 10 described hereinabove with reference to FIG. 14 except that a registration requesting notification of the content reproduction apparatus 20 is issued from the content processing apparatus 10 to the WWW server 31 at step S138, detailed description of them is omitted.

Then at steps S144 to S164, processes for actually registering the content reproduction apparatus 20 into the group management server 32 using the content processing apparatus 10 are performed. The processes at steps S144 to S164 are executed among the content reproduction apparatus 20, the copyright management section of the content processing apparatus 10 and the group management server 32 of the server 30.

In particular, the content processing apparatus 10 first acquires the device ID of the content reproduction apparatus 20 of the registration object from the content reproduction apparatus 20 through the local line 9 (S144). Then, the content processing apparatus 10 transmits the transaction ID received at step S142 described hereinabove, the terminal ID of the content processing apparatus 10 itself and the recorder ID of the content reproduction apparatus 20 to the group management server 32 to issue a registration request of the content reproduction apparatus 20 to the group management server 32 (S146). It is to be noted that the information transferred at step S144 can be transmitted and received safely because falsification thereof from the outside is prevented with the session information described hereinabove.

Then, when the group management server 32 receives the registration request, it decides whether or not registration of the content reproduction apparatus 20 of the registration object should be permitted (S148). In the present embodiment, since there is no restriction to the registration number of content reproduction apparatus 20, the registration is permitted unconditionally. However, the restriction is not limited to that of the present example, but an upper limit number may be set to the registration number of content reproduction apparatus 20. Further, if the content processing apparatus 10 of the registration requesting source is not registered as yet, then the group management server 32 does not permit the registration of the content reproduction apparatus 20 of the registration object.

If the registration permission/inhibition decision at step S148 indicates a result that the registration should not be permitted, then the group management server 32 transmits an error notification to the content processing apparatus 10 that the registration is not permitted.

On the other hand, if the result of the registration permission/inhibition decision indicates that the registration should be permitted, then the group management server 32 performs a registration process of the content reproduction apparatus 20 of the registration object (S150). In particular, the group management server 32 sets a record of the authenticated user in the group registration database 324 based on the terminal ID and so forth of the content processing apparatus 10 of the registration requesting source described hereinabove and writes the device ID of the content reproduction apparatus 20 of the registration object into the record just described. Further, the group management server 32 transmits a registration completion notification to the content processing apparatus 10 of the registration requesting source (S152).

Then, when the content processing apparatus 10 receives the registration completion notification, it produces a group ID (both of a first group ID and a second group ID) based on the leaf ID included in the service data acquired upon registration of the content processing apparatus 10 itself (S154).

Then, the content processing apparatus 10 acquires the source ID list L and the ICV data of the registered content reproduction apparatus 20 from the content reproduction apparatus 20 (S156).

Furthermore, the content processing apparatus 10 checks the validity of the source ID list L based on the ICV data acquired at S156 (S158). As described hereinabove, in the copyright management scheme of the group management type, since ICV data includes a MAC value which is a hash value of the source ID list L, the content processing apparatus 10 can determine the MAC value of the source ID list L acquired from the content processing apparatus 10 and collate the MAC value with the MAC value of the ICV data to detect whether or not the source ID list L is in a falsified condition.

If it is decided as a result of the check of the validity at S158 that the source ID list L is not valid (is falsified), then an error is decided and updating of the source ID list L is not performed.

On the other hand, if it is decided as a result of the check of the validity at S158 that the source ID list L is valid, then the content processing apparatus 10 updates the source ID list L of the content reproduction apparatus 20 (S160). In particular, the content processing apparatus 10 adds the group ID produced at S154 described hereinabove to the source ID list L acquired from the content reproduction apparatus 20. Thereupon, the recorder ID included in the source ID list L of the content processing apparatus 10 itself may be further added to the source ID list L acquired from the content reproduction apparatus 20.

Furthermore, the content processing apparatus 10 updates the ICV data of the content reproduction apparatus 20 (S162). In particular, the content processing apparatus 10 determines the MAC value of the source ID list L of the content reproduction apparatus 20 updated at S160 described hereinabove to produce ICV data newly.

Thereafter, the content processing apparatus 10 transmits the source ID list L updated at S160 and the ICV data updated at S162 to the content reproduction apparatus 20 so as to be written into the storage section of the content reproduction apparatus 20 (S164). It is to be noted that, at S156 and S164, the ICV data are transmitted and received between the content processing apparatus 10 and the content reproduction apparatus 20 so as not to be falsified using the session information.

Since the group ID is added to the source ID list L of the content reproduction apparatus 20 through such a group registration process of the content reproduction apparatus 20 as described above, the content reproduction apparatus 20 itself can thereafter reproduce a distribution content to which the group ID is applied.

Figure 17:
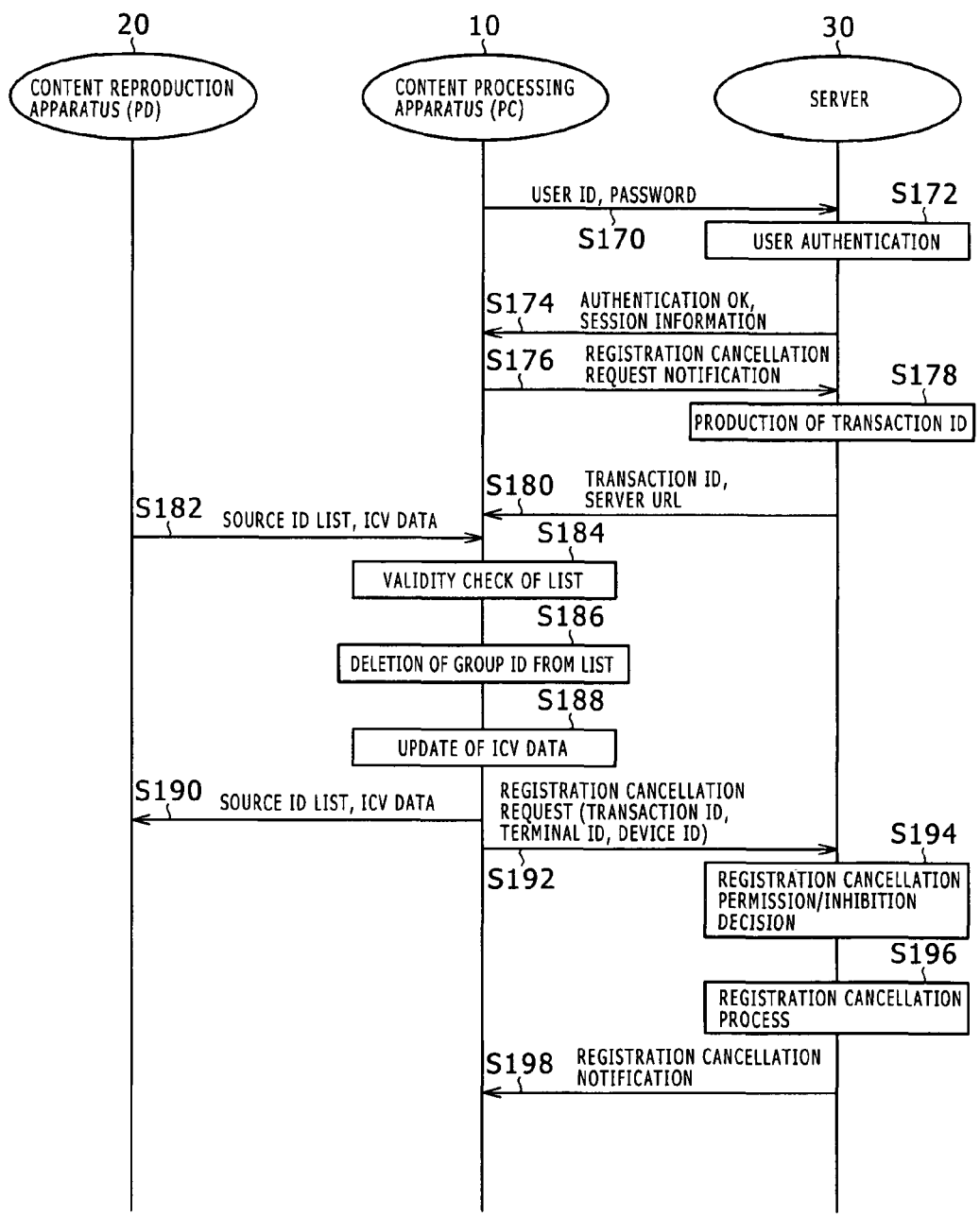
FIG. 17 is a timing chart illustrating a group registration cancellation process of the content reproduction apparatus (PD) according to the embodiment.

Now, a process (group registration cancellation process) of canceling a registration of a content reproduction apparatus (PD) 20 according to the present embodiment from an apparatus group registered already is described with reference to FIG. 17. FIG. 17 is a timing chart illustrating a group registration cancellation process of a content reproduction apparatus (PD) 20 according to the present embodiment.

Also such a group registration cancellation process of a content reproduction apparatus (PD) 20 as just mentioned is performed by locally connecting the content reproduction apparatus (PD) 20 to a content processing apparatus (PC) 10 such that the content processing apparatus (PC) 10 issues a registration cancellation request to the server 30 similarly as in the group registration process of the content reproduction apparatus (PD) 20 described hereinabove.

As shown in FIG. 17, first at steps S170 to S180, a communication connection is established safely between the content processing apparatus 10 of the registration requesting source and the server 30 through the network 5 to perform user authentication. The processes at S170 to S180 are performed between the browser of the content processing apparatus 10 and the WWW server 31 of the server 30. It is to be noted that such processes at S170 to S180 are substantially similar to those at steps S60 to S70 of the content processing apparatus 10 described hereinabove with reference to FIG. 14 except that a registration cancellation requesting notification of the content reproduction apparatus 20 is issued from the content processing apparatus 10 to the WWW server 31, and therefore, detailed description of the same is omitted.

At next steps S182 to S198, processes for actually canceling the registration of the content processing apparatus 10 are performed. The processes at S182 to S198 are performed between the copyright management section of the content processing apparatus 10 of the registration cancellation requesting source and the group management server 32 of the server 30.

In particular, the content processing apparatus 10 first acquires the source ID list L and the ICV data of the content reproduction apparatus 20 of the registration cancellation object from the content reproduction apparatus 20 (S182).

Further, the content processing apparatus 10 checks the validity of the acquired source ID list L based on the ICV data acquired at S182 in a similar manner as at S158 described hereinabove (S184). If it is decided as a result of the check of the validity at S184 that the source ID list L is not valid (is falsified), then an error is decided and updating of the source ID list L is not performed.

On the other hand, if it is decided as a result of the check of the validity at S184 that the source ID list L is valid, then the content processing apparatus 10 updates the source ID list L of the content reproduction apparatus 20 (S186). In particular, the content processing apparatus 10 deletes the group ID from the source ID list L acquired from the content reproduction apparatus 20. Thereupon, the recorder ID included in the source ID list L may be deleted further. By this, the content reproduction apparatus 20 is disabled from reproducing a content to which the source ID is applied.

Furthermore, the content processing apparatus 10 updates the ICV data of the content reproduction apparatus 20 (S188). In particular, the content processing apparatus 10 determines the MAC value of the source ID list L of the content reproduction apparatus 20 updated at S186 to produce new ICV data.

Thereafter, the content processing apparatus 10 transmits the source ID list L updated at S186 and the ICV data updated at S188 to the content reproduction apparatus 20 so as to be written into the storage section of the content reproduction apparatus 20 (S190).

Then, the content processing apparatus 10 issues a registration cancellation request of the content reproduction apparatus 20 of the registration cancellation object to the group management server 32 (S192). In particular, the content processing apparatus 10 transmits the transaction ID received at S180 described hereinabove, the terminal ID corresponding to the content processing apparatus 10 itself and the device ID of the content reproduction apparatus 20 of the registration cancellation object to the group management server 32 to issue a registration cancellation request. It is to be noted that the information transmitted at S192 can be transmitted safely because falsification thereof from the outside is prevented with the session information described hereinabove.

Thereafter, when the group management server 32 receives the registration cancellation request, it decides whether or not the registration of the content reproduction apparatus 20 should be canceled (S194). For example, if the registration cancellation request is illegal, then the group management server 32 does not permit cancellation of the registration.

If the registration cancellation should not be permitted as a result of such a registration permission/inhibition decision at S194 as described above, then the group management server 32 transmits an error notification that the registration cancellation of the content processing apparatus 10 is not permitted.

On the other hand, if the registration cancellation should be permitted as a result of the registration permission/inhibition decision at S194, then the group management server 32 performs a registration cancellation process of the content reproduction apparatus 20 of the registration cancellation object (S196). In particular, the group management server 32 specifies a record of the authenticated user in the group registration database 324 based on the terminal ID and so forth of the content processing apparatus 10 of the registration requesting source and deletes the device 3D of the content reproduction apparatus 20 of the registration calculation object from the record.

Thereafter, the group management server 32 transmits a registration cancellation completion notification to the content processing apparatus 10 of the registration cancellation requesting source (S198).

As described above, in the registration cancellation process of the content reproduction apparatus 20, after the group ID is deleted (S186) from the source ID list L of the content reproduction apparatus 20 on the content processing apparatus 10 side first, the registration cancellation process (S196) is performed on the group management server 32 side. Consequently, as regards the content reproduction apparatus 20 whose registration is canceled by the group management server 32 side, the group ID can be deleted with certainty from the source ID list L of the content reproduction apparatus 20. Therefore, such a situation that, although the registration is cancelled on the group management server 32, the group ID remains in the source ID list L of the content reproduction apparatus 20 can be prevented.

The basic flows of the group registration process and the group registration cancellation process of the content processing apparatus (PC) 10 and the content reproduction apparatus (PD) 20 are described above. By such processes as just mentioned, even when the owner of the same content processing apparatus 10 or content reproduction apparatus 20 changes, a group change of the content processing apparatus 10 can be performed by performing registration cancellation and re-registration.

It is to be noted that, even if registration of a new group or changing of a group of a content processing apparatus 10 which has a ripping function is performed, the recorder ID of the content processing apparatus 10 does not vary. Therefore, a content ripped by the content processing apparatus 10 before the new group registration or the group change can be reproduced freely by any apparatus of the apparatus group to which the content processing apparatus 10 belongs also after the new group registration or the group change. Consequently, the convenience to the user of the content processing apparatus 10 having a ripping function is enhanced and the purchase merit rises.

<8. Reproduction Control Process of the Group Management Type>

Figure 18:
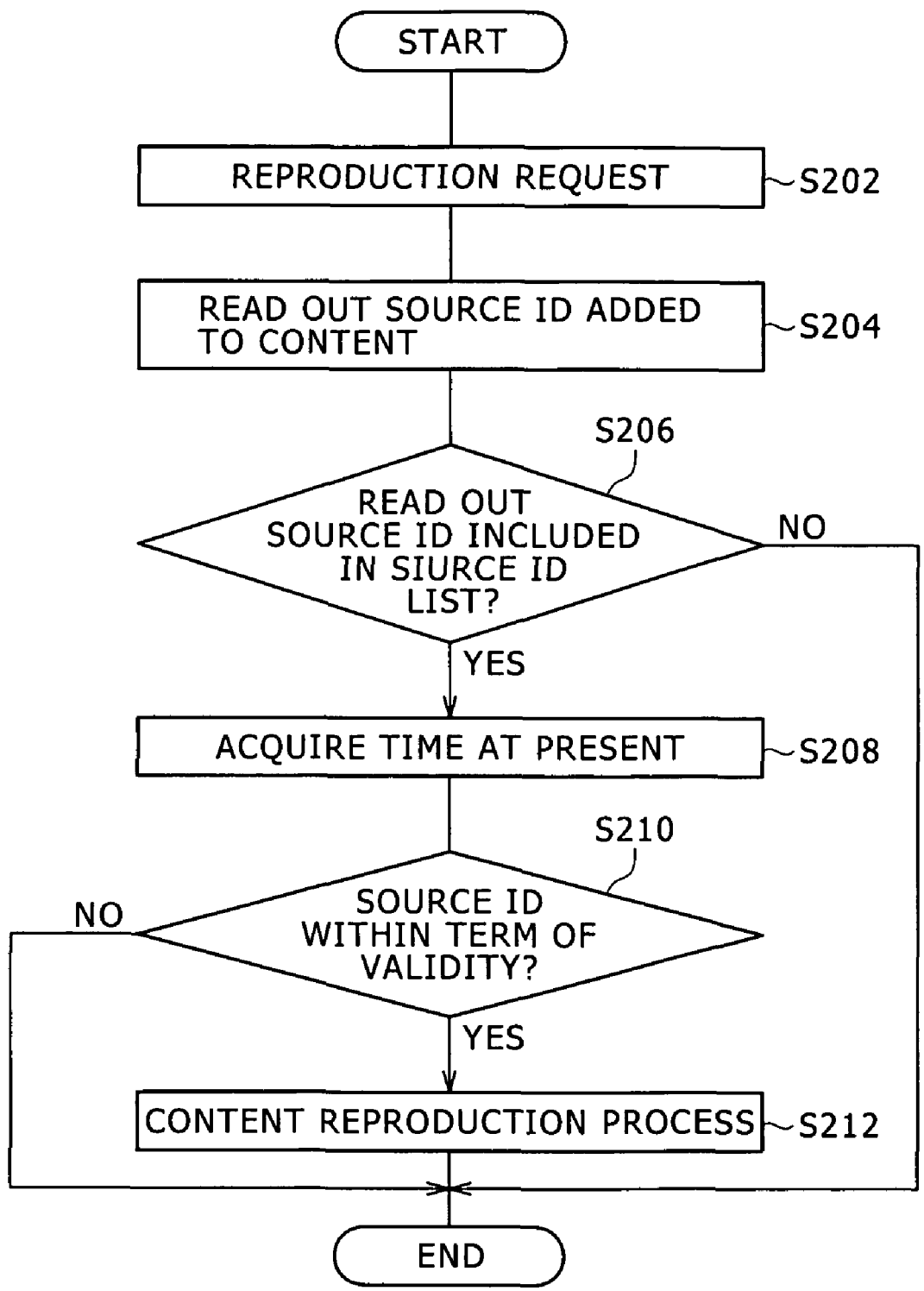
FIG. 18 is a flow chart illustrating a content reproduction control process of the group management type of the content processing apparatus (PC) according to the embodiment.

Now, a content reproduction control process of the group management type by a content processing apparatus 10 according to the present embodiment is described with reference to FIG. 18. FIG. 18 is a flow chart illustrating a content reproduction control process of the group management type by a content processing apparatus 10 according to the present embodiment. It is to be noted that the reproduction control process of the group management type is a process of controlling reproduction of a content based on a source ID applied to a content and a source ID list L.

As shown in FIG. 18, first at step S202, a reproduction request is issued, for example, by the user (step S202; reproduction requesting step). The user would operate the inputting apparatus 108 of the content processing apparatus 10 to select a desired content and issue an instruction to the content reproduction section 170 to reproduce the selected content.

Then at step S204, the source ID applied to the content is read out (step S204). The reproduction permission/inhibition decision section 172 of the content reproduction section 170 first reads out the content of the reproduction requesting object from the content database 116, storage medium 7 or the like and then reads out and interprets the source ID included in a license applied to the content.

Further at step S206, it is decided whether or not the source ID read out from the content described above is included in the source ID list L of the content processing apparatus 10 (step S206). In particular, the reproduction permission/inhibition decision section 172 of the content reproduction section 170 reads out the source ID list L, for example, from the storage apparatus 111 and interprets the source ID list L. Then, the reproduction permission/inhibition decision section 172 compares the source ID read out from the content described above and the source IDs included in the source ID list L with each other to decide whether or not the source ID read out from the content described above is included in the source ID list L.

If a result of the decision reveals that the source ID read out from the content is included in the source ID list L, then the reproduction permission/inhibition decision section 172 permits reproduction of the content, whereafter the processing advances to step S208. On the other hand, if the source ID read out from the content is not included in the source ID list L, then the reproduction permission/inhibition decision section 172 does not permit reproduction of the content, and the reproduction control process is ended.

Further, at step S208, the present time is acquired (step S208). The reproduction permission/inhibition decision section 172 acquires the present time from a clock apparatus (not shown) built in the content processing apparatus 10.

Thereafter, at step S210, it is decided whether or not the present time acquired as described above is within a term of validity of the source ID read out from the content described hereinabove (step S210). In particular, the reproduction permission/inhibition decision section 172 first reads out validity term information corresponding to the source ID read out from the content described hereinabove from the source ID list L. The validity term information corresponding to the source ID read out from the content described hereinabove is recorded in an associated relationship with the source ID, for example, in the source ID list L.

Then, the reproduction permission/inhibition decision section 172 decides whether or not the acquired present time described above exceeds the term of validity of the source ID described above. If a result of the decision reveals that the present time exceeds the term of validity of the source ID described above, then the term of the source ID has run out. Therefore, the reproduction permission/inhibition decision section 172 does not permit reproduction of the content described above but ends the reproduction control process.

On the other hand, if the present time is within the term of validity of the source ID described above, the reproduction permission/inhibition decision section 172 permits reproduction of the content, whereafter the processing advances to step S212. As a result, at step S212, the reproduction execution section 174 reproduces the content (step S212).

As described above, the content reproduction control process of the group management type according to the present embodiment is executed based on the source ID in the source ID list L applied to the content and the validity term information of the source ID. According to such reproduction control as just described, it is possible to set a term of validity of reproduction of a content in a unit of a source ID to permit/inhibit reproduction of the content. It is to be noted that the validity of term of the source ID need not necessarily be set.

<9. Updating Process of a Source ID List of the Group Management Type>

Figure 19:
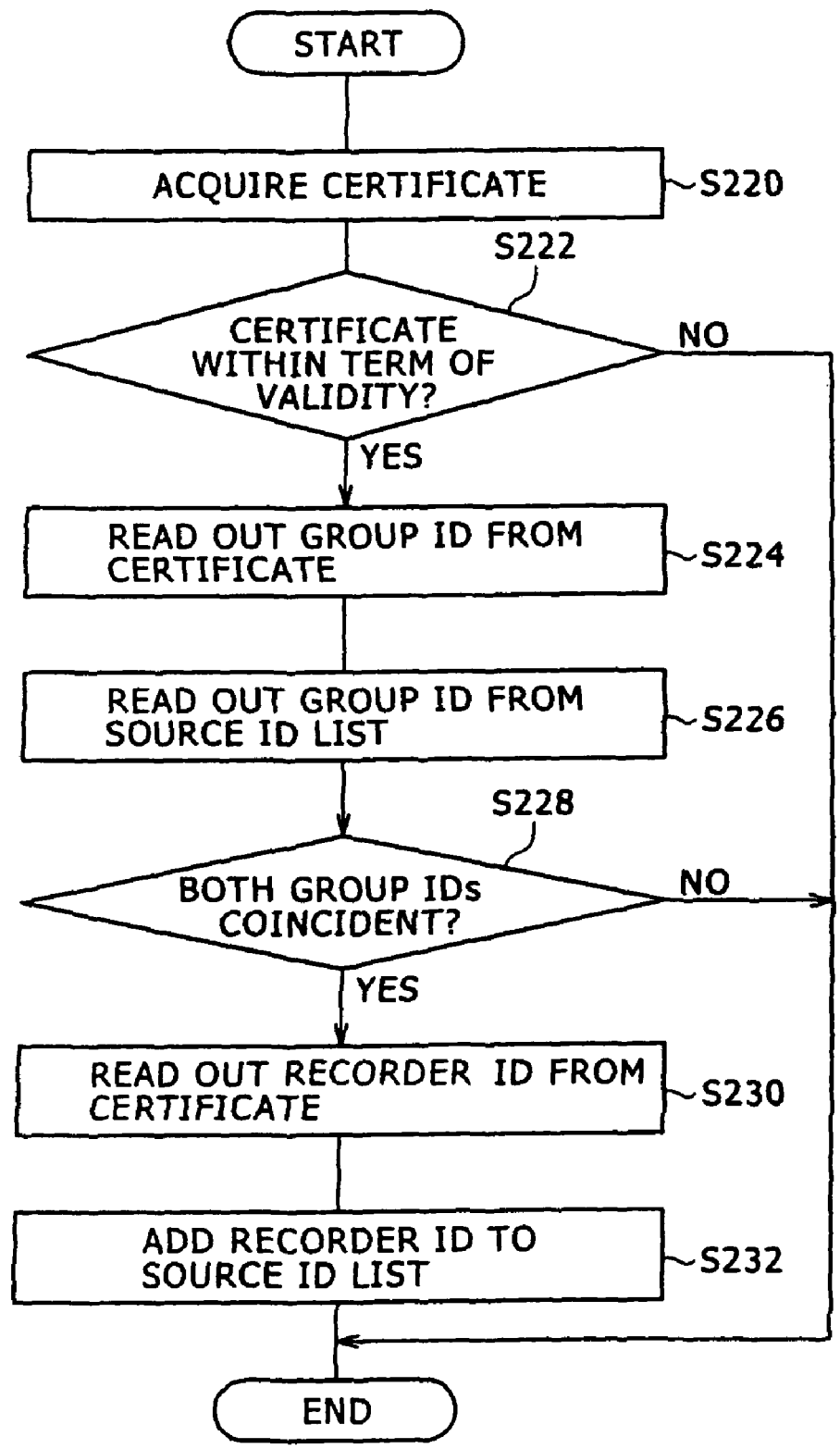
FIG. 19 is a flow chart illustrating a source ID list updating process of the content processing apparatus according to the embodiment.

Now, an updating process of the source ID list L by a content processing apparatus (PC) 10 according to the present embodiment is described with reference to FIG. 19. FIG. 19 is a flow chart illustrating an updating process of the source ID list L by a content processing apparatus 10 according to the present embodiment. The present list updating process is an example wherein the content processing apparatus 10 acquires a distributed group certificate G and updates the source ID list L of the content processing apparatus 10 itself or the source ID list L of a content reproduction apparatus 20 locally connected to the content processing apparatus 10 based on the acquired group certificate G.

As shown in FIG. 19, first at step S220, the content processing apparatus 10 acquires a group certificate G distributed from a different content processing apparatus 10 or the certificate management server 36 (step S220). The content processing apparatus 10 can acquire a group certificate G by receiving the group certificate G through the network 5 or the local line 9 or by reading out the group certificate G recorded on the storage medium 7.

Then at step S222, the content processing apparatus 10 decides whether or not the acquired group certificate G is within a term of validity (step S222). In particular, the list management section 140 of the content processing apparatus 10 first reads out validity term information included in the group certificate G and acquires present time information from the clock apparatus built in the content processing apparatus 10. Then, the list management section 140 decides whether or not the present time is within the term of validity of the group certificate G. If a result of the decision proves that the group certificate G is within the term of validity, then the processing advances to S224. On the other hand, if the group certificate G is no longer valid, then updating of the list is rejected and the list updating process is ended.

Further, at step S224, the list management section 140 reads out the group ID included in the acquired group certificate G (step S224).

Thereafter, at step S226, the list management section 140 reads out the group ID possessed by the content processing apparatus 10 itself (step S226). In the present embodiment, since each content processing apparatus 10 retains a group ID in the source ID list L thereof, the list management section 140 reads out the group ID corresponding to the content processing apparatus 10 from the source ID list L.

Then at step S228, the list management section 140 decides whether or not the group ID read out from the acquired group certificate G and the group ID corresponding to the content processing apparatus 10 itself coincide with each other (step S228). If a result of the decision proves that the two group IDs coincide with each other, then the updating of the list is permitted, and the processing advances to step S230. On the other hand, if the two group IDs are different from each other, then the updating of the list is rejected, and the list updating process is ended.

Further at step S230, the list management section 140 adds the recorder ID included in the group certificate G to the source ID list L (step S230). In particular, the list management section 140 reads out the recorder ID from the acquired group certificate G and writes the recorder ID into the source ID list L. Consequently, the content processing apparatus 10 can thereafter reproduce a ripped content to which the recorder ID is applied. The updating process of the source ID list L based on the group certificate G is ended thereby.

The basic configuration of the content sharing system 100 and the content sharing method which utilizes the content sharing system 100 according to the present embodiment is described above. According to the content sharing system 100, copyright management of the group management method and the copyright management system of the check-in check-out type complying with the SDMI can be implemented.

Where the copyright management of the group management type from between the two copyright management systems described above is to be performed by the content sharing system 100, contents shared between a plurality of apparatus are managed in a unit of a content providing source (in a unit of a user or a unit of an apparatus of a providing source) and reproduction of a content by a content processing apparatus 10 is restricted in response to the content providing source to perform copyright management of the content. In other words, sharing of a content between apparatus can be permitted/inhibited in a unit of a content providing source.

Therefore, where the content providing source is an illegal content providing source, the content processing apparatus 10 of the content acquiring side can collectively inhibit reproduction of all of contents acquired from the illegal content providing source. Accordingly, such illegal acts as an act of distributing a large amount of ripped contents to many and unspecific users and an act of laying a distribution content open on the Internet so that it can be downloaded can be prevented effectively.

On the other hand, where the content providing source is a legal content providing source, if the source ID of the content providing source is added to the source ID list L once to permit sharing of contents, then also another content can later be reproduced freely only if the content is provided from the content providing source by which the sharing has been permitted. Therefore, a content can be copied freely between a plurality of apparatus within a range of private use. Consequently, copyright management proximate to that of a conventional distribution system of analog contents by which unrestricted copying is acknowledged only within private utilization can be implemented.

Consequently, the content sharing system 100 according to the embodiment described above can achieve both of (1) a copyright management function of restricting an act of illegally utilizing a content without paying a reasonable consideration for a content distribution service and so forth and (2) enhancement of the degree of freedom in content utilization within a range of private utilization with a reasonable consideration paid.

Further, in such a copyright management process of the group management type as described above, only it is necessary in principle to perform a process of adding a source ID of a source ID list L only once upon registration of a content distribution service or a ripped content sharing service or in a like case. Accordingly, enhancement in efficiency of a copyright management process can be achieved when compared with an alternative case wherein a copyright management process is executed every time copying (check-in/check-out) of a content is performed as in the case of a copyright management process of the conventional check-in check-out type.

Furthermore, where different apparatus are group-registered into a group in a unit of an owner (user) of content processing apparatus 10 or content reproduction apparatus 20, a content can be copied and utilized freely between those apparatus which are registered in the same apparatus group. Therefore, a legal user which performs private use can copy a content freely between apparatus owned by the user itself, and since there is no necessity for the user to be conscious of a copying source or the number of times of copying of a content, the user is less likely to feel the presence of the copyright management system. Accordingly, within a range of private use, the degree of freedom in content utilization by a user and the convenience can be further raised and user-friendly copyright management can be executed.

<10. Local Registration>

Figure 20A:
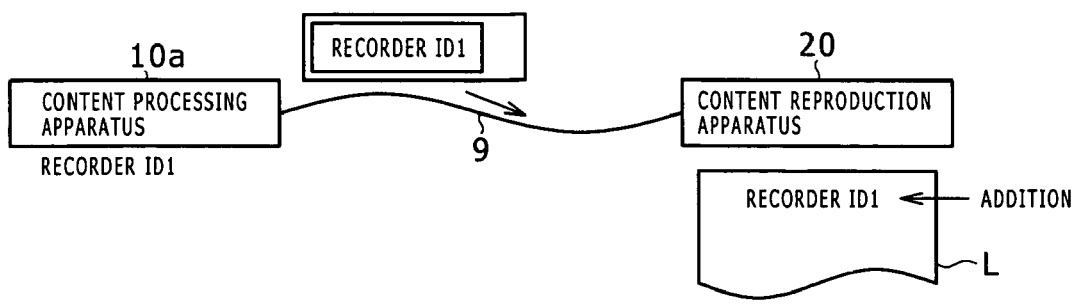
FIG. 20A is an explanatory view showing a general configuration of local registration according to the embodiment.
Figure 20B:
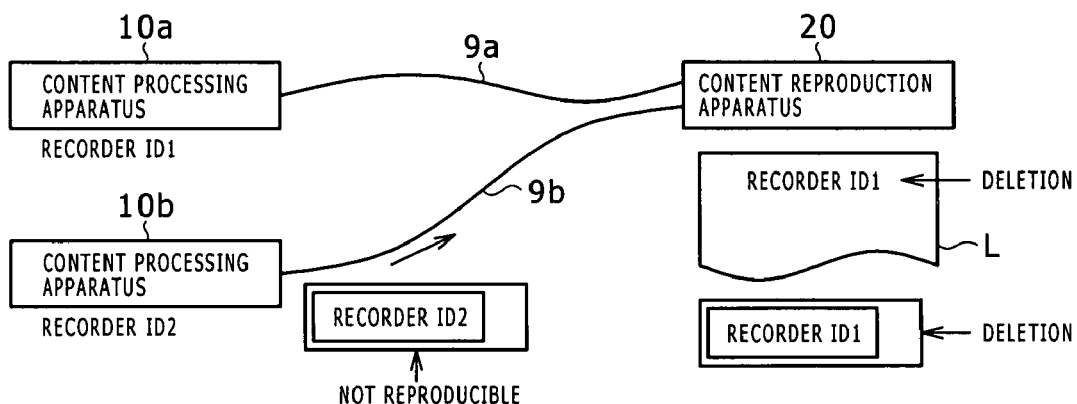
FIG. 20B is an explanatory view showing a general configuration of local registration according to the embodiment.
Figure 20C:
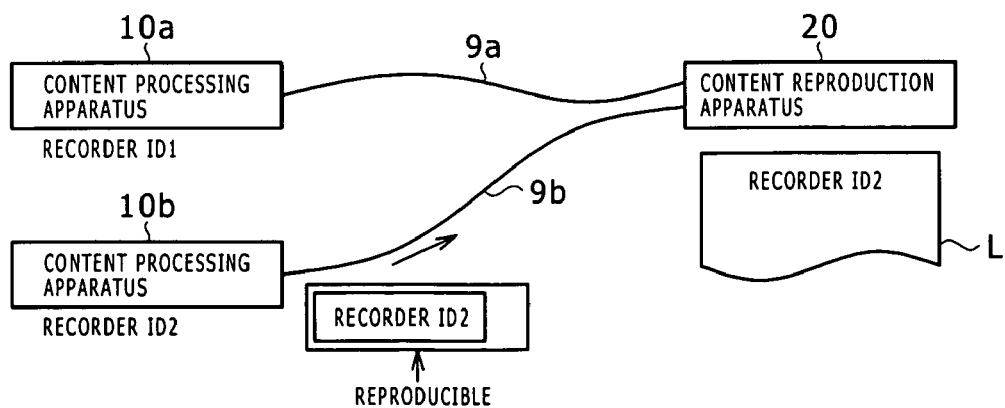
FIG. 20C is an explanatory view showing a general configuration of local registration according to the embodiment.

Here, local registration of the copyright management system (content sharing system 100) of the group management type according to the present embodiment is described in detail with reference to FIGS. 20A to 20C. FIGS. 20A to 20C are explanatory views illustrating a schematic configuration of local registration according to the present embodiment.

As shown in FIGS. 20A to 20C, as a premise of the local registration, it is possible to record only one recorder ID into the source ID list L of the content reproduction apparatus 20. In other words, the content reproduction apparatus 20 can specify only one content processing apparatus 10 and can reproduce content data (or a content), for example, ripped by the content processing apparatus 10.

If a content processing apparatus 10 whose recorder ID is "recorder ID 1" and the content reproduction apparatus 20 are connected to each other through the local line 9 (cable) by an interface such as a USB interface as shown in FIG. 20A, then the recorder ID 1 is added to the source ID list L of the content reproduction apparatus 20. In short, the content reproduction apparatus 20 can be locally registered into the content processing apparatus 10 of the recorder ID 1.

It is to be noted that, although a series of processes of the local registration according to the present embodiment are hereinafter described, since only one recorder ID can be recorded into the content reproduction apparatus 20 as described above, if some other recorder ID is registered already, or if content data relating to some other recorder ID are stored already in the content reproduction apparatus 20 or in a like case, the content reproduction apparatus 20 cannot be registered locally.

If the recorder ID 1 is described in the source ID list L possessed by the content reproduction apparatus 20 as shown in FIG. 20A, then the content reproduction apparatus 20 can reproduce content data recorded through ripping or the like by the content processing apparatus 10 of the recorder ID 1. It is to be noted that the recorder ID 1 is applied to content data recorded by ripping or the like by the content processing apparatus 10 as shown in FIG. 20A.

Thereafter, if it is tried to connect, in a state wherein the content reproduction apparatus 20 is locally registered in a content processing apparatus 10a of the recorder ID 1, the content reproduction apparatus 20 and another content processing apparatus 10b of the recorder ID 2 via a local line 9b as shown in FIG. 20B to acquire and reproduce content data of the recorder ID 2, then since the recorder ID registered in the source ID list L of the content reproduction apparatus 20 is the recorder ID 1, the content data of the recorder ID 2 cannot be reproduced.

Further, even if it is tried to register the recorder ID 2 into the source ID list L, since the recorder ID 1 is registered already, the recorder ID 2 cannot be described in the source ID list L possessed by the content reproduction apparatus 20 and cannot be locally recorded into the content processing apparatus 10b either.

In order for the content reproduction apparatus 20 to reproduce the content data of the recorder ID 2, it is necessary to delete the recorder ID 1 described already in the source ID list L and delete the content data of the recorder ID 1. In short, it is necessary to cancel the local registration of the content reproduction apparatus 20.

The cancellation of the local registration is to delete the recorder ID described in the source ID list L possessed by the content reproduction apparatus 20. The deletion of the recorder ID can be performed not only from the content processing apparatus 10 to which the recorder ID is added but also from any content processing apparatus 10 by connecting the same to the content reproduction apparatus 20 by the local line 9.

Further, the deletion of the recorder ID described above may be performed also in a case wherein an initialization process of deleting all data including the source ID list L is performed for the recording section such as a HDD of the content reproduction apparatus 20, and if the recorder ID is deleted, then the local registration can be canceled.

If the recorder ID 1 is deleted from the source ID list L and the content data of the recorder ID 1 are deleted, then the content processing apparatus 10b of the recorder ID 2 can add the recorder ID 2 of the content processing apparatus 10b itself to the source ID list L of the content reproduction apparatus 20. In short, the content processing apparatus 10b can be locally registered.

It is to be noted that, while a case wherein the content reproduction apparatus 20 locally registered already is to be locally registered into another content processing apparatus 10 is described taking a case wherein it is necessary to delete the recorder ID possessed by the content reproduction apparatus 20 and the content data to which the recorder ID is applied as described above as an example, the case described above is not limited to this example. For example, such a configuration may be used that to delete only the recorder ID possessed by the content reproduction apparatus 20 from the source ID list L is used as cancellation of the local registration to permit local registration into another content processing apparatus 10.

If the recorder ID 1 described in the source ID list L possessed by the content reproduction apparatus 20 is deleted and the recorder ID 2 is registered as shown in FIG. 20C, then the content reproduction apparatus 20 can acquire content data to which the recorder ID 2 possessed by the content processing apparatus 10b of the recorder ID 2 is applied and reproduce the content data of the recorder ID 2.

Now, the source ID list L possessed by the content processing apparatus 10 or the content reproduction apparatus 20 when the group registration or the local registration described hereinabove is performed is described with reference to FIGS. 21A to 21C.

Figure 21A:
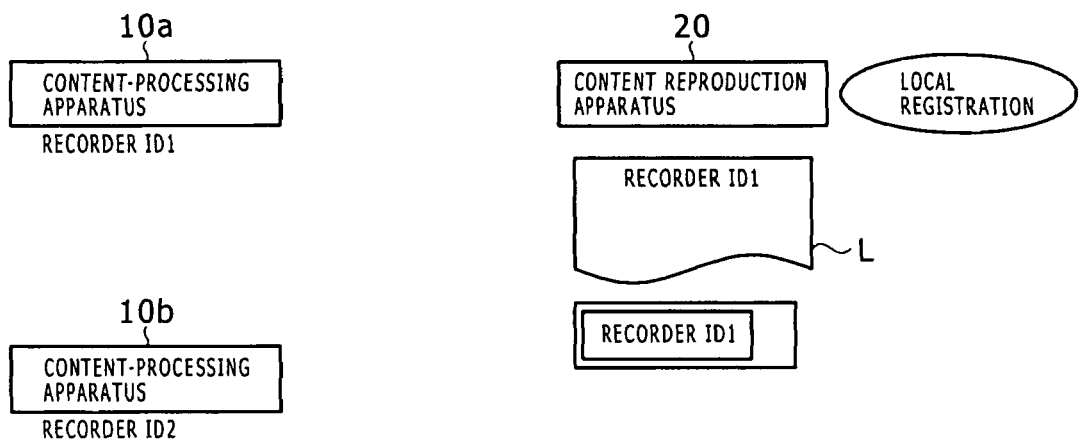
FIG. 21A is an explanatory view showing a general configuration of a source ID list in local registration or service registration according to the embodiment.

It is assumed that, as shown in FIG. 21A, the content processing apparatus 10a of the recorder ID 1, the content processing apparatus 10b of the recorder ID 2 and the content reproduction apparatus 20 locally registered already exist. It is to be noted that the content reproduction apparatus 20 is locally registered in the content processing apparatus 10a of the recorder ID 1 and possesses content data of the recorder ID 1.

Figure 21B:
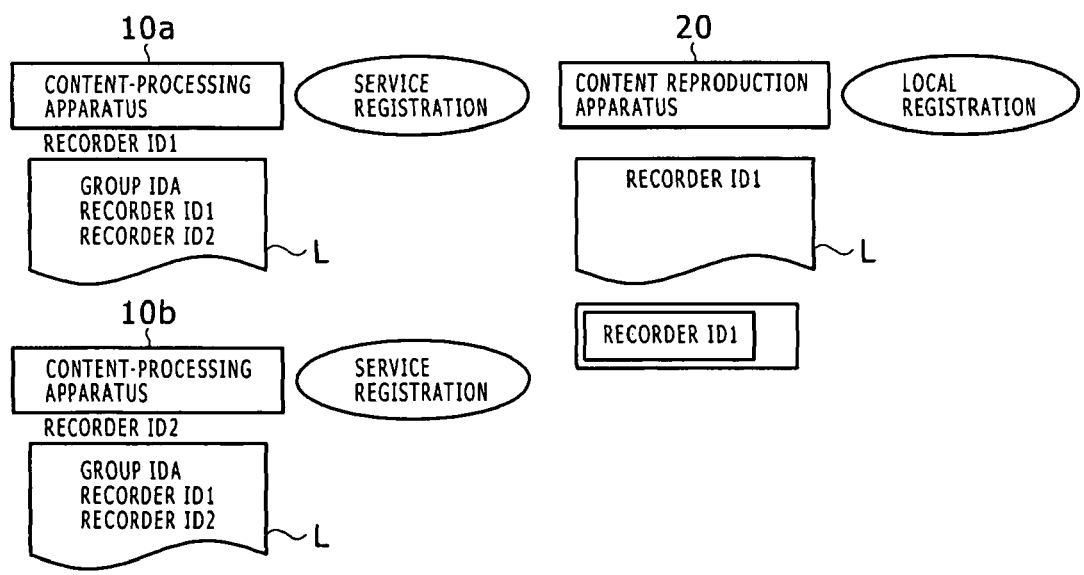
FIG. 21B is an explanatory view showing a general configuration of the source ID list in local registration or service registration according to the embodiment.
Figure 21C:
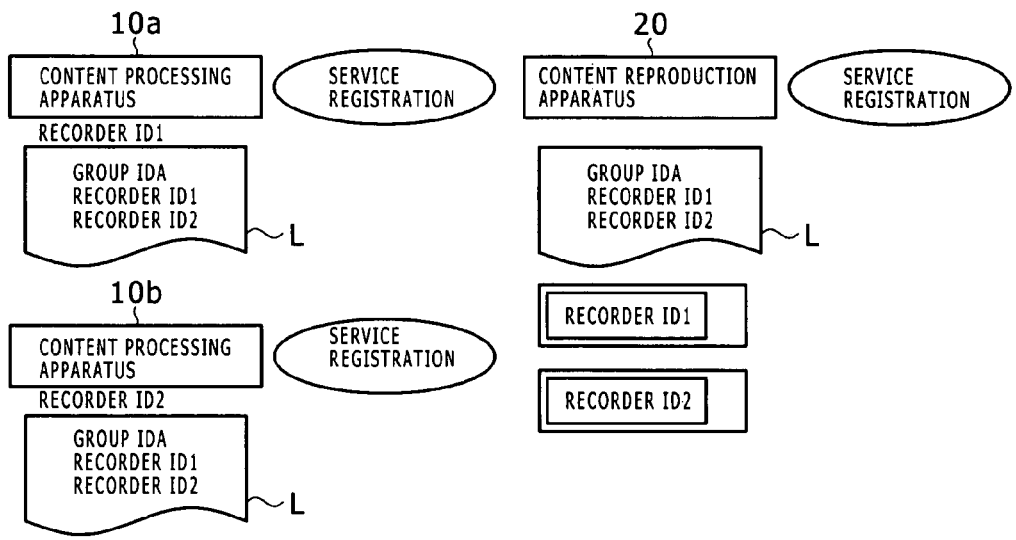
FIG. 21C is an explanatory view showing a general configuration of the source ID list in local registration or service registration according to the embodiment.

Then, if the content processing apparatus 10a of the recorder ID 1 performs service registration (or, which is sometimes referred to as group registration) of the group IDA as shown in FIG. 21B, then the group IDA is added to the source ID list L possessed by the content processing apparatus 10b of the recorder ID 1. It is to be noted that the recorder ID 1 is described already since it is the recorder ID of the content processing apparatus 10a itself.

Similarly, also with regard to the content processing apparatus 10b of the recorder ID 2, if service registration of the group IDA is performed, then the group IDA is described into the source ID list L of the content processing apparatus 10b of the recorder ID 2.

Furthermore, it is possible to form one group from apparatus having the same group ID and group-resistor the apparatus, and the recorders ID of the apparatus which have the same group ID are added to the source ID list L.

As shown in FIG. 21B, the recorder ID of the content processing apparatus 10 of the recorder ID 1 to which the same group IDA is added is added to the source ID list L of the content processing apparatus 10b of the recorder ID 2, and the recorder ID 2 is added also to the source ID list of the content processing apparatus 10a of the recorder ID 1.

It is to be noted that, as a timing at which the content processing apparatus 10 adds the recorder ID to the source ID list L as shown in FIG. 21B, for example, a timing at which a group certificate G transmitted from the group management server 32 is received when the content processing apparatus 10 accesses the group management server 32 or a like timing can be listed. However, the timing is not limited to the example just described. Further, by receiving the group certificate G described above, the content processing apparatus 10 can add all recorder IDs belonging to the group ID including the newly added recorder ID to the source ID list L.

The access is a general term of information processing of processing information through a communication network (network 5) such as utilization of the system, connection to a server, referring to a file, storage of a file, deletion of a file, alteration of a file and so forth.

Then, if, in addition to the content processing apparatus 10a which is service-registered already in the group IDA, the content reproduction apparatus 20 which is locally registered in the content processing apparatus 10a of the recorder ID 1 is service-registered into the group of the group IDA, then the group IDA is registered into the source ID list L possessed by the content reproduction apparatus 20, and also the recorder ID 2 is added.

Accordingly, if the content reproduction apparatus 20 is service-registered with the group IDA, then the content reproduction apparatus 20 can reproduce content data recorded by ripping or the like by the content processing apparatus 10a and 10b of the recorder ID 1 and the recorder ID 2.

It is to be noted that, although the group IDA is added to the source ID list L of the content reproduction apparatus 20 by service-registration of the content reproduction apparatus 20, the timing at which the recorder ID such as the recorder ID 2 belonging to the group IDA is added to the source ID list L may be, for example, a case wherein the content reproduction apparatus 20 is connected to the content processing apparatus 10b of the recorder ID 2 or a like case. However, the timing is not limited to the example just described.

Figure 22:
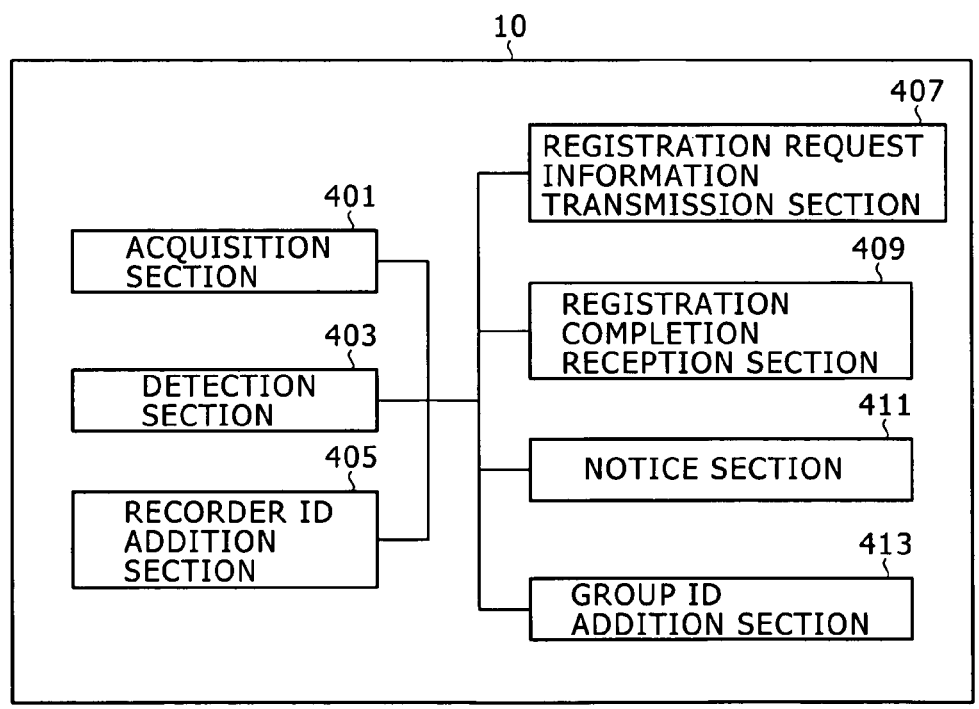
FIG. 22 is a block diagram showing a general configuration of a group registration section of the content processing apparatus according to the embodiment.

Now, components provided in the group registration section of the content processing apparatus 10 are described with reference to FIG. 22. FIG. 22 is a block diagram showing a general configuration of the group registration section of the content processing apparatus 10 according to the present embodiment.

As shown in FIG. 22, the group registration section in the content processing apparatus 10 includes an acquisition section 401, a detection section 403, a recorder ID addition section 405, a registration request information transmission section 407, a registration completion reception section 409, a notice section 411, and a group ID addition section 413.

The acquisition section 401 acquires the source ID list L (second source ID list) possessed by the content reproduction apparatus 20 of the connection destination. It is to be noted that the acquired source ID list L is ICV-calculated to determine a MAC value, and the MAC value is collated with the MAC value included in falsification detecting data acquired separately to confirm that the source ID list L is not in a falsified state. The falsification detecting data are produced based on the source ID list L.

The detection section 403 detects whether or not the content reproduction apparatus 20 whose source ID list L is acquired by the acquisition section 401 is service-registered and further detects whether or not the recorder ID of the content processing apparatus 10 (self content processing apparatus 10) of the source of the acquisition is described in the source ID list L of the content reproduction apparatus 20 acquired by the acquisition section 401. The self content processing apparatus 10 has a same meaning as the content processing apparatus 10 itself or the like.

The recorder ID addition section 405 adds the recorder ID of the self content processing apparatus 10 to the source ID list L acquired by the acquisition section 401 and stores the source ID list L after the addition to the content reproduction apparatus 20 of the source of the acquisition of the source ID list L into the storage apparatus or the like.

As a condition for the addition of the recorder ID to the source ID list L by the recorder ID addition section 405, it can be listed as an example that it is detected by the detection section 403 that a content reproduction apparatus 20 of the acquisition destination of the source ID list L is not service-registered and any other recorder ID than the recorder ID of the content processing apparatus 10 itself (self content processing apparatus 10) of the acquisition source is described in the source ID list L as hereinafter described.

It is to be noted that, while the recorder ID addition section 405 is described above taking a case wherein the recorder ID is added to the source ID list L of the content reproduction apparatus 20 as an example, the addition is not limited to such an example as just described, but, for example, the recorder ID addition section 405 may add the recorder ID to the source ID list L possessed by the content processing apparatus 10 or the like.

If the registration request information transmission section 407 accepts a request or the like to service-register a content processing apparatus 10 or a content reproduction apparatus 20 as a result of an operation of the inputting section such as the mouse by the user, then the registration request information transmission section 407 transmits registration request information to the transmission section. It is to be noted that the transmitted registration request information is transmitted to the group management server 32 through the transmission section via the network.

The registration completion reception section 409 receives, through the network, registration completion information which is a notification of completion of registration from the group management server 32 to which the registration request information is transmitted. It is to be noted that, if the service registration process of the content reproduction apparatus 20 or the content processing apparatus 10 does not end normally, then not registration completion information but registration error information or the like is transmitted from the group management server 32.

The notice section 411 displays a notification or the like for recommending service registration on the display screen of the content processing apparatus 10. Further, the notice section 411 displays, on the display screen of the content processing apparatus 10, a notification or the like for recommendation to erase (initialize) content data of the recorder ID which is stored in the content reproduction apparatus 20 but does not correspond to the content processing apparatus 10. It is to be noted that the present invention can be carried out not only in a case wherein a notification is displayed on the display screen of the content processing apparatus 10 but also in another case wherein a notification for recommendation to perform service-registration or the like is displayed on the display screen of the content reproduction apparatus 20.

If the registration completion reception section 409 receives registration completion information, then the group ID addition section 413 adds the group ID described in the source ID list L possessed by the content processing apparatus 10 to the source ID list L possessed by the content reproduction apparatus 20. Thereupon, the group ID addition section 413 adds the group ID to the source ID list L acquired by the acquisition section 401.

Further, the present invention can be carried out also in a case wherein the group ID updating section 149 described hereinabove with reference to FIG. 8 has functions substantially same as the functions of the group ID addition section 413 described hereinabove or in a like case, and the group ID updating section 149 may add the group ID to the source ID list L or the like.

Now, a series of registration processes including an automatic local registration process for the content reproduction apparatus 20 according to the present embodiment are described with reference to FIGS. 23 to 25.

Figure 23:
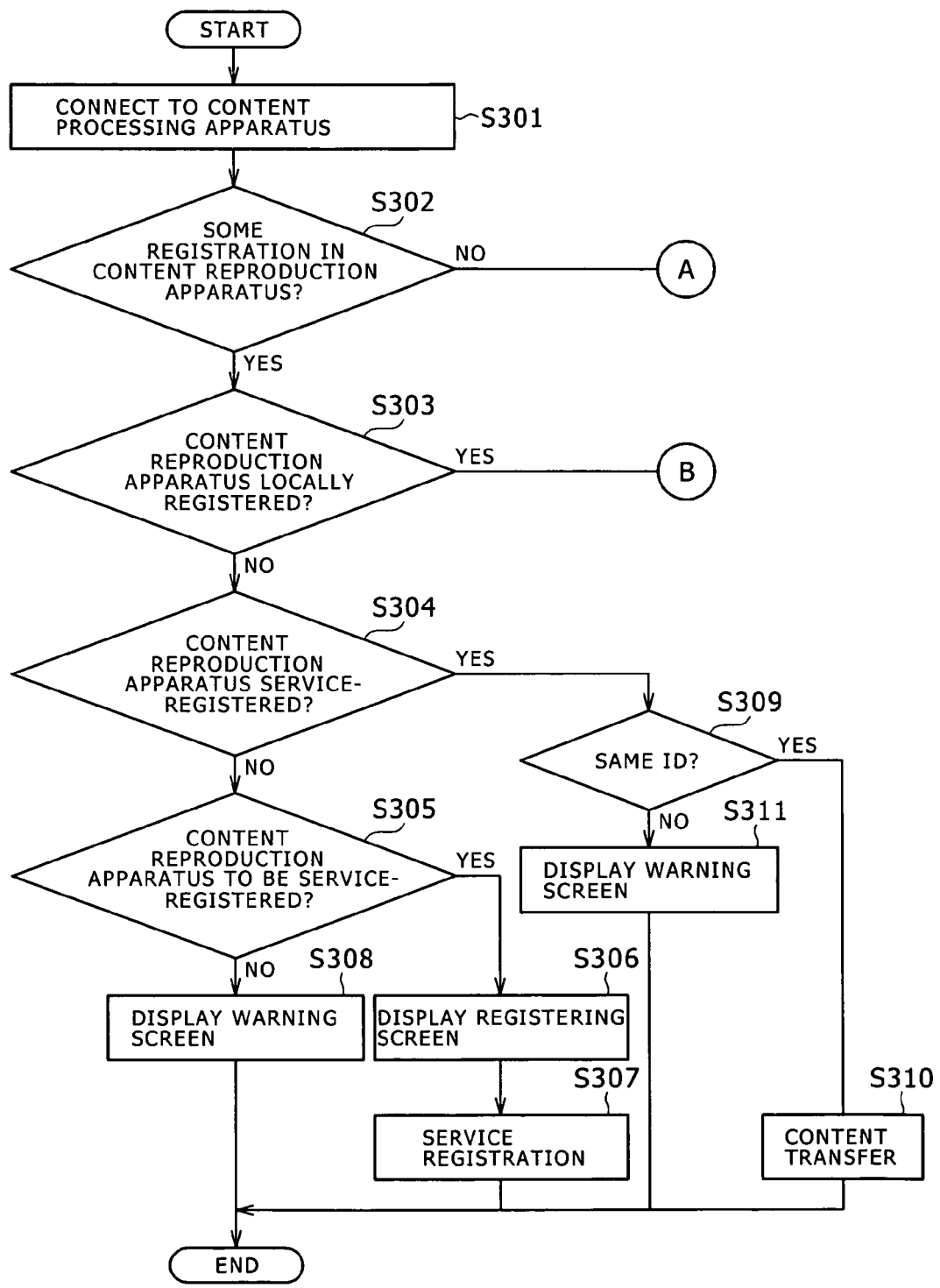
FIG. 23 is a flow chart illustrating an outline of a registration process of the content reproduction apparatus or the content processing apparatus according to the embodiment.
Figure 24:
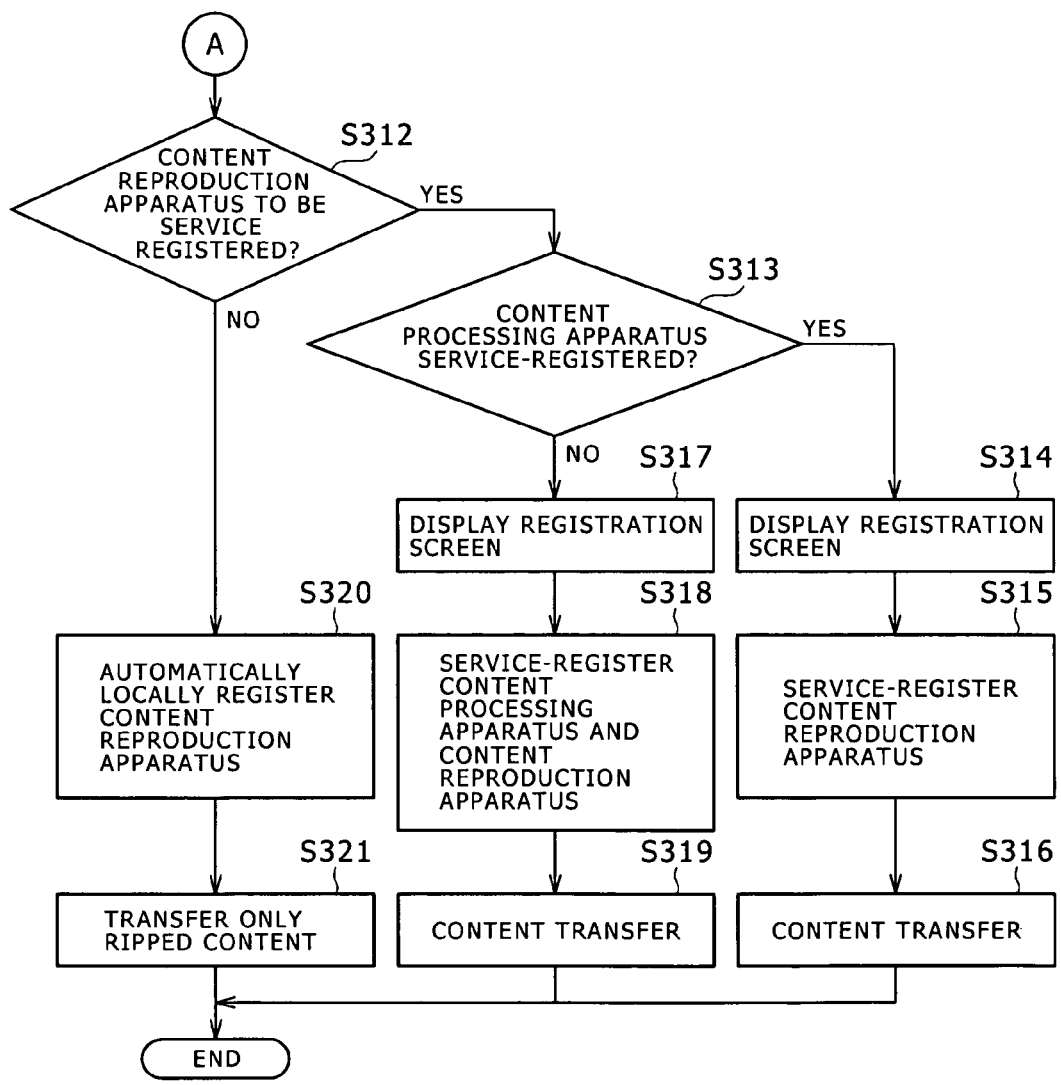
FIG. 24 is a flow chart illustrating an outline of the registration process of the content reproduction apparatus or the content processing apparatus according to the embodiment.

First, if the content reproduction apparatus 20 is connected to the content processing apparatus 10 by a cable (local line 9) (S301) as shown in FIG. 23, then the acquisition section 401 provided in the content processing apparatus 10 acquires the source ID list L possessed by the content reproduction apparatus 20 of the connection destination of the cable (local line 9).

After the acquisition section 401 acquires the source ID list L, the detection section 403 detects based on the source ID list L whether or not the content reproduction apparatus 20 of the destination of the acquisition is registered in some registration (S302). For example, the detection section 403 detects whether the group ID is described in the source ID list L possessed by the content reproduction apparatus 20, whether the recorder ID of the content processing apparatus 10 (self content processing apparatus 10) of the source of the acquisition is described, or the like.

For example, if a group ID is described in the source ID list L, then the detection section 403 detects that the content reproduction apparatus 20 is service-registered (or group-registered) already. If the recorder ID is described in the source ID list L, then the detection section 403 detects that the content reproduction apparatus 20 is locally registered already.

If, as a result of the detection, the content reproduction apparatus 20 is registered in some registration such as local registration or service registration (S302), then the detection section 403 subsequently detects whether or not the content reproduction apparatus 20 is locally registered already (S303). If a result of the detection indicates that the content reproduction apparatus 20 is not locally registered, then the detection section 403 subsequently detects whether or not the content processing apparatus 10 is service-registered (S304). It is to be noted that whether or not the content processing apparatus 10 is service-registered can be decided based on whether or not the group ID is described in the source ID list L (first source ID list) possessed by the content processing apparatus 10.

If a result of the detection by the detection section 403 reveals that the content processing apparatus 10 is not service-registered as yet (S304), that is, if the content reproduction apparatus 20 connected by the cable (local line 9) is not locally recorded as yet and the content processing apparatus 10 is not service-registered as yet, then the notice section 411 produces service registration recommendation information for urging the group management server 32 to perform service registration and causes the content processing apparatus 10 to display the service registration recommendation information on the display screen (S305).

Thereafter, if the user visually observes the service registration recommendation information by the notice section 411 through the display screen and performs service registration of the content processing apparatus 10 (S305), then a registration screen for service registration is displayed on the display screen (S306).

If the user operates the inputting section such as the mouse in accordance with the registration screen displayed on the screen and the registration request information transmission section 407 accepts an instruction of service registration, then the registration request information transmission section 407 transmits registration request information to the group management server 32.

The content processing apparatus 10 receives registration completion information (registration completion information) representative of completion of service registration from the group management server 32 and produces a group ID based on the leaf ID, and the group ID addition section 413 adds the group ID to the source ID list L of the content processing apparatus 10, thereby completing the service registration (S307). It is to be noted that, together with the addition of the group ID, also recorder IDs belonging to the group ID are added to the source ID list L of the content processing apparatus 10.

Figure 26:
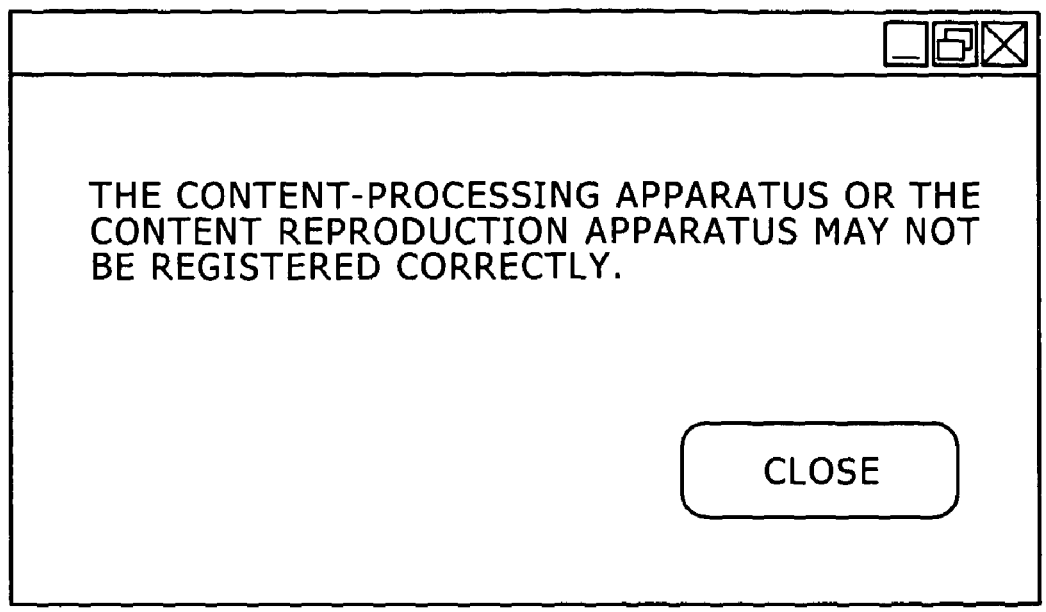
FIG. 26 is an explanatory view showing an outline of a warning screen according to the embodiment.

On the other hand, when service registration of the content reproduction apparatus 20 is not to be performed (S305), such a warning screen as shown in FIG. 26 is displayed on the display screen of the content processing apparatus 10 (S308). By displaying the warning screen shown in FIG. 26, it is possible to let the user recognize that the content reproduction apparatus 20 is not registered correctly.

On the other hand, where the content processing apparatus 10 is service-registered already (S304), for example, if the detection section 403 detects that the group ID registered in the source ID list L of the content processing apparatus 10 and the group ID registered in the source ID list L of the content reproduction apparatus 20 are same as each other (S309), then the content processing apparatus 10 can transfer content data to which the group ID stored in the content processing apparatus 10 is applied to the content reproduction apparatus 20 (S310).

If the group IDs described in the source ID lists L possessed by the content processing apparatus 10 and the content reproduction apparatus 20 are not same as each other (S309), then the warning screen shown in FIG. 26 is displayed on the screen as described hereinabove (S311). As a result, for example, the content processing apparatus 10 cannot transfer content data transferred thereto from the content distribution server 34 to the content reproduction apparatus 20.

Then, if the content reproduction apparatus 20 is not registered at all at step S302, then if service registration recommendation information by the notice section 411 is visually observed by the user through the display screen of the content processing apparatus 10 and the content reproduction apparatus 20 is to be service-registered (S312), then the detection section 403 detects the registration situation of whether or not the content processing apparatus 10 connected by the cable (local line 9) (S313) is service-registered.

If a result of the detection by the detection section 403 proves that the content processing apparatus 10 is service-registered (S313), then the registration screen for service registration of the content reproduction apparatus 20 is displayed on the display screen of the content processing apparatus 10 (S314).

Thereafter, if the user operates the inputting section such as the mouse in accordance with the registration screen displayed on the screen and the registration request information transmission section 407 accepts an instruction for service registration to the content reproduction apparatus 20, then the registration request information transmission section 407 transmits registration request information to the group management server 32.

As the content processing apparatus 10 receives registration completion information (registration completion information) representative of completion of the service registration of the content reproduction apparatus 20 from the group management server 32, the group ID addition section 413 adds the group ID of the group to which the content processing apparatus 10 belongs to the source ID list L of the content reproduction apparatus 20, thereby completing the service registration (S315). It is to be noted that, together with the addition of the group ID, also recorder IDs belonging to the group ID are added to the source ID list L of the content reproduction apparatus 20.

After the service registration of the content reproduction apparatus 20 is completed (S315), the content processing apparatus 10 can transfer content data to which the group ID same as that stored in the content processing apparatus 10 is applied, to the content reproduction apparatus 20 (S316).

On the other hand, if the result of the detection by the detection section 403 proves that the content processing apparatus 10 is not service-registered (S317), then a registration screen for service-registering the content reproduction apparatus 20 and the content processing apparatus 10 is displayed on the display screen of the content processing apparatus 10 (S318).

If the user operates the inputting section such as the mouse in accordance with the registration screen displayed on the screen and the registration request information transmission section 407 accepts an instruction for service registration, then the registration request information transmission section 407 transmits registration request information to the group management server 32.

It is to be noted that, although service registration of the content reproduction apparatus 20 and the content processing apparatus 10 is performed at S318, the service registration may be performed in a case wherein each of the content reproduction apparatus 20 and the content processing apparatus 10 accepts an input of, for example, a user ID, a password or the like to produce registration request information or in another case wherein, when service registration of each of such apparatus is to be performed, where an input of common information such as a user ID or a password is accepted, if information of one of them is accepted, then registration request information is produced automatically, or in a like case. In the latter case, simplification of the information inputting process by a user or reduction in production time of registration request information can be achieved.

The content processing apparatus 10 receives registration completion information (registration completion information) representative of completion of the service registration of the content processing apparatus 10 and the content reproduction apparatus 20 from the group management server 32 and produces a group ID based on the leaf ID, and the group ID addition section 413 adds the group ID to the source ID lists L of the content processing apparatus 10 and the content reproduction apparatus 20, thereby completing the service registration (S318). It is to be noted that, together with the addition of the group ID, also recorder IDs which belong to the group ID are added to the source ID lists L of the content reproduction apparatus 20 and the content processing apparatus 10.

After the service registration of the content processing apparatus 10 and the content reproduction apparatus 20 is completed (S318), content data to which the group ID same as the group ID added to the source ID list L possessed by the content processing apparatus 10 from among contents data stored in the content processing apparatus 10 can be transferred to the content reproduction apparatus 20 (S319).

Furthermore, if the service registration recommendation information produced by the notice section 411 is displayed on the display screen and the user who visually observes the service registration recommendation information does not perform service registration of the content processing apparatus 10 (S312), that is, if the content reproduction apparatus 20 is not registered at all and no service registration is to be performed, then the recorder ID addition section 405 of the content processing apparatus 10 adds the recorder ID of the content processing apparatus 10 itself to the source ID list L of the content reproduction apparatus 20 and produces falsification detecting data including a MAC value determined by ICV calculation from the updated source ID list L. Further, the recorder ID addition section 405 of the content processing apparatus 10 stores the source ID list L after the addition and the falsification detecting data into the content reproduction apparatus 20 (S320).

After the local registration is completed (S320), content data (ripped content data) to which the recorder ID is applied from among the contents data held by the content processing apparatus 10 can be transferred to the content reproduction apparatus 20 (S321).

Accordingly, if the content reproduction apparatus 20 is not registered at all, then the content processing apparatus 10 locally registers the content reproduction apparatus 20 automatically. By such local registration, the content reproduction apparatus 20 can acquire content data held by the content processing apparatus 10 and reproduce the content data even if the content reproduction apparatus 20 does not have a function of communicating with a network such as the Internet. It is to be noted that, for example, unless service registration is performed, content data distributed from the content distribution server 34 cannot be reproduced by the content reproduction apparatus 20.

Figure 25:
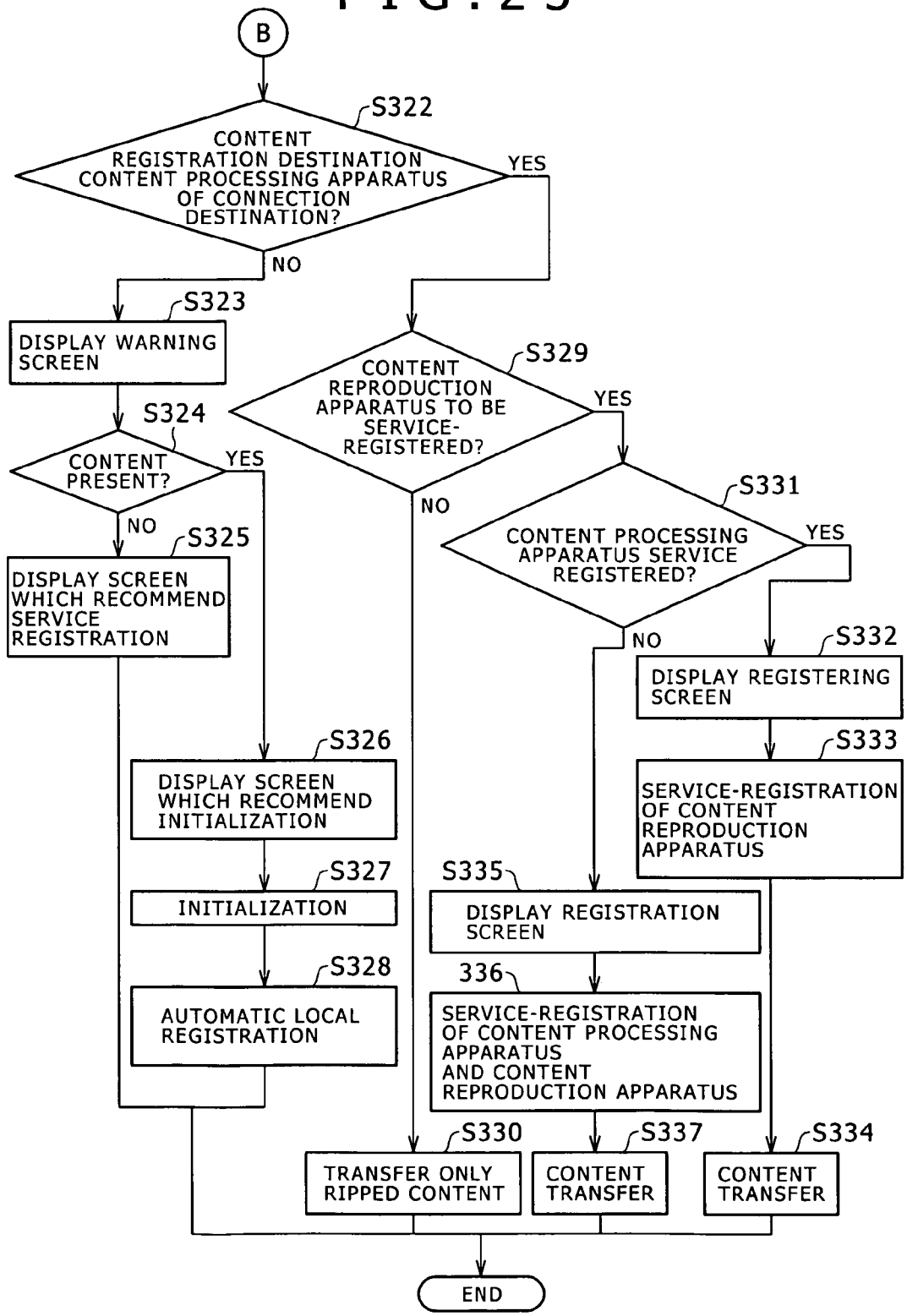
FIG. 25 is a flow chart illustrating an outline of the registration process of the content reproduction apparatus or the content processing apparatus according to the embodiment.

Thereafter, it is decided whether or not some registration of the content reproduction apparatus 20 is performed as shown in FIG. 23 (S302) and the content reproduction apparatus 20 is locally registered (S303) and besides the content processing apparatus 10 locally registered in the content reproduction apparatus 20 is the content processing apparatus 10 actually connected by the cable (local line 9) as shown in FIG. 25 (S322).

In particular, if the detection section 403 detects that a recorder ID same as the recorder ID corresponding to the content processing apparatus 10 itself is described in the source ID list L of the content reproduction apparatus 20, then it can be decided that the content processing apparatus 10 locally registered in the content reproduction apparatus 20 is actually connected by the cable (local line 9).

If a result of the detection reveals that the recorder IDs described in the source ID lists L of the content reproduction apparatus 20 and the content processing apparatus 10 are different from each other (S322), then the warning screen is displayed on the screen of the content processing apparatus 10 (S323). Further, it is confirmed whether or not content data exist in the storage apparatus of the content reproduction apparatus 20 (S324).

If content data do not exist (S324), then service registration recommendation information for urging the user to perform service registration of the content reproduction apparatus 20 into the group management server 32 is produced by the notice section 411 and displayed on the display screen of the content processing apparatus 10 (S325).

Figure 27:
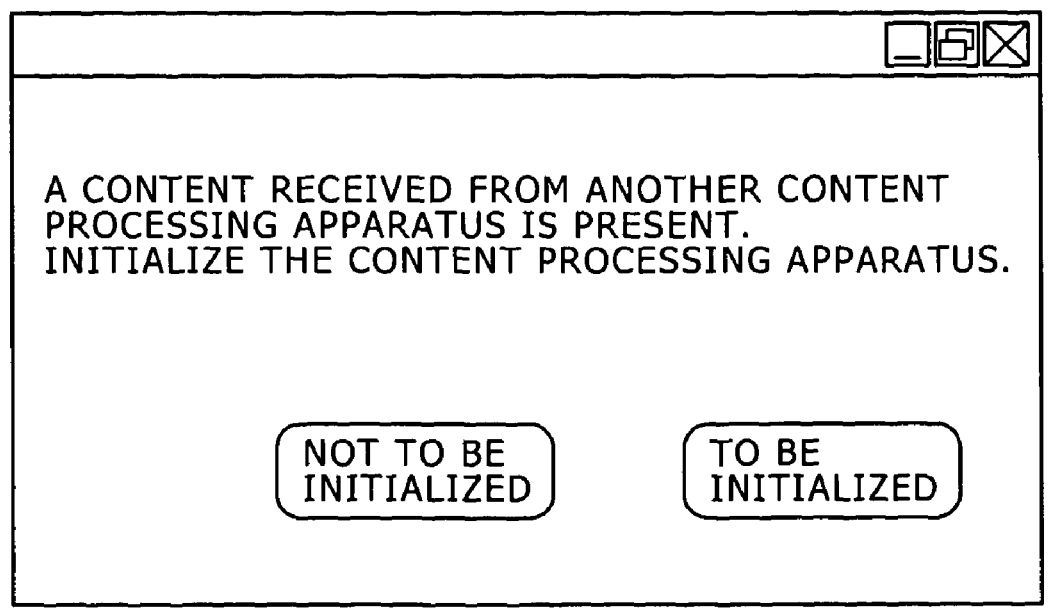
FIG. 27 is an explanatory view showing an outline of the warning screen according to the embodiment.

On the other hand, if content data exist in the content reproduction apparatus 20 (S324), then such a screen for urging the user for initialization as shown in FIG. 27 is displayed on the screen of the content processing apparatus 10 (S326). If an "initialization" button is depressed by an operation of the inputting section by the user through the screen shown in FIG. 27, then the data stored in the storage apparatus of the content reproduction apparatus 20 are all deleted to execute a physical initialization process (S327).

After the initialization process for the content reproduction apparatus 20 is completed (S327), the recorder ID addition section 405 of the content processing apparatus 10 executes a local registration process (S328). In particular, the recorder ID addition section 405 adds the recorder ID of the content processing apparatus 10 itself to the registered source ID list L of the content reproduction apparatus 20 and produces falsification detecting data including a MAC value determined by ICV calculation from the updated source ID list L. Further, the recorder ID addition section 405 stores the source ID list L after the addition and the falsification detecting data into the content reproduction apparatus 20 (S328).

Accordingly, by executing the initialization process for the content reproduction apparatus 20 (S327), it is possible to cancel the local registration registered in another content processing apparatus 10 having a different recorder ID and locally registering the content reproduction apparatus 20 automatically with the recorder ID of the content processing apparatus 10 connected by the cable (local line 9) (S328).

Then, if the result of the detection reveals that the recorder ID described in the source ID list L of the content reproduction apparatus 20 and the recorder ID described in the source ID list L of the content processing apparatus 10 are same as each other (S322), then service registration recommendation information by the notice section 411 is displayed on the display section. If the user visually observes the display and does not perform service registration of the content reproduction apparatus 20 (S329), then, for example, only those content data (ripped content data) having the recorder ID applied thereto from among the content data stored in the storage apparatus of the content processing apparatus 10 can be transferred to the content reproduction apparatus 20 (S330).

On the other hand, if the content reproduction apparatus 20 is to be service-registered (S329) and the result of the detection by the detection section 403 indicates that the content processing apparatus 10 is service-registered (S331), then the registration screen for service registration of the content reproduction apparatus 20 is displayed on the display screen of the content processing apparatus 10 (S332).

Thereafter, if the user operates the inputting section such as the mouse in accordance with the registration screen displayed on the screen and the registration request information transmission section 407 accepts the instruction to service-register the content reproduction apparatus 20, then the registration request information transmission section 407 transmits registration request information to the group management server 32.

As the content processing apparatus 10 receives registration completion information (registration completion information) representative of completion of the service registration of the content reproduction apparatus 20 from the group management server 32, the group ID addition section 413 adds the group ID of the group to which the content processing apparatus 10 belongs to the source ID list L of the content reproduction apparatus 20, thereby completing the service registration (S333).

After the service registration of the content reproduction apparatus 20 is completed (S333), the content processing apparatus 10 can transfer those content data, to which a group ID same as the group ID added to the source ID list L held by the content processing apparatus 10 from among the contents data stored in the content processing apparatus 10, to the content reproduction apparatus 20 (S334).

On the other hand, if the content processing apparatus 10 is not service-registered (S331), then a registration screen for service-registering the content reproduction apparatus 20 and the content processing apparatus 10 is displayed on the display screen of the content processing apparatus 10 (S335).

If the user operates the inputting section such as the mouse in accordance with the registration screen displayed on the screen and the registration request information transmission section 407 accepts the instruction for service registration, then the registration request information transmission section 407 transmits registration request information to the group management server 32.

The content processing apparatus 10 receives registration completion information (registration completion information) representative of completion of the service registration of the content processing apparatus 10 and the content reproduction apparatus 20 from the group management server 32 and produces a group ID based on the leaf ID, and the group ID addition section 413 adds the group ID to the source ID lists L of the content processing apparatus 10 and the content reproduction apparatus 20, thereby completing the service registration (S336). It is to be noted that, together with the addition of the group ID, also recorder IDs which belong to the group ID are added to the source ID lists L of the content reproduction apparatus 20 and the content processing apparatus 10.

After the service registration of the content processing apparatus 10 and the content reproduction apparatus 20 is completed (S336), the content processing apparatus 10 can transfer, from within the content data stored in the content processing apparatus 10, those content data to which a group ID same as the group ID added to the source ID list L possessed by the content processing apparatus 10 is applied to the content reproduction apparatus 20 (S337).

It is to be noted that, while, in the present embodiment, the transfer of content data is described taking a case wherein the transfer is performed from a content processing apparatus 10 to a content reproduction apparatus 20 as an example, the transfer is not limited to this example, and the present invention can be applied also to transfer from a content reproduction apparatus 20 to a content processing apparatus 10 and so forth.

Further, while, in the present embodiment, the acquisition section 401, detection section 403, recorder ID addition section 405, registration request information transmission section 407, registration completion reception section 409, notice section 411 and group ID addition section 413 provided in the group registration section of the content processing apparatus 10 are described taking a case wherein they are formed from hardware as an example, the present invention is not limited to such an example as just described. For example, at least one of the sections mentioned above may be a program which is formed from one, two or more modules or components.

While the series of processes described above can be executed by hardware for exclusive use, it may otherwise be executed by software. Where the series of processes is executed by software, a program which constructs the software is installed into the content processing apparatus 10, content reproduction apparatus 20, server 30 and so forth.

Here, in the present specification, the steps which describe the program for causing a computer of each of the content processing apparatus 10, content reproduction apparatus 20, group management server 32 and so forth to execute various processes need not necessarily be processed in a time series in the order as described as the flow charts, and include also processes which are executed parallelly or individually (for example, parallel processing or processing by an object).

<11. Registration of a Content Processing Apparatus or a Content Reproduction Apparatus in the Case of the Same ID>

Figure 28:
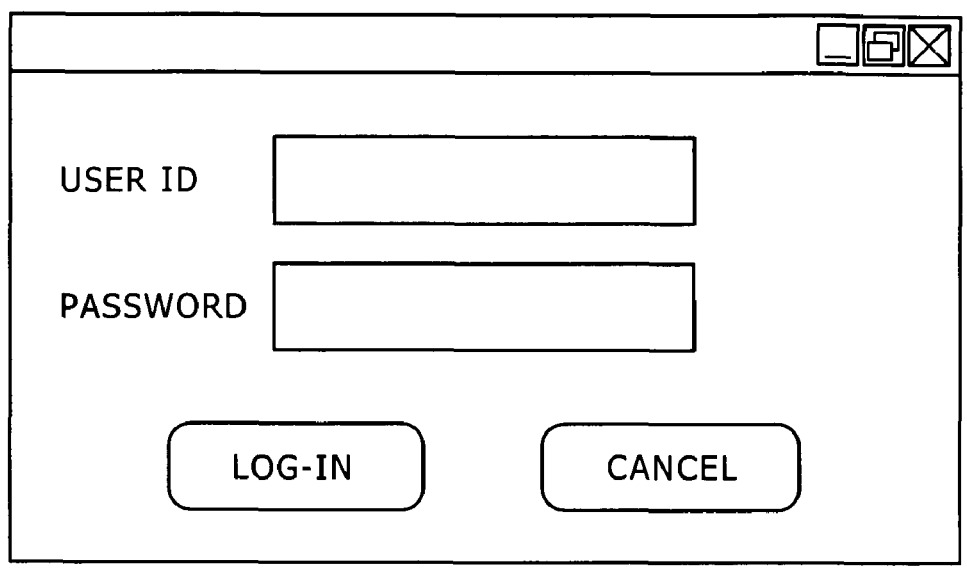
FIG. 28 is an explanatory view showing an outline of an input screen upon a service registration process according to the embodiment.
Figure 29:
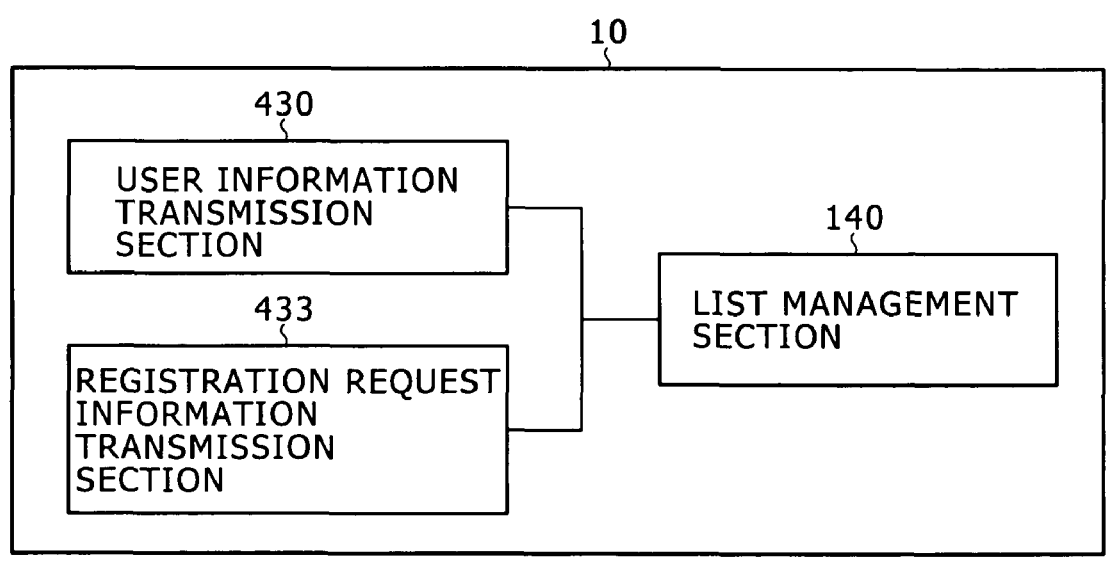
FIG. 29 is a block diagram showing a general configuration of a group management section provided in the content processing apparatus according to the embodiment.
Figure 30:
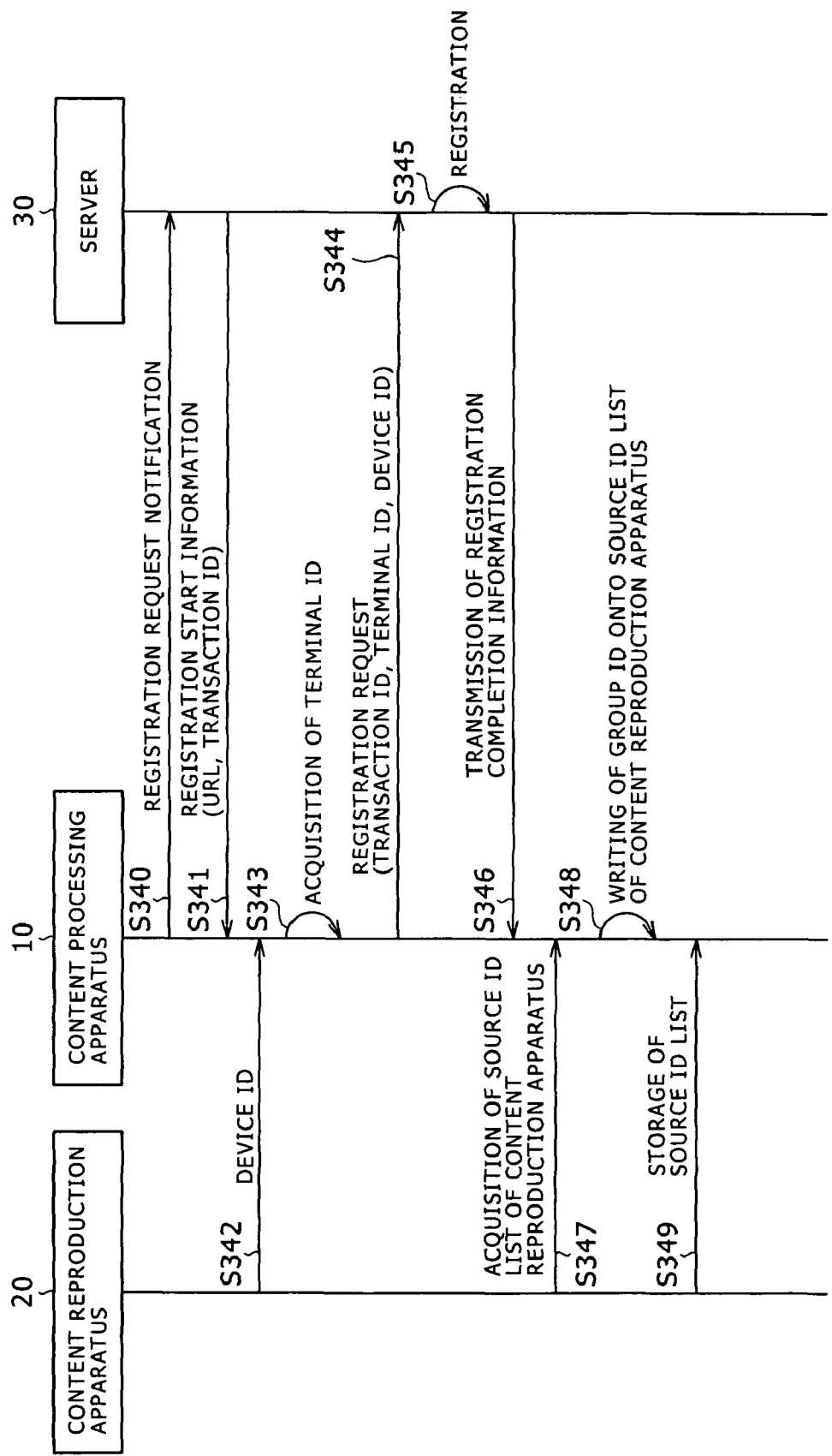
FIG. 30 is a sequence diagram illustrating an outline of service registration of the content reproduction apparatus according to the embodiment.
Figure 31:
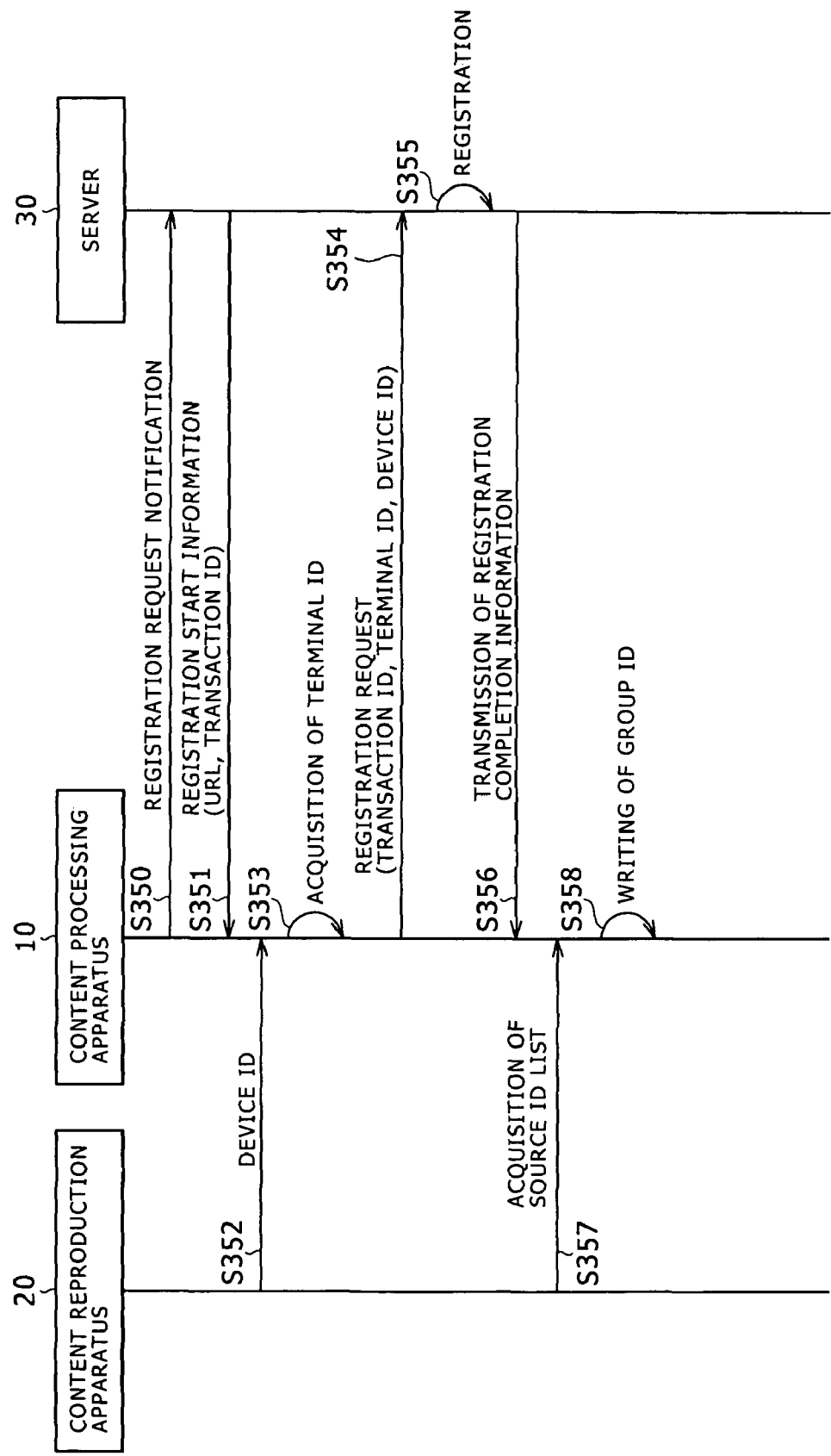
FIG. 31 is a sequence diagram illustrating an outline of service registration of the content processing apparatus according to the embodiment.

Now, a service registration process of a content processing apparatus 10 or a content reproduction apparatus 20 where the user IDs are same as each other is described with reference to FIGS. 28 to 31. FIG. 28 is an explanatory view showing an outline of an input screen upon a service registration process according to the present embodiment; FIG. 29 is a block diagram showing a general configuration of the group management section according to the present embodiment; FIG. 30 is a sequence diagram showing an outline of service registration of a content reproduction apparatus 20 according to the present embodiment; and FIG. 31 is a sequence diagram showing an outline of service registration of a content processing apparatus 10 according to the present embodiment.

First, as described hereinabove, when a content processing apparatus 10 or a content reproduction apparatus 20 is to be service-registered, the content processing apparatus 10 accesses the group management server 32 through the network and transmits information necessary for a service registration process to the group management server 32 (management server according to the present embodiment).

The access is a general term of information processing of processing information through a communication network such as utilization of a system, connection to a server, referring to a file, storage of a file, deletion of a file or alteration to a file.

Further, it is described above that service registration is performed such that the group management server 32 transmits a leaf ID to the content processing apparatus 10, and the content processing apparatus 10 produces a group ID based on the leaf ID and adds the group ID to the source ID list L of the content processing apparatus 10 or the source ID list L of the content reproduction apparatus 20.

As shown in FIG. 28, an input screen for requesting for an ID (user ID) and a password of a user from the group management server 32 side when service registration is to be performed is displayed on the display screen of the content processing apparatus 10, and it is necessary for the user to operate the inputting section such as the mouse to input a user ID and a password on the input screen. However, even in such a case that a content processing apparatus 10 or a content reproduction apparatus 20 having the same user ID is to be registered, a user ID and a password must be transmitted to the group management server 32, and the efficiency in service registration process is low.

Thus, a service registration process by which service registration can be executed without transmitting a user ID and a password from the content processing apparatus 10 to the group management server 32 is described below.

As shown in FIG. 29, the group management section of the content processing apparatus 10 includes a user information transmission section 430, a registration request information transmission section 433 and a list management section (list updating section) 140. It is to be noted that, though not shown, the group management of the content processing apparatus 10 may include also the acquisition section 401, detection section 403 and so forth which are mentioned in the description of the configuration of the group management section.

The user information transmission section 430 accepts user information in which a user ID, a password and so forth which are inputted by an operation of the inputting section by the user are included and transmits the user information to the group management server 32 through the transmission section.

The registration request information transmission section 433 produces registration request information for requesting the group management server 32 for service registration including a device ID or a terminal ID and transmits the registration request information to the group management server 32 through the transmission section.

When service registration of the content reproduction apparatus 20 connected to the local line 9 into the content processing apparatus 10 is to be performed, the registration request information transmission section 433 produces registration request information including the device ID of the content reproduction apparatus 20 acquired by the acquisition section 401.

Further, when service registration of the content processing apparatus 10 is to be performed, the registration request information transmission section 433 produces registration request information including a terminal ID produced by the content processing apparatus 10.

When the list management section 140 receives a leaf ID transmitted back from the group management server 32 after the registration request information is transmitted to the group management server 32, it produces a group ID based on the leaf ID and adds the group ID to the source ID list L held by the content processing apparatus 10 or the content reproduction apparatus 20 which is an object of the service registration.

Now, service-registration of a content reproduction apparatus 20 is described with reference to FIG. 30. It is to be noted that, as a precondition, the content processing apparatus 10 is serviced-registered already in the group management server 32.

When the content reproduction apparatus 20 is cable-connected to the content processing apparatus 10 by the local line 9, the content processing apparatus 10 acquires the source ID list L of the content reproduction apparatus 20 to detect whether or not the content reproduction apparatus 20 is service-registered as described hereinabove.

If the content processing apparatus 10 detects that the content reproduction apparatus 20 is not service-registered, then the content processing apparatus 10 issues a notification of registration request of the content reproduction apparatus 20 to the server 30 through the network as shown in FIG. 30 (S340).

Particularly, the content processing apparatus 10 accesses the WWW server 31 provided in the server 30 to send a registration request notification (S340). The WWW server 31 accepts and transfers the registration request notification to the group management server.

Then, when the registration request notification is received from the content processing apparatus 10, the server 30 transmits registration start information which includes information necessary to execute a registration process to the content processing apparatus 10 (S341). The registration start information mentioned above includes information of a URL indicative of a location in which, for example, a transaction ID necessary for re-transmission of data, a leaf ID necessary to produce a group ID or the like is stored and so forth. The leaf ID is user identification information managed by the group management server 32.

After the content processing apparatus 10 receives the registration start information, the acquisition section 401 of the content processing apparatus 10 acquires a device ID from the content reproduction apparatus 20 (S342).

After the device ID is acquired (S342), the content processing apparatus 10 acquires a terminal ID held by the content processing apparatus 10 itself (S343).

Thereafter, the registration request information transmission section 433 of the content processing apparatus 10 produces registration request information including the transaction ID, terminal ID and device ID and transmits the registration request information to the server 30 (S344).

The user registration section (registration section) 312 of the WWW server 31 of the server 30 acquires a record (registration record) of the content processing apparatus 10 registered already based on the terminal ID and performs checking of whether or not the content processing apparatus 10 can be registered, and adds the device ID newly to the registration record (S345). It is to be noted that, in the registration record of the content processing apparatus 10, user information such as a user ID and a password is coordinated with the terminal ID and so forth. In an ordinary case, the group management server 32 first receives the user ID and the password from the content processing apparatus 10 to uniquely specify a record in which the content processing apparatus 10 is registered. However, if the terminal ID is received, then the record can be specified uniquely, and therefore, a rapid and efficient service registration process can be performed.

It is to be noted that, although a registration record is described hereinabove in connection with the group registration DB 324 shown in FIG. 12, registration records (records 3241 to 3245) are records produced when an apparatus such as a content processing apparatus 10 is registered into the group management server 32. The registration record includes a user ID, a password, a terminal ID, a device ID, a recorder ID and so forth as described hereinabove.

Further, the WWW server (management server) 31 first receives user information including a user ID and a password from the content processing apparatus 10, and the user authentication section (authentication section) 314 of the WWW server 31 authenticates the user information and transmits authentication permission notification information to the content processing apparatus 10. If the content processing apparatus 10 does not receive the authentication permission notification information, then the registration request information cannot be transmitted to the WWW server 31 of the server 30. However, even if the user information is not transmitted, if the server 30 receives a terminal ID, then since a record can be specified uniquely, the server 30 can perform a rapid and efficient service registration process.

After the device ID of the content reproduction apparatus 20 is added to the group registration DB 324 managed by the group management server 32 (S345), the server 30 transmits registration completion information for conveying that the registration is completed to the content processing apparatus 10 (S346).

After the content processing apparatus 10 receives the registration completion information, the acquisition section 401 of the content processing apparatus 10 acquires the source ID list L of the content reproduction apparatus 20 (S347). It is to be noted that the acquisition section 401 ICV-calculates the source ID list L for detecting falsification upon acquisition of the source ID list L and confirms whether the determined MAC value coincides with a MAC value included in the falsification detecting data (ICV data) acquired together with the source ID list L.

After the source ID list L is acquired (S347), the list management section 140 adds the group ID of the content processing apparatus 10 registered already to the source ID list L therein (S348). Further, the list management section 140 produces falsification detecting data from the source ID list L after updated and stores the falsification detecting data into the storage apparatus of the content reproduction apparatus 20 together with the source ID list L (S349).

The service registration process of the content reproduction apparatus 20 is ended thereby. If the content processing apparatus 10 is service-registered already, then when a content reproduction apparatus 20 owned by the same user is to be service-registered, the service registration can be executed efficiently even if user information such as a user ID and a password is not inputted intentionally by the user.

Now, service-registration of a content processing apparatus 10 is described with reference to FIG. 31. It is to be noted that, as a precondition, the content reproduction apparatus 20 is service-registered already in the group registration DB 324 of the group management server 32.

After the content reproduction apparatus 20 is cable-connected to the content processing apparatus 10 by the local line 9, the content processing apparatus 10 acquires the source ID list L of the content reproduction apparatus 20 to detect whether or not the content reproduction apparatus 20 is service-registered as described hereinabove.

Further, the content processing apparatus 10 decides whether or not the content processing apparatus 10 itself is service-registered by detecting whether or not a group ID and so forth are described in the source ID list L similarly as in the case of the content reproduction apparatus 20.

Here, if the content processing apparatus 10 detects that the content processing apparatus 10 is not service-registered, then the content processing apparatus 10 first issues a notification of a service registration request of the content processing apparatus 10 itself to the server 30 through the network (S350).

Then, when the registration request notification is received from the content processing apparatus 10, the server 30 transmits transmission start information in which information necessary to execute a registration process is included to the content processing apparatus 10 (S351). The registration start information includes information of a URL indicative of a location in which, for example, a transaction ID necessary for re-transmission of data, a leaf ID necessary to produce a group ID or the like is stored and so forth. It is to be noted that the transaction ID is managed by the WWW server 31 and the leaf ID is managed by the group management server 32.

After the content processing apparatus 10 receives the registration start information, the acquisition section 401 of the content processing apparatus 10 acquires a device ID from the content reproduction apparatus 20 (S352).

After the device ID is acquired (S352), the content processing apparatus 10 acquires a terminal ID held by the content processing apparatus 10 itself (S353).

Thereafter, the registration request information transmission section 433 of the content processing apparatus 10 produces registration request information including the transaction ID, terminal ID and device ID and transmits the registration request information to the server 30 (S354).

The user registration section 312 of the WWW server 31 acquires a record (registration record) of the content reproduction apparatus 20 registered already based on the device ID and performs checking of whether or not the content processing apparatus 10 can be registered, and adds the terminal ID newly to the registration record if the content processing apparatus 10 can be registered (S355). It is to be noted that, in the registration record of the content reproduction apparatus 20, user information such as a user ID and a password is coordinated with the device ID and so forth. In an ordinary case, the server 30 further receives the user ID and the password from the content processing apparatus 10 to uniquely specify a registration record in which the content reproduction apparatus 20 is registered. However, if the device ID is received, then the registration record can be specified uniquely, and therefore, a rapid and efficient service registration process can be performed.

After the terminal ID of the content processing apparatus 10 is added to the pertaining registration record of the group registration DB 324 of the group management server 32 (S355), the server 30 transmits registration completion information for conveying that the registration is completed to the content processing apparatus 10 (S356).

After the content processing apparatus 10 receives the registration completion information, the acquisition section 401 of the content processing apparatus 10 acquires the source ID list L of the content reproduction apparatus 20 (S357). It is to be noted that the acquisition section 401 ICV-calculates the source ID list L for detecting falsification upon acquisition of the source ID list L and confirms whether the determined MAC value coincides with a MAC value included in the falsification detecting data (ICV data) acquired together with the source ID list L.

After the source ID list L is acquired (S357), the list management section 140 acquires the group ID of the content reproduction apparatus 20 registered already in the source ID list L therein and writes the group ID into the source ID list L of the content processing apparatus 10 itself (S358).

The service registration process of the content processing apparatus 10 is ended thereby. If the content reproduction apparatus 20 is service-registered already (for example, if the device ID is stored in the pertaining registration record or in a like case), then when a content processing apparatus 10 owned by the same user is to be service-registered, the service registration can be executed efficiently even if user information such as a user ID and a password is not inputted intentionally by the user.

While the series of processes described above can be executed by hardware for exclusive use, it may otherwise be executed by software. Where the series of processes is executed by software, a program which constructs the software is installed into the content processing apparatus 10, content reproduction apparatus 20, server 30 and so forth.

Here, in the present specification, the steps which describe the program for causing a computer to execute various processes need not necessarily be processed in a time series in the order as described as the flow charts, and include also processes which are executed parallelly or individually (for example, parallel processing or processing by an object).

Further, while the user information transmission section 430, registration request information transmission section 433 and list management section 140 provided in the content processing apparatus 10 according to the present embodiment are described taking a case wherein they are formed from one, two or more modules or components as an example, the present invention is not limited to such an example as just described but can be carried out also in a case wherein, for example, each of the user information transmission section 430, registration request information transmission section 433 and list management section 140 provided in the content processing apparatus 10 is formed from hardware or in a like case.

<12. List Production Method of Title Information Based on Permission/Inhibition of Reproduction of a Content>

Now, a list production method of title information based on permission/inhibition of reproduction of a content is described with reference to FIGS. 32 to 44.

The content processing apparatus 10 according to the present embodiment decides with regard to contents stored and retained in the content processing apparatus 10 whether or not the contents can be reproduced under copyright management by the content processing apparatus 10 and produces a list (hereinafter referred to also as title list) of title information of the contents so that the decision can be made. Further, the content processing apparatus 10 causes the produced title list to be displayed on a display unit which is one of outputting apparatus provided in the content processing apparatus 10. Furthermore, the content processing apparatus 10 can delete a content, with regard to which it is decided that it cannot be reproduced under copyright management by the content processing apparatus 10, from the content processing apparatus 10.

Further, the content processing apparatus 10 according to the present embodiment decides with regard to contents stored and retained in the content reproduction apparatus 20 connected to the content processing apparatus 10 whether or not the contents can be reproduced under copyright management by the content reproduction apparatus 20 and produces a title list of the contents so that the decision can be made. Further, the content processing apparatus 10 causes the produced title list to be displayed on the display unit which is one of the outputting apparatus provided in the content processing apparatus 10. Furthermore, the content processing apparatus 10 can delete a content, with regard to which it is decided that it cannot be reproduced under copyright management by the content reproduction apparatus 20, from the content reproduction apparatus 20. In the following, a functional configuration of the content processing apparatus 10 for implementing the functions described above is described in detail.

Figure 32:
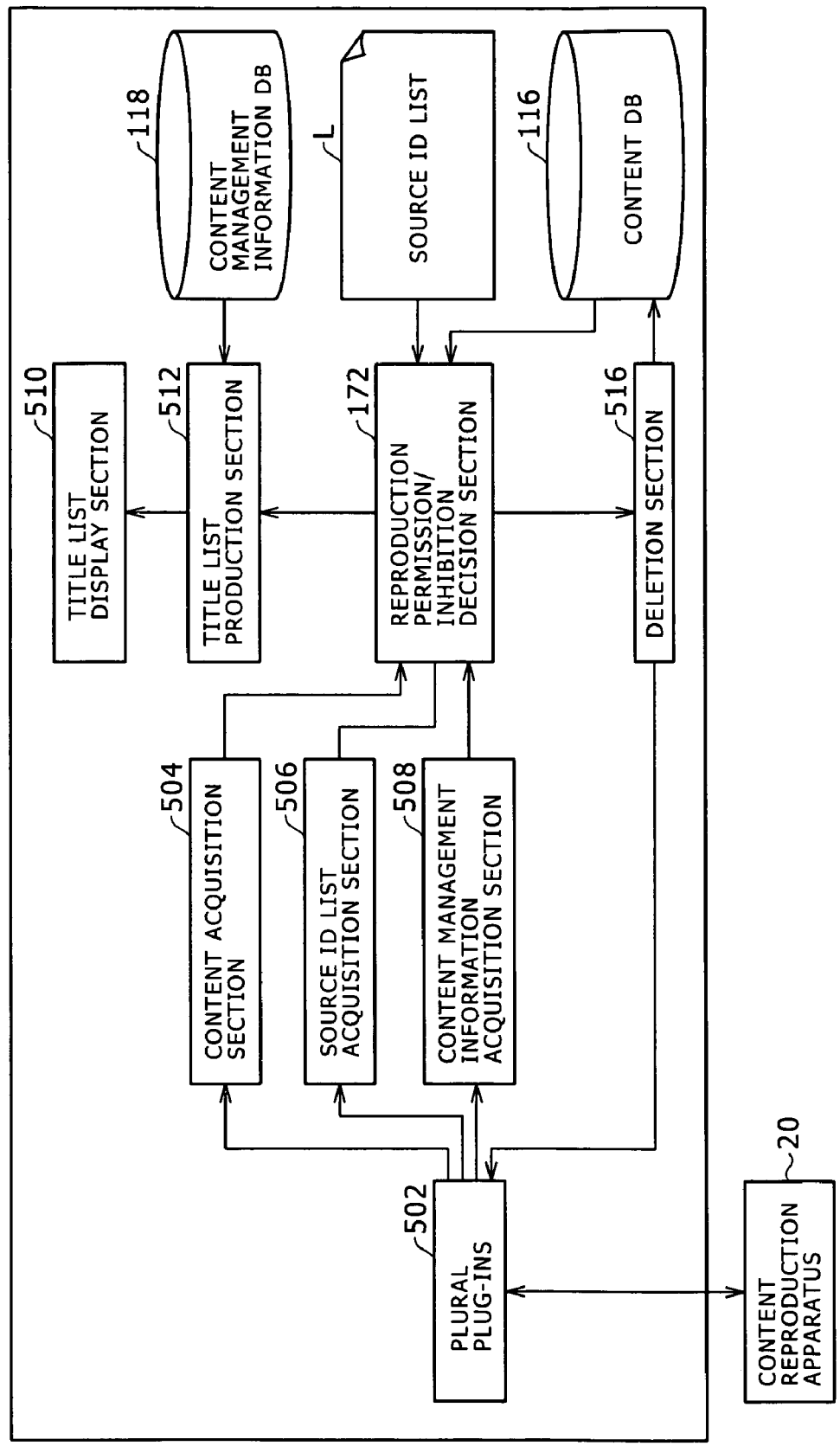
FIG. 32 is a block diagram showing a functional configuration of the content processing apparatus according to the embodiment.

As shown in FIG. 32, the content processing apparatus 10 further includes, in order to implement the functions described above, for example, plug-ins 502, a content acquisition section 504, a source ID list acquisition section 506, a content management information acquisition section 508, a title list display section 510, a title list production section 512, a reproduction permission/inhibition decision section 172, a deletion section 516 and so forth. Further, a content management information DB 118, a content DB 116 and a source ID list L are stored in the storage apparatus 111 of the content processing apparatus 10.

The plug-ins 502 are a plurality of plug-in modules included in the data communication section 120. A plurality of plug-in modules corresponding to different types of the content reproduction apparatus 20 (for example, PC, PDA, portable video player, MP3 player, IC player, CD play, MD player and so forth) are installed into the content processing apparatus 10 so that the content processing apparatus 10 can perform detection of connection of various types of content reproduction apparatus 20 and transmission and reception of data through the plug-in modules.

Each plug-in module has set therein a type regarding whether copyright management of the group management type or copyright management of the check-in check-out type should be performed for each content reproduction apparatus 20 a connection to which is detected by the plug-in module to perform communication. Accordingly, when a plug-in module to which a type of the group management method is set is to operate, the content processing apparatus 10 decides permission/inhibition of a content in the content reproduction apparatus 20 based on the group management method in which a source ID is used. On the other hand, when a plug-in module to which a type of the check-in check-out method is set is to operate, the content processing apparatus 10 decides permission/inhibition of a content in the content reproduction apparatus 20 based on the check-in check-out method in which a license corresponding to the content is used.

The content management information acquisition section 508 has a function of acquiring management information of contents held by the content reproduction apparatus 20 from the content reproduction apparatus 20 through the plug-in 502. The management information of contents includes a content ID, an address of a content corresponding to the content ID, title information of the content and so forth. The title information includes, for example, where the content is a music content, the title, artist name and so forth of a tune.

The content acquisition section 504 has a function of receiving a content ID and/or an address of a content held by the content reproduction apparatus 20 provided from the reproduction permission/inhibition decision section 172 and acquiring the content based on the content ID or address from the content reproduction apparatus 20 through the plug-in 502.

The source ID list acquisition section 506 has a function of acquiring the source ID list L possessed by the content reproduction apparatus 20 from the content reproduction apparatus 20 through the plug-in module to which the method of the group management type is set.

The source ID lists L to which the content processing apparatus 10 refers in order to perform permission/inhibition of reproduction of a content includes a source ID list L held by the content processing apparatus 10 and indicating a providing source of a content whose reproduction by the content processing apparatus 10 is permitted and a source ID list L held by the content reproduction apparatus 20 and indicating a providing source of a content whose reproduction by the content reproduction apparatus 20 is permitted. The former is an example of a first source ID list, and the latter is an example of a second source ID list.

The reproduction permission/inhibition decision section 172 has a function of deciding whether or not a content stored in the content DB 116 of the content processing apparatus 10 can be reproduced under copyright management by the content processing apparatus 10. Further, the reproduction permission/inhibition decision section 172 has also a function of deciding whether or not a content held by the content reproduction apparatus 20 can be reproduced under copyright management by the content reproduction apparatus 20. In the following, the former function is described first.

The reproduction permission/inhibition decision section 172 acquires the content ID of a content which makes an object of decision of permission/inhibition of reproduction from the title list production section 512 and acquires a content from the content DB 116 based on the content ID. Further, the reproduction permission/inhibition decision section 172 acquires the source ID list L stored in the storage apparatus or the like of the content processing apparatus 10. The reproduction permission/inhibition decision section 172 reads out the source ID applied to the content acquired from the content DB 116 and checks whether or not the read out source ID is included in the source ID list L. If the read out source ID is included in the source ID list L, then the reproduction permission/inhibition decision section 172 decides that the content to which the source ID is applied is a reproducible content. On the other hand, if the read out source ID is not included in the source ID list L, then the reproduction permission/inhibition decision section 172 decides that the content to which the source ID is applied is a non-reproducible content.

It is to be noted that, while, in the foregoing description, a content is acquired from the content DB 116 and a source ID applied to the content is referred to, the present invention is not limited to this example. For example, if a content ID and a source ID are recorded in a coordinated relationship with each other in advance in the content management information DB 118 or the like, then even if the content is not acquired from the content DB 116, the reproduction permission/inhibition decision section 172 can acquire the source ID by referring to the content management information DB 118 based on the content ID.

Now, the latter function of deciding whether or not a content held by the content reproduction apparatus 20 can be reproduced under copyright management by the content reproduction apparatus 20 is described. Since the process to be performed by the reproduction permission/inhibition decision section 172 differs depending upon whether copyright management of the group management type is being performed or copyright management of the check-in check-out type is being performed by the content reproduction apparatus 20 connected to the content processing apparatus 10. Therefore, the processes are described separately. First, the process of the group management type is described.

The reproduction permission/inhibition decision section 172 acquires a content ID or an address of a content in the content reproduction apparatus 20 from the title list production section 512 and causes the content acquisition section 504 to acquire the content from the content reproduction apparatus 20 based on the content ID or address. Further, the reproduction permission/inhibition decision section 172 causes the source ID list acquisition section 506 to acquire the source ID list L held by the content reproduction apparatus 20. The reproduction permission/inhibition decision section 172 acquires the source ID list L from the source ID list acquisition section 506, acquires the content from the content acquisition section 504, acquires the source ID applied to the content and checks whether or not the source ID is included in the source ID list L. If the source ID is included in the source ID list L, then it is decided that the content to which the source ID is applied is a reproducible content, but if the source ID is not included in the source ID list L, then it is decided that the content to which the source ID is applied is a non-reproducible content.

It is to be noted that, while, in the foregoing description, a content is acquired from the content reproduction apparatus 20 and a source ID applied to the content is referred to, the present invention is not limited to the example just described. For example, if the content reproduction apparatus 20 includes a database in which a content ID and a source ID are associated with each other, then the reproduction permission/inhibition decision section 172 can refer to the source ID necessary for decision of permission/inhibition of reproduction of the content by acquiring the database.

Now, the process in the case of the check-in check-out method is described. The reproduction permission/inhibition decision section 172 acquires a content ID or an address of the content in the content reproduction apparatus 20 from the title list production section 512 and causes the content acquisition section 504 to acquire the content from the content reproduction apparatus 20 based on the content ID or address. The reproduction permission/inhibition decision section 172 acquires the content from the content acquisition section 504, reads out reproduction restriction information set to a license applied to the content and decides whether or not the content is reproducible. In particular, for example, where a reproduction-permission time number is included as the reproduction restriction information in the license, the reproduction permission/inhibition decision section 172 checks whether or not the reproduction-permission time number remains (remaining time number>0), and if the reproduction-permission time number remains, then the reproduction permission/inhibition decision section 172 decides that the content is a reproducible content. On the other hand, if a reproduction-permission period is included as the reproduction restriction information, then whether the reproduction-permission period does not elapse is checked, for example, by comparing the system time of the content processing apparatus 10 and the reproduction-permission period with each other. If the reproduction-permission period does not elapse, then the reproduction permission/inhibition decision section 172 decides that the content is a reproducible content.

It is to be noted that, while, in the foregoing description, a license is applied to a content and the content is acquired from the content reproduction apparatus 20 to refer to the license included in the content, the present invention is limited to the example just described. For example, if the license is not applied to the content but is managed in an associated relationship with the content ID, for example, by another database in the content reproduction apparatus 20, then the content processing apparatus 10 can perform the decision of permission/inhibition of reproduction described above not by acquiring the content but by acquiring the license.

The deletion section 516 has a function of deleting a content, which is decided to be non-reproducible on the content processing apparatus 10 by the reproduction permission/inhibition decision section 172, from the content DB 116. Further, the deletion section 516 has another function of deleting a content, which is decided to be non-reproducible on the content reproduction apparatus 20 by the reproduction permission/inhibition decision section 172, from the content reproduction apparatus 20. In particular, the deletion section 516 decides whether a content of an object of deletion is a content in the content processing apparatus 10 or a content in the content reproduction apparatus 20 in accordance with an input from the inputting apparatus 108 such as depression of a "collective deletion" button. The deletion section 516 issues a decision request for permission/inhibition of reproduction of the content in the content processing apparatus 10 or in the content reproduction apparatus 20 to the reproduction permission/inhibition decision section 172 and acquires an answer from the reproduction permission/inhibition decision section 172. The answer includes, for example, the content ID and so forth of the content which has been decided to be non-reproducible by the reproduction permission/inhibition decision section 172.

The deletion section 516 deletes the pertaining content from the content DB 116 or the content reproduction apparatus 20 based on the content ID of the non-reproducible content acquired from the reproduction permission/inhibition decision section 172 and the deletion object (whether the deletion object is in the content processing apparatus 10 or in the content reproduction apparatus 20) decided by the deletion section 516 itself. When the content is to be deleted from the content DB 116, the deletion section 516 deletes the content to which the content ID is applied, for example, based on the content ID. When the content is to be deleted from the content reproduction apparatus 20, the deletion section 516 transmits, for example, the content ID and a deletion request to the content reproduction apparatus 20 through the plug-in 502 so that the content reproduction apparatus 20 deletes the content to which the content ID is applied from among the contents held by the content reproduction apparatus 20 itself.

In the content management information DB 118, content IDs applied uniquely to the contents stored in the content DB 116, addresses of the contents and title information of the contents are stored in an associated relationship with each other.

The title list production section 512 has a function of producing a title list of contents based on an input from the inputting apparatus 108. The title list includes information with which the contents can be identified, and for example, where the contents are music contents, the title list includes a tune mane, an artist name and so forth. In particular, for example, if the user issues an instruction through the inputting apparatus 108 to display a plurality of contents included in a certain group (album) in the form of a table, the title list production section 512 reads out the content IDs of the contents included in the group from the content management information DB 118 and provides the read out content IDs to the reproduction permission/inhibition decision section 172 so that the reproduction permission/inhibition decision section 172 decide whether or not the contents can be reproduced by the content processing apparatus 10. Thereafter, the title list production section 512 acquires a result of the decision from the reproduction permission/inhibition decision section 172 and uses the title information included in the content management information DB 118 to produce a title list of the contents such that permission/inhibition of reproduction of the contents can be distinguished. To produce a title list of the contents such that permission/inhibition of reproduction of the contents can be distinguished is achieved particularly, for example, by setting luminance information which differs depending upon reproducible contents and non-reproducible contents or by coordinating them such that different icons are displayed. Or, reproducible contents and non-reproducible contents may be grouped into different groups.

The title list display section 510 has a function of causing a title list produced by the title list production section 512 to be displayed on the display unit which is one of the outputting apparatus 110. The display allows the user, who has issued the instruction through the inputting apparatus 108 to display, for example, a plurality of contents included in a certain group (album) in the form of a table, to observe the table of the title information including whether or not each content can be reproduced by the content processing apparatus 10.

On the other hand, if the user issues an instruction through the inputting apparatus 108 to display the contents in the content reproduction apparatus 20 in the form of a table, then the title list production section 512 requests the content management information acquisition section 508 to acquire content management information from the content reproduction apparatus 20. The content management information acquisition section 508 provides the acquired content management information to the title list production section 512. Then title list production section 512 provides content IDs or addresses of contents included in the content management information to the reproduction permission/inhibition decision section 172 so that the reproduction permission/inhibition decision section 172 may decide whether or not the contents in the content reproduction apparatus 20 corresponding to the content IDs or addresses can be reproduced. The reproduction permission/inhibition decision section 172 acquires the content, based on the content IDs or addresses provided, from the content reproduction apparatus 20 through the contents acquisition section 504. Thereafter, the reproduction permission/inhibition decision section 172 decides whether or not the acquired contents can be reproduced, and provides a result of the decision to the title list production section 512. The result at least includes the content IDs and information of permission/inhibition of reproduction. The title list production section 512 produces a title list, on which permission/inhibition of reproduction can be discriminated, based on the content IDs included in both of the content management information and the decision result, title information included in the content management information and the decision results of permission/inhibition of reproduction included in the decision result. The discrimination of permission/inhibition of reproduction is such as described hereinabove.

Figure 33:
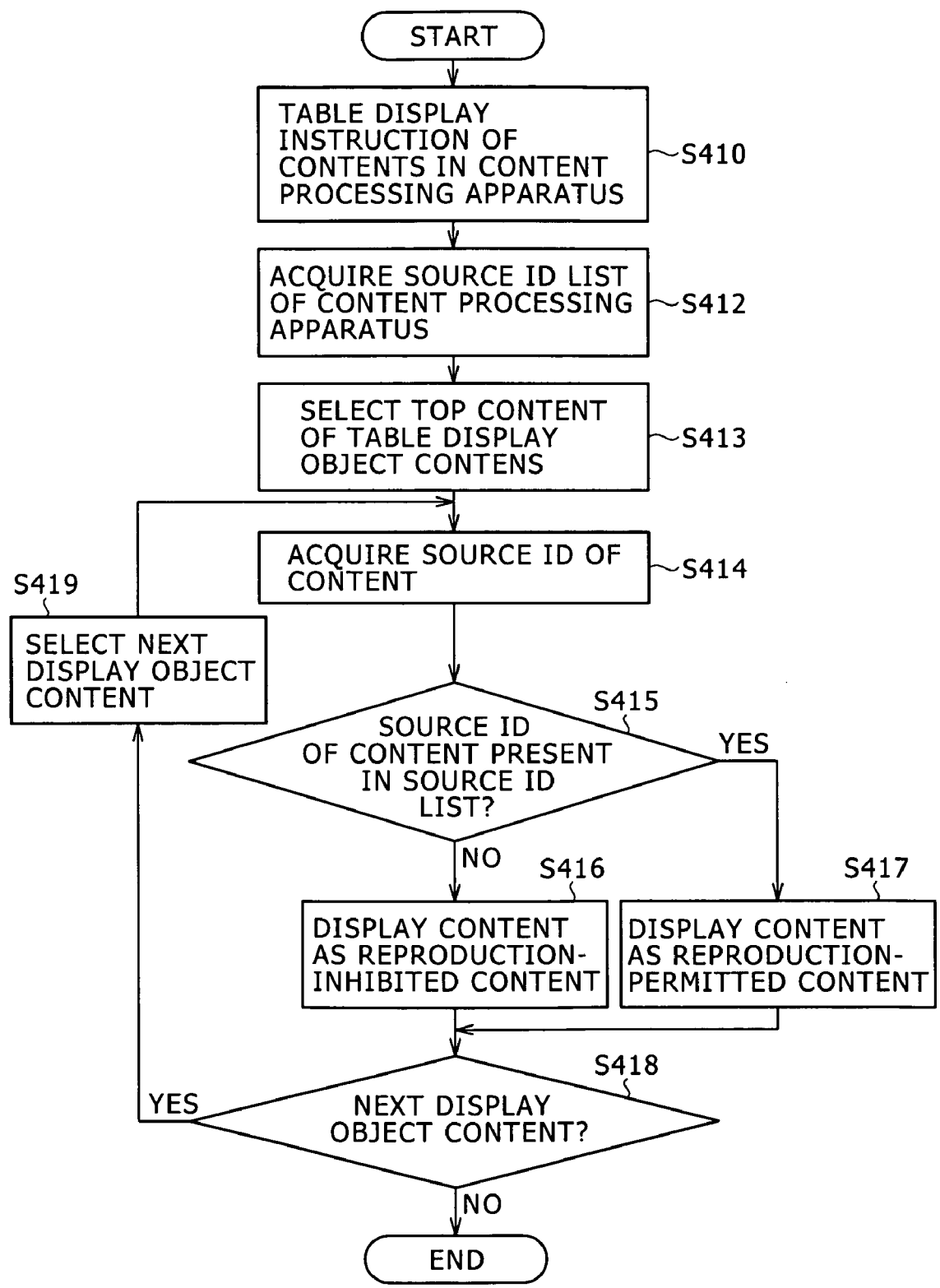
FIG. 33 is a flow chart illustrating a process of displaying a title list of contents in the content processing apparatus according to the embodiment.
Figure 34:
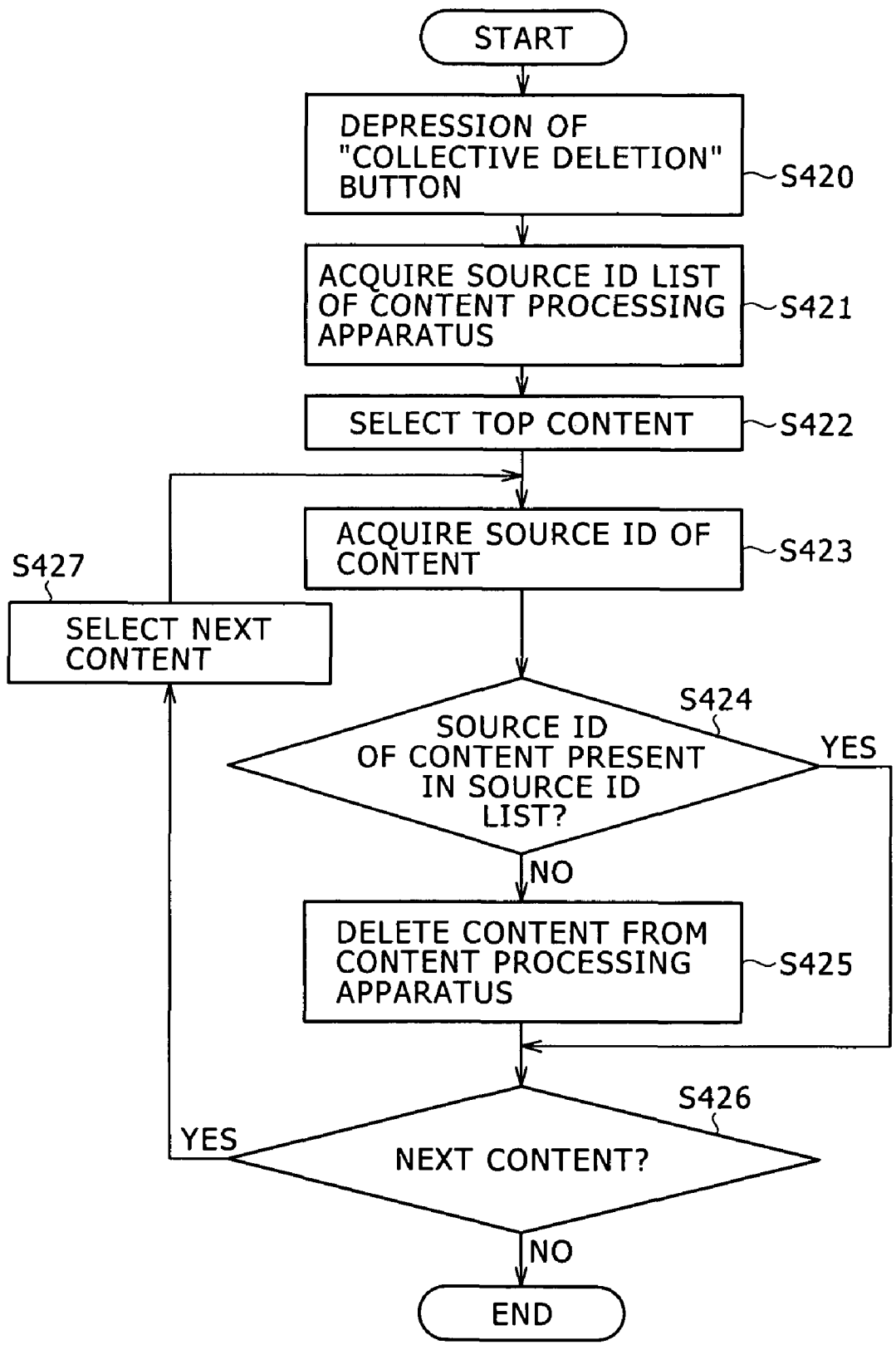
FIG. 34 is a flow chart illustrating a deletion process of a reproduction-inhibited content in the content processing apparatus according to the embodiment.
Figure 35:
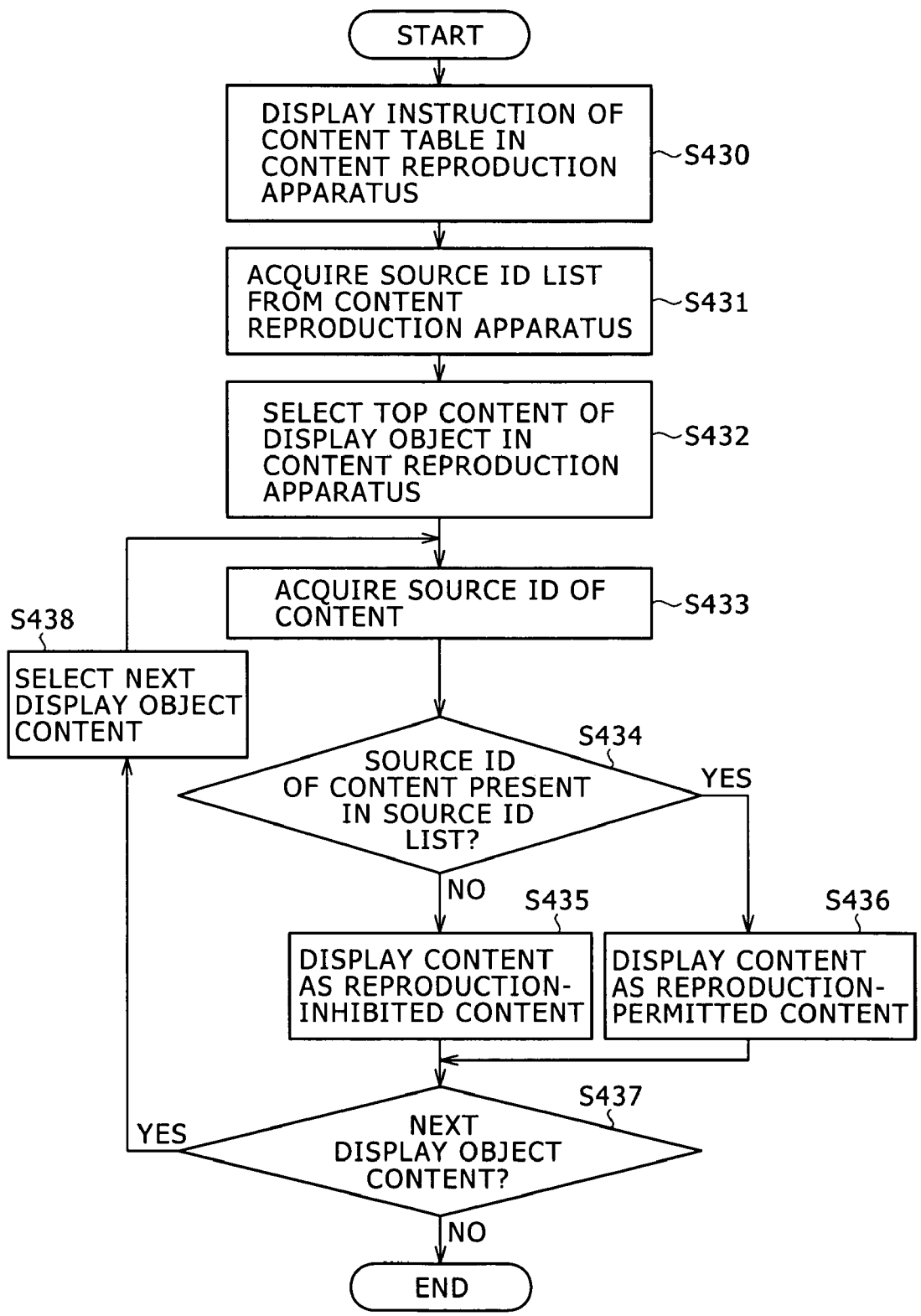
FIG. 35 is a flow chart illustrating another process of displaying a title list of contents in the content reproduction apparatus according to the embodiment.
Figure 36:
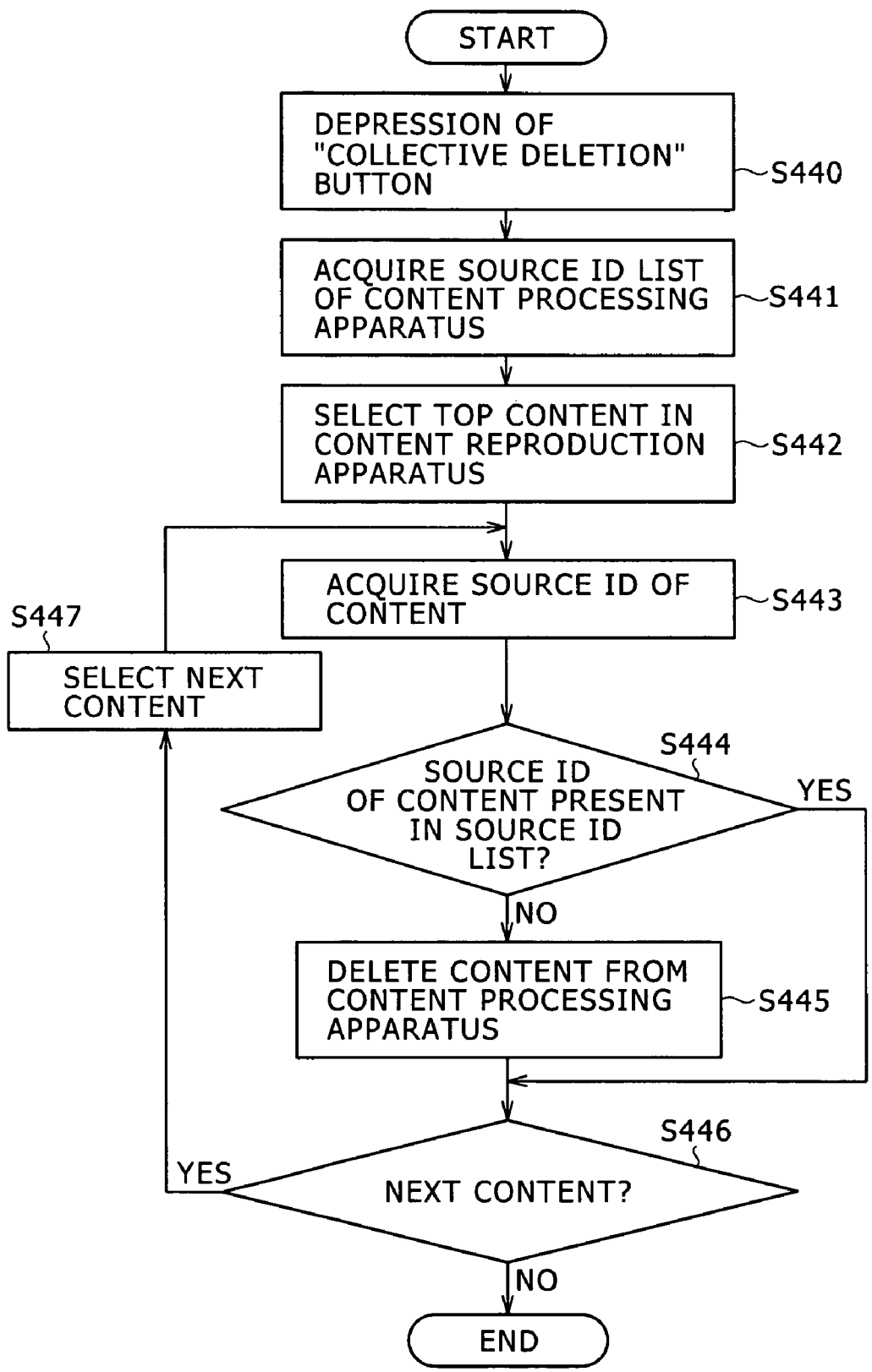
FIG. 36 is a flow chart illustrating another deletion process of a reproduction-inhibited content in the content reproduction apparatus according to the embodiment.
Figure 37:
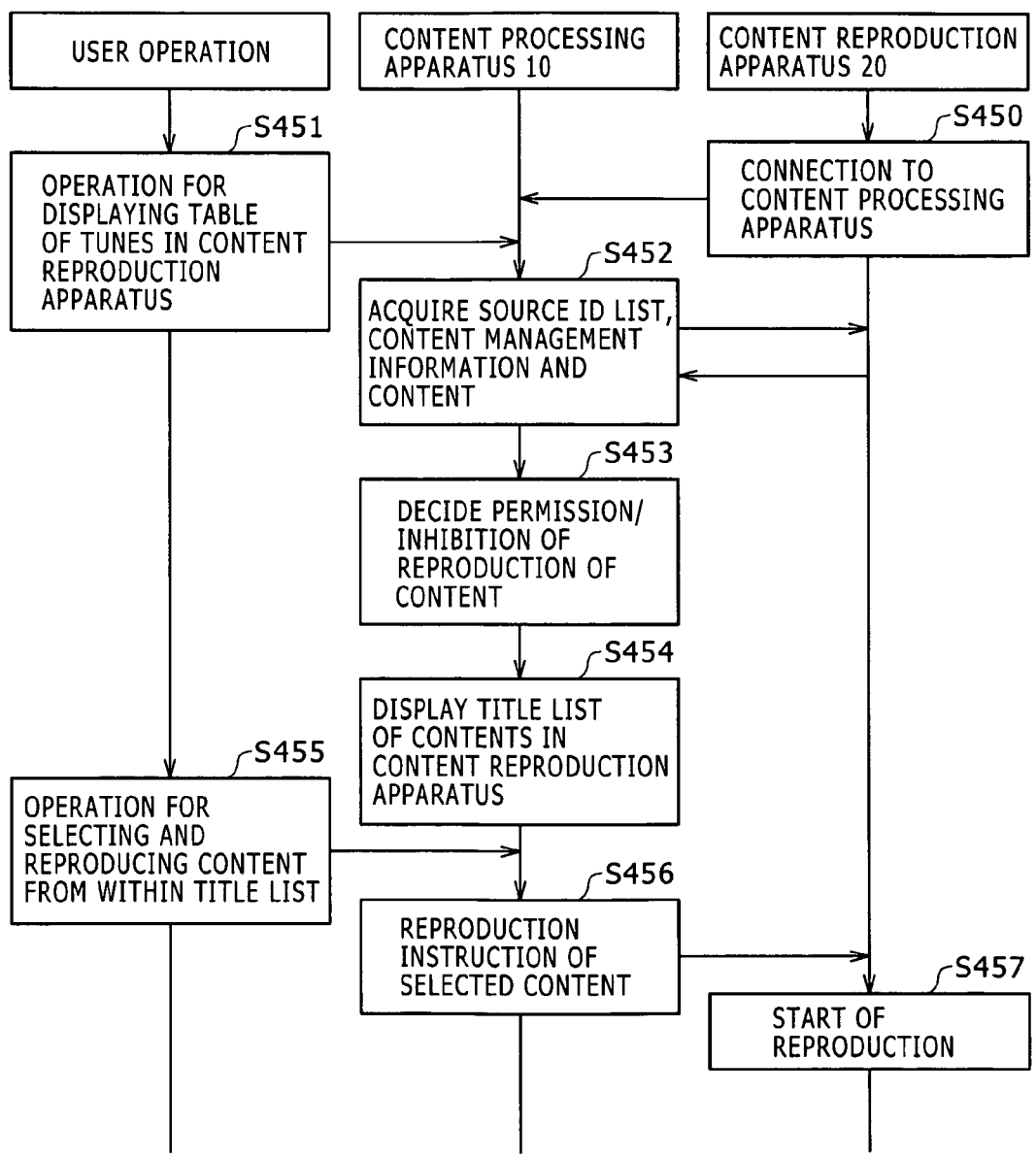
FIG. 37 is a flow chart illustrating a process of reproducing a content in the content reproduction apparatus from the content processing apparatus according to the embodiment.
Figure 38:
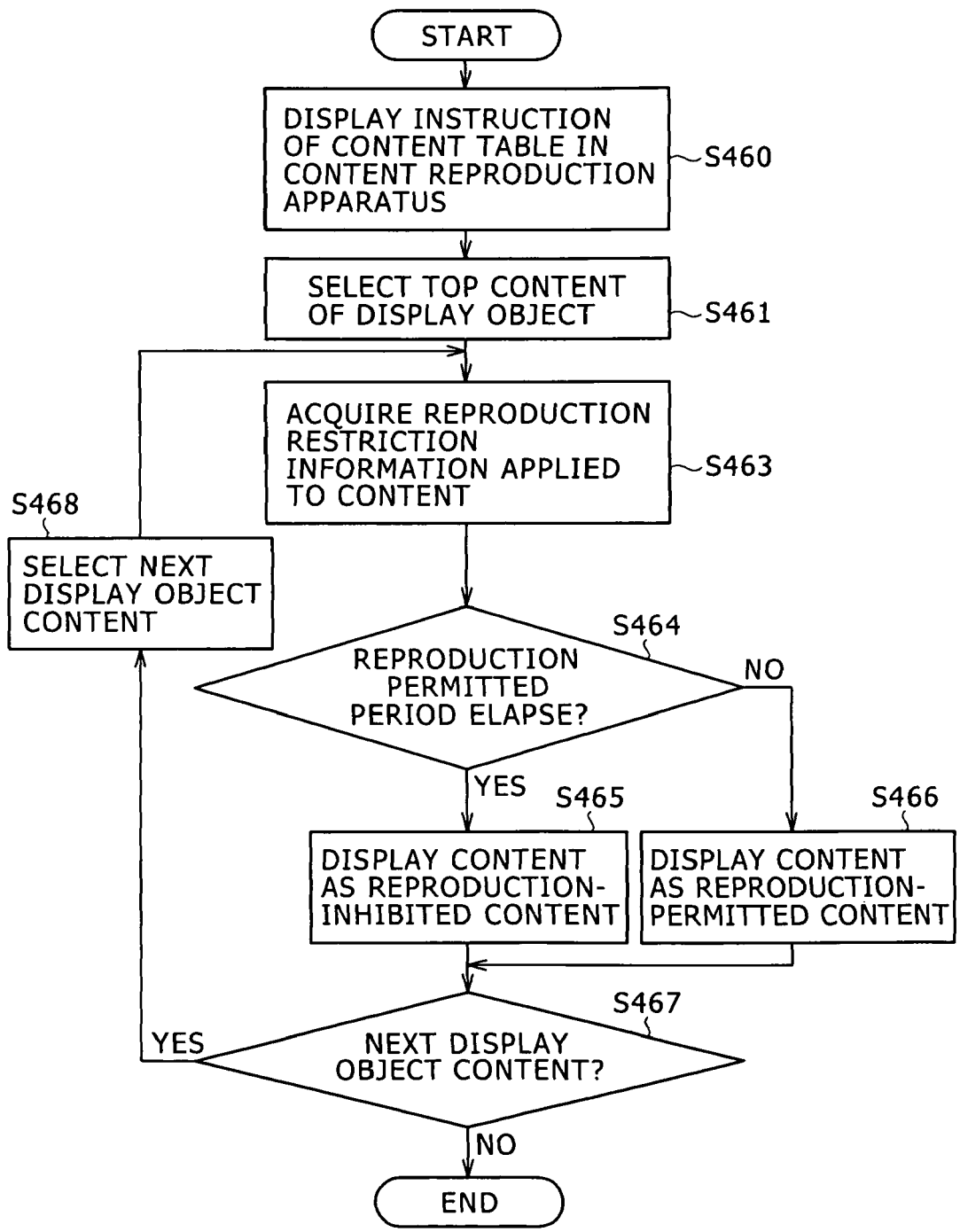
FIG. 38 is a flow chart illustrating a process of displaying a title list of contents in the content reproduction apparatus according to the embodiment.

Now, a flow of a process of displaying a table of contents in a content processing apparatus 10 in such a manner that permission/inhibition of reproduction can be discriminated is described with reference to FIG. 33.

First at step S410, an instruction to display a table of contents in the content processing apparatus 10 is issued (S410). In particular, the title list production section 512 designates contents of an object of display in response to an instruction received through the inputting apparatus 108 from the user and then issues a request for decision of permission/inhibition of reproduction to the reproduction permission/inhibition decision section 172. Then at step S412, the reproduction permission/inhibition decision section 172 acquires the source ID list L of the content processing apparatus 10 (S412). Thereafter, the reproduction permission/inhibition decision section 172 selects a content at the top of the display object contents designated by the title list production section 512 (S413). In particular, the reproduction permission/inhibition decision section 172 acquires more than one content ID from the title list production section 512 and acquires contents corresponding to the content IDs in the acquired order or an in an arbitrary order from the content DB 116 (S413, S419).

The reproduction permission/inhibition decision section 172 having acquired the contents reads out, at step S414, the source ID applied to one of the acquired contents (S414). Thereafter, the reproduction permission/inhibition decision section 172 checks whether or not the read out source ID is included in the source ID list L (S415). Then, if the source ID is included in the source ID list L, then the processing advances to step S417, at which the reproduction permission/inhibition decision section 172 notifies the title list production section 512 that the content to which the source ID is applied can be reproduced. On the other hand, if the source ID is not included in the source ID list L at step S415, then the processing advances to step S416, at which the reproduction permission/inhibition decision section 172 notifies the title list production section 512 that the content to which the source ID is applied cannot be reproduced. The title list production section 512 produces a title list in accordance with the notification from the reproduction permission/inhibition decision section 172, and the title list display section 510 displays based on the produced title list that the content is a reproducible or non-reproducible content (S416, S417). The process described is performed for all of the object contents (S418).

The flow of the process of displaying a table of contents in the content processing apparatus 10 in such a manner that permission/inhibition of reproduction can be discriminated is described above. Now, a flow of a process of deleting a content, which cannot be reproduced under copyright management, from within a content processing apparatus 10 is described with reference to FIG. 34.

First, at step S420, for example, the "collective deletion" button would be depressed by the user (S420). When the button is depressed, the deletion section 516 issues a request to the reproduction permission/inhibition decision section 172 to decide permission/inhibition of a content stored in the content DB 116 of the content processing apparatus 10. The reproduction permission/inhibition decision section 172 receiving the request first acquires, at step S421, the source ID list L of the content processing apparatus 10 (S421). Thereafter, the reproduction permission/inhibition decision section 172 successively reads out the contents stored in the content DB 116 (S422, S427) and acquires the source ID applied to each of the contents (S423). Then, the reproduction permission/inhibition decision section 172 checks whether or not the acquired source ID is included in the source ID list L (S424). If the acquired source ID is not included in the source ID list L, then the reproduction permission/inhibition decision section 172 notifies the deletion section 516 that the content to which the source ID is applied cannot be reproduced. Then, the deletion section 516 deletes the content from the content DB 116 based on the notification (S425). The process described above is performed for all of the contents stored in the content DB 116 (S426).

The flow of the process of deleting a content which cannot be reproduced under copyright management from within the content processing apparatus 10 is described above. Now, a flow of a process of displaying a table of contents in a content reproduction apparatus 20 which performs copyright management of the group management method in such a manner that permission/inhibition of reproduction can be discriminated is described with reference to FIG. 35.

First at step S430, an instruction to display a table of contents in the content reproduction apparatus is issued (S430). In particular, the title list production section 512 issues a request for acquisition of content management information from the content reproduction apparatus 20 to the content management information acquisition section 508 in response to an instruction received through the inputting apparatus 108 from the user as described hereinabove. The title list production section 512 issues a request for decision of permission/inhibition of reproduction of the contents in the content reproduction apparatus 20 to the reproduction permission/inhibition decision section 172 based on the content management information acquired by the content management information acquisition section 508.

Then at step S431, the reproduction permission/inhibition decision section 172 acquires the source ID list L from the content reproduction apparatus 20 through the source ID list acquisition section 506 (S431). Thereafter, the reproduction permission/inhibition decision section 172 selects a content at the top of the display object contents designated by the title list production section 512 (S432). In particular, the reproduction permission/inhibition decision section 172 acquires more than one content ID from the title list production section 512 and acquires contents corresponding to the content IDs in the acquired order or an in an arbitrary order from the content reproduction apparatus 20 through the content acquisition section 504 (S432, S438).

The reproduction permission/inhibition decision section 172 having acquired the contents reads out, at step S433, the source ID applied to one of the acquired contents (S433). Thereafter, the reproduction permission/inhibition decision section 172 checks whether or not the read out source ID is included in the source ID list L (S434). Then, if the source ID is included in the source ID list L, then the processing advances to step S436, at which the reproduction permission/inhibition decision section 172 notifies the title list production section 512 that the content to which the source ID is applied can be reproduced. On the other hand, if the source ID is not included in the source ID list L at step S434, then the processing advances to step S435, at which the reproduction permission/inhibition decision section 172 notifies the title list production section 512 that the content to which the source ID is applied cannot be reproduced. The title list production section 512 displays based on the notification from the reproduction permission/inhibition decision section 172 that the content is a reproducible or non-reproducible content (S435, S436). The process described is performed for all of the object contents (S437).

It is to be noted that, if the source ID list L includes validity term information of the source ID, the reproduction permission/inhibition decision section 172 decides that the content to which the source ID whose term of validity has expired is applied cannot be reproduced.

The flow of the process of displaying a table of contents in the content reproduction apparatus 20 in such a manner that permission/inhibition of reproduction can be discriminated is described above. Now, a flow of a process of deleting a content, which cannot be reproduced under copyright management by a content reproduction apparatus 20 which performs copyright management of the group management type, from within the content reproduction apparatus 20 is described with reference to FIG. 36.

First, at step S440, for example, the "collective deletion" button would be depressed by the user (S440). When the button is depressed, the deletion section 516 issues a request to the reproduction permission/inhibition decision section 172 to decide permission/inhibition of reproduction of a content stored in the content reproduction apparatus 20. The reproduction permission/inhibition decision section 172 receiving the request first acquires, at step S441, the source ID list L of the content reproduction apparatus 20 through the source ID list acquisition section 506 (S441). Thereafter, the reproduction permission/inhibition decision section 172 successively reads out the contents from the content reproduction apparatus 20 through the content acquisition section 504 (S442, S447) and acquires the source ID applied to each of the contents (S443). Then, the reproduction permission/inhibition decision section 172 checks whether or not the acquired source ID is included in the source ID list L (S444). If the acquired source ID is not included in the source ID list L, then the reproduction permission/inhibition decision section 172 notifies the deletion section 516 that the content to which the source ID is applied cannot be reproduced. Then, the deletion section 516 deletes the content from the content reproduction apparatus 20 based on the notification (S445). The process described above is performed for all of the contents stored in the content reproduction apparatus 20 (446).

The flow of the process of deleting a content which cannot be reproduced under copyright management from within the content reproduction apparatus 20 is described above. Now, a flow of a process of causing a content in the content reproduction apparatus 20 to be reproduced from the content processing apparatus 10 is described with reference to FIG. 37.

First at step S450, the content reproduction apparatus 20 is connected to the content processing apparatus 10 (S450). If the user issues an instruction through the inputting apparatus 108 to display the contents in the content reproduction apparatus 20 in the form of a table (S451), then the content processing apparatus 10 acquires the source ID list L, content management information and contents from the content reproduction apparatus 20 (S452) and performs the process described hereinabove with reference to FIG. 35 to make a decision of permission/inhibition of reproduction of each content (S453). Then, the content processing apparatus 10 displays a title list in such a manner that reproducible contents and non-reproducible contents can be discriminated from each other (S454). The user would select a reproducible content from within the displayed title list (S455). At this time, the non-reproducible contents may be blocked against selection. When the user selects a content, the content processing apparatus 10 issues an instruction to the content reproduction apparatus 20 to reproduce the content (S456). Since the reproduction permission/inhibition decision based on the source ID and the source ID list L has been performed already, there is no necessity to perform it here again. The content reproduction apparatus 20 reproduces the designated content (S457).

The flow of the process of causing a content in the content reproduction apparatus 20 to be reproduced from the content processing apparatus 10 is described above. Now, a flow of a process of displaying a table of contents in a content reproduction apparatus 20 which performs copyright management of the check-in check-out type in such a manner that permission/inhibition of reproduction can be discriminated is described with reference to FIG. 38.

First, at step S460, an instruction to display a table of contents in the content reproduction apparatus is issued (S460). In particular, the title list production section 512 issues a request for acquisition of content management information from the content reproduction apparatus 20 to the content management information acquisition section 508 in response to an instruction received through the inputting apparatus 108 from the user as described hereinabove. The title list production section 512 issues a request for decision of permission/inhibition of reproduction of the contents in the content reproduction apparatus 20 to the reproduction permission/inhibition decision section 172 based on the content management information acquired by the content management information acquisition section 508.

Then at step S461, the reproduction permission/inhibition decision section 172 selects a content at the top of the display object contents designated by the title list production section 512 (S461). In particular, the reproduction permission/inhibition decision section 172 acquires more than one content ID from the title list production section 512 and acquires contents corresponding to the content IDs or addresses in the acquired order or in an arbitrary order from the content reproduction apparatus 20 through the content acquisition section 504 (S461, S468).

The reproduction permission/inhibition decision section 172 having acquired the contents reads out, at step S463, reproduction restriction information from a license included in each of the acquired contents (S463). Thereafter, the reproduction permission/inhibition decision section 172 decides based on the read out reproduction restriction information whether or not the content is reproducible. In particular, for example, where a reproduction-permission period is set to the reproduction restriction information as described hereinabove, the reproduction permission/inhibition decision section 172 compares the reproduction-permission period with the system time of the content processing apparatus 10 or the like to check whether or not the reproduction-permission period elapses (S464). If the reproduction-permission period does not elapse, then the processing advances to step S466 at which the reproduction permission/inhibition decision section 172 notifies the title list production section 512 that the content corresponding to the license can be reproduced. On the other hand, if the reproduction-permission period elapses, then the processing advances to step S465, at which the reproduction permission/inhibition decision section 172 notifies the title list production section 512 that the content corresponding to the license cannot be reproduced. The title list production section 512 displays based on the notification from the reproduction permission/inhibition decision section 172 that the content is a reproducible or non-reproducible content (S465, S466). The process described is performed for all of the object contents (S467).

The flow of the process of displaying a table of contents in the content reproduction apparatus 20 which performs copyright management of the check-in check-out type in such a manner that permission/inhibition of reproduction can be discriminated is described above. Now, examples of display of a title list to be displayed are described with reference to FIGS. 39 to 44.

Figure 39:
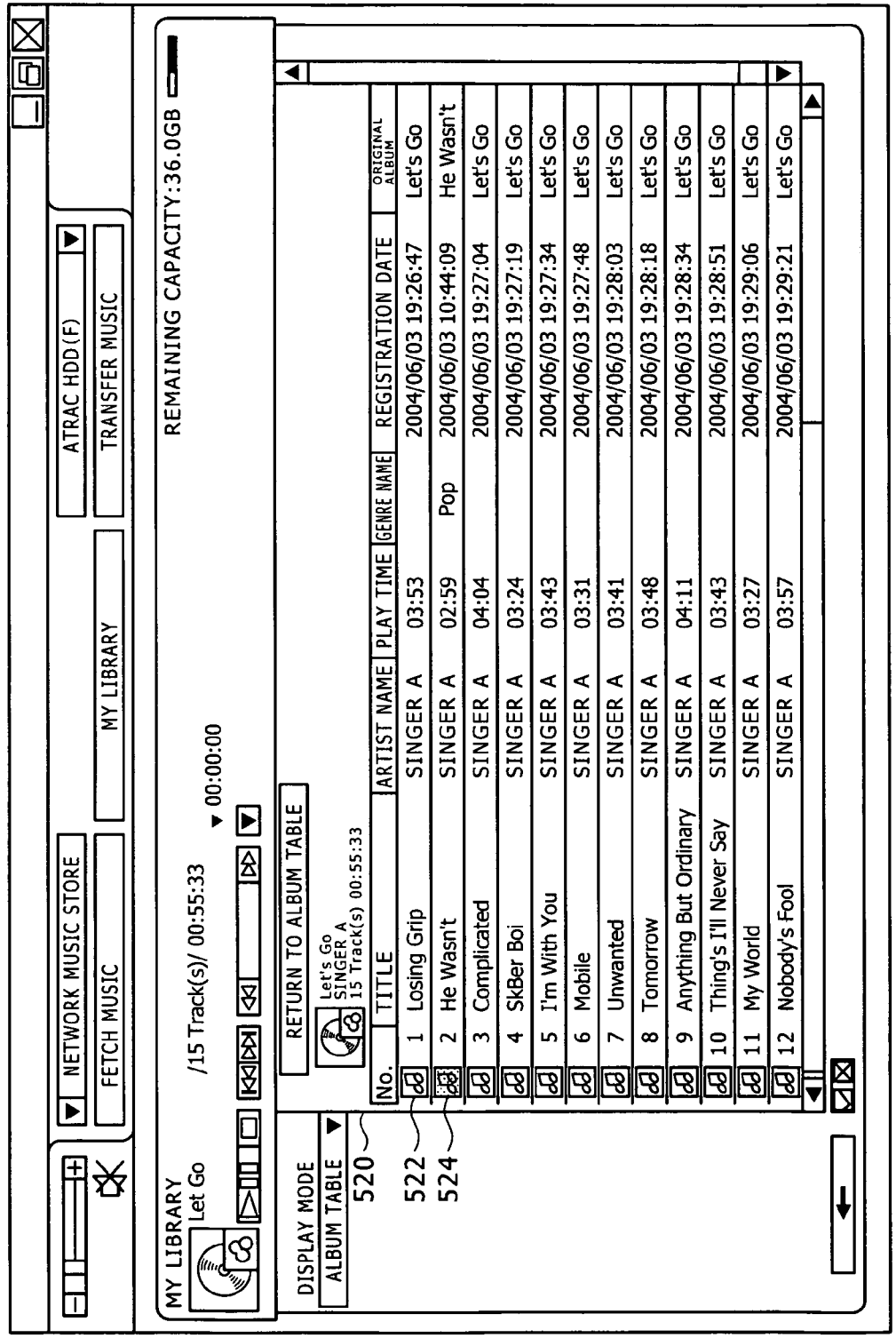
FIG. 39 is a screen layout showing a display example of a title list of contents in the content reproduction apparatus according to the embodiment.

FIG. 39 shows a display example of a title list of contents in the content processing apparatus 10. In the title list 520, a tune name, an artist name, play time, a genre and so forth are displayed as title information. Reproducible contents and non-reproducible contents are distinguished by icons displayed each at the top of the title information such that they are different in color, shape, size or the like as seen from a reproduction-permission icon 522 and a reproduction-inhibition icon 524 in FIG. 39.

Figure 40:
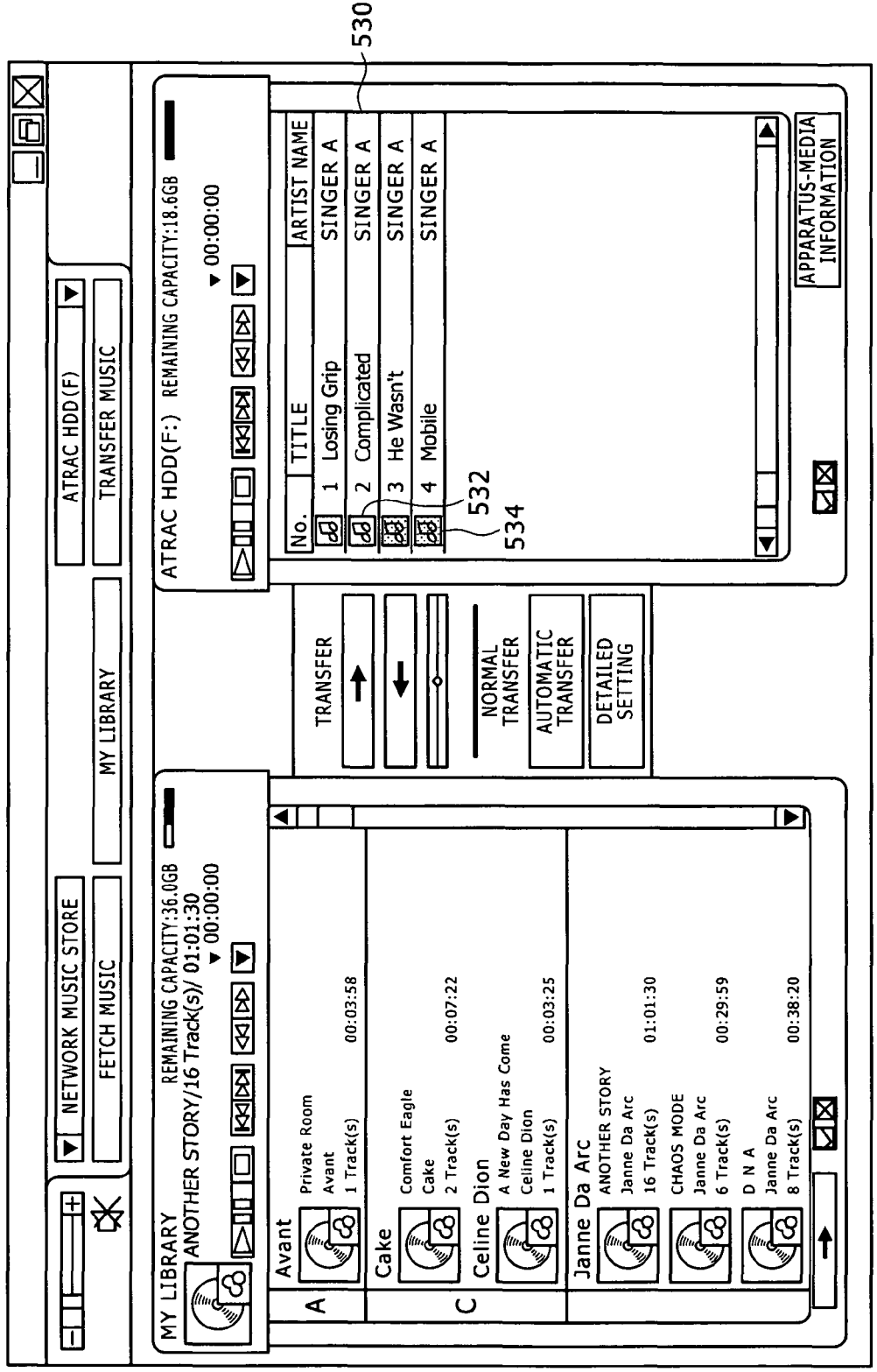
FIG. 40 is a screen layout showing another display example of a title list of contents in the content reproduction apparatus according to the embodiment.

FIG. 40 shows a display example of a title list of contents in the content reproduction apparatus 20. As shown in FIG. 40, it is possible to display a title list 530 of the content reproduction apparatus 20, for example, at part of a display screen. Reproducible contents and non-reproducible contents are distinguished by icons displayed each at the top of the title information such that they are different from each other as seen from a reproduction-permission icon 532 and a reproduction-inhibition icon 534 in FIG. 40.

Figure 41:
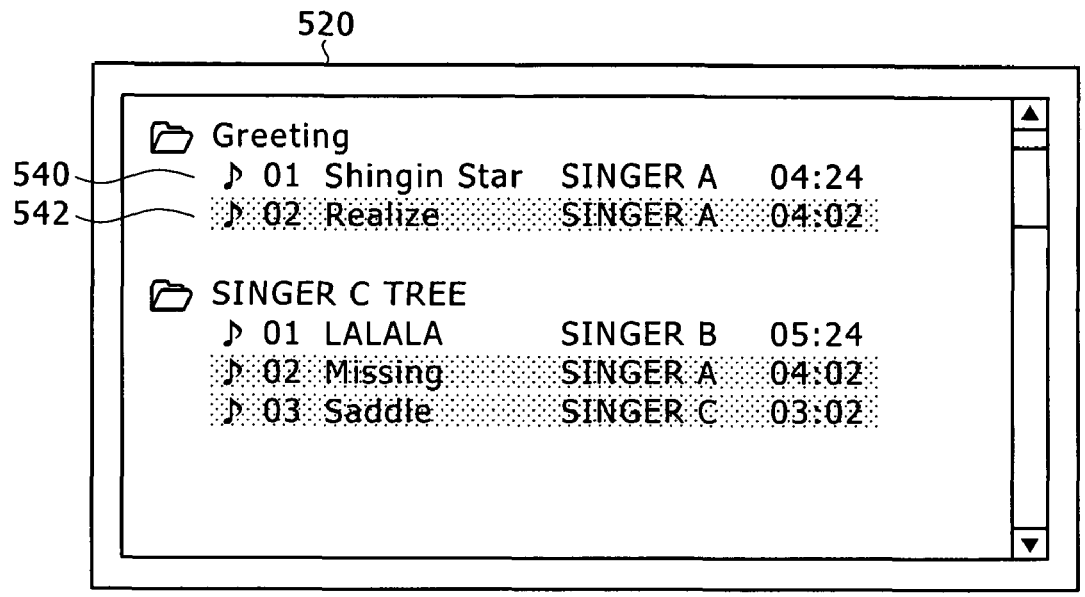
FIG. 41 is a screen layout showing another display example of the title list according to the embodiment.
Figure 42:
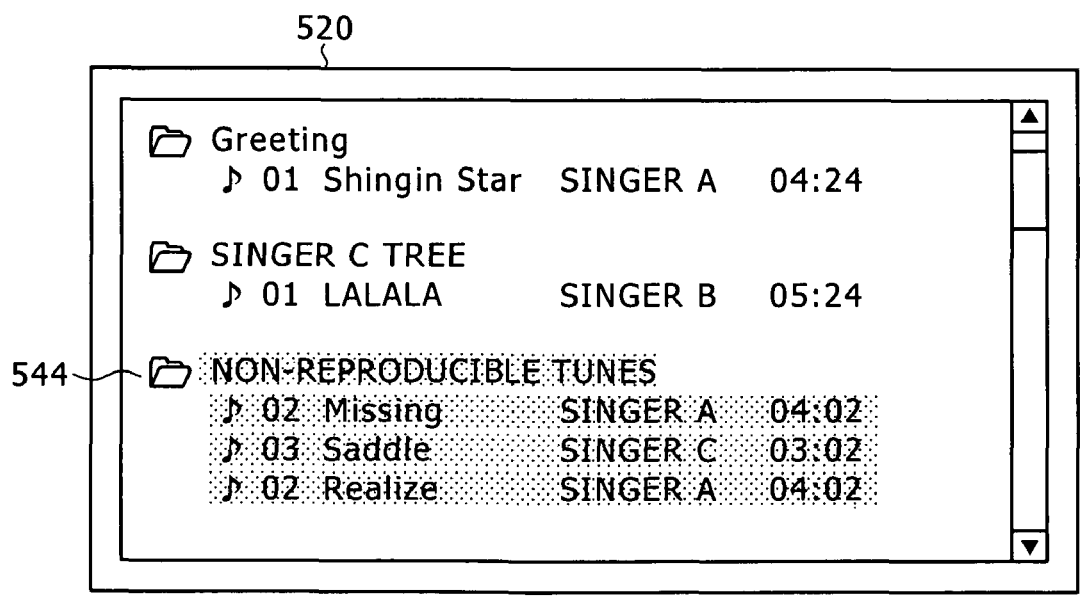
FIG. 42 is a screen layout showing a further display example of the title list according to the embodiment.
Figure 43:
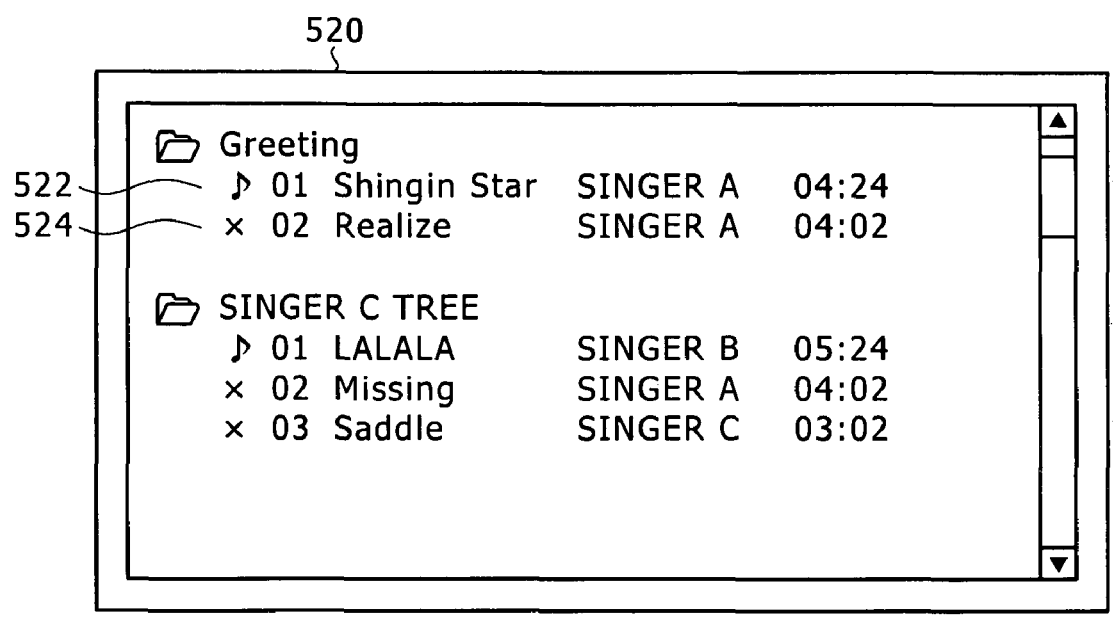
FIG. 43 is a screen layout showing a still further display example of the title list according to the embodiment.

FIGS. 41, 42 and 43 show different examples wherein reproducible contents and non-reproducible contents are displayed differently from each other. In FIG. 41, reproducible contents and non-reproducible contents are distinguished by being displayed in different colors or in different luminances. For example, since an area 540 in which title information of a reproducible content is displayed and another area 542 in which title information of a non-reproducible content is displayed are displayed in different colors or luminances as shown in FIG. 41, the user can identify reproducible contents and non-reproducible contents from each other. Further, according to such display as described above, where reproducible contents and non-reproducible contents exist in a mixed manner in one album, the user can recognize which content in the album is reproducible and which content is non-reproducible.

In FIG. 42, non-reproducible contents are distinguished by being displayed collectively. For example, where non-reproducible contents are displayed as non-reproducible tunes in a group as shown in FIG. 42, the user can distinguish reproducible contents and non-reproducible contents from each other. Further, according to the display just described, since non-reproducible contents in a content processing apparatus or a content reproduction apparatus are displayed collectively, the user can collectively confirm contents which cannot be reproduced by the content processing apparatus or the content reproduction apparatus.

In FIG. 43, reproducible contents and non-reproducible contents are distinguished from each other by icons different form each other similarly as in FIGS. 39 and 40.

Figure 44:
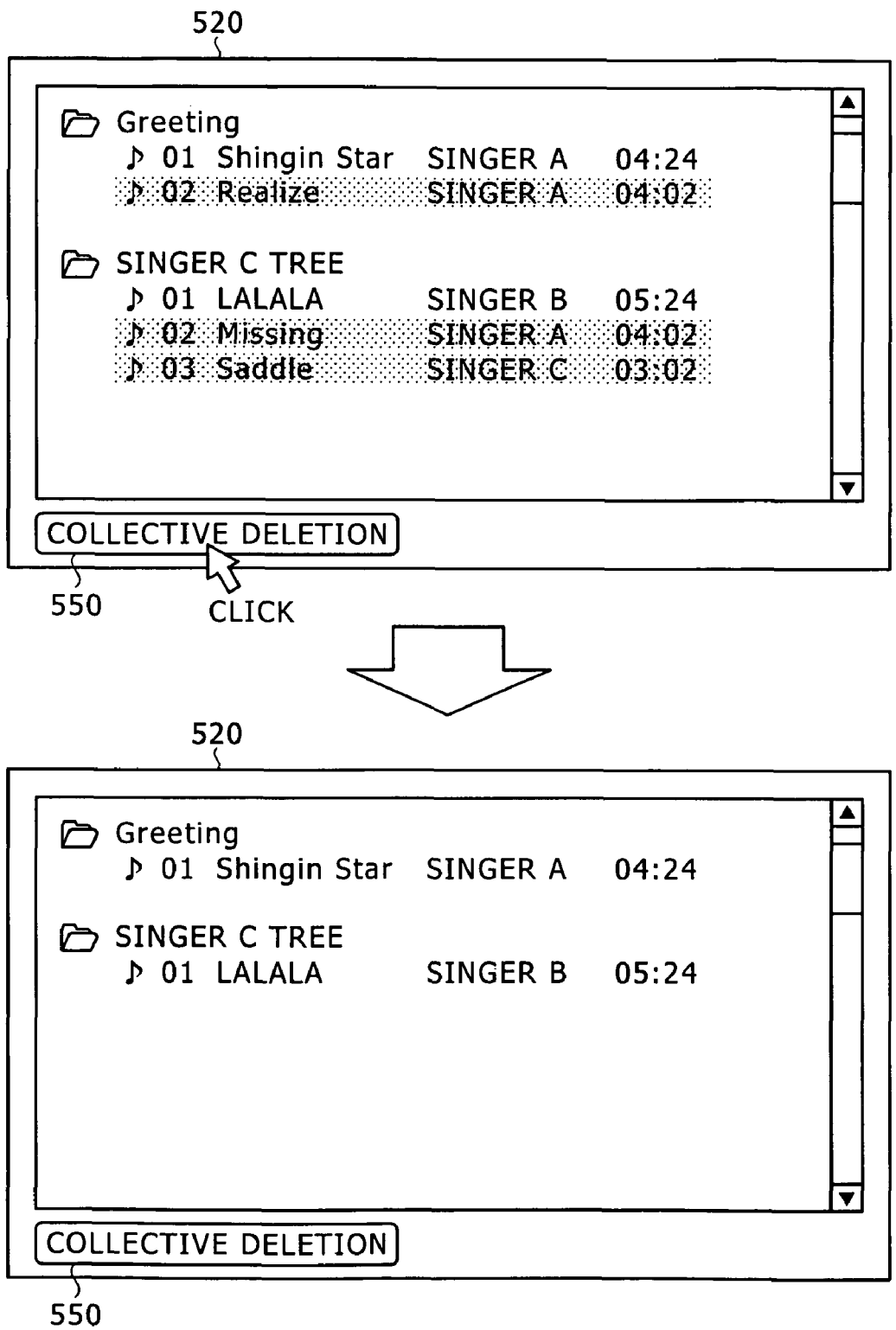
FIG. 44 is a screen layout showing a display example in a case wherein the deletion process of a reproduction-inhibited content is performed according to the embodiment.
Figure 45:
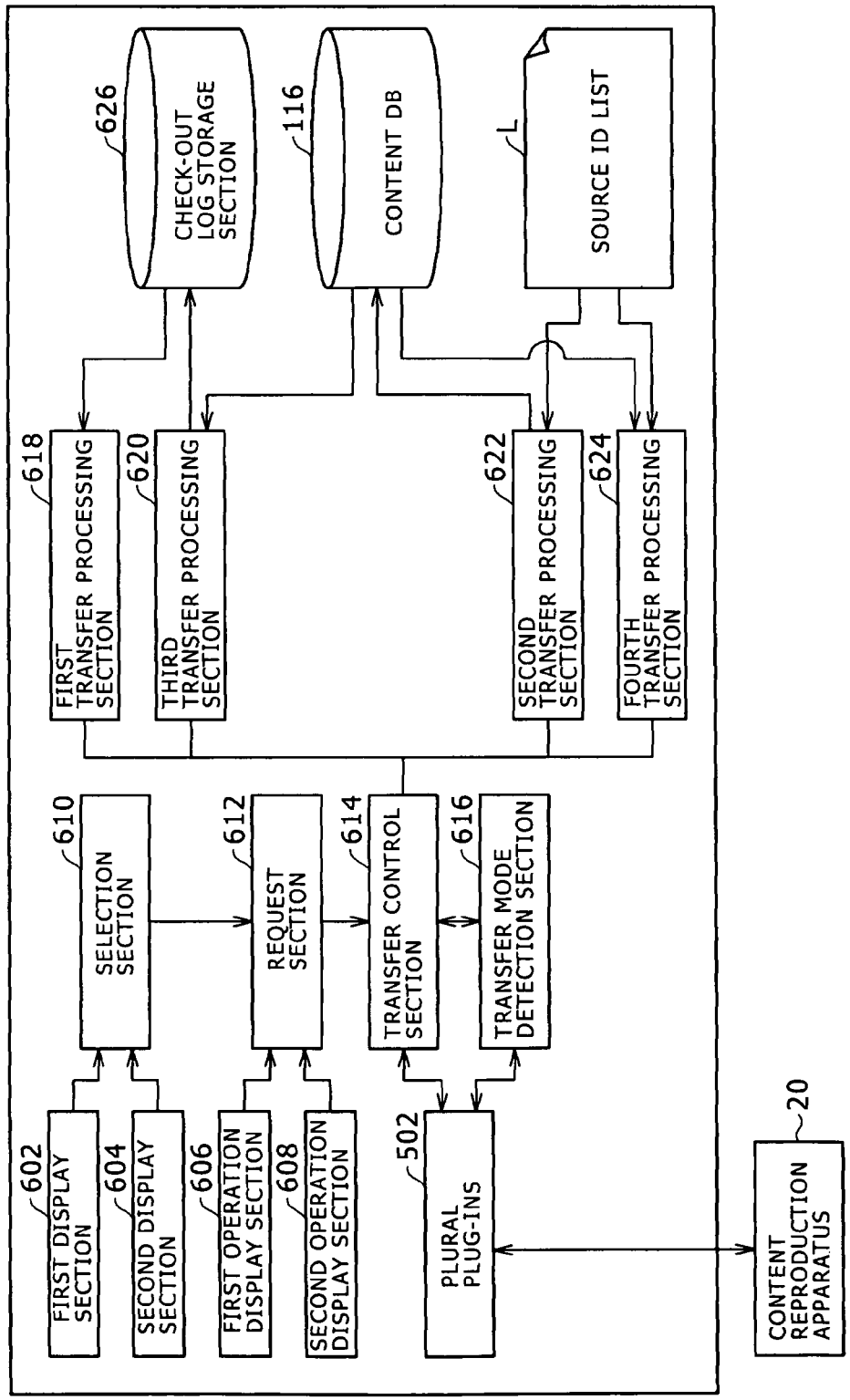
FIG. 45 is a block diagram showing a functional configuration of the content processing apparatus according to the embodiment.

FIG. 44 shows a display example of a screen where non-reproducible contents are deleted by an operation of a user. If the user depresses a collective deletion button 550 on the display using the inputting apparatus 108, then the non-reproducible contents are deleted from the content processing apparatus 10 or the content reproduction apparatus 20, and title information relating to the deleted contents disappears also from the title list 520 or 530 of the display screen.

The functional configuration, processing flows and screen display examples of the content processing apparatus 10 according to the present embodiment are described above. With the content processing apparatus 10 according to the present embodiment, since contents are displayed in such a manner that it can be discriminated whether or not the contents are reproducible in regard to the copyright, the user can recognize whether or not a content can be reproduced without actually reproducing the content. Further, since also title information of any non-reproducible content is displayed, the user can recognize information of those contents which cannot be reproduced.

<13. Content Transfer Method>

Now, a content transfer method of the content processing apparatus 10 according to the present embodiment is described with reference to FIGS. 45 to 53. The content processing apparatus 10 according to the present embodiment performs transfer to and from a content reproduction apparatus 20 connected to the content processing apparatus 10 in a corresponding form in response to the copyright management method of the content reproduction apparatus 20. In particular, where the content reproduction apparatus 20 performs copyright management of the group management type, the content processing apparatus 10 receives contents possessed by the content reproduction apparatus 20 from the content reproduction apparatus 20. Further, the content processing apparatus 10 transmits contents possessed by the content processing apparatus 10 itself to the content reproduction apparatus 20. On the other hand, where the content reproduction apparatus 20 performs copyright management of the check-in check-out type, the content processing apparatus 10 performs check-in and check-out from and to the content reproduction apparatus 20. In the following, a functional configuration of the content processing apparatus 10 for implementing the functions described above is described in detail.

In order to implement the functions, the content processing apparatus 10 further includes, for example, a first display section 602, a second display section 604, a first operation display section 606, a second operation display section 608, a plurality of plug-ins, a selection section 610, a requesting section 612, a transfer mode detection section 616, a transfer control section 614, a first transfer processing section 618, a second transfer processing section 622, a third transfer processing section 620, a fourth transfer processing section 624, a check-out log storage section 626 and so forth.

The first display section 602 has a function of causing title information of contents stored in the content reproduction apparatus 20 connected to the content processing apparatus 10 to be displayed on the display apparatus which is one of the outputting section provided in the content processing apparatus 10. The second display section 604 has a function of causing title information of contents stored in the content DB 116 of the content processing apparatus 10 to be displayed on the display apparatus. The first display section 602 and the second display section 604 can cause individual display objects on the same screen as in the case of a screen layout hereinafter described. Accordingly, the user can confirm both of the title information of the contents in the content processing apparatus 10 and the title information of the contents in the content reproduction apparatus 20 connected to the content processing apparatus 10 on the same screen.

The selection section 610 has a function of providing a content ID corresponding to title information designated through the inputting apparatus by the user from within the title information of the contents in the content processing apparatus 10 and the title information of the contents in the content reproduction apparatus 20 to the requesting section 612. In particular, the content ID corresponding to the title information designated by the user is searched for and found out from within the content management DB and provided to the requesting section 612.

The first operation display section 606 has a function of causing an operation section, which is provided to allow the user to perform a first operation, to be displayed on the display apparatus. The first operation is an operation of issuing an instruction to transfer a content from the content reproduction apparatus 20 to the content processing apparatus 10. The first operation display section 606 causes the display apparatus to display, for example, an icon or the like as an operation section and issues a notification that the operation is performed to the requesting section 612 when an operation through the inputting apparatus is performed for the operation section by the user such as clicking of the icon performed, for example, by means of the mouse by the user.

The second operation display section 608 has a function of causing an operation section, which is provided to allow the user to perform a second operation, to be displayed on the display apparatus. The second operation is an operation of issuing an instruction to transfer a content from the content processing apparatus 10 to the content reproduction apparatus 20. The second operation display section 608 causes the display apparatus to display, for example, an icon or the like as an operation section and issues a notification that the operation is performed to the requesting section 612 when an operation through the inputting apparatus is performed for the operation section by the user such as clicking of the icon performed, for example, by means of the mouse by the user.

The requesting section 612 acquires a content ID from the selection section 610 and receives the notification described hereinabove from the first operation display section 606, and issues a request to the transfer control section 614 to transfer a content corresponding to the content ID from the content reproduction apparatus 20 to the content processing apparatus 10. In particular, the requesting section 612 provides, for example, the content ID acquired from the selection section 610 and a flag or the like indicative of a transfer request from the content reproduction apparatus 20 to the content processing apparatus 10 to the transfer control section 614.

Further, when the notification described hereinabove is received from the second operation display section 608, the requesting section 612 issues a request to the transfer control section 614 to transfer a content corresponding to the content ID acquired from the selection section 610 from the content processing apparatus 10 to the content reproduction apparatus 20. In particular, the requesting section 612 provides, for example, the content ID acquired from the selection section 610 and a flag or the like indicative of a transfer request from the content processing apparatus 10 to the content reproduction apparatus 20 to the transfer control section 614.

The transfer control section 614 receives the transfer request of a content from the requesting section 612 and issues a request to the transfer mode detection section 616 to detect a transfer mode of the content reproduction apparatus 20 connected to the content processing apparatus 10. The transfer mode detection section 616 detects a plug-in module which is operating from among the plurality of plug-in modules and acquires a copyright management type set to the operating plug-in module. In particular, for example, if a file or the like in which identifiers of the plug-in modules and copyright management types set to the plug-in modules are associated with each other is stored in the storage apparatus of the content processing apparatus 10 in advance, then the transfer mode detection section 616 can acquire the copyright management type set to the operating plug-in module by referring to the file. The content reproduction apparatus 20 corresponding to the plug-in module performs copyright management of contents in accordance with the copyright management method set to the plug-in module. Accordingly, the transfer mode detection section 616 can determine whether the copyright management method of the content reproduction apparatus 20 connected to the content processing apparatus 10 is the group management type or the check-in check-out type by detecting the copyright management method set to the operating plug-in module.

The transfer control section 614 acquires a result of the detection from the transfer mode detection section 616 and causes one of the first transfer processing section 618, second transfer processing section 622, third transfer processing section 620 and fourth transfer processing section 624 to perform a transfer process in response to the detection result and a request from the requesting section 612.

If the notification from the requesting section 612 is transfer of the content from the content reproduction apparatus 20 to the content processing apparatus 10 and besides the detection result of the transfer mode detection section 616 is the check-in check-out type (first mode), then the transfer control section 614 causes the first transfer processing section 618 to perform the transfer process.

If the notification from the requesting section 612 is transfer of the content from the content processing apparatus 10 to the content reproduction apparatus 20 and besides the detection result of the transfer mode detection section 616 is the check-in check-out type, the transfer control section 614 causes the third transfer processing section 620 to perform the transfer process.

If the notification from the requesting section 612 is transfer of the content from the content reproduction apparatus 20 to the content processing apparatus 10 and besides the detection result of the transfer mode detection section 616 is the group management type (second mode), then the transfer control section 614 causes the second transfer processing section 622 to perform the transfer process.

If the notification from the requesting section 612 is transfer of the content from the content processing apparatus 10 to the content reproduction apparatus 20 and besides the detection result of the transfer mode detection section 616 is the group management type, the transfer control section 614 causes the fourth transfer processing section 624 to perform the transfer process. The transfer processing of each transfer processing section is described below.

The third transfer processing section 620 performs a check-out process of a content from the content processing apparatus 10 to the content reproduction apparatus 20. The check-out process is a process of restricting the right of the content processing apparatus 10 with which the content processing apparatus 10 can, instead of transferring a copy of a content possessed in the content DB 116 thereof from the content processing apparatus 10 to the content reproduction apparatus 20 with a license, in which right information with regard to the copy of the content is set, applied thereto, transfer the content to a different information processing apparatus.

The third transfer processing section 620 acquires a content ID from the transfer control section 614 and searches the content DB 116 for a content corresponding to the content ID. The third transfer processing section 620 refers to the remaining check-out time number set to the license applied to the content. If the remaining check-out time number is greater than 0, then the third transfer processing section 620 can check out the content. Therefore, the third transfer processing section 620 produces a copy and a license of the content and applies the produced license to the content produced and then transmits the content to the content reproduction apparatus 20 through the transfer control section 614. The third transfer processing section 620 performs a process of decrementing the remaining check-out time number set to the license of the content stored in the content DB 116 which is the copying source of the content transmitted to the content reproduction apparatus 20. Further, the third transfer processing section 620 acquires the device ID set to the content reproduction apparatus 20 which is a transmission destination of the content through the transfer control section 614 and stores the content ID of the transmitted content and the device ID described hereinabove in an associated relationship as a check-out log into the check-out log storage section 626.

The first transfer processing section 618 performs a check-in process of a content from the content reproduction apparatus 20 to the content processing apparatus 10. The check-in process is a process of depriving the content reproduction apparatus 20 of a right of reproducing a content checked out in such a manner as described hereinabove to the content reproduction apparatus 20 and instead causing the content processing apparatus 10 to recover a right of being capable of checking out the content to another information processing apparatus.

The first transfer processing section 618 acquires a content ID from the transfer control section 614. Further, the first transfer processing section 618 acquires a device ID of the content reproduction apparatus 20 from the content reproduction apparatus 20 through the transfer control section 614. The first transfer processing section 618 searches the check-out log storage section 626 for a check-out log in which the content ID and the device ID are associated with each other based on the acquired content ID and device ID. If a result of the search reveals that the pertaining check-out log is stored in the check-out log storage section 626, then it is determined that the content corresponding to the content ID is a content checked out from the content processing apparatus 10 to the content reproduction apparatus 20. In this instance, the first transfer processing section 618 performs a check-in process of the content. In particular, the first transfer processing section 618 transmits a request to delete the license applied to the content corresponding to the content ID from the content reproduction apparatus 20 to the content reproduction apparatus 20 to cause the content reproduction apparatus 20 to delete the pertaining license. Also the content corresponding to the content ID may be deleted similarly. Further, the third transfer processing section 620 performs a process of searching the content DB 116 of the content processing apparatus 10 for a content corresponding to the content ID acquired from the transfer control section 614 and increasing the check-out remaining time number set to the license applied to the content. Further, the third transfer processing section 620 deletes the check-out log searched out as described above from the check-out log storage section 626.

The second transfer processing section 622 performs a transfer process of a content from the content reproduction apparatus 20 to the content processing apparatus 10. In particular, the second transfer processing section 622 acquires the source ID list L (second source ID list L) possessed by the content reproduction apparatus 20 from the content reproduction apparatus 20 through the transfer control section 614. Further, the second transfer processing section 622 reads out the group ID from the source ID list L (first source ID list L) of the content processing apparatus 10 and reads out the group ID from the acquired second source ID list L to check whether or not the two IDs coincide with each other. If the two IDs coincide with each other, then since the content processing apparatus 10 and the content reproduction apparatus 20 are registered in the same group in the management server, transfer of the content from the content reproduction apparatus 20 to the content processing apparatus 10 is permitted. Accordingly, when the group IDs included in the first source ID list L and the second source ID list L coincide with each other, the second transfer processing section 622 issues a request to the content reproduction apparatus 20 to transfer the content corresponding to the content ID through the transfer control section 614 and stores the pertaining content transferred thereto into the content DB 116. It is to be noted that, where a plurality of group IDs are included in the first source ID list L or the second source ID list L, transfer is permitted if one of the plural group IDs included in the first source ID list L is included as a group ID in the second source ID list L. Further, in order to prevent the same content from being stored in an overlapping relationship into the content DB 116, before the second transfer processing section 622 issues a request for transfer of a content to the content reproduction apparatus 20, it may acquire the content ID from the transfer control section 614 and search the content DB 116 to decide whether or not the content corresponding to the content ID is stored in the content DB 116 and then issue a request for transfer only if the content corresponding to the content ID is not accommodated in the content DB 116.

The fourth transfer processing section 624 performs a transfer process of a content from the content processing apparatus 10 to the content reproduction apparatus 20. In particular, the fourth transfer processing section 624 acquires the source ID list L (second source ID list L) possessed by the content reproduction apparatus 20 from the content reproduction apparatus 20 through the transfer control section 614. Meanwhile, the second transfer processing section 622 acquires the content ID of the content of an object of transfer from the transfer control section 614 and searches the content DB 116 for a content corresponding to the content ID. The second transfer processing section 622 acquires the source ID applied to the searched out content and checks whether or not the acquired source ID is included in the source ID list L (second source ID list L) acquired from the content reproduction apparatus 20. If a result of the check proves that the acquired source ID is included in the source ID list L (second source ID list L), then since the content to which the source ID is applied can be reproduced by the content reproduction apparatus 20, the fourth transfer processing section 624 transfers the content to the content reproduction apparatus 20 through the transfer control section 614. It is to be noted that the fourth transfer processing section 624 may produce and transfer a copy of the content.

The functional configuration of the content processing apparatus 10 is described above. Now, a flow of transfer or check-in of a content from the content reproduction apparatus 20 to the content processing apparatus 10 is described with reference to FIGS. 46 to 49.

Figure 46:
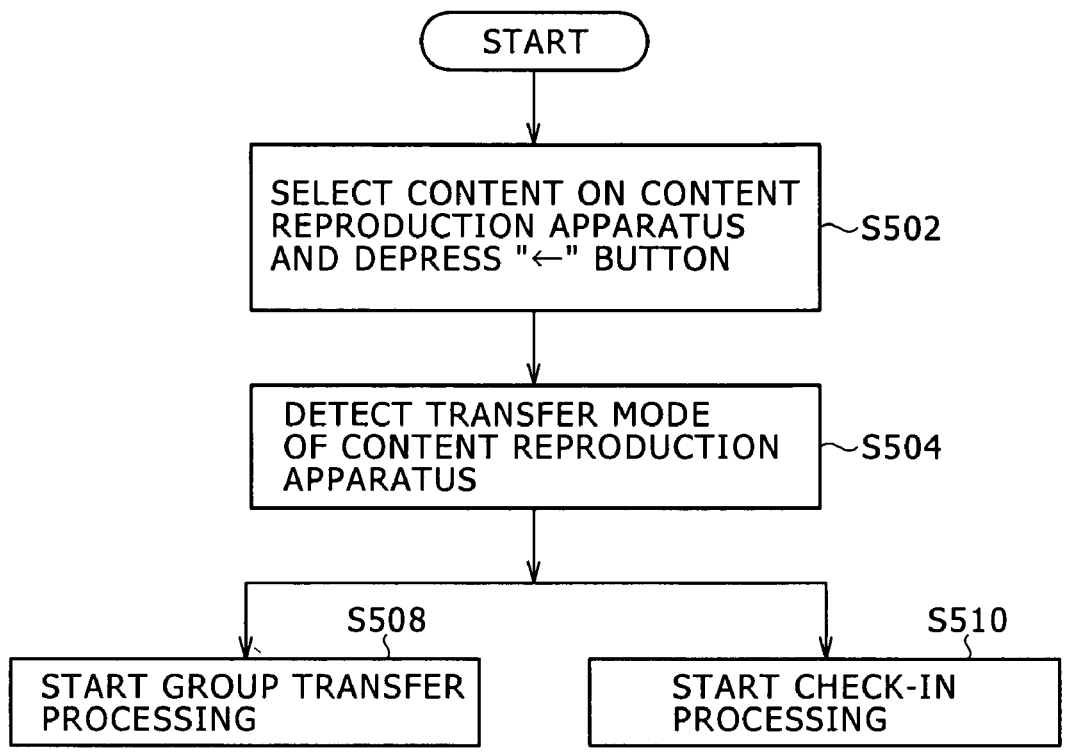
FIG. 46 is a flow chart illustrating a content transfer process from the content reproduction apparatus to the content processing apparatus according to the embodiment.
Figure 47:
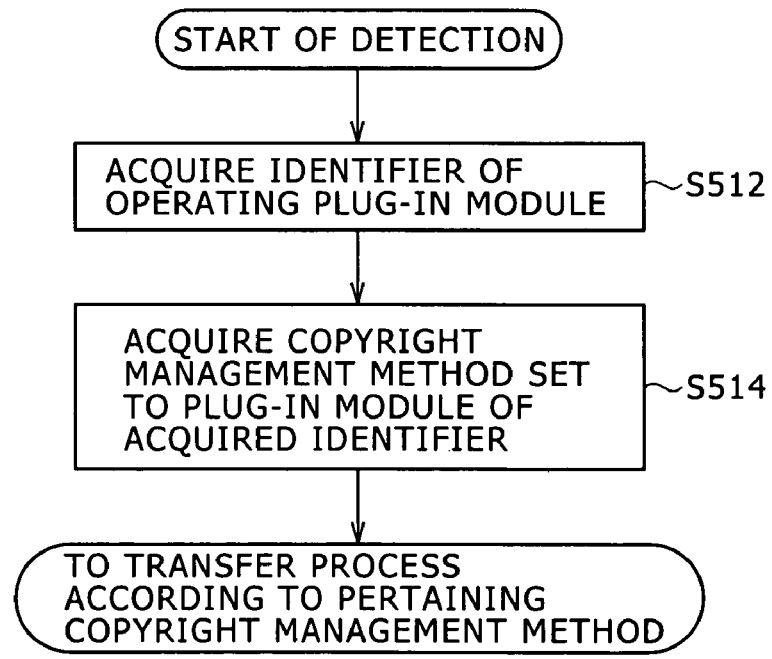
FIG. 47 is a flow chart illustrating a transfer mode decision process of the content reproduction apparatus according to the embodiment.

First, at step S502 of FIG. 46, the user would select title information of a desired content from within title information of contents in the content reproduction apparatus 20 displayed on the display section of the content processing apparatus 10 and depress a "←" button (S502). The depression of the "←" button is an example of an operation. As the "←" button is depressed through the inputting apparatus, a transfer request of the selected content from the content reproduction apparatus 20 to the content processing apparatus 10 is generated in the content processing apparatus 10.

Then at step S504, the content processing apparatus 10 detects the transfer mode of the content reproduction apparatus 20 (S504). The detection process is described in detail with reference to FIG. 47. First, at step S512, the content processing apparatus 10 acquires the identifier of an operating one of the plug-in modules (S512). Then, the content processing apparatus 10 acquires the copyright management type set to the operating plug-in module based on the acquired identifier (S514). In particular, for example, the content processing apparatus 10 performs such an operation as referring to a file in which identifiers and copyright management types are associated with each other in advance as described hereinabove to acquire the copyright management type set to the plug-in module.

Referring back to FIG. 46, after the content processing apparatus 10 acquires the transfer mode (copyright management type) of the content reproduction apparatus 20 at step S504, if the transfer mode is the group management type, then the processing advances to step S508, at which the content processing apparatus 10 starts a transfer process according to the group management method (S508). On the other hand, if the transfer mode is the check-in check-out type, then the processing advances to step S510, at which the content processing apparatus 10 starts a check-in check-out process (S510).

Figure 48:
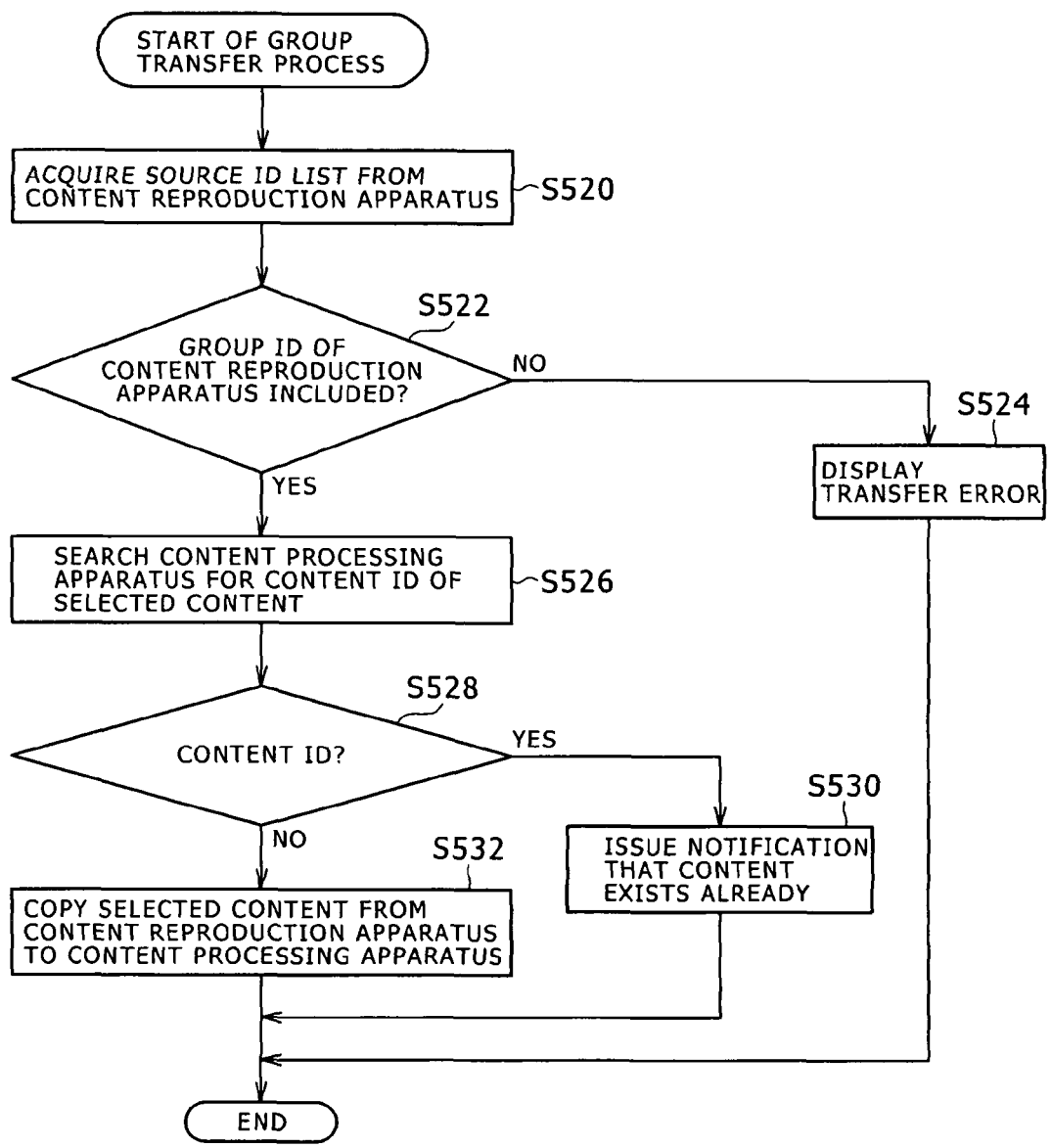
FIG. 48 is a flow chart illustrating a content transfer process from the content reproduction apparatus to the content processing apparatus in the group management type according to the embodiment.

A flow of a transfer process of a content from the content reproduction apparatus 20 to the content processing apparatus 10 by the group management method is described with reference to FIG. 48.

First, at step S520, the content processing apparatus 10 acquires the source ID list L (second source ID list L) from the content reproduction apparatus 20 (S520). Thereafter, the content processing apparatus 10 acquires the group ID from the source ID list L (first source ID list L) of the content processing apparatus 10 and checks whether or not the group ID is included in the second source ID list L (S522). If a result of the check reveals that the group ID is not included in the second source ID list L, then the content processing apparatus 10 displays an error message that the content cannot be transferred (S524). On the other hand, if the group ID is included in the second source ID list L, then the content processing apparatus 10 checks based on the content ID of the content selected by the user whether or not the content processing apparatus 10 possesses the content of an object of transfer already (S526). If a result of the check reveals that the content processing apparatus 10 possesses the content of an object of transfer already (S528), then the content processing apparatus 10 notifies the user by displaying a message that the content exists in the content processing apparatus 10 already or by some other means (S530).

On the other hand, if the content processing apparatus 10 does not possess the content of an object of transfer (S528), the content processing apparatus 10 causes the content to be transferred from the content reproduction apparatus 20 to the content processing apparatus 10 (S532).

Figure 49:
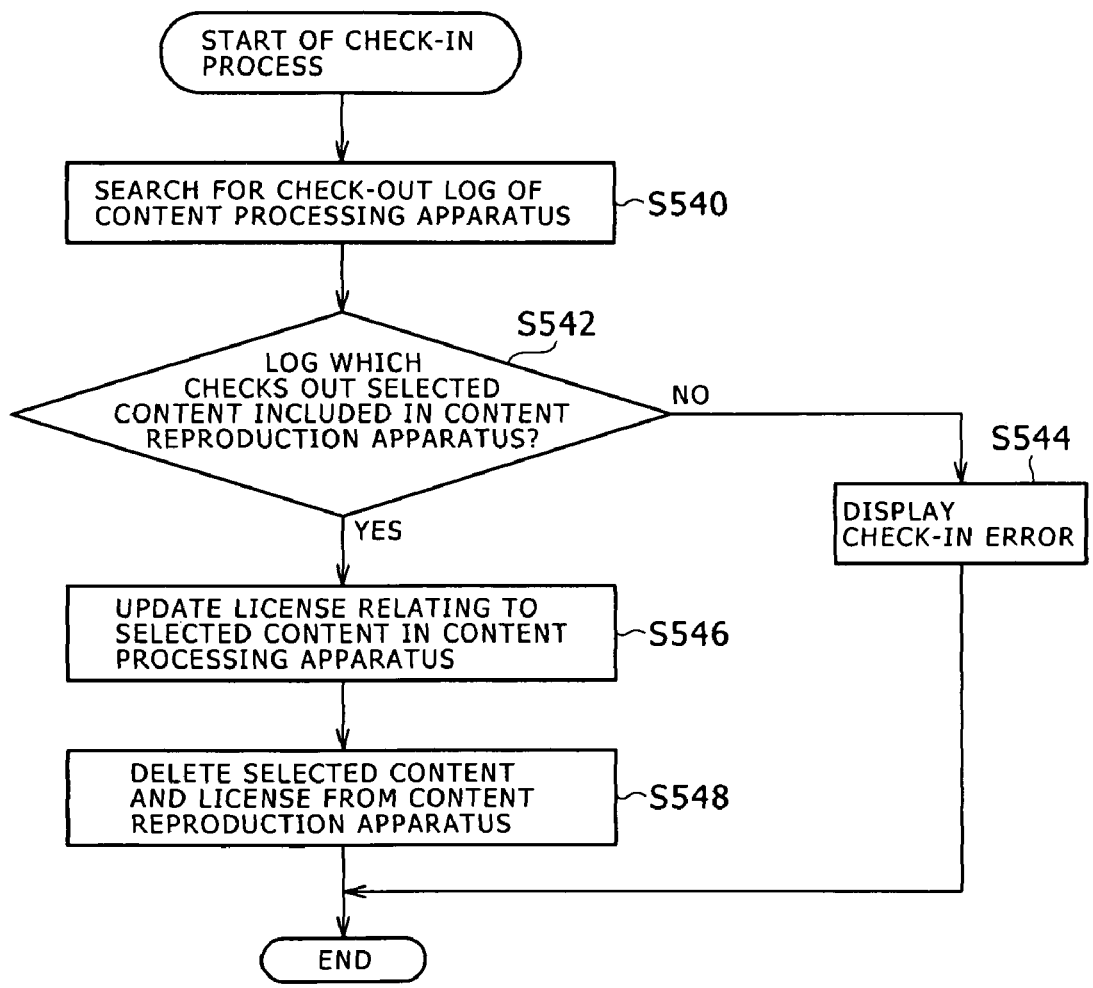
FIG. 49 is a flow chart illustrating a check-in process from the content reproduction apparatus to the content processing apparatus in the check-in check-out apparatus according to the embodiment.

Now, a transfer process (check-in process) of a content from the content reproduction apparatus 20 to the content processing apparatus 10 according to the check-in check-out method is described with reference to FIG. 49.

First, at step S540, the content processing apparatus 10 searches for a check-out log based on the content ID of the content of an object of transfer and the device ID of the content reproduction apparatus 20 as described hereinabove (S540) to check whether or not a log in which the content has been checked out to the content reproduction apparatus 20 exists. If a result of the check reveals that the pertaining check-out log does not exist (S542), then the content processing apparatus 10 displays an error message that the content cannot be checked in such as "This content is not a content checked out from the content processing apparatus" (S544).

On the other hand, if the pertaining check-out log exists (S542), then the content processing apparatus 10 increments the remaining check-out time number set to the license applied to the content in the content processing apparatus 10 corresponding to the content ID of the content of the check-in object by one (S546). Thereafter, the content processing apparatus 10 deletes the content of the check-in object and the license applied to the content from the content reproduction apparatus 20 (S548). It is to be noted that the order of the step S546 and the step S548 may be reversed.

The flow of transfer or check-in of a content from the content reproduction apparatus 20 to the content processing apparatus 10 is described above. Now, a flow of transfer or check-out of a content from the content processing apparatus 10 to the content reproduction apparatus 20 is described with reference to FIGS. 50 to 52.

Figure 50:
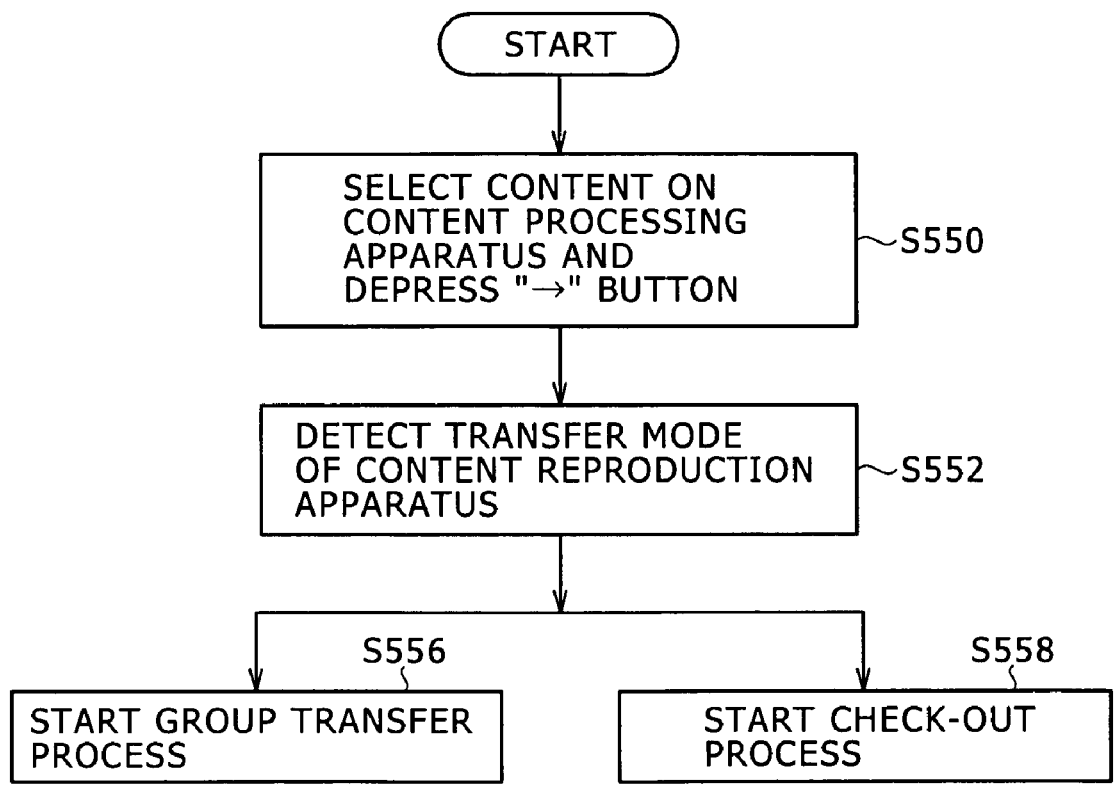
FIG. 50 is a flow chart illustrating a content transfer process from the content processing apparatus to the content reproduction apparatus according to the embodiment.

First at step S550 of FIG. 50, the user would select title information of a desired content from within title information of contents in the content processing apparatus 10 displayed on the display section of the content processing apparatus 10 and depress a "→" button (S550). The "→" button is an example of an operation element. As the "→" button is depressed through the inputting apparatus, a transfer request of the selected content from the content processing apparatus 10 to the content reproduction apparatus 20 is generated in the content processing apparatus 10.

Then at step S552, the content processing apparatus 10 detects the transfer mode of the content reproduction apparatus 20 (S552). The detection process is similar to the process described above with reference to FIG. 47. If a result of the detection proves that the transfer mode is the group management type, then the processing advances to step S556, at which the content processing apparatus 10 starts a transfer process according to the group management method (S556). On the other hand, if the transfer mode is the check-in check-out type, then the processing advances to step S558, at which the content processing apparatus 10 starts a check-in check-out process (S558).

Figure 51:
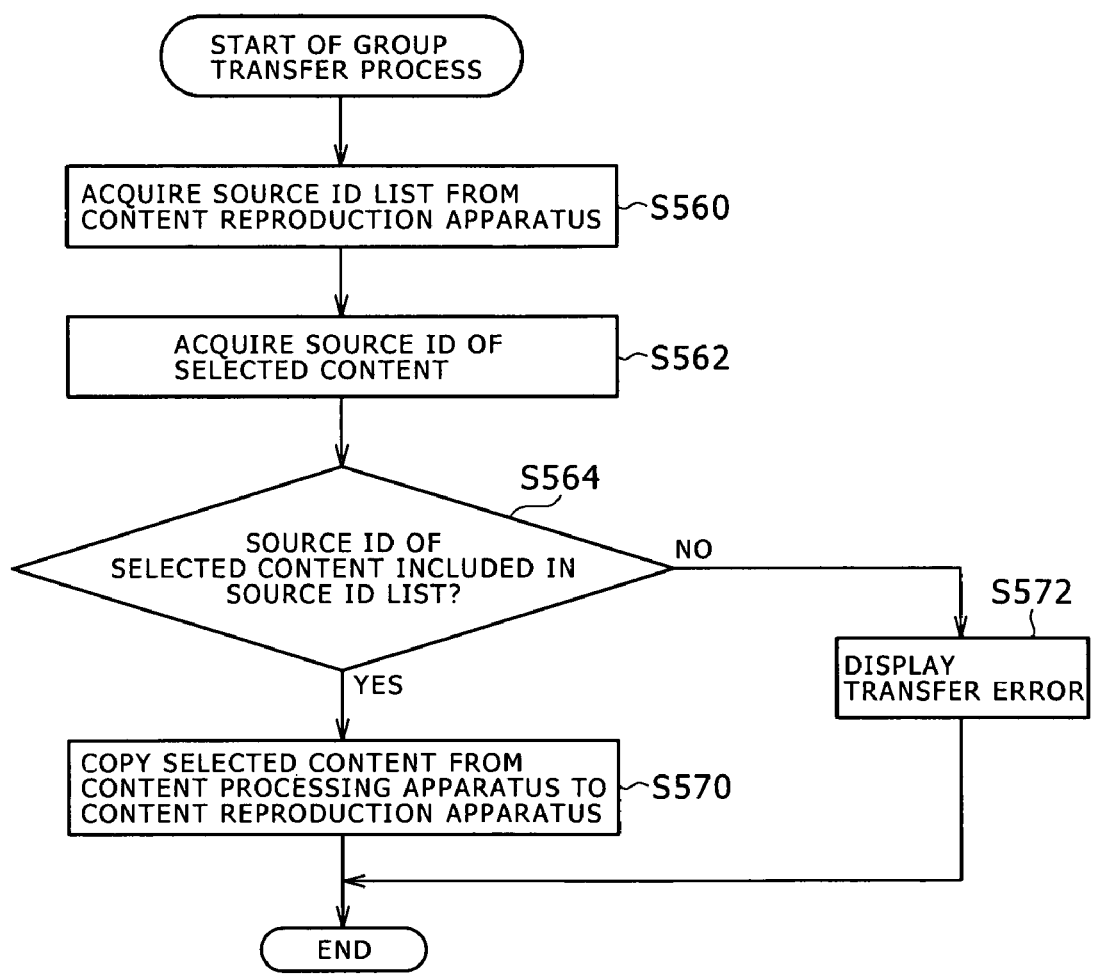
FIG. 51 is a flow chart illustrating a content transfer process from the content processing apparatus to the content reproduction apparatus in the group management method according to the embodiment.

A flow of a transfer process of a content from the content processing apparatus 10 to the content reproduction apparatus 20 according to the group management method is described with reference to FIG. 51.

First, at step S560, the content processing apparatus 10 acquires the source ID list L (second source ID list L) from the content reproduction apparatus 20 (S560). Thereafter, the content processing apparatus 10 acquires the source ID applied to the content selected by the user (S562) and checks whether or not the source ID is included in the second source ID list L (S564). If the source ID is not included in the second source ID list L, then the content processing apparatus 10 displays an error message that the content is not to be transferred such as "This content cannot be reproduced by the content reproduction apparatus" (S572). On the other hand, if the source ID is included in the second source ID list L, then the content processing apparatus 10 transfers the content of the object of transfer from the content processing apparatus 10 to the content reproduction apparatus 20 (S570).

Figure 52:
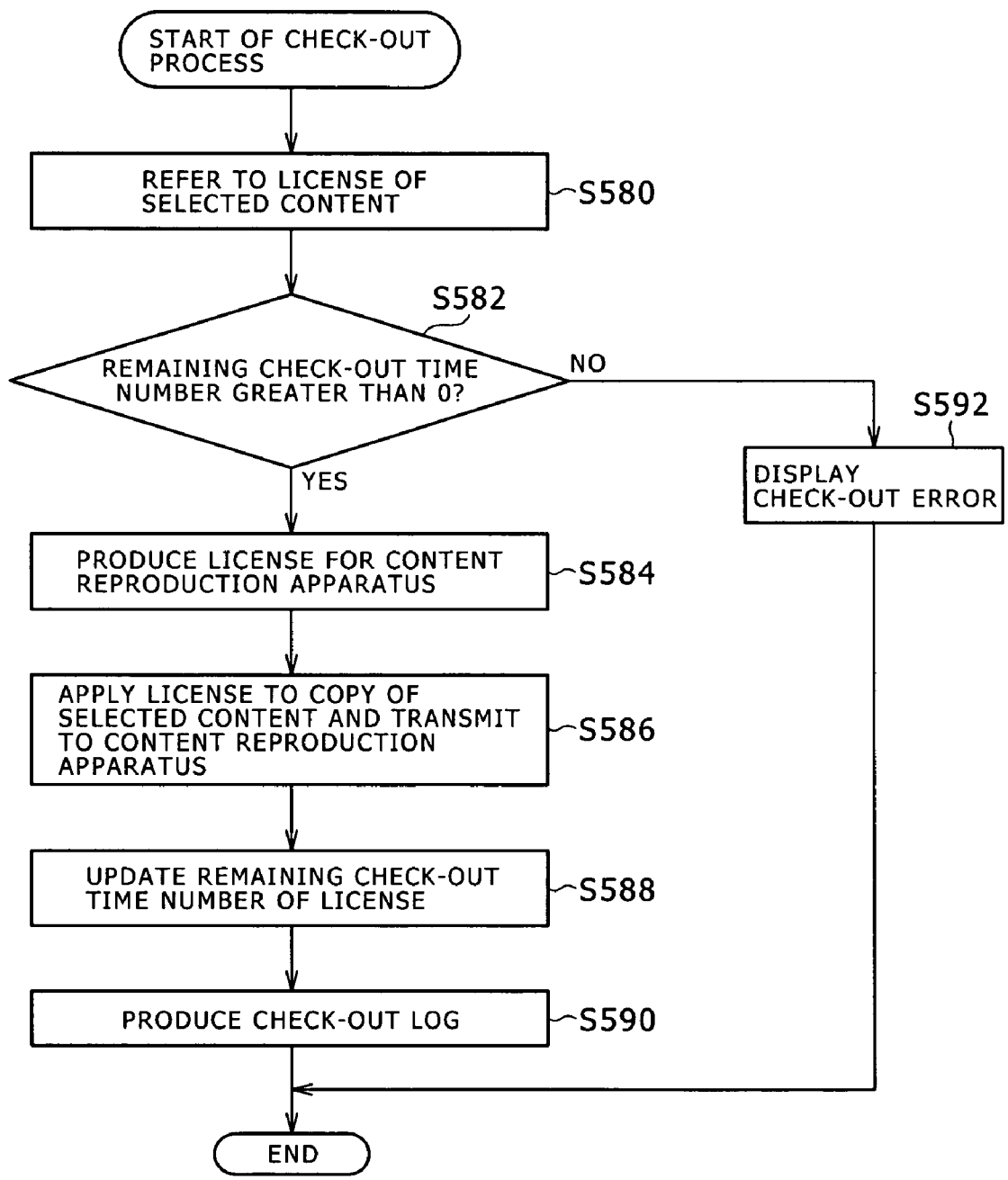
FIG. 52 is a flow chart illustrating a check-out process from the content processing apparatus to the content reproduction apparatus in a check-in check-out method according to the embodiment.
Figure 53:
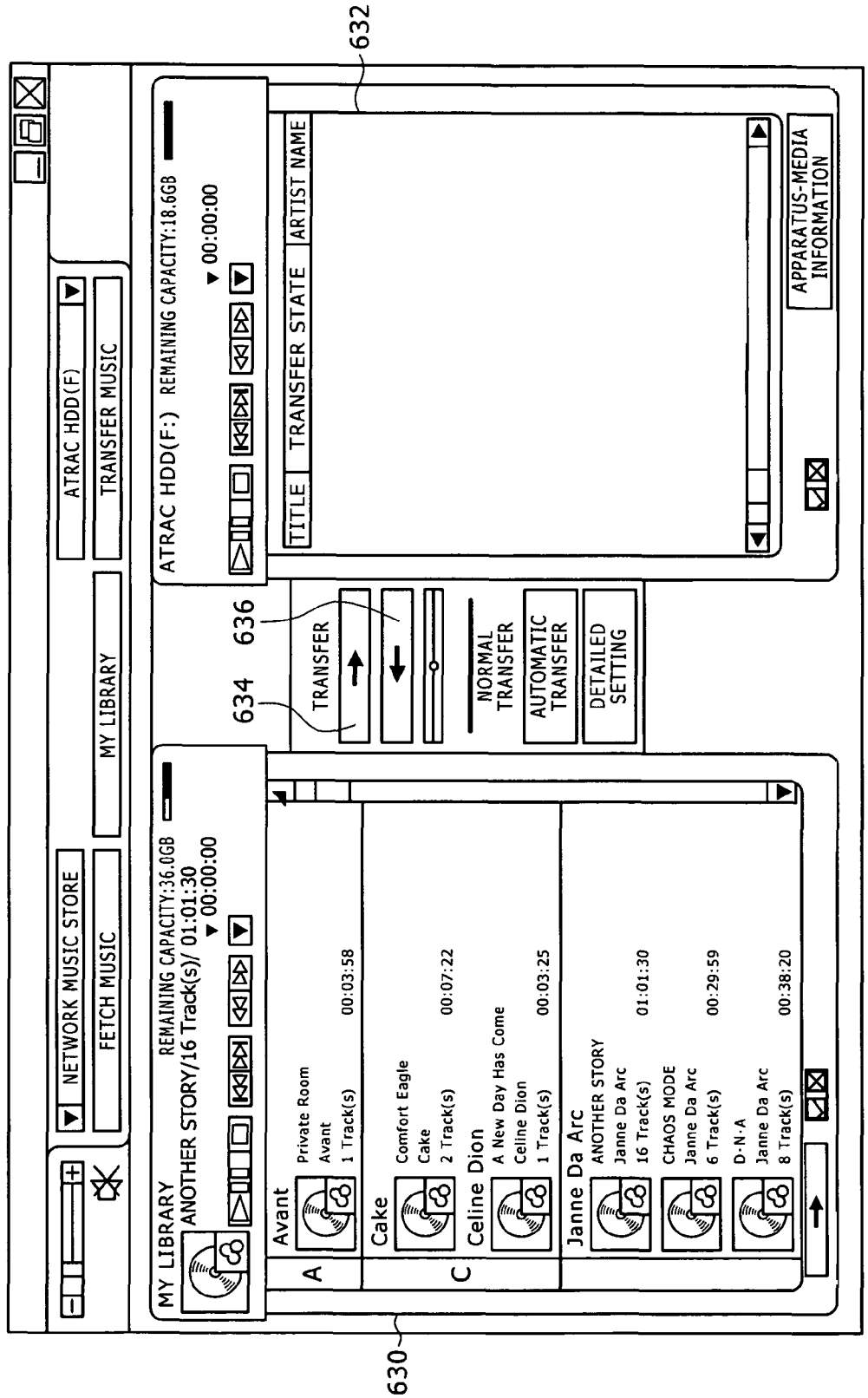
FIG. 53 is a screen layout of a screen displayed in order to cause a user to perform transfer of a content according to the embodiment.

Now, a transfer process (check-out process) of a content from the content processing apparatus 10 to the content reproduction apparatus 20 according to the check-in check-out method is described with reference to FIG. 52.

First, at step S580, the content processing apparatus 10 refers to the license applied to a selected transfer object content in the content processing apparatus 10 (S580). If the remaining check-out time number set to the license is 0 (S582), then the content processing apparatus 10 displays an error message that the transfer object content cannot be checked out (S592). On the other hand, if the remaining check-out time number is greater than 0, then the content processing apparatus 10 produces a license wherein reproduction restriction information of the content in the content reproduction apparatus 20 or the like is set (S584). Then, the content processing apparatus 10 applies the produced license to the copy of the content and transmits the copy of the content to the content reproduction apparatus 20 (S586).

Thereafter, the content processing apparatus 10 decrements the check-out time number set to the license applied to the content in the content processing apparatus 10 which is the copying source of the content transmitted to the content reproduction apparatus 20 by one (S588). Then, the content processing apparatus 10 produces a check-out log in which the content ID of the content whose check-out has been performed and the device ID of the content reproduction apparatus 20 of the check-out destination are associated with each other (S590).

The flow of the transfer of the check-out of a content from the content processing apparatus 10 to the content reproduction apparatus 20 is described above. Now, an example of a screen layout displayed on the display unit of the content processing apparatus 10 according to the present embodiment is described.

A title list 630 is an example of title information of contents in the content processing apparatus 10 displayed by the second display section 604. Another title list 632 is an example of title information of contents in the content reproduction apparatus 20 displayed by the first display section 602.

A "→" button 634 is an example of an operation element displayed by the second operation display section 608. A "←" button 636 is an example of an operation element displayed by the first operation display section 606.

The user can perform transfer of a desired content from the content processing apparatus 10 to the content reproduction apparatus 20 by selecting a desired title from within the title list 630 and depressing the "→" button 634. Thereupon, transfer of the content according to the group management method or check-out of the content according to the check-in check-out method is performed selectively in response to the copyright management method of the content reproduction apparatus 20 which is the transfer destination.

Further, the user can perform transfer of a desired content from the content reproduction apparatus 20 to the content processing apparatus 10 by selecting a desired title from within the title list 632 and depressing the "←" button 636. Thereupon, transfer of the content according to the group management method or check-in of the content according to the check-in check-out method is performed selectively in response to the copyright management method of the content reproduction apparatus 20 which is the transfer source.

An example of the screen layout to be displayed on the display apparatus of the content processing apparatus 10 is described above.

In the foregoing description, the structural configuration, processing flows and screen display example of the content processing apparatus 10 according to the present embodiment are described above. With the content processing apparatus 10 according to the present embodiment, a content can be transferred in response to a copyright management method of the content reproduction apparatus 20 connected to the content processing apparatus 10 in accordance with a method corresponding to the copyright management method. Further, even if an operation is performed for the same operation element, since the content processing apparatus 10 detects the copyright management method of the content reproduction apparatus 20 to discriminate a transfer method, the user need not be conscious of the copyright management method of the content reproduction apparatus 20 to select a transfer method.

<14. Content Reproduction Control Method of the Content Reproduction Apparatus (PD)>

Now, a reproduction control method of a content by the content reproduction apparatus (PD) 20 according to the present embodiment is described.

The content reproduction apparatus (PD) 20 according to the present embodiment is ready for both of a copyright management scheme of the group management type and another copyright management scheme of the check-in check-out type as described hereinabove. To this end, the content reproduction apparatus (PD) 20 can selectively execute one of reproduction control of the group management type based on a source ID applied to a content and a source ID list L and reproduction control of the check-in check-out type based on utilization condition information of a license corresponding to a content.

The content processing apparatus (PC) 10 sets the reproduction control method of the content reproduction apparatus (PD) 20 connected thereto through the local line 9 to one of the group management type and the check-in check-out type. The setting of the reproduction control method is performed by the content processing apparatus (PC) 10 which acquires ICV data 231 of the content reproduction apparatus (PD) 20 from the content reproduction apparatus (PD) 20, updating the type identification information (flag 232, refer to FIG. 10) in the ICV data 231 and then transferring the ICV data 231 to the content reproduction apparatus (PD) 20 so as to be written into the content reproduction apparatus 20. For example, if the flag 232 in the ICV data 231 is described as "0", then the reproduction control method of the content reproduction apparatus (PD) 20 is set to the group management type, but if the flag 232 is described as "1", then the reproduction control method of the content reproduction apparatus (PD) 20 is set to the check-in check-out type.

It is to be noted that, in the present embodiment, the ICV data 231 of the content reproduction apparatus (PD) 20 can be updated only by the content processing apparatus (PC) 10 locally connected to the content reproduction apparatus (PD) 20, but the content reproduction apparatus (PD) 20 itself cannot update the ICV data 231. However, the present invention is not limited to such an example as just described, but the content reproduction apparatus (PD) 20 itself may be configured so as to update the ICV data 231 based on a user input or the like so that the reproduction control method of the content reproduction apparatus (PD) 20 may be changed over by the content reproduction apparatus (PD) 20 itself.

Now, an example of a content reproduction control process of the content reproduction apparatus (PD) 20 according to the present embodiment is described with reference to FIGS. 54 and 10. It is to be noted that FIG. 54 is a flow chart illustrating an example of the content reproduction control process of the content reproduction apparatus (PD) 20 according to the present embodiment.

This content reproduction control process is a processing flow of causing a content of a reproduction object to be selected by a user from among all of contents stored in the content reproduction apparatus 20 and then deciding permission/inhibition of reproduction of the selected content of the reproduction object to perform control of the reproduction.

Figure 54:
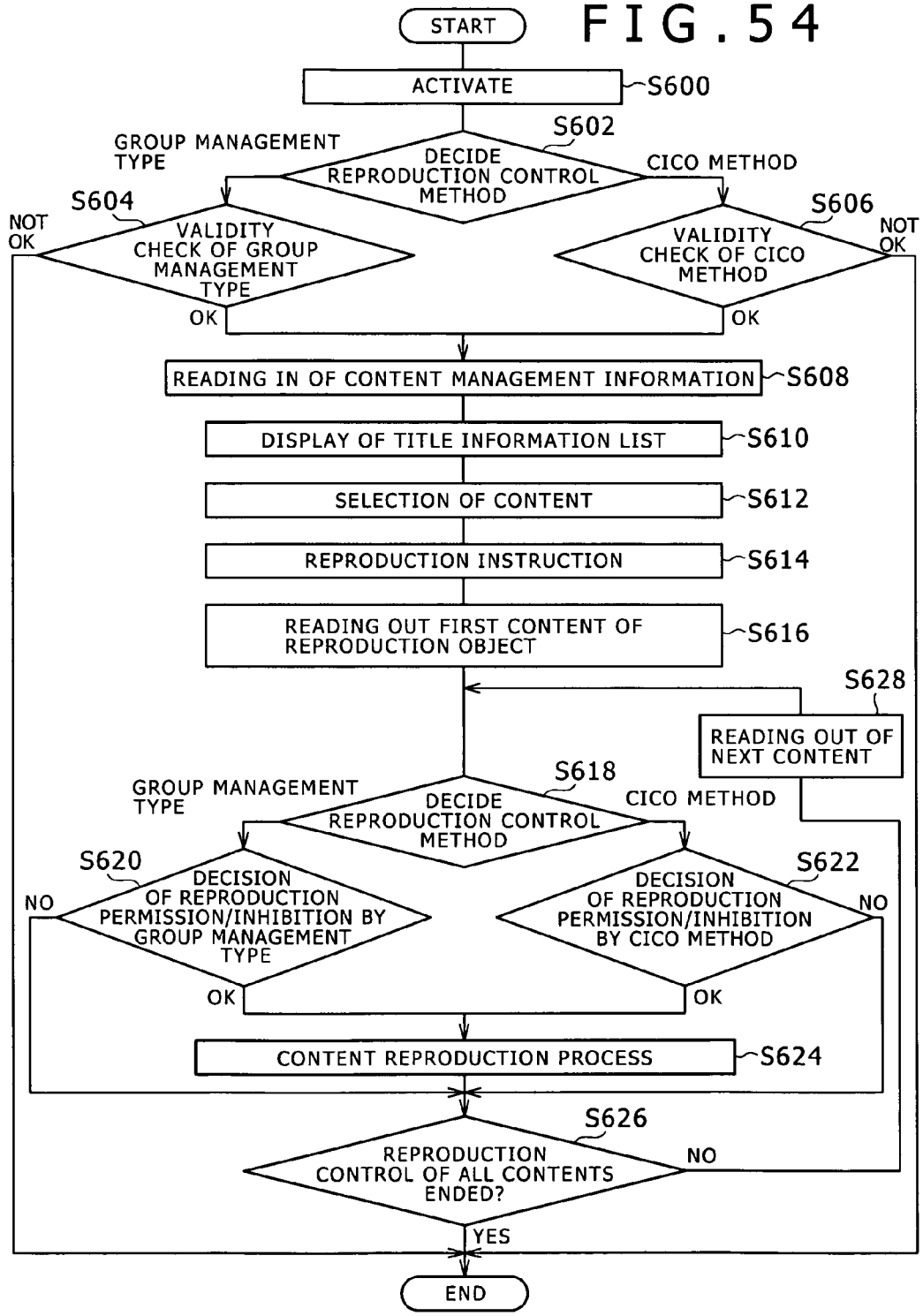
FIG. 54 is a flow chart illustrating an example of a content reproduction control process of the content reproduction apparatus (PD) according to the embodiment.

As shown in FIG. 54, first at step S600, the content reproduction apparatus 20 is activated (S600). For example, if a power supply button (reproduction key or the like) of the content reproduction apparatus 20 is depressed by a user, then the content reproduction apparatus 20 is activated. It is to be noted that, upon this activation, the content reproduction apparatus 20 and the content processing apparatus (PC) 10 need not be connected to each other.

Then at step S602, the reproduction control method of the content reproduction apparatus 20 set in advance is decided based on the method identification information by the reproduction control type decision section 240 of the content reproduction apparatus 20 (step S602).

In particular, after the content reproduction apparatus 20 is activated, the reproduction control type decision section 240 reads out the ICV data 231 stored in the storage section 230 of the content reproduction apparatus 20 and checks the flag 232 in the ICV data 231. This flag 232 is an example of the method identification information representative of the reproduction control method of the content. The reproduction control type decision section 240 decides based on the value of the flag 232 whether the reproduction control method of the content reproduction apparatus 20 is set to the group ID management method (first reproduction control method) or the check-in check-out method (first reproduction control method). For example, if the flag 232 is "0", then the reproduction control type decision section 240 decides that the reproduction control method of the content reproduction apparatus (PD) 20 is set to the group management method, and the processing advances to step S604. On the other hand, if the flag 232 is "1", then the reproduction control type decision section 240 decides that the reproduction control method of the content reproduction apparatus (PD) 20 is set to the check-in check-out method, and the processing advances to step S606.

Then at step S604, the validity in that reproduction control of the group management method is performed is checked by the reproduction permission/inhibition decision section 242 of the content reproduction apparatus 20 (step S604). In particular, the reproduction permission/inhibition decision section 242 checks the validity of the source ID list L stored in the storage section 230 based on the ICV data 231 stored in the storage section 230, that is, checks whether or not the source ID list L is falsified illegally. As described hereinabove, the MAC value 233 of the legal source ID list L is included in the ICV data 231 of the group management method. Therefore, the reproduction permission/inhibition decision section 242 can detect presence/absence of falsification of the source ID list L by comparing the MAC value of the source ID list L at present read out from the storage section 230 and the MAC value 233 of the ICV data 231 read out from the storage section 230 with each other.

On the other hand, at step S606, the validity in that reproduction control of the check-in check-out method is performed is checked by the reproduction permission/inhibition decision section 242 of the content reproduction apparatus 20 (step S606). In particular, the reproduction permission/inhibition decision section 242 checks the validity of the license of each of the contents stored in the storage section 230, that is, checks whether or not the license is falsified illegally, based on the ICV data 231 stored in the storage section 230. As described hereinabove, the MAC value 233 based on the license of each content is included in the ICV data 231 of the check-in check-out method. Therefore, the reproduction permission/inhibition decision section 242 can detect presence/absence of falsification of the license by comparing the license of each content and the MAC value 233 of the ICV data 231.

If illegal falsification is detected as a result of such a validity check at step S604 or S606 as described above, then the reproduction of the content is not permitted, but an error notification is issued and all processes are ended. On the other hand, if illegal falsification is not found but the validity is confirmed, then the processing advances to step S608.

Then at step S608, content management information is read out from the content management information database 236 into the RAM 203 (step S608). This content management information is attribute information of contents stored in the content database 234 such as a content ID, title information of the contents (tune name, artist name, album name, reproduction time and so forth), recording place information (for example, an address in the content database 234) and so forth relating to the contents.

Further at step S610, a title list is displayed on the display apparatus 210 of the content reproduction apparatus 20 (step S610). The title list production section 250 of the content reproduction apparatus (PD) 20 produces a title list of the contents based on the title information of the contents read out from the content management information database 236. This title list is, for example, a table of tune names of music contents and includes, as incidental information, an artist name or an album name, reproduction time and so forth of a music content. Further, the title list production section 250 causes the produced title list to be displayed on the display apparatus 210.

Thereafter, at step S612, a content of a reproduction object would be selected by the user (step S612). When the title list is displayed on the display apparatus 210 as described above, the user would read the title list to select one, two or more contents whose reproduction is desired and operate the inputting apparatus 208 to designate the title information of the content or contents.

Furthermore, at step S614, a reproduction instruction would be issued by the user (step S614). After the title information of the content or contents whose reproduction is desired is designated in such a manner as described above, the user would depress the reproduction key of, for example, the inputting apparatus 208 or the remote controller 218 to issue an instruction to start a reproduction process. Consequently, the content selection section 252 selects a content or contents corresponding to the title information designated by the user as a content or contents of an object of reproduction and outputs information (content ID, storage place information and so forth) relating to each of the contents of the reproduction object to the reproduction permission/inhibition decision section 242.

Further, at step S616, the content of the first one of the selected reproduction objects is read out from the content database 234 (step S616). In particular, the reproduction permission/inhibition decision section 242 searches the content database 234 based on information regarding the contents of the reproduction object inputted from the content selection section 252 to read out the file of the first one of the contents of the reproduction object.

Thereafter, at step S618, the reproduction control method of the content reproduction apparatus 20 set in advance is decided similarly as at step S602 described hereinabove (step S618). If it is decided as a result of the decision that the reproduction control method of the content reproduction apparatus 20 is the group management type, then the processing advances to step S620, but if it is decided that the reproduction control method of the content reproduction apparatus 20 is the check-in check-out method, then the processing advances to step S622. It is to be noted that, since the decision of the reproduction control method has been performed at step S602 described hereinabove, the present set S618 at which similar decision of the reproduction control method is performed can be omitted.

Then at step S620, the first reproduction permission/inhibition decision section 242a decides permission/inhibition of the content of the reproduction object based on the reproduction control method of the group management type (step S620). In particular, the first reproduction permission/inhibition decision section 242a decides permission/inhibition of reproduction of the content based on whether or not the source ID applied to the content of the reproduction object is included in the source ID list L stored in the storage section 230 of the content reproduction apparatus 20.

If a result of the decision reveals that the source ID applied to the content of the reproduction object is included in the source ID list L, then the first reproduction permission/inhibition decision section 242a permits reproduction of the content, and the processing advances to step S624. On the other hand, if the source ID applied to the content of the reproduction object is not included in the source ID list L, then the first reproduction permission/inhibition decision section 242a does not permit reproduction of the content, and the processing advances to step S626.

It is to be noted that, if a term of validity is set to the source ID included in the source ID list L, then the first reproduction permission/inhibition decision section 242a decides, at step S620, in addition to the decision described above, whether or not the source ID applied to the content of the reproduction object is within the term of validity. If the source ID is within the term of validity, then the first reproduction permission/inhibition decision section 242a permits reproduction of the content, but if the source ID is outside the term of validity, then the first reproduction permission/inhibition decision section 242a does not permit reproduction of the content.

Meanwhile, at step S622, permission/inhibition of reproduction of the content of the reproduction object is decided based on the reproduction control method of the check-in check-out type by the second reproduction permission/inhibition decision section 242b (step S622). In particular, the second reproduction permission/inhibition decision section 242b decides permission/inhibition of the content of the reproduction object based on the utilization conditions (reproduction time number restriction, reproduction term and so forth) of the license associated with the content of the reproduction object.

If a result of the decision reveals that the utilization conditions of the license are satisfied (for example, when the license is within the reproduction term, when the reproduction time number in the past does not reach an upper limit to the reproduction time number or the like), the second reproduction permission/inhibition decision section 242b permits reproduction of the content, and the processing advances to step S624. At this time, for example, if a reproduction time number restriction is set to a utilization condition of the license, then the reproduction time number is incremented by one. On the other hand, if the utilization conditions of the license are not satisfied (for example, when the license is outside the reproduction term, when the reproduction time number in the past reaches the upper limit to the reproduction time number or the like), the second reproduction permission/inhibition decision section 242b does not permit reproduction of the content, and the processing advances to step S626.

Thereafter, at step S624, the content of the reproduction object whose reproduction has been permitted at step S620 or S622 described hereinabove is reproduced by the reproduction execution section 244 (step S624). On the other hand, the content of the reproduction object whose reproduction has not been permitted at step S620 or S622 described hereinabove is not reproduced. In this instance, an error notification may be issued.

Then at step S626, it is decided whether or not the reproduction control at steps S618 to S624 described above has been performed for all of the contents of the object of reproduction selected at step S612 described hereinabove (step S626). If the reproduction control has not be performed for some of the selected contents, then the processing advances to step S628, at which a next one of the contents of the reproduction object is read out from the content database 234 (step S628). Thereafter, the reproduction control at S618 to S624 is performed in a similar manner as described above for the next content of the reproduction object. After such processes as described above are repeated for all of the contents of the reproduction object selected at step S612 described hereinabove, the entire processing flow is ended.

Now, another example of the content reproduction control process of the content reproduction apparatus (PD) 20 according to the present embodiment is described with reference to FIGS. 55 and 10. It is to be noted that FIG. 55 is a flow chart illustrating another example of the content reproduction control process of the content reproduction apparatus (PD) 20 according to the present embodiment.

This content reproduction control process is a processing flow wherein, for example, title information of all of contents stored in the content reproduction apparatus 20 is first displayed in a list such that reproducible contents and non-reproducible contents can be distinguished from each other and then, after a user who reads the title list selects a content of a reproduction object from among the reproducible contents, the selected content of the reproduction object is reproduced.

Figure 55:
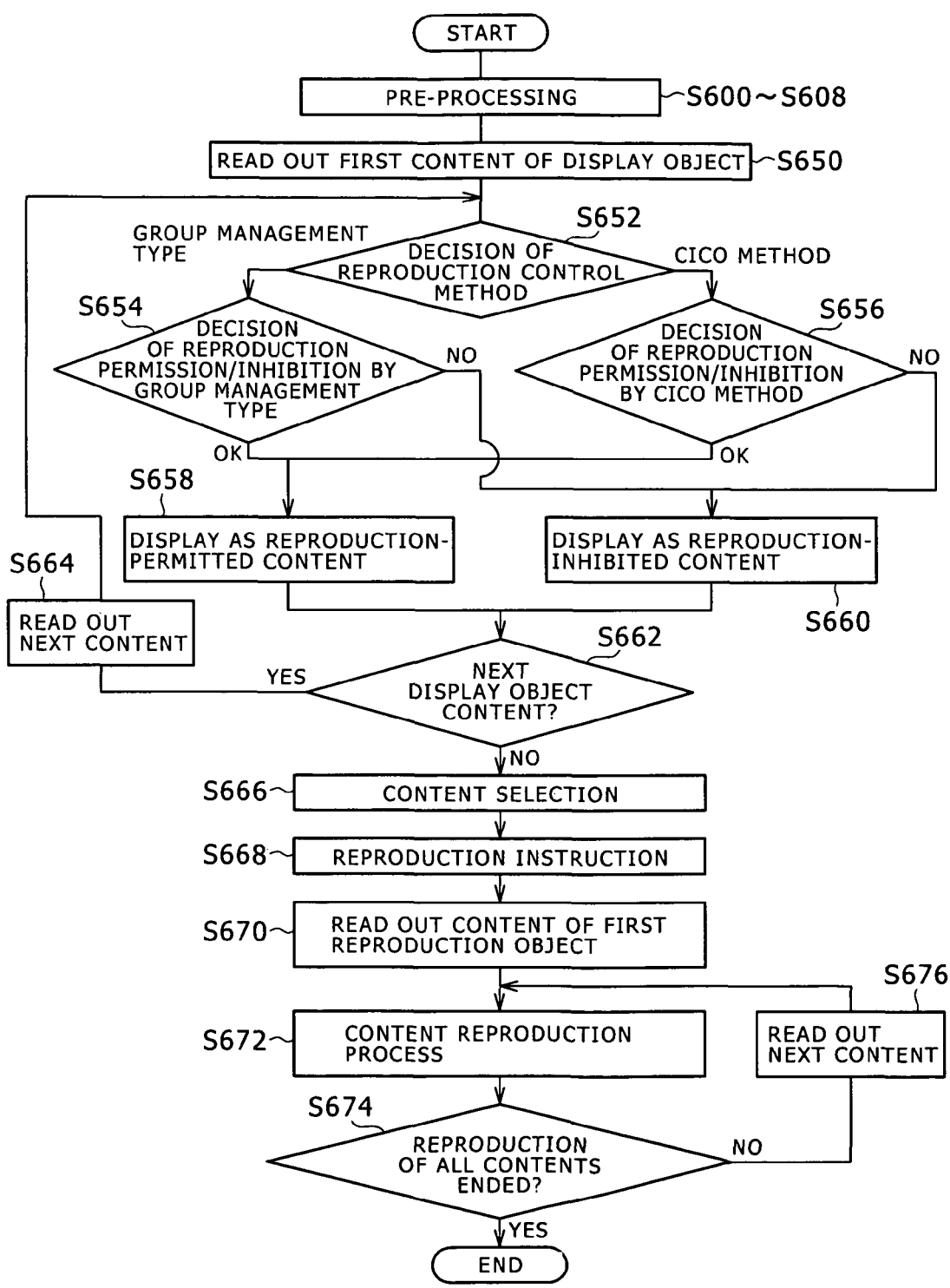
FIG. 55 is a flow chart illustrating another example of the content reproduction control process of the content reproduction apparatus (PD) according to the embodiment.

As shown in FIG. 55, pre-processes similar to those at steps S600 to S608 described hereinabove with reference to FIG. 54 are performed first (steps S600 to S608).

At next steps S650 to S664, a title list display process is performed wherein a title list on which reproducible contents and non-reproducible contents can be distinguished from each other is displayed on the display apparatus 210 of the content reproduction apparatus 20.

In particular, first at step S650, a first content of the display object is read out from the content database 234 (step S650). In particular, the reproduction permission/inhibition decision section 242 searches the content database 234 based on information relating to the content in the content management information (content ID, storage place information and so forth) read out at step S508 described hereinabove to read out a file of the first content of the display object.

It is to be noted that, in the present embodiment, all of the contents stored in the content database 234 of the content reproduction apparatus 20 are determined as contents of a display object. However, the present invention is not limited to such an example as just described, but some of the contents may be determined as contents of a display object based on a predetermined reference for selection. This reference for selection may be, for example, the artist, album, genre, release date, latest reproduction timing, designation by the user or the like of a music content.

Then at step S652, the reproduction control method of the content reproduction apparatus 20 set in advance is decided similarly as at step S602 described hereinabove (step S652). If a result of the decision proves that the reproduction control method is the group management method, then the processing advances to step S654, but if the reproduction control method is the check-in check-out method, then the processing advances to step S656. It is to be noted that, since the decision of the reproduction control method has been performed at step S602 described hereinabove, the present step S652 at which similar decision of the reproduction control method is performed can be omitted.

Further, at step S654, the first reproduction permission/inhibition decision section 242a decides permission/inhibition of the content of the reproduction object based on the reproduction control method of the group management type (step S654). In particular, the first reproduction permission/inhibition decision section 242a decides permission/inhibition of reproduction of the content of the reproduction object based on whether or not the source ID applied to the content of the reproduction object is included in the source ID list L stored in the storage section 230 of the content reproduction apparatus 20.

If a result of the decision reveals that the source ID applied to the content of the reproduction object is included in the source ID list L, then the first reproduction permission/inhibition decision section 242a decides that the content is a reproducible content, and the processing advances to step S658. On the other hand, if the source ID applied to the content of the reproduction object is not included in the source ID list L, then the first reproduction permission/inhibition decision section 242a decides that the content is a non-reproducible content, and the processing advances to step S660.

On the other hand, at step S656, the second reproduction permission/inhibition decision section 242b decides permission/inhibition of the content of the reproduction object based on the reproduction control method of the check-in check-out type (step S656). In particular, the second reproduction permission/inhibition decision section 242b decides permission/inhibition of reproduction of the content of the reproduction object based on utilization conditions (reproduction time number restriction, reproduction term and so forth) associated with the content of the reproduction object.

If a result of the decision reveals that the utilization conditions of the license described hereinabove are satisfied, then the second reproduction permission/inhibition decision section 242*b* decides that the content is a reproducible content, and the processing advances to step S658. On the other hand, if the utilization conditions of the license are not satisfied, then the second reproduction permission/inhibition decision section 242*b* decides that the content is a non-reproducible content, and the processing advances to step S660.

Then at step S658, the content of the reproduction object which has been decided to be reproducible at step S654 or S656 described hereinabove is displayed as a reproducible content (step S658). In particular, the title list production section 250 causes the display apparatus 210 to display the title information of the content of the display object which has been decided to be reproducible in such a form that the user can recognize that the content is reproducible.

On the other hand, at step S660, the content of the display object which has been decided to be non-reproducible at step S654 or S656 described hereinabove is displayed as a non-reproducible content (step S660). In particular, the title list production section 250 causes the display apparatus 210 to display the title information of the content of the display object which has been decided to be non-reproducible in such a form that the user can recognize that the content is non-reproducible.

Thereafter, at step S662, it is decided whether or not the reproduction permission/inhibition decision and display processes at steps S652 to S660 described hereinabove have been performed for all of the contents of the display object (step S662). If the reproduction permission/inhibition decision and display processes have not been performed for some of the contents of the display object, then the processing advances to step S664, at which a next content of the display object is read out from the content database 234 (step S664). Thereafter, the reproduction permission/inhibition decision and display processes at steps S652 to S660 are executed similarly as described hereinabove for the next content of the display object. After such processes as described above are repeated for all of the contents of the display object, the processing advances to step S666.

It is to be noted that, at the point of time at which the processing advances to step S666, a title list on which reproducible contents and non-reproducible contents can be distinguished from each other is displayed on the display apparatus 210. Display examples of the title list are shown in FIGS. 56A to 56C.

Figure 56C:
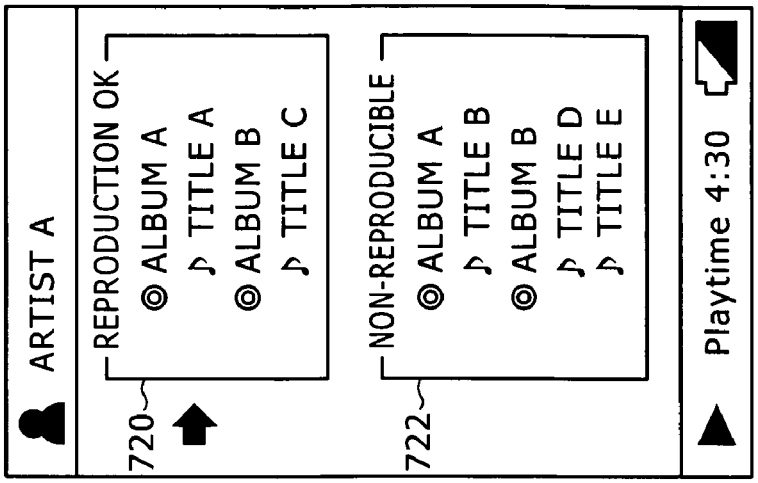
FIG. 56C is an explanatory view showing a further example of the title list to be displayed on the display apparatus of the content reproduction apparatus (PD) according to the embodiment.
Figure 56B:
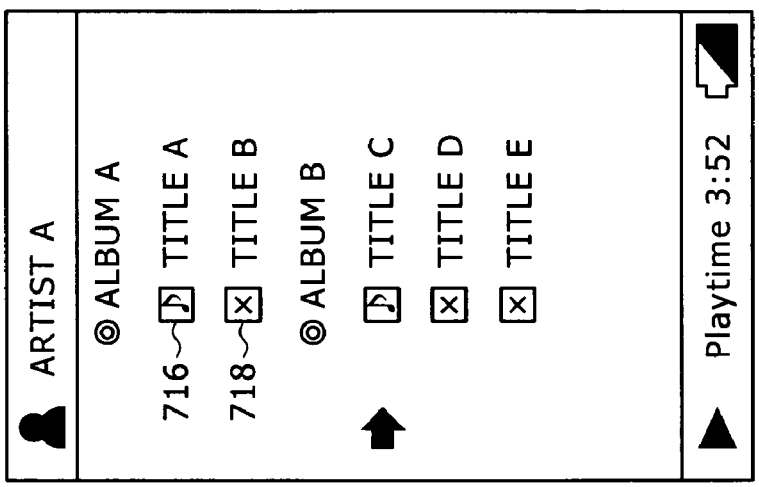
FIG. 56B is an explanatory view showing another example of the title list to be displayed on the display apparatus of the content reproduction apparatus (PD) according to the embodiment.
Figure 56A:
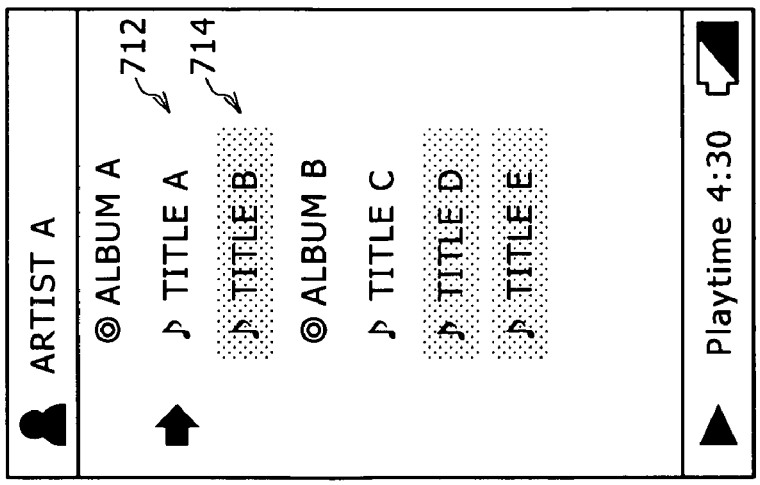
FIG. 56A is an explanatory view showing an example of a title list to be displayed on a display apparatus of the content reproduction apparatus (PD) according to the embodiment.

As shown in FIGS. 56A to 56C, on a title list 710 displayed on the display apparatus 210 of the content reproduction apparatus 20, for example, titles A to E (tune names) of music contents relating to a certain artist A are displayed for each of the albums A and B. On the title list 710, the titles A and C of reproducible contents and the titles B, D and E of non-reproducible contents are displayed in a distinguishable manner from each other.

In particular, in the example of the title list 710 shown in FIG. 56A, the titles A and C of reproducible contents and the titles B, D and E of non-reproducible contents are distinguished from each other by being displayed in different colors or with different luminances. For example, an area 712 in which the titles A and C of reproducible contents are displayed and another area 714 in which the titles B, D and E of non-reproducible contents are displayed in different colors or with different luminances so that the user can distinguish the reproducible contents and the non-reproducible contents from each other. Further, according to such display as just described, where reproducible contents and non-reproducible contents are included in a mixed state in one album, the user can recognize which content in the album is reproducible and which content is non-reproducible.

On the other hand, in the example of the title list 710 shown in FIG. 56B, a reproducible icon 716 of a musical note mark is added to the titles A and C of reproducible contents while a non-reproducible icon 718 of a x mark is added to the titles B, D and E of non-reproducible contents. By displaying titles of contents to which icons which are different in color, shape, pattern, size or the like in this manner are added to the title for each content in this manner, reproducible contents and non-reproducible contents can be displayed such that they can be distinguished from each other.

Further, in the example of the title list 710 shown in FIG. 56C, the titles A and C of reproducible contents and the titles B, D and E of non-reproducible contents are displayed distinctly in different regions. In particular, the titles A and C of reproducible contents are displayed in a reproduction OK area 720 while the titles B, D and E of non-reproducible contents are displayed in a non-reproducible area 722. Consequently, the user can distinguish the reproducible contents and the non-reproducible contents from each other. Further, according to such a display example as just described, since reproducible/non-reproducible contents of the content reproduction apparatus 20 are displayed collectively, the user can collectively recognize reproducible/non-reproducible contents in the content reproduction apparatus 20.

Referring back to FIG. 55, at step S666, a content of a reproduction object would be selected from among the reproducible contents by the user (step S666). Where the title list is selected on the display apparatus 210 as described above, the user would read the title list to select one, two or more contents whose reproduction is desired and operate the inputting apparatus 208 to designate title information of the content or contents. Thereupon, since reproducible contents and non-reproducible contents are displayed in a distinguishable manner on the title list as shown in FIGS. 56A to 56C, the user can select any content whose reproduction is desired from among the reproducible contents.

Thereafter, at step S668, a reproduction instruction would be issued by the user (step S668). After the user designates title information of a desired content in such a manner as described above, the user would depress, for example, the reproduction key of the inputting apparatus 208 or the remote controller 218 to issue an instruction to start a reproduction process. Consequently, the content selection section 252 selects contents corresponding to the title information designated by the user as contents of a reproduction object and outputs information relating to the contents of the reproduction object (content ID, storage location information and so forth) to the reproduction permission/inhibition decision section 242.

Then at step S670, a first one of the selected contents of the reproduction object is read out from the content database 234 (step S670). In particular, the reproduction permission/inhibition decision section 242 searches the content database 234 based on the information relating to the contents of the reproduction object inputted from the content selection section 252 to read out a file corresponding to a first one of the contents of the reproduction object. Then, the reproduction permission/inhibition decision section 242 issues an instruction to the reproduction execution section 244 to reproduce the content without making a decision of whether or not reproduction of the content should be permitted. This is because, since the contents selected at step S666 described hereinabove by the user are all reproducible contents, there is no necessity to make a decision of permission/inhibition again.

Further, at step S672, the reproduction execution section 244 reproduces the content of the reproduction object (step S672).

Then at step S674, it is decided whether or not all of the contents of the reproduction object selected at step S666 are reproduced (S674). If some content which is not reproduced as yet remains among the selected contents, then the processing advances to step S676, at which a next one of the contents of the reproduction object is read out from the content database 234 (step S676). Thereafter, the next content of the reproduction object is reproduced (step S672). As such a reproduction process as described above is repeated for all of the contents of the reproduction object selected at step S666, the entire processing flow is ended.

The content reproduction control method of the content reproduction apparatus (PD) 20 according to the present embodiment is described above. In the present content reproduction control process of the content reproduction apparatus (PD) 20, it is first determined whether the reproduction control method of the content reproduction apparatus 20 is the group management type or the check-in check-out type, and the reproduction control (reproduction permission/inhibition decision) of contents is performed in accordance with the determined reproduction control method. Therefore, the content reproduction apparatus 20 can selectively execute the two reproduction control methods including the group management method and the check-in check-out method. Consequently, the convenience to the user is enhanced, and besides, since there is no necessity to design and develop content reproduction apparatus (PD) 20 of different models for the different reproduction control methods, enhancement in efficiency in developing work and reduction of the cost can be anticipated.

Further, the content reproduction apparatus (PD) 20 can cope not only with a copyright management scheme according to the conventional check-in check-out method but also with another copyright management scheme according to the group management method wherein reproduction control is performed based on a source ID applied to a content and a source ID list. Consequently, it is possible to cope with a copyright management scheme which is higher in degree of freedom in utilization of contents by a user and is further user-friendly.

Further, where an application for managing a copyright management scheme which is different among different districts is installed into the content processing apparatus 10, only if method identification information (flag 232 or the like) corresponding to any of the copyright management schemes (reproduction control methods) is set in the content reproduction apparatus 20, then reproduction control of a content transferred from the content processing apparatus (PC) 10 in which the application is installed can be performed.

Further, the content reproduction apparatus 20 can display a title list of contents held therein such that those contents which can be reproduced and those contents which cannot be reproduced can be distinguished from each other. Consequently, the user can read the content list to grasp the reproducible contents and the non-reproducible contents and select a desired content to be reproduced from among the reproducible contents.

A preferred embodiment of the present invention is described above with reference to the accompanying drawings. However, naturally the present invention is not limited to the embodiment described above. It is apparent that various alterations or modifications may be made by those skilled in the art within the scope of the invention described in the claims, and it is to be understood that also such alterations and modifications naturally fall within the technical scope of the present invention.

For example, while, in the embodiment described above, each content processing apparatus (PC) 10 produces a group ID based on user identification information (leaf ID) received from the server 30, the present invention is not limited to this example. For example, the server 30 may produce a group ID in a unit of a user. In this instance, the group management server 32 may issue, upon registration of each apparatus, a notification of a group ID in place of a leaf ID to the content processing apparatus 10 such that the content processing apparatus 10 stores the received group ID into the source ID list. Further, the content distribution server 34 may transmit a group ID associated with a distribution content in place of a leaf ID. At this time, the content distribution server 34 may apply the group ID in a file of the distribution content in advance and transmit the file to the content processing apparatus 10.

INDUSTRIAL APPLICABILITY

The present invention can be applied to a content processing apparatus and particularly to a content processing apparatus which manages contents which can be reproduced and contents which cannot be reproduced under copyright management.

The invention claimed is:

1. A content processing hardware apparatus connected to a content reproduction apparatus and a management server, the content processing apparatus comprising:
   a reproduction control section configured to control a reproduction of a content distributed with a source ID and a group ID, wherein the source ID is based on a first source ID list which is retained by said content processing apparatus and indicates providing sources of contents whose reproduction is to be permitted, and said group ID is produced in a unit of a user and is added when said content processing apparatus is registered in a unit of a user at said management server;
   a display configured to display title information of contents stored in the connected content reproduction apparatus;
   a selection section configured to receive an input selecting the title information of the contents displayed on said display;
   a requesting section configured to request a transfer of a content corresponding to the title information selected by said selection section to said content processing apparatus;
   a transfer mode detection section configured to detect a transfer mode of the connected content reproduction apparatus;
   a first transfer processing section configured to detect whether the content corresponding to the title information selected by said selection section is a content previously transferred from said content processing apparatus to the content reproduction apparatus and for updating right information corresponding to the content stored in said content processing apparatus and deleting right information corresponding to the content stored in the content reproduction apparatus; and
   a second transfer processing section configured to detect whether the group ID applied to said content processing apparatus is included in a second source ID list stored in the content reproduction apparatus, and to transfer the content corresponding to the title information selected by said selection section from the content reproduction apparatus to said content processing apparatus.

2. The content processing hardware apparatus according to claim 1, further comprising:

a first operation display section configured to display a first operation section for issuing an instruction to said requesting section, said requesting section configured to request the transfer in response to an operation of said first operation section.

3. A content processing hardware apparatus, comprising:
a processor configured to control a reproduction of a content;
a display configured to display title information of contents stored in a content reproduction apparatus connected to the content processing apparatus; and
a user input configured to receive a selection of at least one of the contents stored in the content reproduction apparatus displayed on the display,
the processor configured to determine a first transfer mode or a second transfer mode of the content based on mode setting information stored at the content processing apparatus,
the processor configured to retrieve the content corresponding to the selection received at the input from the content reproduction apparatus and delete the retrieved content from the content reproduction apparatus, and to transfer the content to the content reproduction apparatus, when the detected transfer mode is the first transfer mode, and
the processor configured to retrieve the content corresponding to the selection received at the input from the content reproduction apparatus while maintaining a copy of the retrieved content at the content reproduction apparatus when the detected transfer mode is the second transfer mode.

4. The content processing apparatus according to claim 3, wherein the processor is configured to automatically transfer the content to the content reproduction apparatus, when the detected transfer mode is the second transfer mode.

5. A computer program embodied on a computer-readable hardware storage medium for causing a content processing hardware apparatus, which is connected at least to a content reproduction apparatus and a management server, to execute:
controlling a reproduction of a content distributed with a source ID and a group ID, wherein the source ID is based on a first source ID list which is retained by said content processing apparatus and indicates providing sources of contents whose reproduction is to be permitted, and said group ID is produced in a unit of a user and is added when said content processing apparatus is registered in a unit of a user at said management server;
displaying title information of contents stored in the connected content reproduction apparatus;
selecting the title information of the contents displayed by the displaying;
requesting a transfer of a content corresponding to the title information selected by the selection process selecting to said content processing apparatus;
detecting a transfer mode of the connected content reproduction apparatus;
detecting whether the content corresponding to the title information selected by the selecting is a content previously transferred from said content processing apparatus to the content reproduction apparatus, updating right information corresponding to the content stored in said content processing apparatus, and deleting right information corresponding to the content stored in the content reproduction apparatus; and
detecting whether the group ID applied to said content processing apparatus is included in a second source ID list stored in the content reproduction apparatus, and transferring the content corresponding to the title information selected by the selecting from the content reproduction apparatus to said content processing apparatus.

6. A content processing method implemented using a content processing hardware apparatus, which is connected at least to a content reproduction apparatus and a management server, the content processing method comprising:
controlling a reproduction of a content distributed with a source ID and a group ID, wherein the source ID is based on a first source ID list which is retained by said content processing apparatus and indicates providing sources of contents whose reproduction is to be permitted and said group ID is produced in a unit of a user and is added when said content processing apparatus is registered in a unit of a user at said management server;
displaying title information of contents stored in the connected content reproduction apparatus;
selecting the title information of the contents displayed by the displaying;
requesting a transfer of a content corresponding to the selected title information to said content processing apparatus;
detecting a transfer mode of the connected content reproduction apparatus;
detecting whether the content corresponding to the title information selected by the selecting is a content previously transferred from said content processing apparatus to the content reproduction apparatus, updating right information corresponding to the content stored in said content processing apparatus and deleting right information corresponding to the content stored in the content reproduction apparatus; and
detecting whether the group ID applied to said content processing apparatus is included in a second source ID list stored in the content reproduction apparatus and transferring the content corresponding to the title information selected by the selecting from the content reproduction apparatus to said content processing apparatus.

* * * * *